United States Patent [19]
Lewis et al.

[11] Patent Number: 5,812,394
[45] Date of Patent: Sep. 22, 1998

[54] OBJECT-ORIENTED COMPUTER PROGRAM, SYSTEM, AND METHOD FOR DEVELOPING CONTROL SCHEMES FOR FACILITIES

[75] Inventors: Robert W. Lewis, Dana Point; Matthew A. Tanner, Irvine, both of Calif.; Timothy K. Walker, Overland Park, Kans.

[73] Assignee: Control Systems International, Fairway, Kans.

[21] Appl. No.: 505,704

[22] Filed: Jul. 21, 1995

[51] Int. Cl.$^6$ ................................................ G05B 11/01
[52] U.S. Cl. ..................... 364/146; 364/188; 364/189; 364/191; 364/140
[58] Field of Search ....................... 364/188, 189, 364/146, 191, 140, 130, 300, 400, 513; 395/155, 500, 700, 159, 326, 561

[56] References Cited

U.S. PATENT DOCUMENTS

| | | | |
|---|---|---|---|
| 4,628,435 | 12/1986 | Tashiro et al. | 364/130 |
| 4,736,320 | 4/1988 | Bristol | 364/300 |
| 4,885,717 | 12/1989 | Beck et al. | 364/900 |

(List continued on next page.)

OTHER PUBLICATIONS

Bailey, "Introducing Bailey Evolution 90™ . . . The Sound Investment Strategy for Process Automation", 1993.
Bailey, "Wide–Range, Fully Compatible Family of Process Automation and Management Systems", 1993.
Computer Products, "Unbundling the DCS", approximately 1992.

(List continued on next page.)

*Primary Examiner*—Reba I. Elmore
*Assistant Examiner*—Ramesh Patel
*Attorney, Agent, or Firm*—Hovey, Williams, Timmons & Collins

[57] ABSTRACT

An object-oriented development system for developing control schemes for facilities includes a device diagramming component for describing a physical description of a facility and a logical definition of a control scheme for the facility. The device diagramming component includes a mode for selecting device symbols representative of equipment or control functions used in facilities. The device symbols are selected from an object-oriented repository containing a plurality of device symbols and device objects. Certain types of device symbols relate to device objects containing logical instructions and configuration information relating to the represented equipment or control functions. The device diagramming component also includes a mode for interrelating in a graphical manner the selected device symbols and their corresponding device objects into a device diagram representing the physical description of the facility and the logical definition of the control scheme for the facility. A device logic developing component defines the logical instructions of the device objects relating to the equipment or control functions. Thus, the development system integrates in a graphical format the physical description of the facility with the logical instructions which define the control scheme for the facility. These logical instructions unify the configuration of analog/regulatory control with the configuration of discrete/sequential/interlocking control.

32 Claims, 77 Drawing Sheets

U.S. PATENT DOCUMENTS

| | | | |
|---|---|---|---|
| 4,972,328 | 11/1990 | Wu et al. | 364/513 |
| 5,014,208 | 5/1991 | Wolfson | 364/468 |
| 5,051,898 | 9/1991 | Wright et al. | 364/200 |
| 5,485,600 | 1/1996 | Joseph et al. | 395/500 |
| 5,485,620 | 1/1996 | Sadre et al. | 395/700 |
| 5,509,116 | 4/1996 | Hiraga et al. | 395/155 |
| 5,530,643 | 6/1996 | Hodorowski | 364/191 |
| 5,546,301 | 8/1996 | Agrawal et al. | 364/140 |
| 5,555,385 | 9/1996 | Selby et al. | 395/159 |
| 5,576,946 | 11/1996 | Bender et al. | 364/146 |
| 5,594,858 | 1/1997 | Blevins | 395/326 |
| 5,603,018 | 2/1997 | Terada et al. | 395/561 |
| 5,611,059 | 3/1997 | Benton et al. | 395/326 |

OTHER PUBLICATIONS

*Elsag Bailey*, "Elsag Bailey Automation", approximately 1993.

*Fisher–Rosemount*, "Managing the Process Better", Sep. 1993.

*Fisher–Rosemount*, "Managing the Process Better", Dec. 1993.

*Honeywell*, "Process Manager Specification and Technical Data", Sep. 1991.

*Honeywell*, "TDC 3000 Overview", approximately 1992.

*Honeywell*, "TDC 3000 Process Manager", approximately 1992.

*Honeywell*, "UDC 6000 Process Controller", Aug. 1992.

*Leeds and Northrup*, "Make Your Automation Plan a Reality: MAX 1000", approximately 1990.

*Toshiba*, "Toshiba Integrated Control Systems", Nov. 1990.

*Reliance Electric Company*, "Multitasking Capability Simplifies Process Control Design", approximately late 1980s, by Angelo J. Notte.

OBJECT-ORIENTED COMPUTER PROGRAM, SYSTEM, AND METHOD FOR DEVELOPING CONTROL SCHEMES FOR FACILITIES

FIELD OF THE INVENTION

The present invention relates to control schemes, and more particularly, to a user configurable open system for control of any type of facility.

BACKGROUND OF THE INVENTION

Control systems for various types of facilities, such as manufacturing or processing facilities, employ feedback control to measure, sense, count, time, etc. a parameter's status in a facility and use this status information to direct the operation of the facility. A control system must provide this capability for all pieces of equipment which need control in a given area of a facility.

In traditional control systems, the following steps generally must be performed to create a control system:

1. Select components of the control system architecture including I/O, controllers, networks, operator interface nodes, and engineering development nodes.
2. Select development tools (software utilities and products) to configure or program the components.
3. Write the logic used to control the facility using a special control programming language. This logic typically executes on some type of controller.
4. Draw and define the appearance and run-time behavior of graphic symbols and screens used to represent field devices on an operator interface.

The need for control systems has spawned a wide variety of products designed to facilitate the above steps. These products are typically built using generally available computing and electronic technology. Also, many general purpose computer and networking products, such as commercial computers, are used as control system components.

The products that typically make up the components of a control system include:

Sensing devices (e.g., thermocouples)
Electronic hardware (e.g., Analog to Digital Converters)
Computing hardware (e.g., single-board computers)
Operating systems (e.g., UNIX)
Network communication (e.g., Arcnet)
Software applications (e.g., databases)
General purpose processors (e.g., Intel 80x86)

Because of this availability of products, the first step of creating a control system involves selecting components. The following components are typically selected and used in control systems:

| | |
|---|---|
| Development Node | Typically, a computer where the control system project is configured by an engineer. |
| Operator Interface | Typically, a computer where an operator can monitor and, if necessary, interact with the control scheme for the equipment in the facility. |
| Control Network | Network that allows computers and controllers to communicate with one another. |
| Controller | Hardware containing configuration information and logic processing instructions pertaining to the field sensors and control devices connected to it. Typically, the hardware is a proprietary, programmable computer designed specifically as a controller to control a facility, e.g., a manufacturing plant or process operation. |
| Sensors (e.g. flow meter) | Devices that measure physical phenomena and convert those measurements into electrical signals which are sent to the controller. |
| Control Devices (e.g. valve) | Devices that operate the facility. Control devices receive their instructions from the controller. |
| I/O Rack | A housing which can hold multiple I/O cards. Each I/O card is typically capable of accepting inputs and driving outputs (I/O). Inputs and outputs are electronic signals wired to screw terminals on the card. Therefore, usually each input or output has a physical piece of wire carrying a voltage or current signal which represents the sensed value or output value. |
| I/O or Instrumentation Network | A network that allows the controller to communicate with I/O racks. |

Based on the capability of these components in the architecture, most control systems provide the following functionality:

1. Measurement, control, and communications: These tasks are performed by groups of modules or devices that are distributed in function and location.
2. Operator interfaces: These are usually located in a centralized control room, although additional operator interfaces may be scattered throughout a facility.
3. Development nodes: These provide access to the logic and graphic screen configuration data.
4. A control network: This provides connections between components.
5. Redundancy: This is implemented in the event a device or module fails. All other devices or modules continue to operate.

These functions can be further summarized by grouping them into development, run-time (operator interface), and controller functions. These are summarized below followed by more detailed descriptions.

Development Functionality

Typical control system installations allow development of a system designed to monitor and control a specific facility. The development environment is a tool with which a control system project is configured. Fundamentally, one must define what happens in the controllers when they receive sensed data from field devices, and what control values the controller might send to a control device in response to the sensed values. An engineer must also define a whole host of additional details including how fast this must happen, how data is presented to an operator, etc.

The typical control system development environment requires a development engineer to fill in forms, draw pictures representing configuration concepts, and/or write specific machine instructions (essentially, a computer program that carries out specific tasks that cannot be defined via other methods). This development environment may be performed using a single product from a single manufacturer composed of either software or software and computer hardware. In other cases, the development environment may be performed by a collection of products from several suppliers. In either case, the result of development activity using these tools is creation of a run-time project from this information. The run-time project must then be transferred to the controller(s) and operator interface(s).

The development may be performed on- or off-site. In either case, the finished control system project is installed on-site. It should be understood that a control system project is a description or definition of the method by which a facility is to be monitored and controlled. In addition to installing the control system project, qualified personnel must perform the manual labor of installing the field sensors and control devices, connecting them to controllers, and connecting the controllers to a network. The development and operator interface computers must also be installed.

Run-Time Functionality

A typical control system run-time environment executes the control system project design configured and programmed during the development phase described above. Typically, the run-time environment consists of a controller programmed with the logic required to evaluate sensed data and send control values to control devices in response to the sensed data. In addition, a run-time environment allows an operator to monitor the status of field sensors and control devices by reading and interpreting data received from the controller and/or by viewing a graphical representation of that data.

Basically, field sensors send sensed data to a controller. The controller has been programmed to evaluate that data and to respond by sending control values back to control devices. At the same time, the controller relays some of that data to a separate computer where an operator monitors the process and, if necessary, performs manual control.

Programming the Controller Logic

The controller is typically programmed at the development node. However, some systems have less capability and require a non-network, direct connection to the controller in order to perform programming.

When a facility is designed, engineers typically produce the following types of documents:

Physical Definition Drawings—illustrate how equipment relates to one another in the field. Such drawings are dependent on the type of facility. For example, a chemical process would likely have an associated Piping and Instrumentation Drawing (P&ID). However, a coal handling conveyor system might have a mechanical flow sheet drawing. A control system for electrical power generation might include electrical one-line drawings.

Sequence of operations or logic schematics—specify in great detail the control logic needed to run the facility described in the physical definition drawings. A sequence of operations uses prose to describe the logic while schematics use graphical symbols and connecting lines to represent the logic.

It should be noted that zero, one, or more of these documents may be produced. For example, many manufacturing operations can be described with only a sequence of operations. On the other hand, most chemical processing plants require P&IDs. Engineers use these paper diagrams as an authority and reference when they program the controller, i.e., the documents specify what the controller should do when it detects certain conditions.

The logic behind the controller's actions is programmed using a special type of program language designed for control applications. Control programming languages are especially suited to receiving sensed values, running those values through standard or custom algorithms, and outputting one or more control values which typically command control devices to do something.

Some of the more common of these control programming languages are described below:

Function Blocks: This is the primary language used to program analog control. A function block processes inputs and provides one or more outputs. Multiple function blocks are connected together to solve the logic for a process, typically, an analog control process. Its paradigm is that of a simple mathematical function, e.g., square root, add, subtract, etc.

Rung Ladder Logic: This is the primary language used to program Programmable Logic Controllers (PLCs). As such, it is used primarily to solve the logic for discrete control. Its paradigm is a series of relays where electric power flows from left to right. This language was designed to mimic the electrical wiring diagram used to design handwired relay control systems.

Sequential Function Chart (SFC): This is the primary language used to solve the logic for batching and similar step-oriented applications. SFC uses a diagram similar to a flowchart to specify a sequence of steps, actions, transitions, and branches.

Textual Control Language: The above languages may be well suited to representing control logic, but they are not well suited to every task that a controller needs to perform. Special textual control languages are similar to conventional programming languages like C, BASIC, or Pascal. They are typically used to augment the other languages to perform initialization procedures or complex calculations, tasks the other languages may not be suited to perform.

Most controller language implementations support more sophisticated functionality than that described above. Some implementations also allow the programmer to save logic and reuse it much as a conventional programmer might create a function or procedure. Additionally, some controllers support other conventional computer science oriented programming languages and methods including C, BASIC, expert systems, flow charting, and others As such, these all represent, with the options described above, a language-based approach to expressing control functionality.

Using these languages, logic is created for each area or operation in a facility associated with a controller. For example, a certain operation might have several sets of logic that define what the controller should do when a certain pump shuts down or starts up. Commands might be sent to other equipment as a result of the pump's current status.

The information contained within a particular operation's logic set may contain minimal or a significant amount of information including tag names that represent originating points for data. The programmer often finds that part or all the logic for one operation is applicable to another operation. In this case, the programmer may copy the appropriate section of logic in order to reuse it. In some cases, the programmer will have to change some of the logic. In all cases, the programmer will have to change all identifiers in order to ensure that the new logic is receiving the correct data. Typically, this involves searching for tag names and replacing them with the appropriate information. The method by which searching and replacing occurs varies from system to system, and in some cases may require significant manual work.

Once the controller logic is programmed, it must be placed into the controller. The method by which the program is placed into the controller varies depending on the capabilities of the controller and other factors. The most common methods involve: (a) downloading the controller logic over a network into the controller's memory, and (b) transporting the controller logic via a removable memory device and copying the controller logic into the controller's memory from that device.

There are two dominant control system options currently available: distributed control systems (DCS) and programmable logic controllers (PLC).

Distributed Control Systems (DCS)

Historically, distributed control systems (DCS) have concentrated on analog control. Discrete control has been the realm of programmable logic controllers (PLC).

The traditional paradigm for an analog control system consists of a field sensor transmitting data to a single-loop controller which provides feedback to a device that has the means to control a measured variable. A single-loop controller implements a generally accepted algorithm—PID or proportional+integral+derivative—which determines what value the controller should send back through the loop to the control device.

In the 1970's, Honeywell introduced what is generally considered to be the first DCS, the TDC-2000. (TDC stands for Total Distributed Control.) The TDC-2000 integrated the functionality of multiple single-loop controllers into a single box. In addition, Honeywell placed the TDC-2000 on a network so that multiple controllers could communicate with one another.

This reduced the space requirements for a controller (for example, one power supply for a single, multi-loop controller rather than one for each single-loop controller). It also allowed the controllers to be distributed and placed closer to their associated field sensors and control devices. This set the paradigm for DCS: the functionality of multiple single-loop controllers in one piece of electronic equipment with many of these tied together on a network.

Today, distributed control systems can contain the functionality of hundreds of controllers executing hundreds of PID algorithms. A specialized I/O network can connect multiple I/O racks to one controller. Each I/O rack can communicate with multiple field sensors and control devices.

In distributed control, individual feedback controllers for each control loop are placed closer to the field devices. This requires a control network that connects individual controllers with operators, computers, consoles, and displays. As a result, the control loops become physically shorter and less vulnerable to noise or damage. Although the communication link might be lost, this represents only a loss of operator intelligence since individual field controllers continue to operate locally. Also the control network is normally equipped with redundant capability in order to prevent loss of control functionality and information.

The typical controller in a DCS system can control hundreds of I/O points. In some cases the points are monitored solely to display the respective sensed values. In other cases, feedback control is executed on the I/O points associated with the controller.

The controller in a DCS system is typically performing the following functions:
  Scanning the I/O or instrumentation network
  Signal conditioning and conversion
  Analog control processing including PID
  Logic and interlocking
  Communication updates with other controllers or operator interface nodes DCS controllers have traditionally been strong in PID and other types of analog processing but weak in logic and interlocking.

Most traditional DCS products rely on function block programming to implement the bulk of the logic for the control scheme. To a great extent, this is because function blocks are especially suited for analog control and traditional DCS deals heavily with analog control. However, function block programming does not always provide all the functionality needed to implement the logic for an operation or process. In some cases, DCS programmers seek out and DCS vendors provide other specialized programming languages that augment the capabilities offered by function block programming. Some of the other types of specialized control languages include rung ladder logic, sequential function charts, some type of textual language, etc.

The development node or configuration interface is used to perform system tasks other than those required by operators. Configuration and maintenance functions are performed at this interface, which can be located in a standalone console or within the operator interface.

The development node interface is used to create graphics, displays, control points, passwords, trend displays, interlocks, and sequencing codes. Different configurations are required since every facility is different in terms of equipment and method of operation. Configuration is performed with a variety of tools, including graphical interfaces, relational databases, configuration forms, text files, or combinations of these.

Programmable Logic Controller (PLC) Based Systems

PLC-based control systems are distinguished by their requirement for integration. Typically, someone—either the end user or a company they have hired—must consolidate the PLC and its I/O subsystem with disparate computers and software packages that compose the operator interface and development nodes. It is not uncommon for a PLC-based control system to include products from a dozen or more vendors, including the PLC manufacturer. In contrast, the DCS control system is typically purchased completely from the DCS vendor.

At the controller level, however, the two systems have great similarity. The basic control function and operation described above is equally applicable to both PLC-based and DCS-based systems.

The typical PLC can control hundreds or thousands of I/O points. In some cases the points are monitored solely to display the respective sensed values. In other cases, feedback control is executed on the I/O points associated with the controller.

The PLC is typically performing the following functions:
  I/O scanning
  Logic processing and interlocking
  Communication updates PLCs have traditionally been strong in logic and interlocking but weak in network redundancy, analog control, and loop (PID) processing. Also, PLCs typically require more attention by control system engineers to set up communication paths which produce a coherent system.

The I/O connected to the PLC monitors sensed values that are sent from field transmitters. The format of the signal sent will vary depending upon the instrumentation used. The controller must collect sensed values from the I/O electronics hardware. Typically, this I/O hardware is located on an I/O network or bus. The I/O hardware converts electrical signals to a digital representation, which must be collected and stored by the controller for logic processing.

Logic refers to a controller's ability to implement a set of rules or conditions. This implementation of logic is related to logic formalisms in language, such as AND, OR, IF/THEN, etc. Often logic must be used to generate these control outputs because an operator could not react quick enough. Interlocking involves specifying with logic the conditions under which it is safe to operate a piece of equipment. The PLC repeatedly works through the logic program as quickly as possible (in the millisecond range). This algorithm varies from PLC manufacturer to PLC manufacturer.

Since the PLC programming environment exposes direct memory locations to the programmer, special attention must be paid by developers to memory maps, accounting for variables, scan order, I/O mapping, and communication updates. Most PLCs can perform communications to other PLC nodes, or to commercial personal computers acting as operator interface nodes. However, significant development time is required to design and implement an effective communications scheme.

Several issues contribute to the difficulty of producing a coherent system throughout the PLC-based architecture.

Because of direct memory addressing, messages sent from PLC to PLC or from PLC to operator interface could become misaligned by even slight configuration changes in the system.

Because of the possibility of misalignment, many rung logic programming software packages implement mnemonic names associated with direct memory addresses. Often these names serve as tags within both the PLC controller and the operator interface.

The mnemonic tag list usually must be manually updated or kept current between the rung logic programming software and the software used to implement the graphic screens on the operator interface.

Most PLC communications are in response to a request for data from an operator interface node. This communication technique is known as polling: repeatedly asking for a block of data so that a current copy is available to the operator interface. Polling wastes network bandwidth and is inefficient. Exception processing techniques are a superior communication mechanism. However, they are difficult to implement in a PLC environment, i.e., the implementation requires significant additional development time and complexity.

Most PLCs rely on the rung ladder logic programming language to implement the bulk of the logic for the control scheme. This is because of the historical development of the PLC as a replacement for relays. The rung ladder logic programming language was designed to mimic the electrical wiring diagram used to design hardwired relay control systems. Some PLC vendors offer other specialized languages for their PLCs, e.g., sequential function charts and structured text.

The operator interface allows operators to view and control the manufacturing facility or process using a graphical interface. The operator interface for PLC-based control systems is distinguished by its variety. Some PLC-based control systems will incorporate an operator interface (graphical monitor) at the I/O network level, directly connected to the controller, or as a node on the control network. In any case, the interface will provide one or more of the following:

Graphic symbols and screens
Trending
Alarm review
Operator log-in and security
Reporting The development node for a PLC-based control system typically contains several disparate software tools usually from separate vendors:

PLC rung logic programming software
Graphical interface or man machine interface MMI packages
Networking software
Data communications software
and potentially others These packages must be "integrated" by the control engineer.

Efforts have been made by PLC suppliers to maintain a "rung ladder logic" basis for PLC programming in order to continue to provide a "user-friendly" environment for system developers, maintenance engineers, and technicians. However, the result is that the PLC programming language, while being familiar, places restrictive constraints on memory and resource allocation. These constraints, in turn, can make uncontemplated modification or expansion of existing programs difficult. Unlike its counterparts in the non-real-time computer world, the PLC does not lend itself to shared resources or flexible expansion by simply adding or changing a variable or configuration statement.

In addition to a hardware configuration appropriate to I/O requirements, efficient PLC-based real-time monitoring and control depend on three essential elements:

The PLC processor, which executes the program.
The memory map, or "data file" layout.
The program layout, or the order and frequency of ladder logic execution.

Not only must these PLC integration issues be considered, but also the communications to the operator interface must be carefully considered. Usually, a well-designed layout of PLC data is required to support effective communications between the PLC and the operator interface nodes.

Other Types of Control Systems

While DCS or PLC-based control systems dominate the majority of control system installations, several other types of control systems are briefly described below.

Centralized Industrial Computer-Based Systems

This type of control system is based on an older generation computing model, the centralized architecture. MODCOMP is a vendor who provided a large number of systems during the 1960s based on a centralized computing model. In this model a single computer with a single processor performed all functions: I/O scanning, logic solving, driving operator interfaces, and providing development access. This type of control system closely paralleled the available computing technology of the era. Operator interfaces were typically terminals and logic was normally programmed with FORTRAN or assembler. These systems are essentially extinct for most control applications, although a very tiny number of control applications still require a centralized computing approach.

RTU-Based Systems

RTU stands for Remote Terminal Unit. An RTU can be thought of as a very simple controller. The word "terminal" in RTU refers to their original function: to collect data from remote locations. "Terminal strips" refer to the hardware to which wires are connected. A single wire is connected to a "screw terminal".

Therefore, RTUs were originally used to remotely collect information from geographically dispersed locations. For example, RTUs could be used to collect information at various locations along a 500-mile pipeline. RTUs originally could only sense the valves, perform the signal conditioning and conversion, and transfer the information to a central location. Thus, RTUs included special communications capabilities to transfer data over low bandwidth connections such as telephone lines, microwave links, or via radio. Later, RTUs incorporated very rudimentary logic processing capabilities, programmed either with truth tables or simple rung ladder logic.

An RTU-based control system is often referred to as a "SCADA" system. SCADA stands for "Supervisory Control and Data Acquisition." However, the term SCADA has grown to be loosely applied among control systems. For example, some people call MMI software packages SCADA systems. RTU-based control systems will usually incorporate some type of development node and operator interface nodes in a central location to allow operators to monitor the "wide area" control system.

Personal Computer-Based Systems

Some small control applications are integrating the functionality of the I/O network, the controller, and the operator interface into a single personal computer. These systems typically are only successful for low I/O count applications. The controller functionality is often provided by a software product which will interpret and execute rung ladder logic programs. I/O cards are installed directly into the personal computer, limiting the total amount of I/O by the number of slots in the personal computer.

Background for Understanding Object-Oriented Concepts

The conventional software programming paradigm is the top/down, procedural approach. Reusable code is placed into procedures and functions which are then used by other procedures, functions, or mainline code. Program flow begins at the beginning (top) and proceeds in a straight line to the end (bottom) with "side trips" into procedures and functions along the way. This general approach works well for smaller software applications. However the conventional paradigm is not as efficient for large, complex software applications that rely on graphical user interfaces (GUIs) and require so many side trips that a programmer can get lost in his or her own code. In addition, a procedure or function that works well for one purpose may not be suitable for another very similar purpose. This may require writing another procedure or function with just a slight variation which can lead to code maintenance nightmares in very large applications.

Although object-oriented programming is relatively new, it is rapidly gaining momentum as the programming methodology of choice for developers of large, complex software applications.

Object-oriented techniques integrate top/down programming, procedures, and functions into its paradigm. But it offers additional paradigms that make software code even more reusable, more maintainable, and more extensible than the conventional paradigm can offer. A side benefit is usually shorter coding cycles.

The new paradigm centers around something called an "object." Where conventional programming procedures and functions offer reusable data manipulation, objects offer reusable data manipulation and reusable data (actually, reusable types of data). As a result, so much of the intelligence behind a program is packed inside of objects that the programmer spends less time coding and calling procedures and functions and more time writing code to send, receive, and respond to messages transferred among objects. In many cases, even that code is contained in the object relieving the programmer of even more work.

Encapsulation

This calls for the internal workings and data within an object to be hidden or private but the methods of accessing the internal workings and data to be visible or public. Stated differently, an object can be easily manipulated without accessing or understanding its internal workings, structure, or data. An object's private information is often accessible; however, access is not usually necessary in order to use the object effectively.

The advantage is that the programmer does not have to write code to handle an object's data manipulation requirements. The programmer simply needs to reference the object method that acts on the data.

Inheritance

This allows a programmer to create a new object that uses or inherits the capabilities and attributes of an existing object. The programmer may then add, modify, or delete parts of the new object that differ from the original object, if necessary.

Polymorphism

This word means "to assume many forms." In object-oriented systems, it means that different objects can use the same commands and access methods.

Limitations of Traditional Control Systems

The traditional configuration steps apply equally to both of the major control system architectures in use today: DCS-based systems and PLC-based systems. Essentially, a control system engineer will normally choose to perform a project by selecting one of these types of systems. Also, in many cases a DCS system will be augmented by PLCs using a communications gateway or bridge to link information between the two systems.

In this regard, it is generally recognized that one-third to one-half of all DCS installations are connected to a PLC system via some sort of gateway. This occurs because control engineers are employing separate products to acquire the preferred programming environment for each type of control need. However, it is inefficient and potentially dangerous to have the control for a piece of equipment, such as a large pump skid, spread out among separate systems. It would be preferable to perform both types of control in a single system without giving up the advantages of each separate environment.

Traditional control systems are also limited by the types of hardware and software that can be used, and have limitations on expandability and memory. For example, typically the controller is a closed unit with no expansion slots to add cards in contrast to the way that a personal computer can be expanded. Sometimes minimal expansion is possible by adding other cards in the rack holding the controller. As for memory, a new controller typically must be purchased to gain additional memory to hold new control programs or functionality. Also, because of their specialized nature, most traditional controllers require proprietary firmware. With respect to operating systems, traditional controllers use some form of low-level executive or task manager which does not meet the definition of a true operating system. This translates into reduced flexibility and capability for expansion and custom implementation work. Typically, additional capability, e.g., a real-time expert system, must be achieved by dedicating an additional, specialized node on the network for this task.

In addition to the foregoing disadvantages, the traditional control system development environment suffers from a diversity of tools. This problem is especially acute when developing PLC-based control systems. However, the development environments for traditional systems also suffer from a lack of unification of configuration information. In either the PLC-based or DCS-based system multiple software tools typically produce multiple files of configuration information, often organized by the type of information.

Moreover, in a typical/traditional control system, each part of the configuration information is a separate entity. The logic, tag names, and graphic symbols are all stored either in separate database tables or as separate files. For example, the master control definitions for valves, pumps, and other pieces of equipment may be stored in multiple tables and files with each characteristic of each piece of equipment stored in a separate location The relationships among all these elements are typically established via the tag names, e.g., V1001, PMP3, etc.

Because all control schemes for pieces of equipment are in physically separate tables or files, a developer must tie this information together by building and maintaining an association among tag names, often by a naming convention. Some systems force a part of this name to be the same in order to promote a convention. The traditional model does not exhibit object-oriented characteristics such as encapsulation, inheritance, and polymorphism.

For example, using the traditional model, developers can create control schemes for a new piece of equipment based on an old piece of equipment by copying the original logic and tag definitions and changing the tags to new names, paying great attention to keeping the association/tag naming convention intact. In a traditional control system, this step must be accomplished manually or using an operator-initiated search and replace operation for the control logic associated with each piece of equipment.

To summarize, the traditional control system approach suffers from the following drawbacks:

Because of multiple tools, configuration information has multiple perspectives from which it can be viewed which can make it difficult to manage.

The necessary association between information of various types may need to be maintained manually. If these manual links are not accurately updated then incorrect configuration could result.

It is difficult to retrieve all the information (of all types) for a single piece of equipment or process area.

Multiple types of software tools must be learned. Dissimilar user interfaces may have to be mastered.

The traditional control system configuration cycle is always long, tedious, and requires a significant amount of programming, and laborious prototyping followed by laborious implementation.

SUMMARY OF THE INVENTION

In view of the foregoing, it is a general aim of the present invention to provide a control system that reduces engineering development time for control system configuration, increases intuitiveness of the development tool, and increases structure and unification for the logic comprising the system.

In accomplishing that aim, it is a primary object of the present invention to provide a development system for control systems that allows users to define, in an intuitive fashion, the control scheme for a facility by combining the definition of the physical facility with the definition of the logical instructions which comprise the control scheme.

Another object of the present invention is to provide a development system that integrates the capabilities of analog/regulatory and discrete/sequential/interlocking control programming languages into a single tool.

A related object of this invention is to replace the traditional tools used to accomplish analog/regulatory control and discrete/sequential/interlocking control, that is, to replace function blocks traditionally used to program analog/regulatory control and replace rung ladder logic traditionally used to program discrete/sequential/interlocking control.

A further object of this invention is to provide a structured approach to programming logic instructions for controlling a piece of equipment that fits any controllable piece of equipment and that increases reusability and consistency thus providing a consistent model for building a set of logic instructions to control equipment.

Still another object of the present invention is to provide a unique and advantageous approach to creating, storing, and maintaining a library of control scheme routines compared to the traditional, manual method.

An additional object of this invention is to provide a development system that unifies all the configuration information and other data required to produce a control application such as the control scheme, graphical dynamics, and other attributes of all the devices which comprise a control project.

Yet another object of this invention is to produce a control program in an object-oriented user environment that employs object-oriented techniques at every level in the architecture of the product and at every level in the control system.

A still further object of this invention is to provide a control scheme development tool that graphically expresses the physical nature of a facility, e.g., a process operation or manufacturing plant, and thus emulates traditional design drawings.

These and other important aims and objectives are accomplished with the object-oriented development system for developing control schemes for facilities according to the present invention. The development system includes a device diagramming component for describing a physical description of a facility and a logical definition of a control scheme for the facility. The device diagramming component includes a mode for selecting device symbols representative of equipment or control functions used in facilities. The device symbols are selected from an object-oriented repository containing a plurality of device symbols and device objects. Certain types of device symbols relate to device objects containing logical instructions and configuration information relating to the represented equipment or control functions. The device diagramming component also includes a mode for interrelating in a graphical manner the selected device symbols and their corresponding device objects into a device diagram representing the physical description of the facility and the logical definition of the control scheme for the facility. A device logic developing component defines the logical instructions of the device objects relating to the equipment or control functions. Thus, the development system integrates in a graphical format the physical description of the facility with the logical instructions which define the control scheme for the facility. These logical instructions unify the configuration of analog/regulatory control with the configuration of discrete/sequential control.

BRIEF DESCRIPTION OF THE DRAWINGS

The various aspects of the invention are described in detail below with reference to the drawings, in which:

FIGS. 26–46 are a series of screen captures illustrating the step-by-step flow of building an example control application using the User Configurable Open System for Control of the present invention;

DETAILED DESCRIPTION OF THE PREFERRED EMBODIMENT

Figure 1:
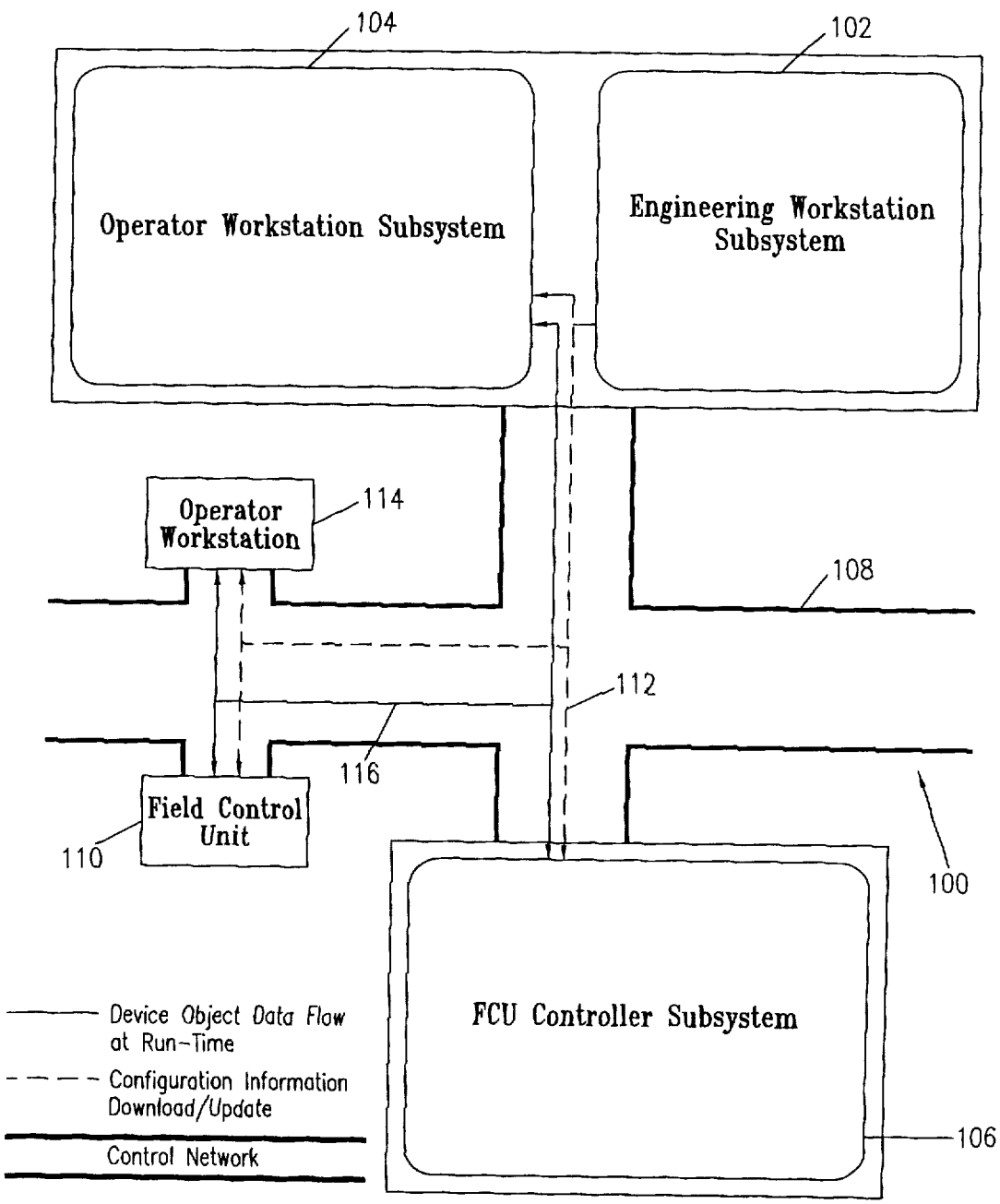
FIG. 1 is a schematic diagram showing the major subsystems of the User Configurable Open System for Control according to the present invention.

FIG. 1 is a schematic diagram illustrating the User Configurable Open System (UCOS) for control according to the present invention. UCOS is a control system that employs object-oriented techniques at every level of its system architecture. As shown in FIG. 1, UCOS 100 includes a number of subsystems which segment the functionality of UCOS. Specifically, UCOS 100 includes an Engineering Workstation Subsystem 102, an Operator Workstation Subsystem 104, and a Field Control Unit (FCU) Controller Subsystem 106. The subsystems communicate via a Control Network 108. As explained in significant detail below, device object configuration and device diagramming is performed at Engineering Workstation Subsystem 102. This configuration information is downloaded into a corresponding controller such as Field Control Unit 110 as illustrated via communication line 112. A plurality of Operator Workstations 114 can be included in the UCOS system each having an Operator Workstation Subsystem, although only one workstation is shown in FIG. 1. Each Operator Workstation receives selected device object updates from Field Control Unit 110 and sends to Field Control Unit 110 operator-initiated commands as illustrated by line 116. The controllers 110 solve the logic for each device object, process I/O for field devices, and update operator workstations as required.

UCOS executes under the Windows NT operating system of Microsoft Corporation which provides a graphical, object-oriented, window-based environment. UCOS takes full advantage of the windows environment thus providing a standardized user interface for both project development and execution. Although this interface is an integral part of UCOS, it is not unique to UCOS and is, therefore, not described herein.

Combining the Physical and Logical Representation

When a control engineer examines a control program built using a traditional development tool such as rung ladder logic or function blocks, the engineer essentially receives a sense of the logical sequence of instructions which operate the facility or piece of equipment. However, minimal information is conveyed about the facility itself or about its physical character. For example, the physical character of a chemical process would include the flow of product or material through the piping and associated tanks. This lack of physical character information arises because the traditional tools are essentially procedural programming languages. As such, they can inherently convey only information about the "logic" which controls a piece of equipment. Other information, such as a description of the equipment and its role in the facility, must be gathered from other sources.

In accordance with the present invention, UCOS introduces a totally new paradigm: allowing the control program for a facility to intuitively convey multiple types of information. By doing this, UCOS allows a control engineer to literally glance at a device diagram and understand both the definition of the physical facility, i.e., what equipment is present and how it is connected, and the logical definition of control instructions which operates this interconnected equipment.

In essence, the UCOS development tool of the present invention conveys more information to a control engineer than simply logical, control instructions information. The "device diagram" of UCOS, discussed below, presents to the developer the big picture, i.e., how the devices to be controlled fit into the facility. More importantly, the device diagram can show how material or product are processed and routed through the facility. The traditional control systems provide graphical ability only when showing process flow via the graphics screens which can be created for operators. While UCOS also has this ability, the development tool in UCOS employs a graphical approach for building a control program. This allows the development tool to convey multiple types of information to the user.

Figure 2:
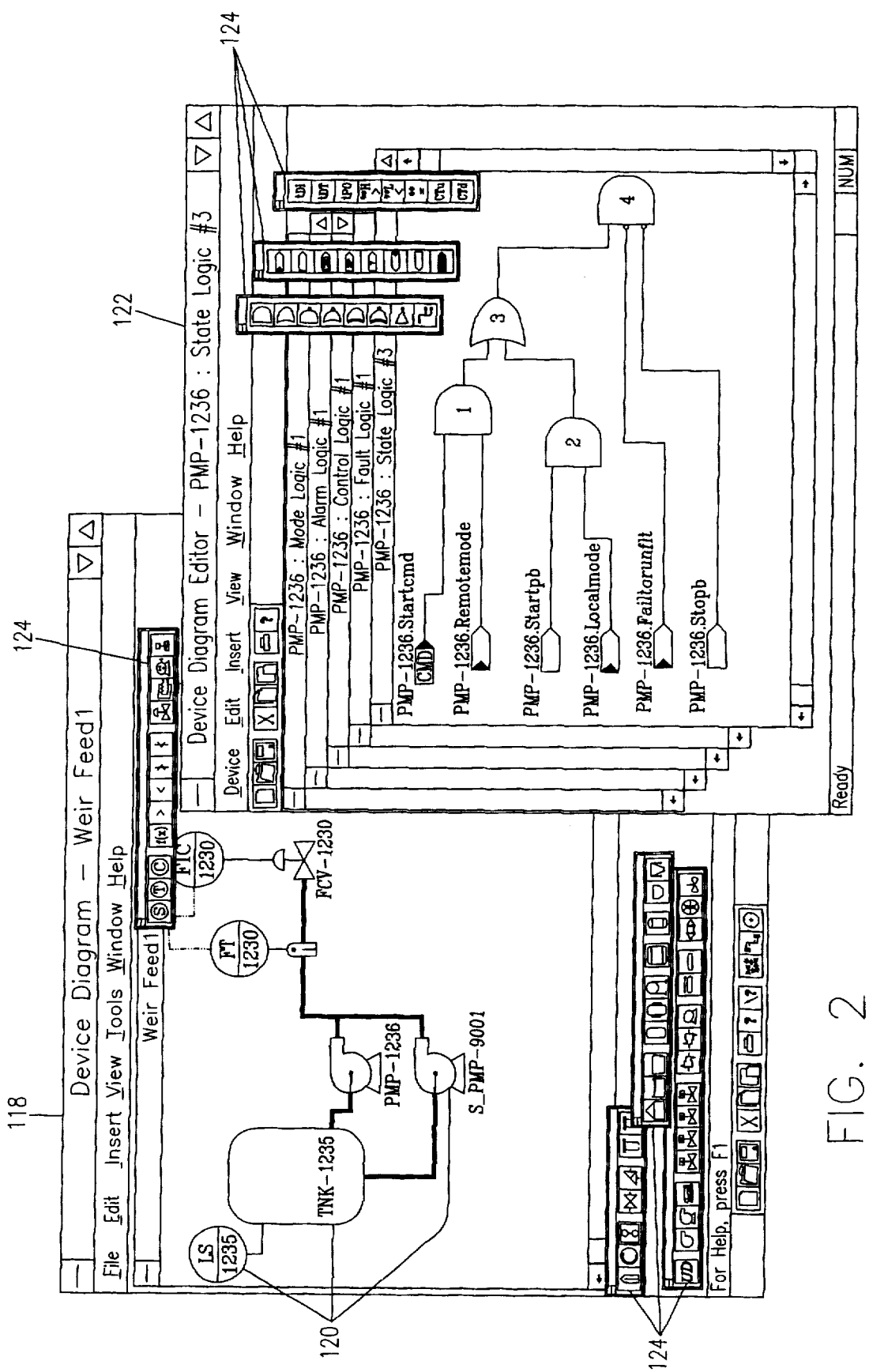
FIG. 2 is a diagram illustrating the device diagram and device definition editors of the present invention.

This control program is the UCOS Device Diagram 118 shown in FIG. 2, a collection of device symbols 120 each of which leads to logic that defines the control functionality of the device or equipment represented by the device symbols. The device symbols and the connection lines between device symbols on a device diagram are the underpinning of the combined representation of physical definition and logical definition. Certain device symbols, such as static container devices, contribute primarily to representing the physical facility. Other device symbols, for example controller devices (an anolog device), contribute primarily to representing the logical definition of how control is performed on devices. Still other devices, for example discrete devices, contribute to both representations.

This approach is extended by the Device Diagram's inherent capability for creating/modifying device diagram symbols. In accordance with the present invention, the capability is provided to use an auxiliary editor that is part of Device Diagramming to construct a symbol which can be applied as a device symbol to be placed on the diagram. These user-defined device symbols allow for specification of a symbol which can connotate either physical or logical representations. The connection points and their type can also be specified, heightening the flexibility this method produces.

Discrete Device symbols are especially important for representing the physical and logical definition because they normally have mechanical connections on a device diagram. Double clicking on their symbol brings up the Device Definition Device Logic editor 122 which allows the user to review the logical control instructions associated with that discrete device.

Both the device symbols 120 and the types of connections a user can draw between symbols contribute to the combined representation. The graphical nature of a device diagram supports its ability to convey multiple representations intuitively. This graphical nature is in turn supported by the Windows user interface which acts as a fundamental, enabling technology. Internally, UCOS accounts for all devices with an object model that allows for their differing characteristics, logic capabilities, and symbolic representation.

In the UCOS Device Diagram development tool the combined representation of the physical and logical definition originates with the device symbols 120. These symbols are organized on Windows toolbars 124 which contribute to the intuitive manner in which the development tool allows for selection and placement of devices. When connecting devices, UCOS assigns connection types based on the device types being connected. This also contributes to the intuitive nature of the development tool. These toolbars and connection types are also shown in FIG. 2.

The Device Diagram 118 operates in a graphical manner allowing the device symbols 120 to be moved, rotated, and arranged. This enables the user to decide the proper balance between representing the physical nature of the facility and the definition of the control scheme logic. This control scheme logic could include either the analog/regulatory control capability supported by analog UCOS devices or the underlying logic which is part of a discrete device. The user could develop a device diagram primarily devoted to representing the logical control scheme, or orient the diagram to emphasize the physical facility. If desired, both aims could be accomplished in a single diagram.

In accordance with the present invention, UCOS models equipment and logical control schemes as device objects. A Device Diagram 118 is a collection of these device objects, connected together in a symbolic editor using a graphical approach. Each symbol on a device diagram leads to a type of UCOS device, whether static, analog or discrete. The UCOS device itself contains definition information and logic which describes how it executes in a UCOS field control unit (FCU).

Figure 3:
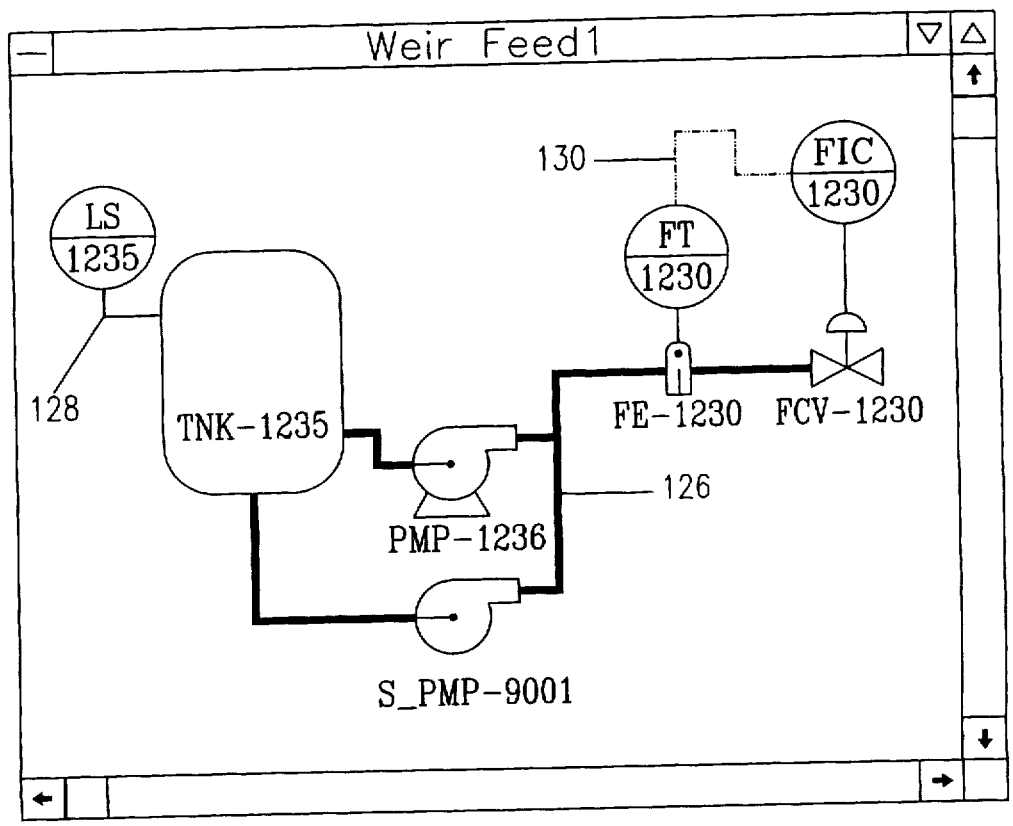
FIG. 3 is an example device diagram created with the User Configurable Open System for Control of the present invention.

Device diagram 118 represents a unique combination of information which describes the physical facility and also describes the logic which controls the facility. Moreover, this information is synthesized in a graphical, intuitive format that is very familiar and easy to follow for the control system engineer. FIG. 3 illustrates in greater detail an example device diagram.

This device diagram contains six control devices: switch LS-1235, transmitter FT-1230, controller FIC-1230, analog end device FCV-1230, PMP-1236 and S_PMP-9001. Two static devices, TNK-1235 (a container) and FE-1230 (an element) are also included. The diagram also shows three types of connections: mechanical connection 126; instrument connection 128; and internal connection 130.

The device diagram of FIG. 3 is an excellent example of the ability of UCOS to combine representation of the physical facility and logical definition. By simply glancing at this diagram a control engineer can understand the physical definition and how it is being controlled. The diagram clearly shows the tank feeding two pumps connected in parallel with a control valve regulating the amount of flow—all information about the physical definition of this facility. The control engineer knows he could go to the facility and locate the tank, the two pumps, etc. For the logical representation, the control engineer knows that a transmitter is feeding a PID Controller which sends an output signal to the control valve to regulate flow. To further examine the logical definition, the user need only double click on the switch, transmitter, controller, or pump device symbols to see additional details about their logic.

The use of the Windows user interface supports and augments the device diagram's ability to represent the physical and logical definition of the facility. Additionally, the device diagram editor can be used to produce diagrams which closely resemble traditional design drawings which usually describe the physical facility, e.g., a P&ID or mechanical flow sheet. For process facilities this capability is augmented by the adherence to Instrument Society of America (ISA) standards for many UCOS Device Diagram symbols. However, the user can actually determine the contribution a particular device's diagram symbol makes to either the physical or logical representation with UCOS's inherent capability to customize diagram symbols. The capability is provided to use an auxiliary editor that is part of Device Diagramming to construct a symbol which can be applied as a device symbol to be placed on the diagram. These user-defined device symbols allow for specification of a symbol which can connotate either physical or logical representations. The connection points and their type can also be specified, heightening the flexibility this method produces.

The symbols and connection types on the device diagram hold the key to this combined representation. Table 1 below segments the contribution a device symbol or connection makes to either the physical or logical representation. This segmenting serves to illustrate how the symbolic approach based on graphical concepts serves multiple purposes in conveying information to the user. Some items significantly contribute to understanding both the physical and logical definition and are therefore listed in both columns. For example, a knowledgeable control engineer could glance at a device diagram containing a transmitter, controller, etc. and easily understand both the physical and logical relationship that the switch has with other devices within the process.

TABLE 1

| Item | Connotates The Physical Facility | Connotates The Logical Control Scheme |
|---|---|---|
| Diagram Symbol for a Particular Device Type | Switch Symbol Transmitter Symbol | Switch Symbol Transmitter Symbol Controller Symbol Computing Device Symbol (s) |
| | Analog End Device Symbol(s) | Analog End Device Symbol(s) |
| | Static Device (Container) Symbol (s) | |
| | Static Device (Element) Symbol (s) | Static Device (Element) Symbol(s) |
| | UCOS supplied Discrete Device Symbol (s) | UCOS supplied Discrete Device Symbol(s) |
| Connection Type | User Created Device Symbol(s) Mechanical Instrument | User Created Device Symbol(s) Instrument Internal |

The symbolic, graphical approach employed by UCOS is consistent with standards set for Windows-based software packages. The device diagram editor further simplifies configuration by making use of toolbars, an object-oriented Windows mechanism for grouping menu items and functionality. The UCOS Device Diagram editor is inherently symbol-based because the user is always viewing a device through its symbol, the same symbol which the user originally selected to place the device object on the diagram. The UCOS symbols for devices are organized in groups on toolbars. The symbols which UCOS employs to represent some devices are specified by ISA standards. A device object's placement in a device diagram can represent the logic in the control scheme or the physical facility or both depending on the device type.

The User Created Device Symbols particularly heighten the user's ability to closely and accurately represent the physical definitions of the facility. If a new type of equipment requires representation the user need only use the Device Symbol editor to create a representation for the device, and specify its connectable points. By providing flexibility in both symbol design and connection type designation practically any facility can be graphically described. Therefore, a UCOS device diagram could represent with equal effect a chemical process facility, a coal handling conveyor system, or a collection of commercial or industrial buildings. Furthermore, User Created Device Symbols allow for creation of configurable devices which can represent control functions which may include coordinating multiple devices, sequencing and interlocking among several devices, calculations, etc.

Referring to FIG. 3, the significance of the internal connection line 130 is evident when examining the definition of the controller device by double clicking on it. The act of drawing connection line 130 between FT-1230 and FIC-1230 caused an internal association of tags between those devices. Effectively, this dashed line logically linked these two devices. The instrument connection 128 allows the device diagram to expose information about the logical and physical connections of the instrumentation and input/output points of the control I/O hardware. Again, this information co-exists on the same diagram that shows the physical facility, illustrating how the symbolic, graphics based approach conveys multiple types of information in a single entity.

Figure 4:
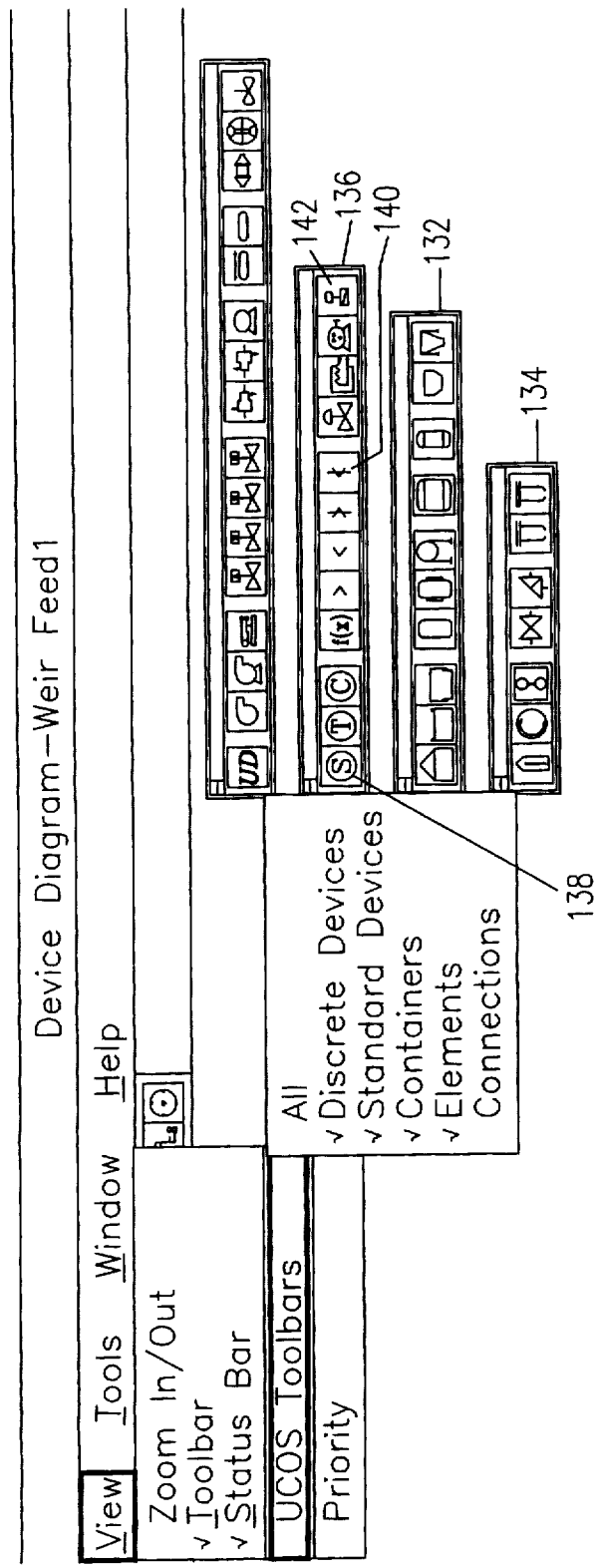
FIG. 4 illustrates the device diagram tool bars organized by tool bar type used in accordance with the present invention.
Figure 5:
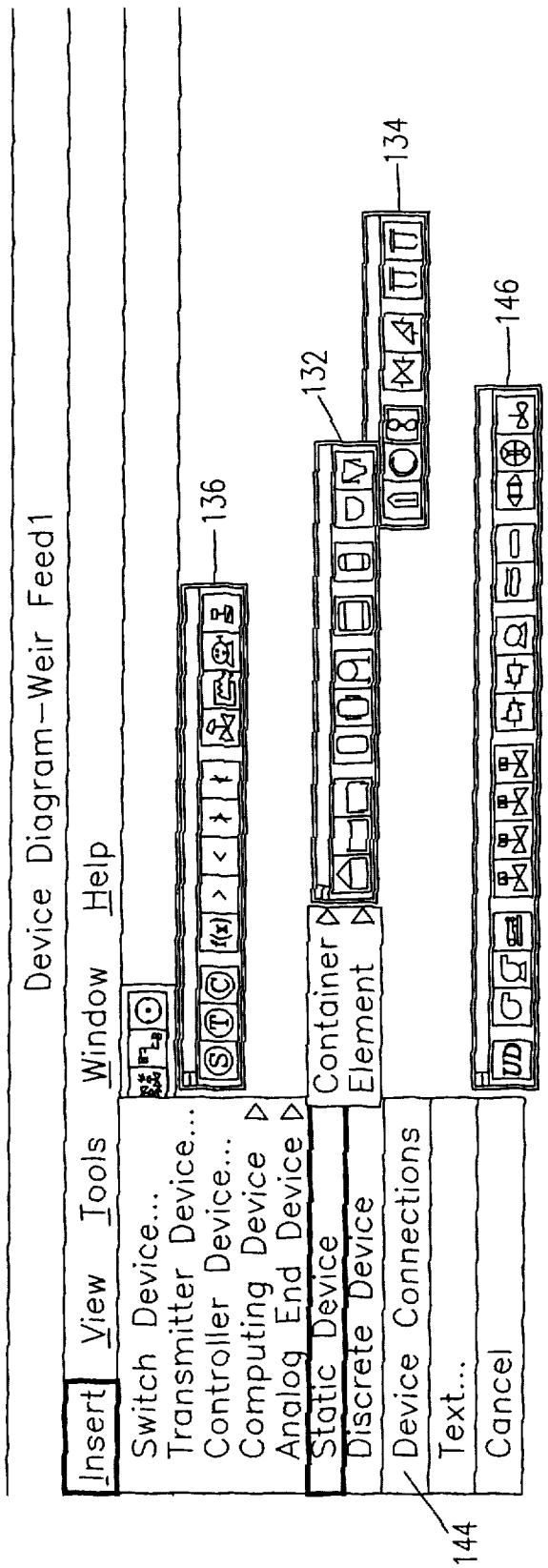
FIG. 5 is a view similar to FIG. 4 but showing the device diagram tool bars organized by device type.

FIG. 4 illustrates the UCOS toolbars available in the device diagram editor. The four toolbars are stacked horizontally to correspond with their names, the four checked items in the pull-down sub-menu. The toolbars provide an accessible, graphical grouping mechanism. UCOS static devices are organized into two groups: containers and elements, which correspond to the bottom two toolbars 132 and 134. The device toolbar 136 organizes devices into three sub-categories: switch/transmitter/controller devices 138, computing devices 140, and analog end devices 142. The toolbar organization can be further understood with reference to FIG. 5. This figure shows the correspondence between the INSERT pull-down menu 144 and the toolbars. Again, the toolbars are stacked horizontally to correspond generally with the items listed on the menu.

Each symbol on each toolbar, when selected, allows the user to place a device object of that type on the diagram. The wide selection of discrete device symbols on discrete device toolbar 146 in particular strengthens the ability of UCOS to represent both the physical nature of the facility and its logical control definition. Further strengthening this capability is the ability to create or customize device diagram symbols. Discrete devices are key because they normally have mechanical connections. However, they harbor significant logical functionality which is accessed by double clicking on the device symbol.

The tremendous power of the representations offered by the UCOS development tools are most apparent when a control engineer can be observed glancing at a diagram like FIG. 3, and then being able to describe the major characteristics of the physical facility and logical control scheme by that simple glance.

The Hybrid Nature of UCOS

In keeping with an important aspect of the invention, the UCOS configuration environment unifies and simplifies the historically disparate DCS vs. PLC configuration environments. Because of this, UCOS does both Analog/Regulatory and Discrete/Sequential/Interlocking control well.

The Device Diagramming step in UCOS represents a unique blend:an environment which unifies the configuration of analog control with the configuration of logic used to implement Discrete and Sequential control. Both of these capabilities are included in the UCOS object-oriented model for control devices.

The reaction of most control engineers to Device Diagramming and underlying logic for configurable devices would be that they have never seen these concepts tied together before. This is due to the fact that most control system engineers are used to programming Discrete/ Sequential control with rung ladder logic (a PLC tool) and Analog/Regulatory control with function blocks (a DCS tool).

The hybrid nature of UCOS extends throughout the architecture of the system. It is possible to build a hybrid control system using DCS components and PLC components. However, UCOS is hybrid throughout, in both its configuration environment and its run-time execution environment. The innovation this represents is a new level of coherence and simplicity within a control system architecture. Greater simplicity, including elimination of Gateways and other potential data transfer bottlenecks, results in a more reliable, more robust system.

Hybrid Capabilities at the I/O Level

In the illustrated embodiment, UCOS uses PLC I/O, although not the PLC controller. However, UCOS has the capability, as an open system, to use practically any PLC vendor's or DCS vendor's I/O Subsystem.

It has been mentioned previously that some control system engineers build a hybrid system using some DCS components and some PLC components. What these system engineers do as an ad hoc method of integration, UCOS provides as a standard feature.

UCOS incorporates what is essentially a vendor-independent I/O model. This model relates to the UCOS control device model. However, the UCOS method of representing I/O is its own technology for allowing a single UCOS controller to scan and control I/O from separate vendors, for example Allen-Bradley and GE Fanuc.

The use of I/O subsystems is a hybrid feature because UCOS uses PLC I/O while providing DCS-like configuration of the control schemes which attach to this I/O. Typically, a PLC must be programmed to make use of its I/O, often using direct memory addresses and other hard coded procedural programming structures.

PLC vendor I/O has a larger installed base than DCS I/O because PLC control systems apply to a wider variety of industries. Thus, UCOS allows the DCS engineer to use market leader I/O subsystems without sacrificing the advantages of DCS configuration techniques. At the I/O level, the evidence of a hybrid system is hard and direct: PLC I/O is directly connected to the UCOS controller. The UCOS controller (FCU) meanwhile, provides the logic capabilities of a PLC and the analog control capabilities of a DCS controller.

UCOS can also leverage any redundant capabilities of the PLC I/O subsystem. For example, GE Fanuc I/O provides network media redundancy. UCOS has incorporated this failover ability and has augmented it with redundant FCU's and, more importantly, with redundant network paths between the FCU and OWS nodes. This latter function is difficult if not impossible to achieve in a PLC-based system.

Hybrid Capabilities at the Controller Level

Hybrid capabilities at the controller level, from a software perspective, are closely related to hybrid capabilities at the development node. This is because the control scheme which the UCOS FCU executes is configured with the UCOS EWS software.

Controller hybrid capabilities from a hardware and operating system perspective are closely related to the modern design approach embodied in the UCOS controller. The UCOS FCU is one of the most differentiated components of the architecture in comparison to both DCS and PLC controllers. Many of the competitive advantages of the UCOS controller are derived from the general product flexibility of personal computers. It is the application of a personal computer as the controller that is futuristic and represents a trend in the control industry. UCOS is at the forefront of this trend. How UCOS makes use of the personal computer characterizes the hybrid nature of the system.

Table 2 below outlines the vast differences between the UCOS FCU and traditional controllers. The differences are illustrated and their hybrid nature is discussed in the table.

TABLE 2

| Category | UCOS | DCS and PLC |
|---|---|---|
| Hardware | Uses off-the-shelf industrial personal computers from a variety of manufacturers. Example: Texas Micro Systems, IBM, etc. The fundamental electronic components and technology are often similar to DCS and PLC controllers (and are, therefore, hybrid) but the supplier channels are totally different. | Each vendor manufactures its own controller from board-level electronic components. |
| Expand-ability | Using the concept of putting cards in a PC the UCOS controller allows for unprecedented expandability. | Typically, the controller is a closed unit with no place to add cards. Sometimes minimal expansion is possible by adding other cards in the rack holding the controller. |
| Memory | Standard PC memory chips provide low-cost expandability. | Typically a new controller must be purchased to gain additional memory to hold new control programs or functionality. |
| Firmware | Often industrial PC's used as the UCOS controller employ industry- standard BIOS and firmware chip sets. | Because of their specialized nature, most traditional controllers require proprietary firmware. |
| Operating System | The UCOS FCU runs QNX, an industry-leading, real-time standards-based, open platform, and open architecture operating system which is available to the user. This greatly adds to the hybrid nature of UCOS because virtually any application can be built using standard tools for deployment on the UCOS FCU. For example, an expert system could run on the UCOS FCU interacting directly with UCOS devices. | Traditional controllers use some form of proprietary "operating system" (which of ten is no more than some form of low-level executive or task manager) that is typically embedded and not accessible because of its singular purpose: to execute the proprietary control logic of that vendor's system. This translates into reduced flexibility and capability for expansion and custom implementation work. |

TABLE 2-continued

| Category | UCOS | DCS and PLC |
| --- | --- | --- |
| | | Typically, additional capability, e.g. a real-time expert system, must be achieved by dedicating an additional, specialized node on the network for this task. |

In the preferred embodiment of the present invention, the UCOS FCU is a software environment running under QNX on a personal computer. Consequently, UCOS has adapted and merged the analog control capabilities of DCS controllers with the logic processing capabilities of PLCs. Essentially, the UCOS FCU must execute the hybrid control schemes downloaded to it from the OWS 104. These hybrid control schemes are generated as part of the object-oriented device diagram configuration performed at the EWS. As such, these control schemes represent both analog and discrete logic capabilities in a single stream of instructions at the FCU level. In most other DCS or PLC controllers, one sub-task may perform analog processing, another timing and sequencing, another interlocking, and so on. Because UCOS incorporates a unified model for both analog and discrete control, the resulting FCU application logic is unified and executes a hybrid control program delivering the required capabilities of both types of control.

Hybrid Capabilities at the Operator Interface Level

The purpose of an operator interface node in a control system architecture is to provide tools for an operator to visualize the process. As such, most control systems eventually provide similar capability at the operator interface level. However, there may be substantial differences as to how these capabilities are implemented. Some systems might require more or less engineering time to produce the operator interface. Some might require more repetitive steps than others. Some might require the engineer to perform more manual bookkeeping of tag lists, cross reference lists, etc.

The hybrid nature of UCOS greatly minimizes the effort required of the control system engineer to produce the operator interface. Essentially, most of the operator interface is a by-product of the device diagramming step. While this hybrid nature does not directly manifest itself from an operator's perspective, the engineers who develop the system would be aware of it.

Hybrid Capabilities at the Development Node

Hybrid capabilities at the development node relate specifically and directly to the UCOS object model and the merging of analog and discrete control. For many years, the DCS configuration environment has consisted primarily of "function blocks" performing regulatory control. For many years, the PLC programming environment has consisted primarily of "rung ladder logic" performing discrete control. The UCOS Device Diagram, as a control program, merges the capabilities of these traditional environments.

As noted above, one-third to one-half of all DCS installations are connected to a PLC system via some sort of gateway. This occurs because control engineers employ separate products to acquire the preferred programming environment for each type of control need. However, it is inefficient and potentially dangerous to have the control for a piece of equipment, such as a large pump skid, spread out among separate systems. Control engineers would prefer a way to perform both types of control in a single system without giving up the advantages of each separate environment.

Figure 6:
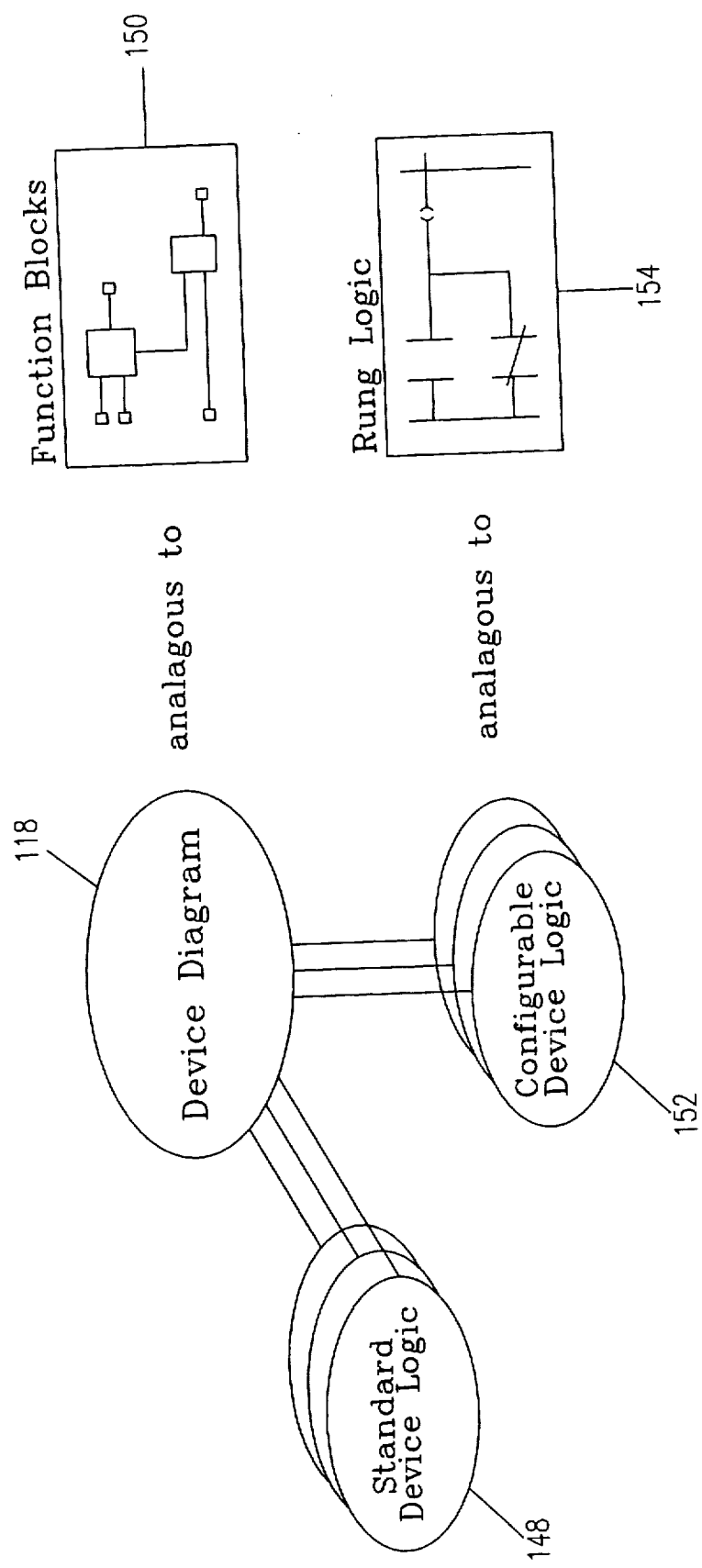
FIG. 6 illustrates the association between the device diagram according to the present invention and traditional control programming languages.

Generally, UCOS provides this dual control via the following structure illustrated in FIG. 6. The perspective of Device Diagrams as shown in FIG. 6 allows for their comparison to the traditional control programming languages. A single Device Diagram will contain one or more devices. Each device can be either a configurable analog device 148 (very much like a single function block 150) or a configurable discrete device 152. A configurable discrete device has a device definition which includes multiple pages of logic for the device (analogous to rung logic 154). This logic is not exactly the same as rung logic, but provides similar discrete control capabilities such as sequencing and interlocking. Essentially, the device definition logic is like a piece of rung ladder logic. The UCOS logic, however, resembles the written logic design that engineers typically draw before programming the PLC with the rung ladder logic language. UCOS logic configuration is performed with graphical tools whose results closely represent and mimic the design drawings engineers develop.

Referring again to FIG. 2, actual screen captures of a UCOS device diagram 118 are shown with a portion of the underlying Device Definition Logic 122 for a pump device (PMP-1236). Importantly, the UCOS Device Definition editor 122 emulates diagrams typically drawn when designing the logic to be programmed with the rung ladder logic language. Therefore, the UCOS Device Definition editor 122 shares a goal with the UCOS Device Diagram editor 118, allowing the user to configure logic with a graphical tool that mimics design drawings he/she is familiar with.

From an object-oriented viewpoint, the hybrid nature of a UCOS Device Diagram is enabled by the device object model. Because each device is an object, the objects can have their own unique data, properties, methods, data types, and structures. Therefore, a device diagram can interrelate these device objects. This object orientedness also enables generation of a single device diagram execution scheme or set of instructions for the FCU.

Another significant aspect of the UCOS approach relates to tag definitions. The UCOS FCU and EWS/OWS nodes "see" a single set of configuration information. Specifically, all nodes are aware of the tags for any device object. This is a hybrid characteristic because DCS-based systems typically provide good tag coherence throughout the function block environment.

PLC-based systems typically suffer from two types of deficiencies with respect to tag management. First, the PLC itself does not have tag capability; the PLC only provides direct memory addresses. Therefore, PLC-based systems require the engineer to use "mnemonics" typically available in PLC rung ladder logic programming software as tag names. These pseudo-tags then require user management to keep them "connected" to the proper direct memory addresses. Small changes to this "memory map" can adversely impact an entire PLC program. Second, the engineer must assign pseudo-tags according to a naming convention if he/she desires the DCS style capability of having all the tags associated with a piece of equipment similarly named.

UCOS merges the "tag bookkeeping" capabilities of the DCS into its device object model and, therefore, frees the logic developer from these duties. If the logic was developed separately, outside UCOS, tag bookkeeping would be required.

The UCOS Structured Approach to Device Programming

UCOS is a control system which provides hybrid capabilities in comparison to DCS-based and PLC-based systems. A significant improvement in UCOS, however, is its structured approach to device programming which effectively improves upon and replaces rung ladder logic used in these two traditional systems. Every UCOS discrete device exhibits this logic structure. Additionally, UCOS Device Templates, explained in further detail below, incorporate this structure, since discrete devices are instantiated from these templates. The structure provided is itself unique, and coupled with the event-based logic processing capabilities of the UCOS FCU, provide significant advantages over the rung ladder logic programming and execution environment.

The UCOS structured approach segments logic into five categories: MODE, FAULT, STATE, CONTROL, and ALARM. Each category of logic has slightly different execution characteristics in the UCOS FCU. These characteristics save programming time and complexity in comparison to rung ladder logic. For example, many PLC programs contain code to handle latching bits and enforcing mutual exclusivity among several signals. The UCOS structure for device programming provides FCU execution support which handles these tasks transparently for certain categories of the control logic. This allows the logic to focus on operating the device, and not be cluttered by internal housekeeping.

The logic in each category is essentially the same, produced within a common editor with common toolbars of input/output tags and logical operators. The structure recommends an intended use for each category of logic, which if employed, will maximize the ability of the structure to save programming effort and increase maintainability. The structure is generic in that it can be applied to any piece of equipment which can be controlled with discrete (on/off) outputs. Certain categories of logic are intended to feed others, resulting in a cascade of logic solving which maximizes the benefits of the FCU execution support. This intended order of use is conceptually depicted in FIG. 7.

Figure 7:
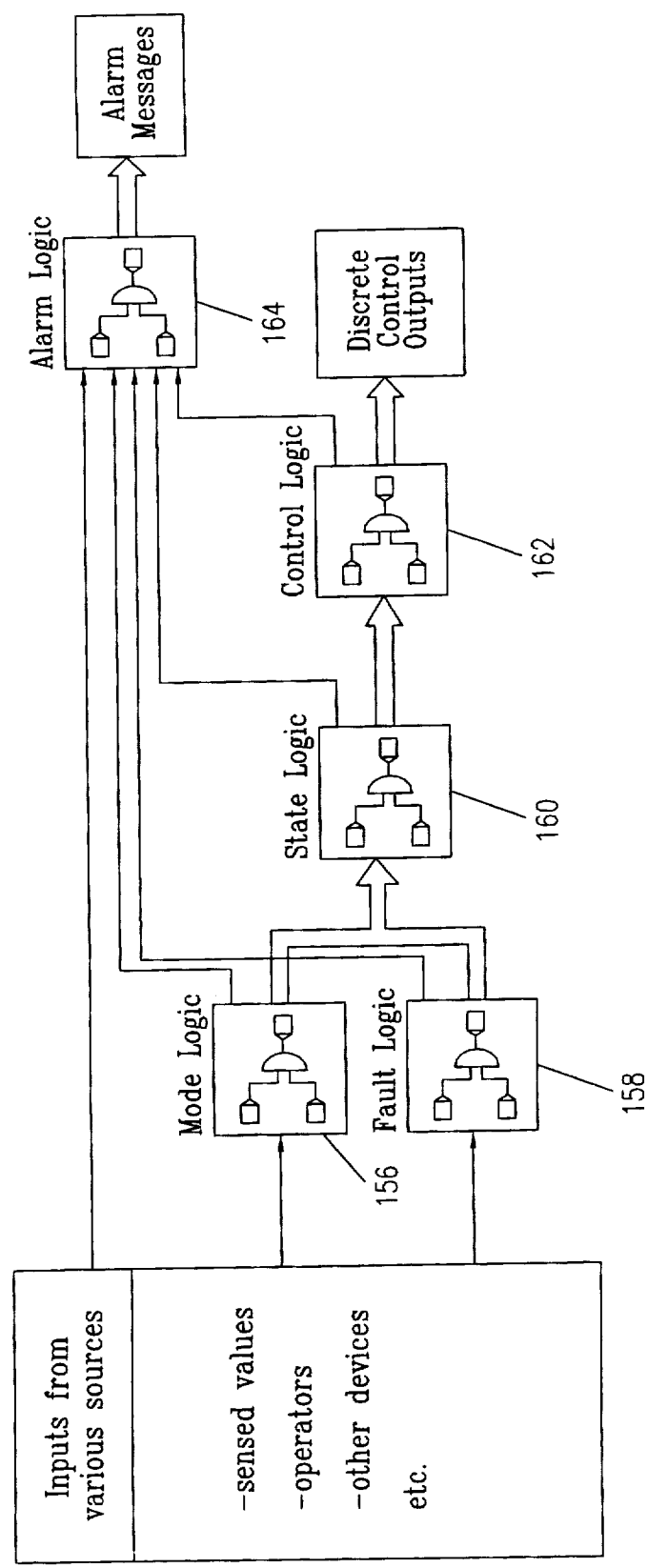
FIG. 7 is a schematic diagram showing the structured categories of logic for device programming according to the present invention.

As shown in FIG. 7, the user could apply the structure by building MODE logic 156 and FAULT logic 158 with the intention of feeding these outputs to the STATE logic 160. Then the output of the STATE logic 160 could be used in CONTROL logic 162 to actuate the device. ALARM logic 164 could be used to produce messages for an operator. No control action would normally be taken in ALARM logic 164. This represents one approach to using the UCOS Device Logic structure which provides particular benefits. Other approaches, however, are possible and might provide similar or different benefits.

The Traditional Programming Tools

A control engineer must describe how a piece of equipment will function or operate using a software tool or control programming language that can cause this operation within the control system. The two major types of control systems, DCS-based and PLC-based, each have developed their own control programming language to meet this need. DCS systems typically rely on Function Blocks, and PLC-based systems typically rely on rung ladder logic. Both languages have the capability to "solve logic." Traditionally, rung ladder logic is viewed as the better tool of the two for discrete/sequential logic, while function blocks are viewed as better for analog/regulatory logic. Also, some DCS systems can also solve rung ladder logic.

As a hybrid system, UCOS exhibits the best capabilities found in both DCS and PLC-based systems. UCOS, therefore, also needed a way for users to describe how a piece of equipment will function or operate.

Rather than simply incorporating rung ladder logic as a component of a discrete device, UCOS provides a totally new method and structure for describing the logic necessary to control a device. This new structure for device programming is the answer of the present invention to rung ladder logic capabilities in traditional control systems. The UCOS device logic structure shares some similar characteristics with rung ladder logic.

Both are primarily designed to produce digital control output signals, i.e., on/off, start/stop, open/close, etc.

Both allow for and incorporate standard logical operations such as AND, OR, NOT, etc. These operations can be arranged in various configurations which effect the "solving" of the logic.

Both require a specialized controller to solve the logic. For rung ladder logic, the control engineer typically writes the logic program with DOS-based software and then compiles and downloads the logic to a PLC for execution. To perform actual control, the rung ladder logic must execute in the PLC. In UCOS the device logic structure is downloaded in a similar fashion to a UCOS FCU for execution.

These similarities, however, are overshadowed by the significant improvements and advances that the UCOS device logic structure provides. By its very nature rung ladder logic allows the programmer to create structured or un-structured logic or anything in between. Also, the "scanning" approach employed by all PLCs requires the programmer to spend considerable energy and effort just to account for "local variables," scan order, memory maps, and real world inputs and outputs.

The UCOS device logic structure removes from the control engineer these burdens and potential pitfalls. This results in time savings to write device control logic and greater reliability, maintainability, and re-usability of that logic.

The UCOS Device Logic Structure

UCOS provides a structure for device logic. The structure itself is unique in that it exposes the base elements required for control of a device. The structure also will fit any controllable piece of equipment. The UCOS innovation is exposing these base elements which are all included in any rung ladder logic program one would write for any device. The UCOS device logic structure is designed to aid the writing of control logic for a piece of equipment which can be controlled with discrete outputs. Further, UCOS analog and discrete devices could be used in combination on a device diagram to perform coordinated regulatory and discrete/sequential control.

UCOS allows the control engineer to draw logic diagrams organized into five fundamental categories: MODE, FAULT, STATE, CONTROL, and ALARM. The logic that can be placed "inside" each category is drawn using the same editor and the same base logic elements. In fact, the logic in the MODE category is no different than the logic in the FAULT logic category. However, the intended use for each category of logic is different. This "intended use" is an underpinning of the UCOS device logic structure. Also, each category of logic is supported by a "graphical folder" defining UCOS tags which will receive the output of the logic in a category. The "intended use" of logic in a category is more than a convention. The logic solver in the UCOS FCU provides slightly different behavior for the logic in each category with respect to the output tags associated with the logic.

Each category of UCOS logic takes one or more UCOS tags as "input tags," solves a network of logic "gates" or operators, and produces on/off values for UCOS tags used as logic outputs.

Figure 8:
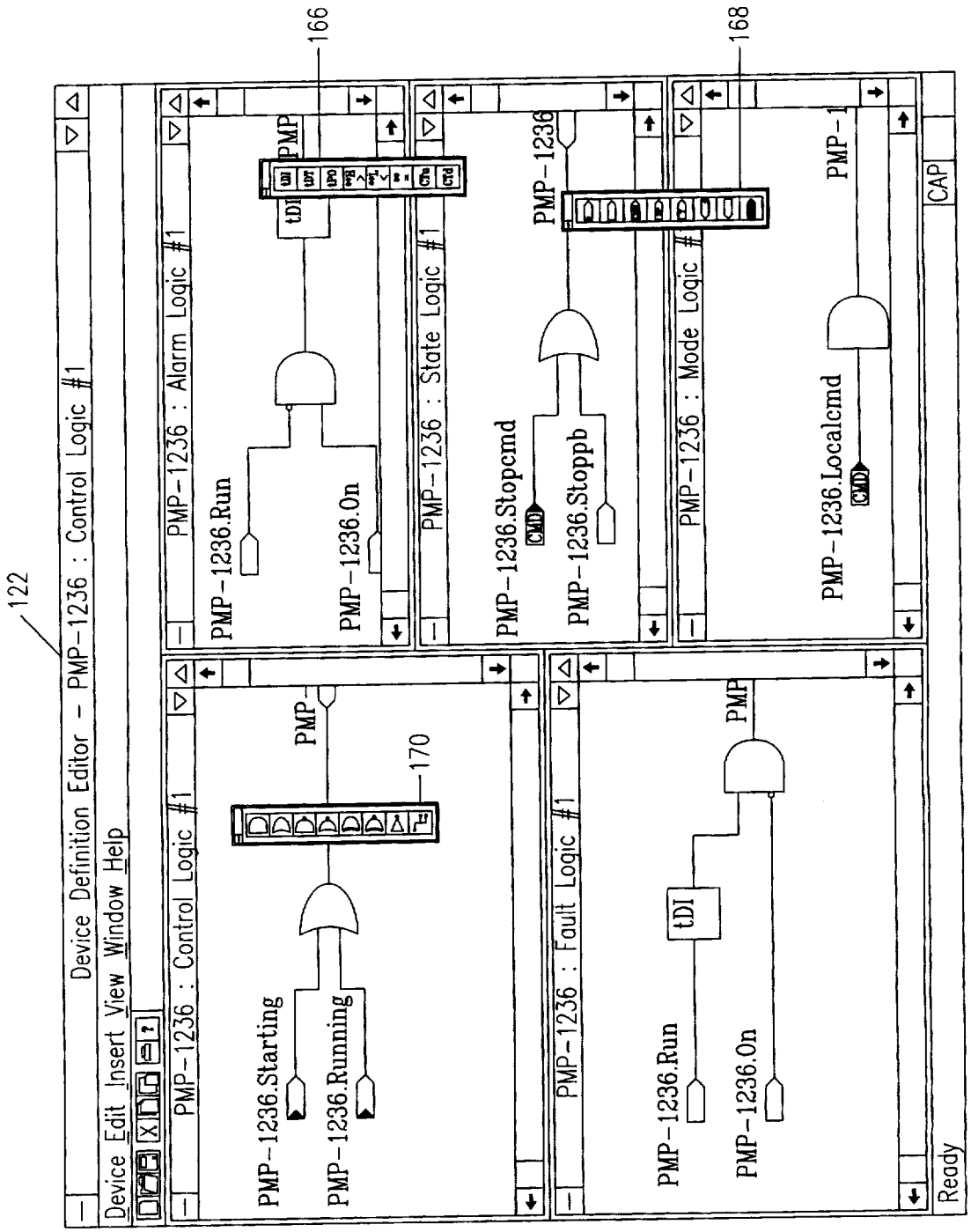
FIG. 8 is a screen capture of the device definition editor of the present invention showing the various categories of device logic depicted in FIG. 7.

FIG. 8 shows the UCOS Device Definition Editor 122 displaying the logic for a pump discrete device (PMP-1236). Note the five categories of logic within the common editor.

The toolbars 166, 168, and 170 show the logic elements available for placement and connection on any of the five logic categories.

In comparison to rung ladder logic, a premise of the UCOS device logic structure is that any rung ladder logic program has Modes, Faults, States, Controls, and Alarms, but that the programmer may not recognize them as such. The value of these five categories derives from their near-universal applicability to any piece of equipment which needs discrete outputs for actuation and control. By bringing these categories to the surface and effectively forcing the control engineer to define consistent logic organized into these categories, UCOS inherently provides a system which has greater maintainability and integrity. The ability to re-use logic is also greatly heightened because of the device logic structure. Because of the structure, these benefits are more easily achieved regardless of the discipline, education, or skill of the control engineer involved. To say this another way, a few control engineers might be able to write rung logic programs which exhibit a similar structure; however, most would not achieve this goal, resulting in complicated, hard-to-debug and maintain rung ladder logic control programs.

Constructing Discrete Device Logic

Figure 9:
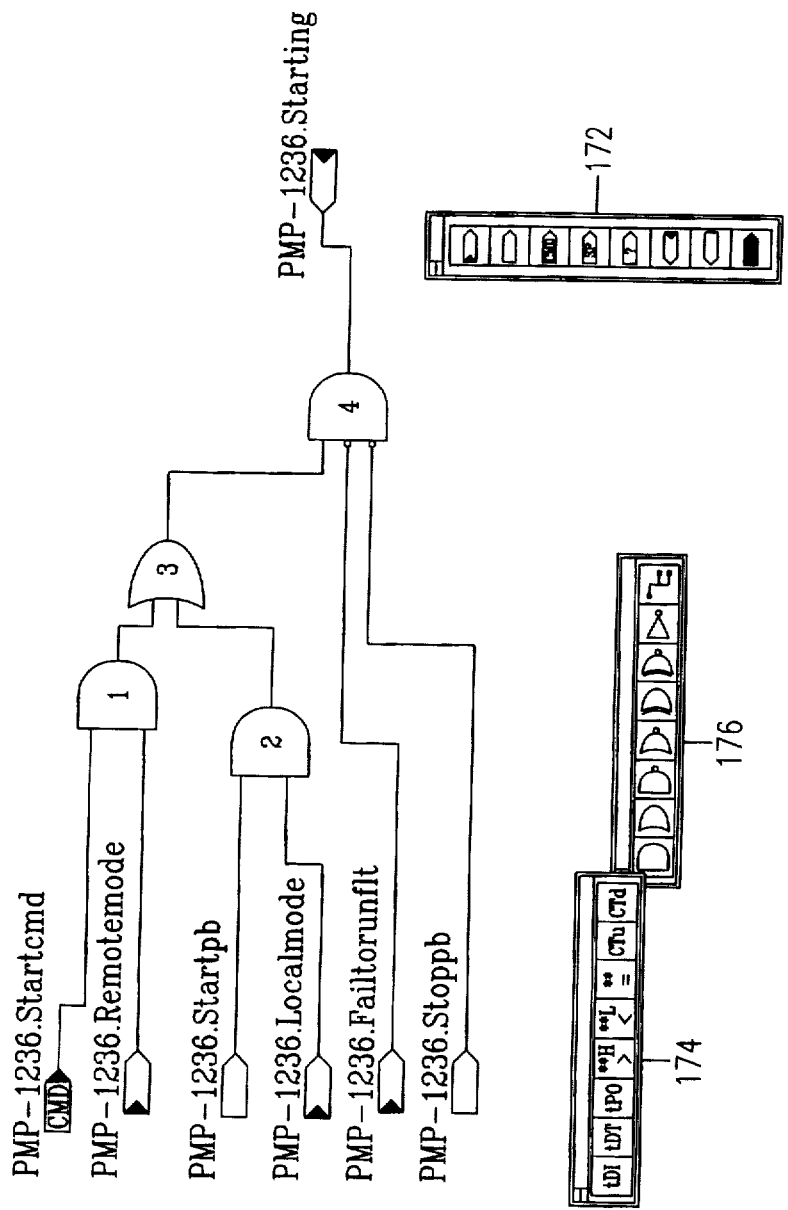
FIG. 9 is a logic diagram illustrating the logic and tool bars utilized in accordance with the present invention.

Referring to FIG. 9, any page of UCOS logic will be comprised of three types of elements: input tags, logical operators, and output tags. FIG. 9 shows some example logic with these three types of elements. The logic elements are organized in toolbars, with the toolbar 172 containing input/output tag symbols, while the toolbars 174 and 176 contain logical operators.

FIG. 9 shows one page of State logic. This particular UCOS discrete device actually has four pages of state logic defined. For any category of logic, each output tag that appears on a logic page is defined in the device's tag definitions folder for that category of logic. For example, the "PMP-1236.Starting" tag in the logic of FIG. 9 is used as a State output tag. Therefore, it must be defined in the State Tag Definition folder. However, it can also be used as an input in any other appropriate category of logic.

Figure 10A:
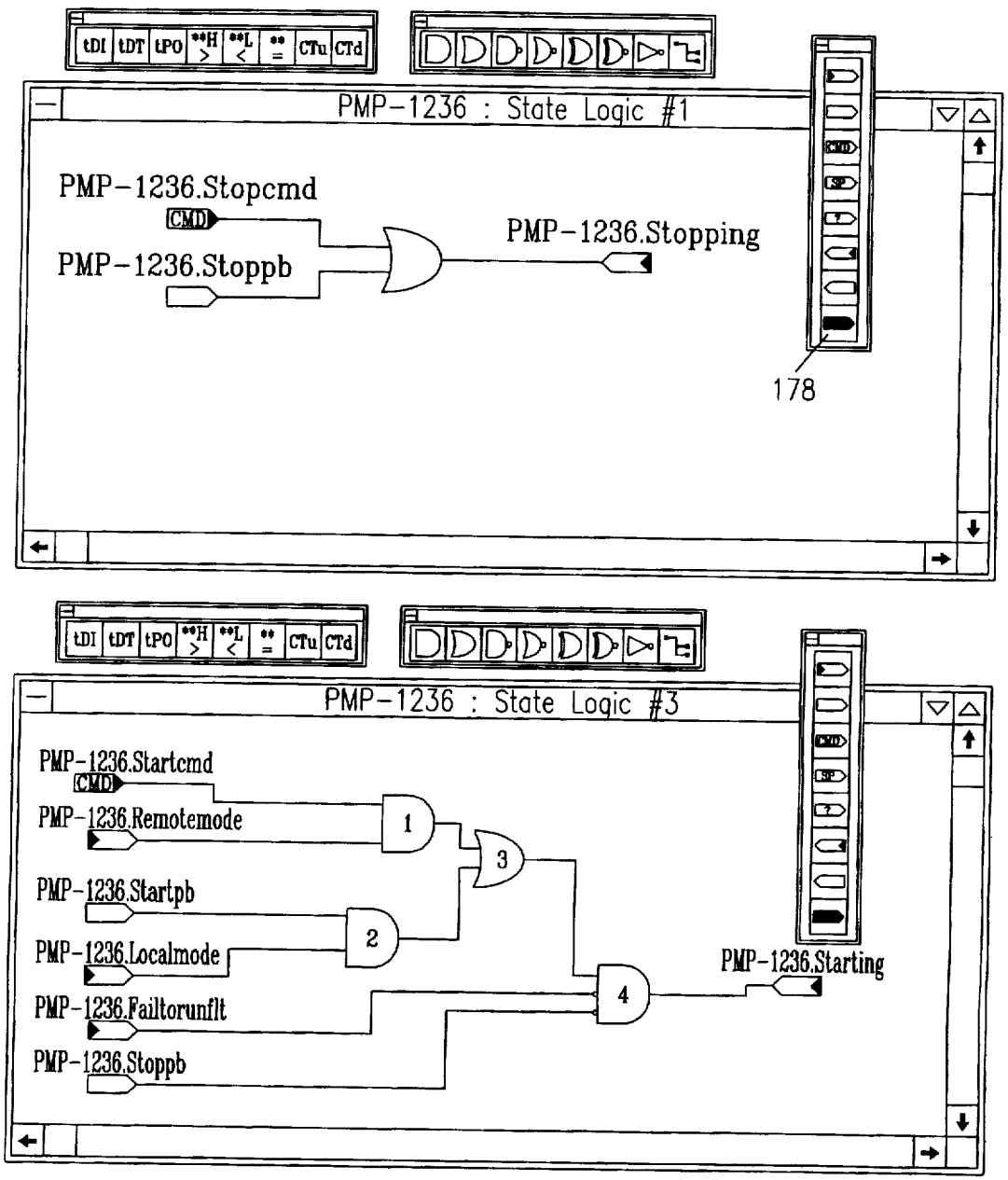
FIG. 10 shows several different pages of state logic for a configurable device.
Figure 10B:
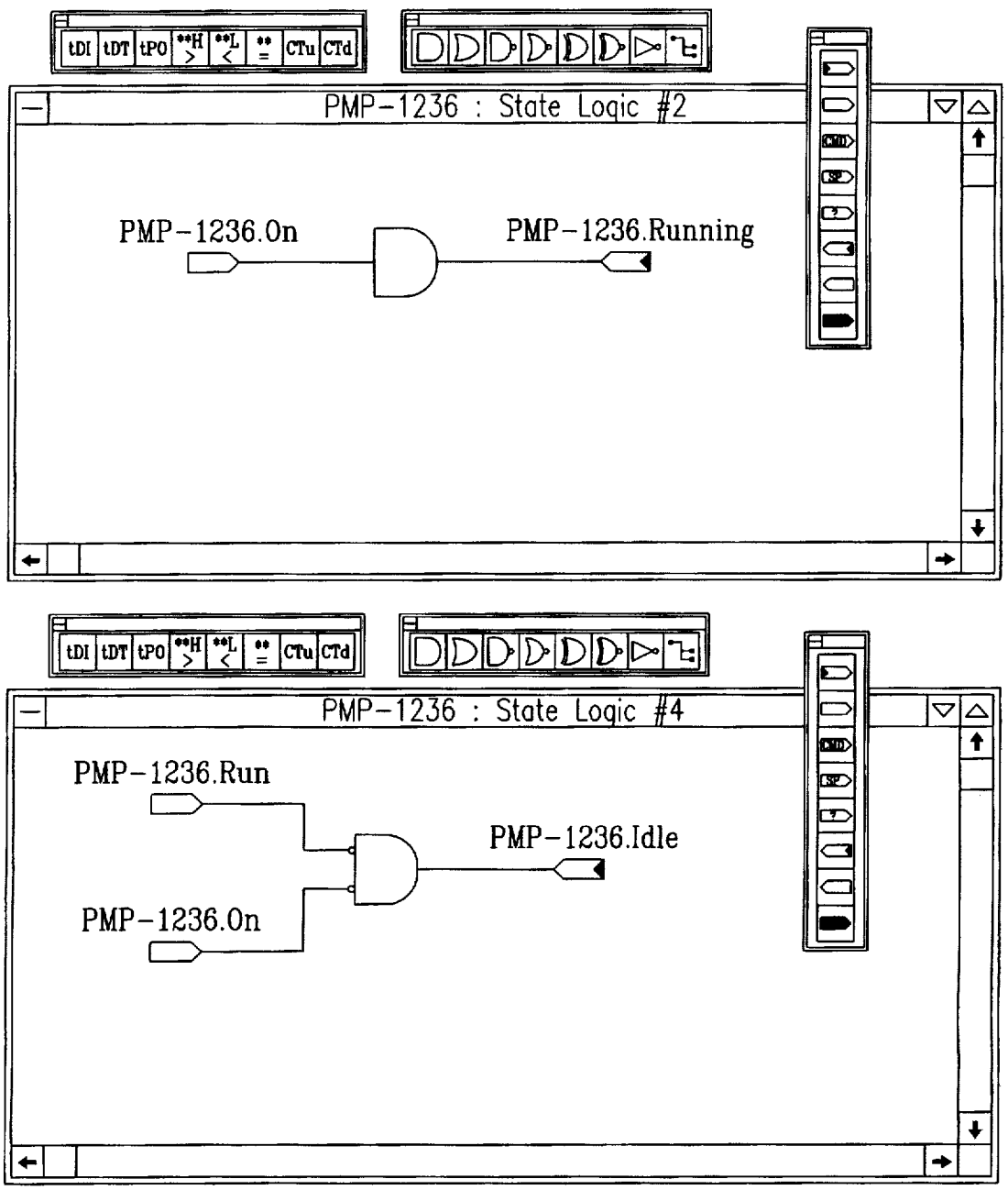
Figure 11:
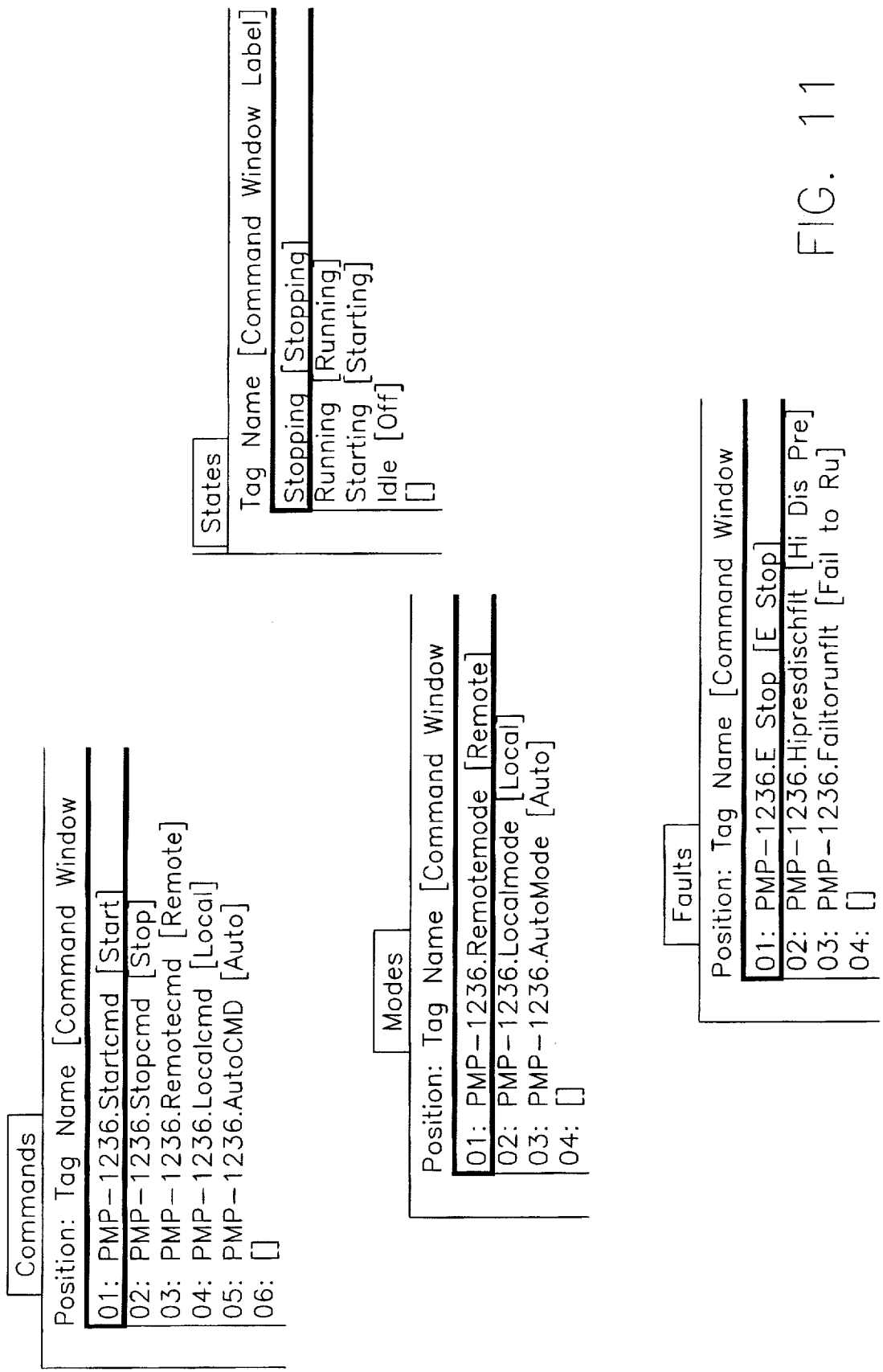
FIG. 11 is a diagram illustrating some of the folder tag definitions used in the present invention.

Referring now to FIGS. 10 and 11, the four pages of State logic and the four output tags used are shown in FIG. 10, while the definition of these tags is shown in the States folder of FIG. 11.

FIGS. 10 and 11 also show how tags from other tag definition folders can be used as State logic inputs (Stopcmd, Stoppb, etc.). On State logic pages, however, output tags must be listed in the States folder. All of the UCOS device logic categories exhibit this characteristic: output tags must come from the folder which corresponds to the same category of logic; input tags, however, can come from any folder. By requiring output tags to be listed in the folder for that category of logic, the UCOS device logic structure enforces conformance and consistency in applying the structure. This also ensures that a device tag will not be used incorrectly or for conflicting purposes, e.g., as both a state and as a mode. Furthermore, there are additional folders in the tag definitions dialog which exist primarily to provide input tags not associated with Mode, State, Alarm, Fault, or Control Logic. The Commands folder shown in the FIG. 11 is an example. Input tags can also come from a Setpoints folder, Analog Controls folder, or from other devices via the totally black input tag symbol 178 (FIG. 10).

As noted above, the logic categories primarily provide a structure for organizing the output tags into folders and allowing for slightly different execution properties in the UCOS FCU. The logic itself is fundamentally the same for each category, making use of a common editor and set of input tags and logical operators.

The designation of logic into these categories coupled with each category's distinctive FCU execution properties is an important part of the inventive aspect of the UCOS device logic structure. Proper use of these two properties allows control programs to be developed much more quickly and with much less programming than rung ladder logic-based systems.

Properties of the Logic Categories

Each logic category is detailed in Table 3 below with respect to its properties within the UCOS Device Logic Structure and describes in general terms the interactions of the various logic categories.

TABLE 3

| Logic Category | Intended Use | FCU Execution Support |
|---|---|---|
| Mode | Mode logic defines how the device will transition into different Modes. These "modes of operation" (e.g. Local/Remote, Auto/Manual) are examined during the execution of State logic. | The FCU enforces mutual exclusivity per mode group. The user designates each tag in the Mode folder as part of a mode group. The FCU only allows one tag per mode group to be set at any given instance. |
| Fault | Fault logic describes "severe abnormal conditions" associated with the devide. These "fault conditions" (e.g. "very high bearing temperature") are examined during execution of State logic, and are reported as "severe alarms" to the user. | The first tag listed in the Fault folder is set by the FCU as the logical OR of all the remaining fault tags. This first fault tag will normally be named "ANYFAULT" and will not be driven by user-defined logic. |
| State | State logic relates to the observable, controllable States of the device. State logic examines "conditions of" Commands, Modes, Faults, Setpoints, etc. to determine the current State of the device. The current device State is examined during execution of Control logic. | The FCU enforces mutual exclusivity for all state tags. The FCU allows only one state tag to be set at any given instance. |
| Control | Control logic examines "conditions of" States to determine the value of internal and real-world outputs. These "control outputs" operate the device. | |
| Alarm | Alarm logic describes "less severe abnormal condition" associated with the device. These "alarm conditions" (e.g. bearing approaching high temperature) are not necessarily examined by the other categories of logic, but are reported as Alarms to the user. | |

In the preferred implementation, the UCOS FCU will solve the categories of logic in a particular order: Alarm, Fault, Mode, State, and Control. This solving order, combined with the FCU's event-based logic processing capability, serves to augment the category-specific FCU execution support. Consider the state logic figures presented earlier in FIG. 10 as an example. Since four state tags are used, the FCU enforces mutual exclusivity on these tags, i.e., only one of the four is ever set at a given instance. The state tag that is "set" will remain set until another state tag becomes set, which causes the FCU to reset all the other state tags. The tags in the state folder can be used as inputs on any of the logic in a device. The event-based processing capability in the FCU sends messages to the other logic "networks" which use a state tag when the tag is set or reset. This event-based or message-based approach guarantees that a state transition is not "lost."

Comparing these ideas to a rung ladder logic based system exposes two critical points. First, a PLC programmer would need to "write code" to enforce any mutually exclusive behavior, whereas in UCOS this capability is inherent. Second, a PLC programmer would need to write code to latch and un-latch bits in memory to achieve the equivalent set/reset functionality of UCOS logic. These two points combined greatly reduce the task of writing control logic in UCOS, and the associated testing, debugging, and re-testing.

Conceptual Summary

Figure 12A:
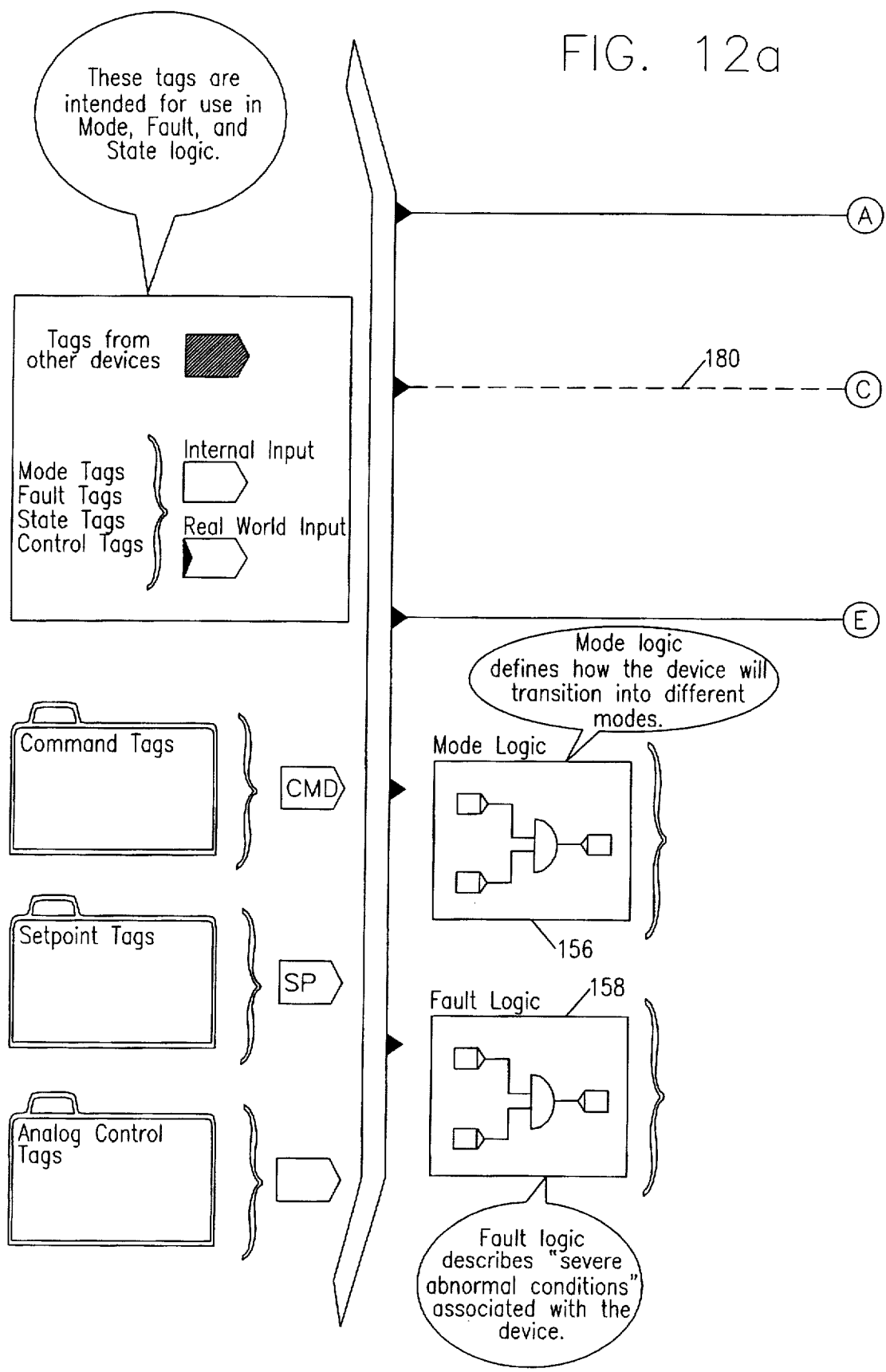
FIGS. 12A–12D are views similar to FIG. 7, but illustrate in further detail the structured logic approach to programming a device with the present invention.
Figure 12B:
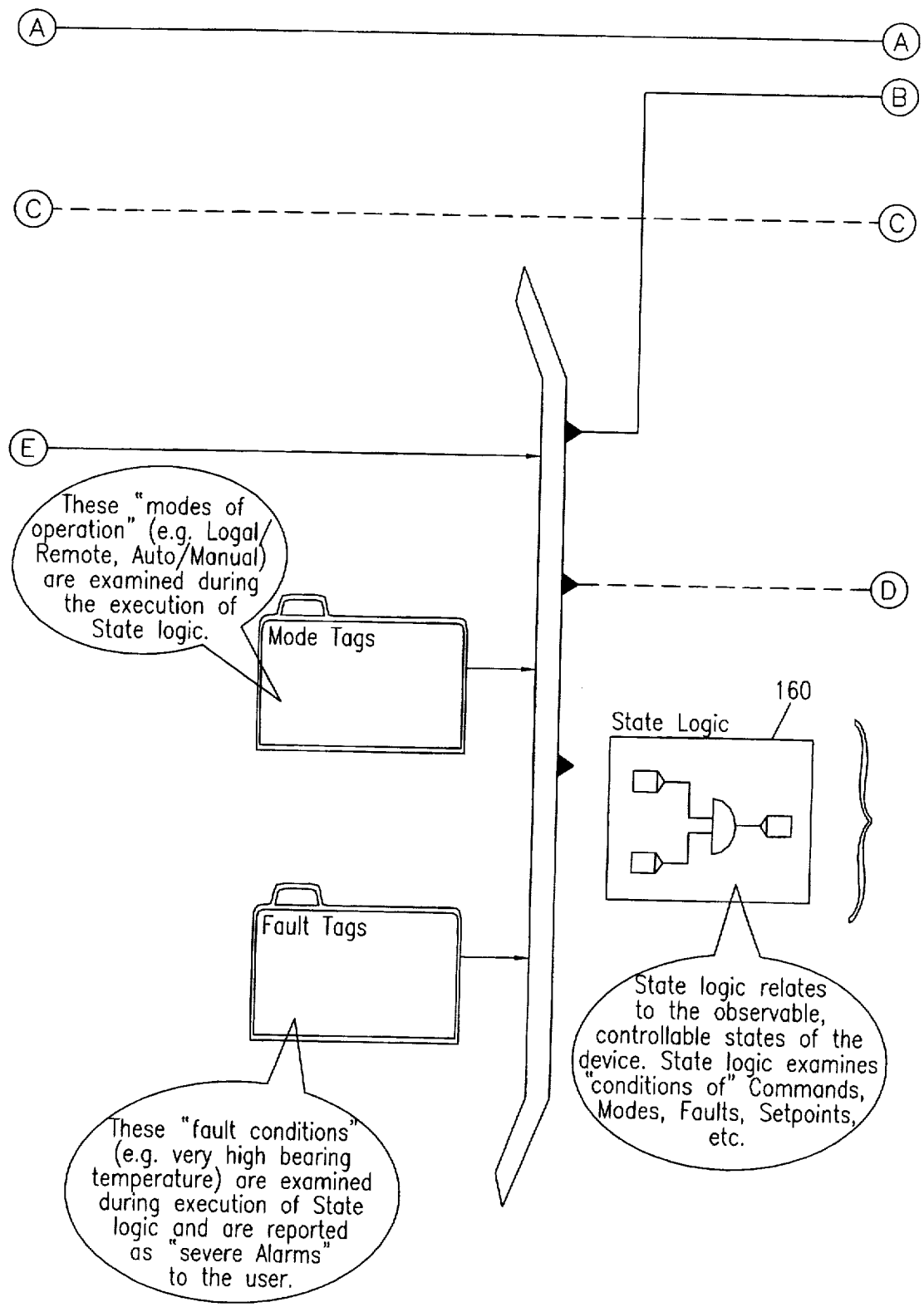
Figure 12C:
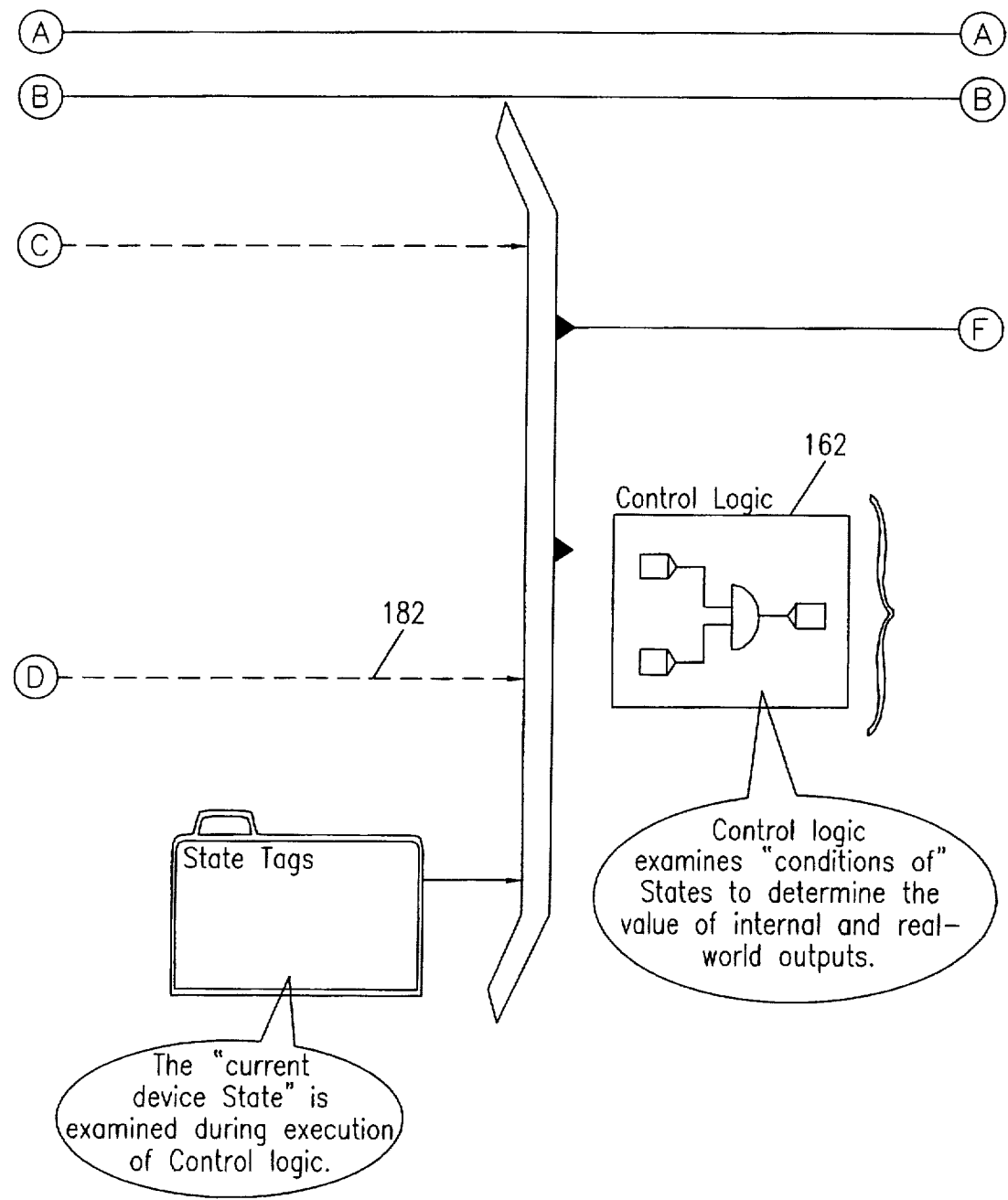
Figure 12D:
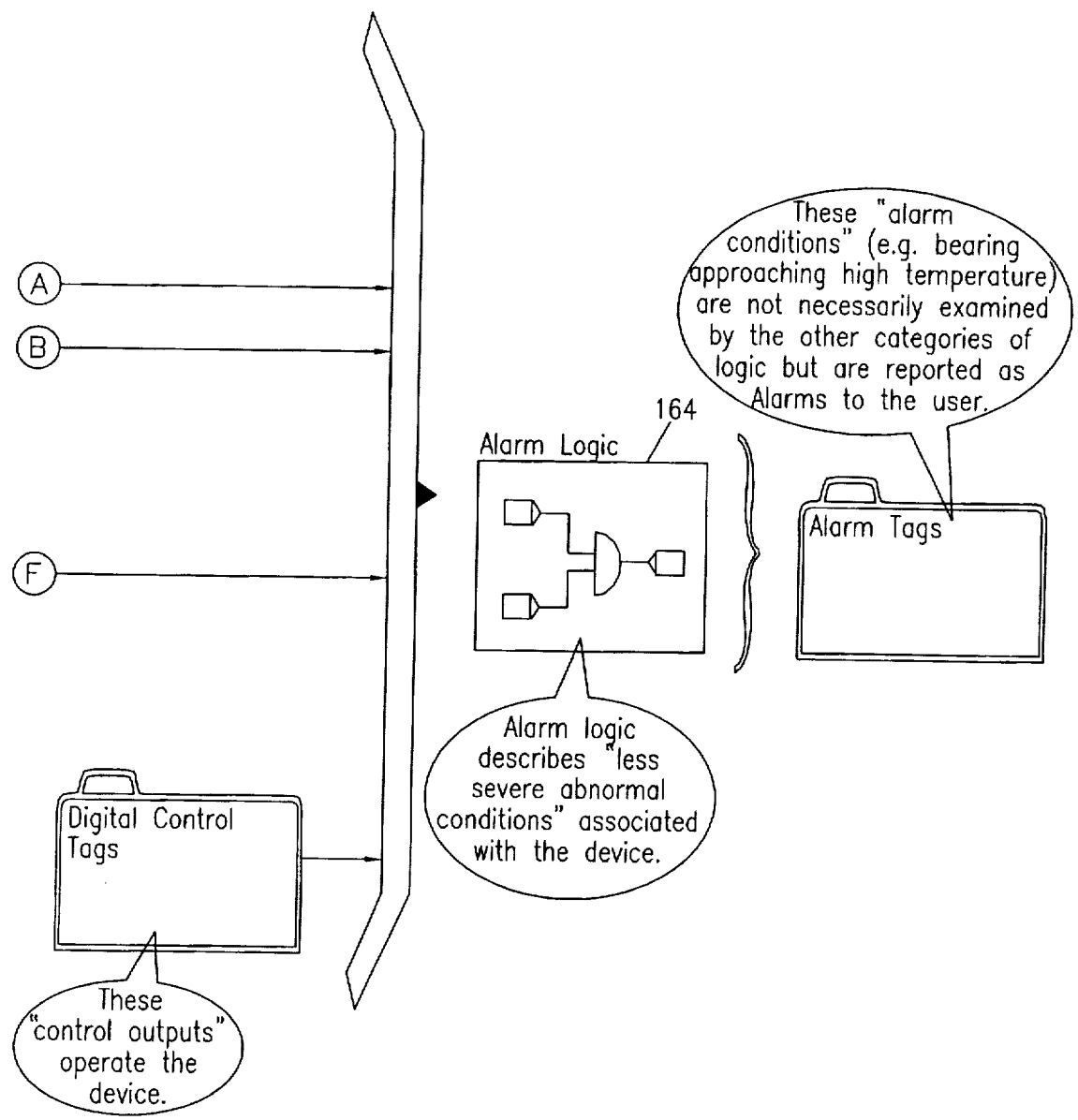

FIGS. 12A and 12B are designed to tie together the various concepts described for the UCOS structured approach to programming a device. These figures are intended to show the progression from input information, to solving the control scheme for the device, to control outputs in greater detail than shown in FIG. 7. FIGS. 12A and 12B represent the intended use or recommended use of the UCOS Device Logic Structure, but also implies via dashed lines 180 and 182 that the user could circumvent the intended use.

Fundamentally, the user is expected to use Mode logic 156 and Fault logic 158 to generate outputs which are fed into State logic 160. The result of the State logic 160 should then be used to drive the discrete outputs via Control logic 162. Alarm logic 164 should be used only to generate messages for operators.

UCOS Templates

Most control system engineers will construct a library of starter routines as they complete various projects. This library might be in rung ladder logic, function blocks, or both. Often, the control system engineer is only as good as his toolbox of starter routines. This technique has become so pervasive that books of starter routines are published and sold to engineers.

Figure 13:
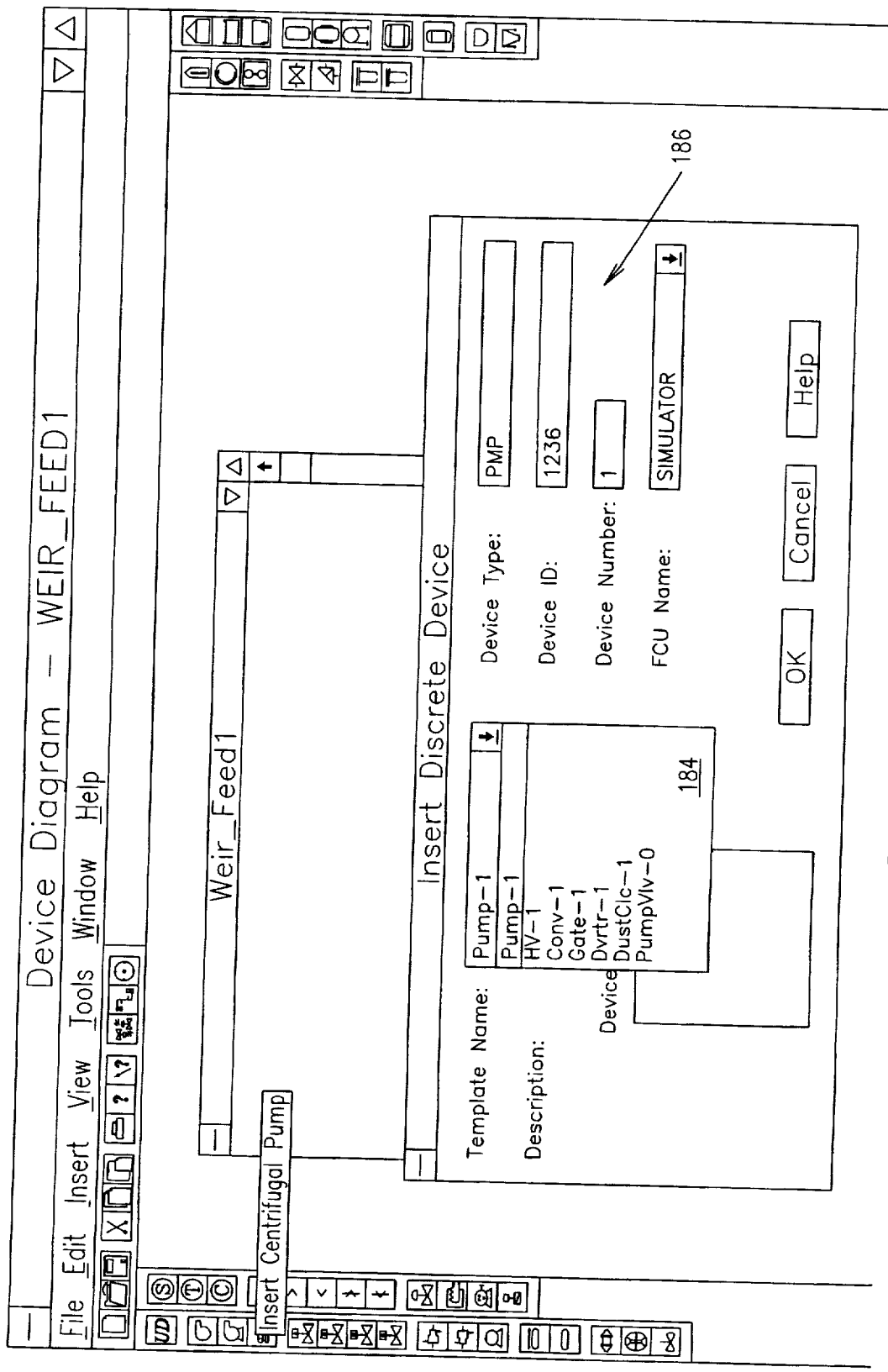
FIG. 13 is a screen capture of a device diagram window in which a discrete device is being inserted.

However, UCOS is the first control system product to incorporate direct support for this tendency of engineers to collect a library of starter routines. UCOS Device Templates allow engineers to build their library within the control scheme development environment. Additionally, UCOS supplies starter routines for control of typical devices. The power of Device Templating is augmented by the ease with which templates can be applied when building a device diagram. FIG. 13 shows how a user places a pump device on a device diagram by instantiating the definition based on a pump device template object.

The left side of the dialog designated by reference 184 shows the names of template definitions for discrete devices. This is the user's list of starter routines. The right side 186 of the dialog allows the user to specify identifying information about the device to be created. Note that the device is targeted to a specific FCU (Simulator) for execution of its logic.

All UCOS devices, when placed (or instantiated) on a device diagram, come from a template. UCOS devices have a template structure which incorporates user-modifiable logic, tag definitions, and graphic symbol dynamics. The underlying device object model utilized by UCOS employs a template approach for both analog and discrete devices.

Tag management is one of the primary advantages of UCOS templates compared to manually building a library of routines. Because UCOS templates are an intrinsic part of the Device Diagram and Device Logic development process, the user does not have to perform traditional search and replace editing functions on the inherited logic. Additionally, UCOS templates provide mechanisms for placeholder tags which can be resolved for external device linkages after instantiation. This placeholder capability further increases the usefulness of device templates.

Essentially, a template acts as a guide to the format of the new device being created. UCOS supports categorization methods so that multiple types of templates for a kind of device can be created. For example, you might have several types of pump templates, several types of valve templates, as well as one-of-a-kind templates. Each template specifies the following information about a device:

The logic which the FCU will execute at run-time

The names and characteristics of tags associated with the device

The symbol to use in representing the device on the device diagram

Figure 15:
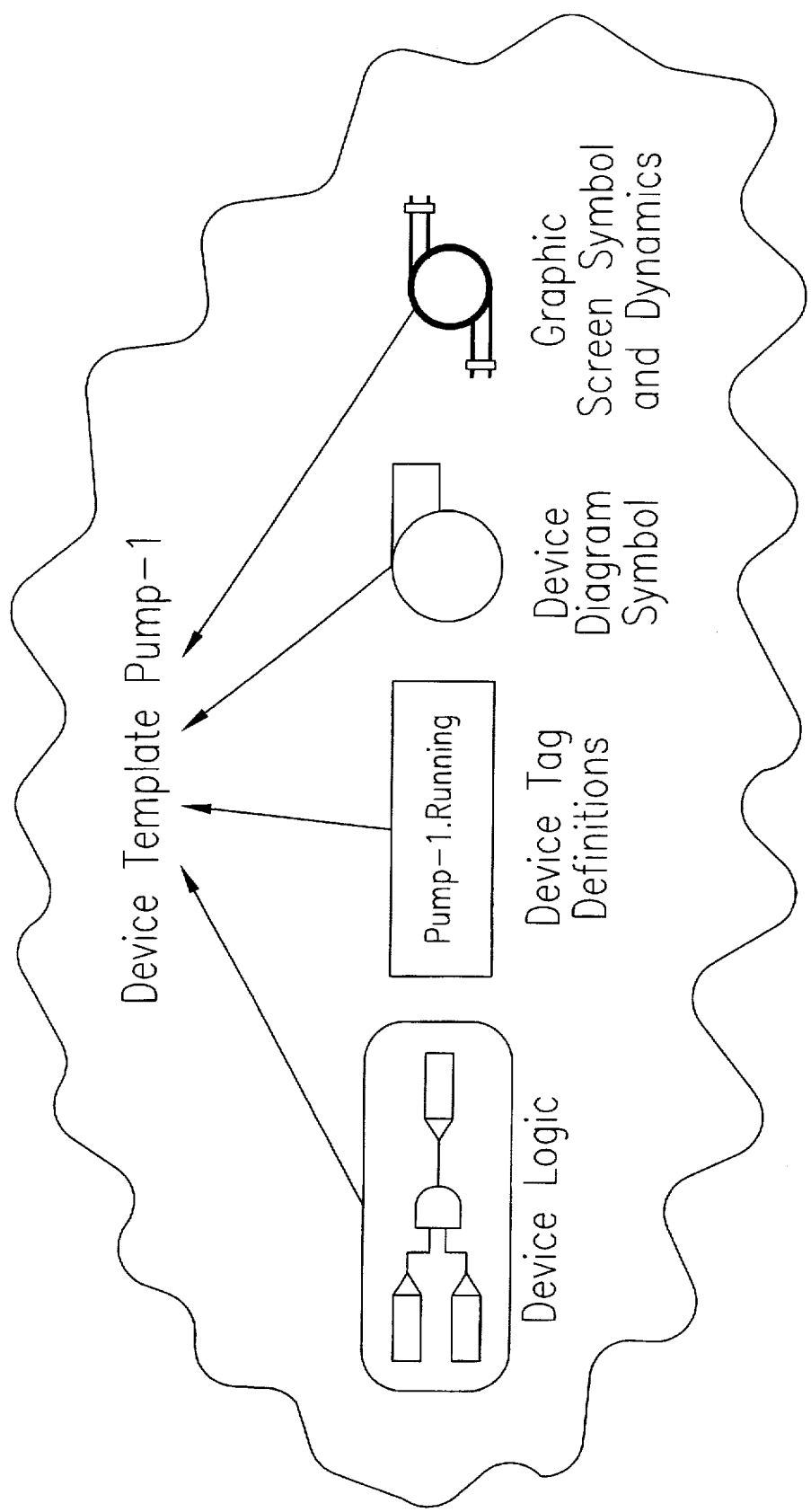
FIG. 15 is a view similar to FIG. 14, but showing the conceptual basis of a discrete device template according to the present invention.

The dynamic, graphical behavior of a symbol used when representing the device on a graphical project screen that the operator uses to monitor the process The above information is represented by FIG. 15 which illustrates the relationship of these elements within a template.

Once a template is created, devices based on it can be inserted into device diagrams. The user simply chooses from a toolbar or menu the type of device he/she wants to insert, supplies relevant configuration information, and points in the diagram where that device is to be placed.

FIG. 13 illustrates the type of configuration information that could be supplied for a discrete device upon insertion into a diagram. Note that the user chooses the template on which to base the new device, Pump-1, and specifies the name of the new device, PMP-1236. When the user finishes filling out this dialog and clicks OK, he/she has specified all the configured parameters associated with the new device. This might include pages of logic, tag definitions, graphic symbols, and the dynamic behavior of graphic symbols. Yet it is all specified simply by giving the new device a name, stating what template to use as a basis, and providing some additional configuration information. Using object-oriented techniques, UCOS handles all the overhead of making the device unique including making each tag name unique, as is illustrated in the FIG. 14. For example, Pump-1.Running is automatically changed to PMP-1236.Running.

In true object-oriented fashion, PMP-1236 inherits all the characteristics of Pump-1. Yet PMP-1236 becomes a new, independent entity. The developer can use these characteristics as is or modify them, as needed. The developer may insert other devices into a diagram based on the Pump-1 template. Yet any changes made to the PMP-1236 device have no impact on either the Pump-1 template or on any other devices based on Pump-1. In other words, changes made to a device through a device diagram are local to the changed device, as demanded by the object paradigm.

However, if the user decides to change the Pump-1 template using the Template Editor, those changes are reflected in any devices based on Pump-1 that are subsequently inserted into a diagram. The changes do not affect previously-inserted devices based on Pump-1.

The developer can create as many templates as are needed to represent the full range of user-defined devices required by the control system. UCOS includes a number of templates for commonly-used devices. Developers can use these templates as starting points for their own templates, or they can create templates from scratch.

Most traditional control systems allow the user to manually organize previously-defined procedural logic into libraries. But in addition to the manual organization, the user also has to manually customize the contents of this "library logic." For example, this might include replacing tag names with equipment-specific tag names. Even with the aid of a computerized search-and-replace function, this has to be accomplished at the discretion of the user for each new piece of equipment.

UCOS totally automates this labor-intensive process using templates. The developer might create additional templates to augment those supplied with UCOS. From those templates, the developer can create configurations for thousands of devices simply by specifying the name of the template on which to base the new device. All the device-specific parameter changes (e.g. tag renaming) are handled automatically when the device is inserted into a diagram.

Storing Configuration Information in a Unified Model/Location

Figure 16:
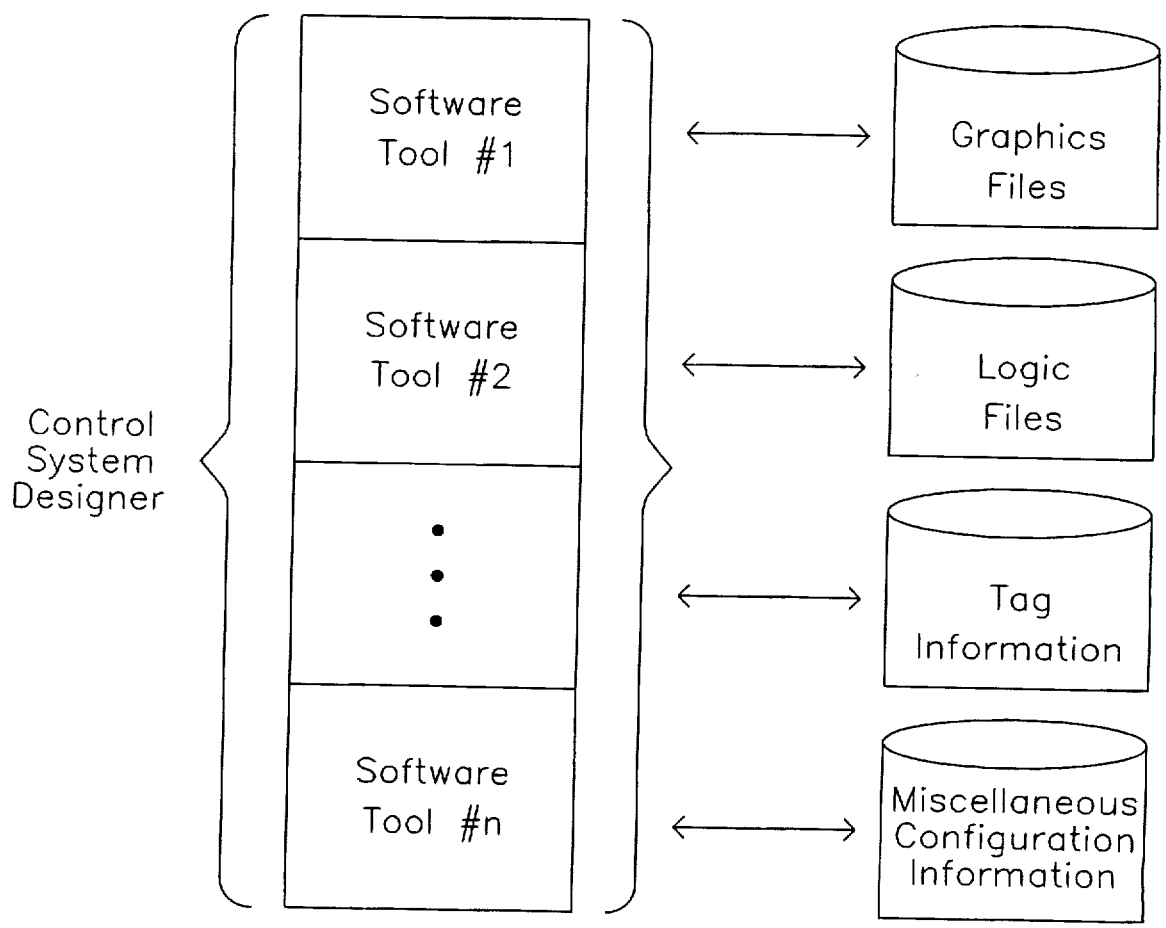
FIG. 16 is a view showing a prior art traditional control system development model.

The traditional control system development environment suffers from a diversity of tools. This problem is especially acute when developing PLC-based control systems. However, the development environments for DCS systems also suffer from a lack of unification of configuration information. In either case multiple software tools typically produce multiple files of configuration information, often organized by the type of information. This traditional model can be conceptualized by FIG. 16.

This traditional approach has drawbacks:

Because of multiple tools, configuration information has multiple perspectives from which it can be viewed which can make it difficult to manage.

The necessary association between information of various types may need to be maintained manually. If these manual links are not accurately updated then incorrect configuration could result.

It is difficult to retrieve all the information (of all types) for a single piece of equipment or area in the facility.

Multiple types of software tools must be learned. Dissimilar user interfaces may have to be mastered.

Figure 17:
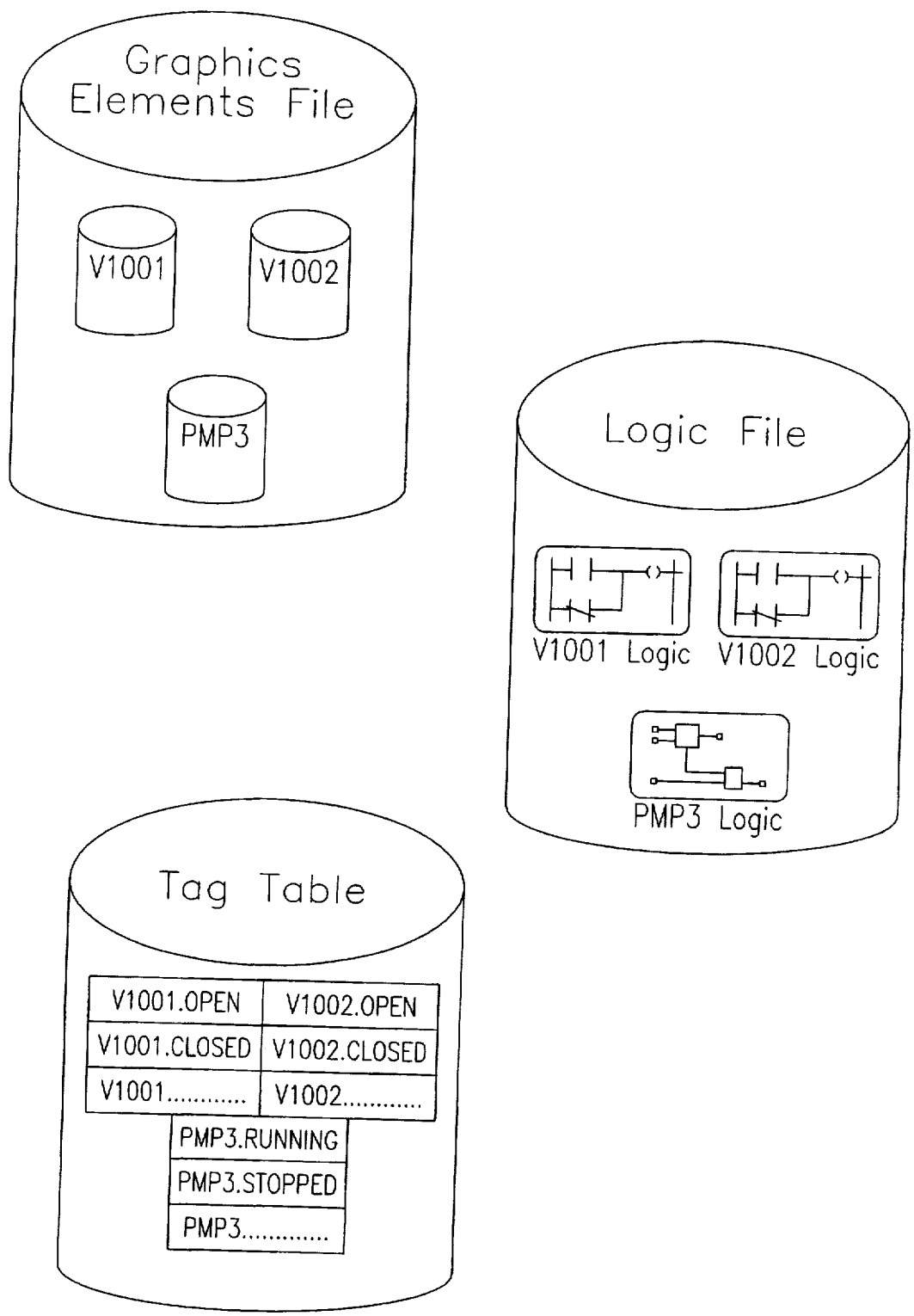
FIG. 17 is a diagram illustrating a representation of configuration information in a typical/traditional control system.

In a typical/traditional control system, each part of the configuration information is a separate entity. The logic, tag names, and graphic symbols are all stored either in separate database tables or as separate files. FIG. 17 is typical of a traditional control system. The master control definitions for valves, pumps, and other pieces of equipment are stored in multiple tables and files with each characteristic of each piece of equipment stored in a separate location. The relationships among all these elements are typically established via the tag names, e.g. V1001, PMP3, etc.

Figure 14:
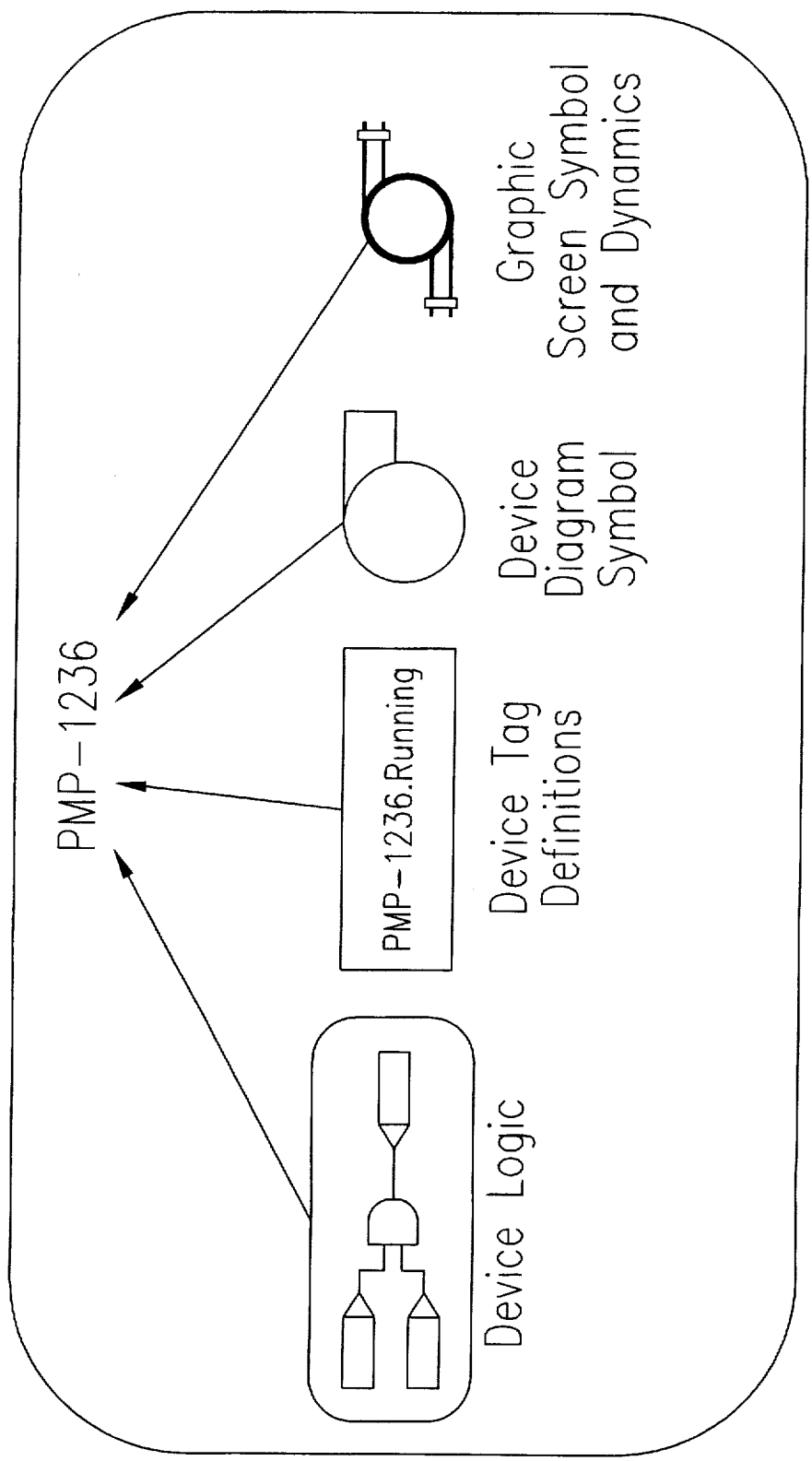
FIG. 14 illustrates the conceptual basis of a device object for a discrete device according to the present invention.
Figure 18A:
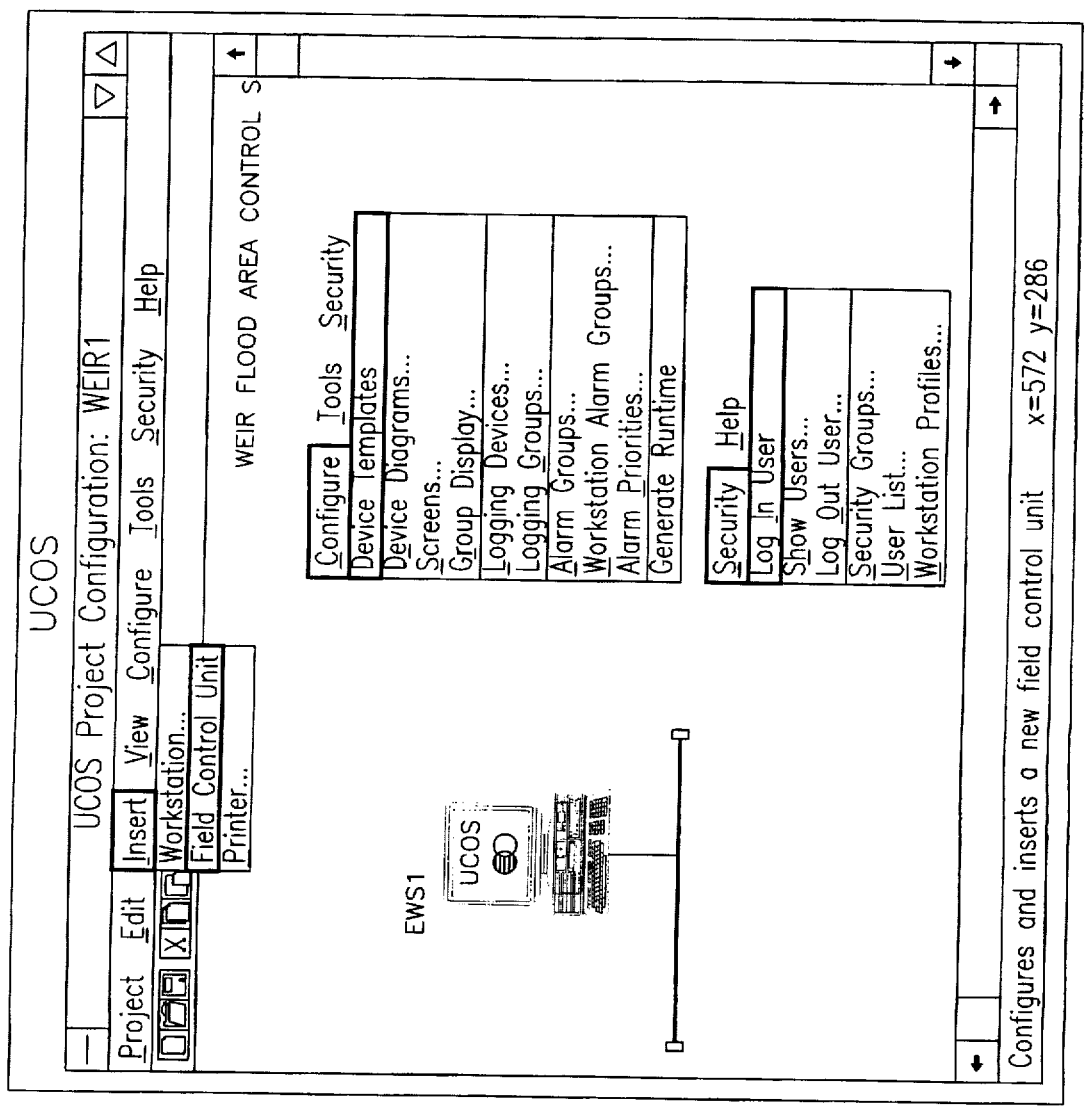
FIG. 18 illustrates the approach to storing configuration information of the User Configurable Open System for Control of the present invention.
Figure 18B:
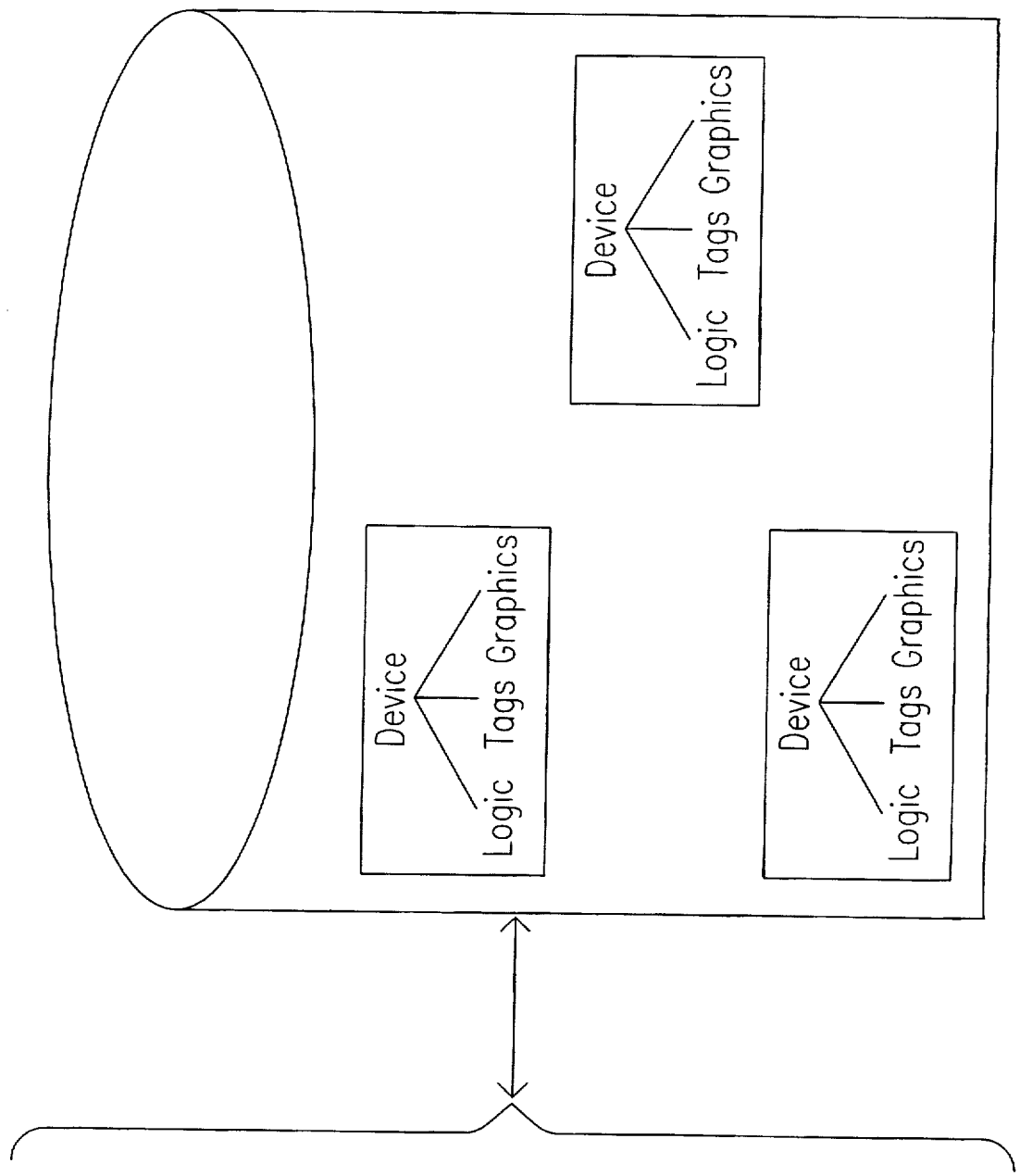

UCOS reverses the traditional model because of its underlying adherence to object-oriented concepts. First, the UCOS development environment provides all the software tools necessary to develop a control application. Second, the configuration information is organized around a device object model, resulting in greater cohesion for all types of information which define control and monitoring behavior for a piece of equipment (device). Third, all information for each control system application is stored in a single, object-oriented repository. This includes not only information about each specific device, such as either pre-defined or user-defined logic, tag names, graphic symbols, and other configuration information, but also information about device interconnections, how devices relate to the project hardware, and general project configuration data. A typical discrete device object is illustrated in FIG. 14. The end result is that the UCOS approach is much more unified than the traditional model, as depicted in FIG. 18.

The UCOS approach eliminates the drawbacks of the traditional system and provides the following benefits.

The user has no need to work toward keeping the configuration for a device together. In UCOS, it is together.

This device-based model facilities other UCOS advances, such as Device Templates, and the ability to represent both the physical nature and the logical control scheme definition of the facility in one development tool.

Another advantage of this method is that something stronger than a tag-naming convention ties together the information needed to control and monitor a piece of equipment (device). This "something stronger" is the internal UCOS object model which links this information inside the object-oriented repository. This is a drastic improvement over the traditional, manual, tag-naming method because there is no manual step to be left out which, in the traditional system, would cause the information to lose its ties among information elements.

A UCOS control program (Device Diagram) contains more than just device objects; it also contains the links among devices. Therefore, all of this information is also kept in a single place within UCOS: in the object-oriented repository.

Figure 19:
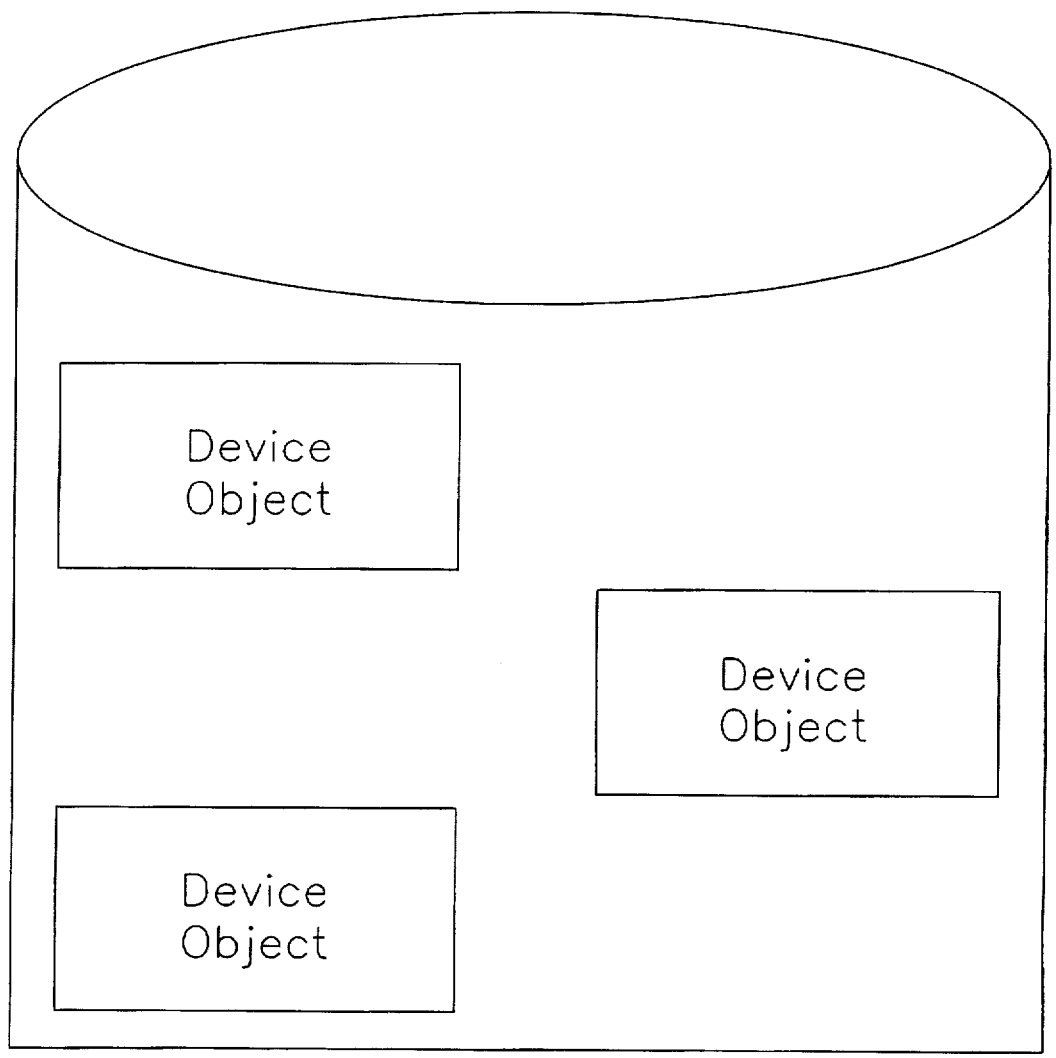
FIG. 19 illustrates multiple device objects stored in a unified repository in accordance with the present invention.

FIG. 19 illustrates how all devices are stored in a unified model/location. Each device object, however, contains the specific details necessary to describe it, including logic, tag definitions, etc. Therefore, the traditional model examined earlier is effectively reversed in UCOS according to an object-oriented paradigm.

Each device object may be of its own unique type. Also, other information pertinent to the application is stored in the object-oriented repository, but is not depicted in FIG. 19.

Note the fundamental differences between the traditional model and the UCOS object model. In the traditional model, all control schemes for pieces of equipment are in physically separate tables or files and are tied together by the developer who must build and maintain an association among tag names, often by a naming convention. In the UCOS object model, all device characteristics are encapsulated within the device definition. There is no need to "tie" them together because they are together. The traditional model does not exhibit object-oriented characteristics such as encapsulation, inheritance, and polymorphism, all of which help unify the configuration information.

For example, using the traditional model, a developer creates control schemes for a new piece of equipment based on an old piece of equipment by copying the original logic and tag definitions and changing the tags to new names, paying great attention to keeping the association/tag naming convention intact. In a traditional control system, this step must be accomplished manually or using an operator-initiated search and replace operation for the control logic associated with each piece of equipment. Note also that the traditional model used by traditional control system products does not prevent automated search and replace functions from being used. However, they would be more difficult and more awkward to accomplish than by using object-oriented techniques.

The Object-Oriented Nature of UCOS

Objects are not new. Object-oriented programming languages have been around for some years. Software using object-oriented interfaces has also been around for some years. However, few control systems employ any but the most basic object-oriented paradigms, if that.

In accordance with the present invention, UCOS introduces the concept of employing object-oriented techniques at every level:

The programming language used to write UCOS is an object-oriented language.

The mechanism used to store UCOS configuration data is an object-oriented repository.

The user interface by which a UCOS project is configured employs object-oriented techniques.

The method by which UCOS communicates among various processes at run-time employs object-oriented messaging concepts.

For the sake of flexibility, UCOS allows a user to modify the pre-defined logic behind a process using a point and click, object-oriented user interface that requires no traditional control logic programming language. The pre-defined run-time behavior of graphic symbols may also be modified. However, these tasks are optional with UCOS where they are required with virtually all other contemporary control systems.

When the user wishes to insert a new device into a Device Diagram, he/she simply picks the type of device to insert, i.e., picks the template on which to base the new device. Since the device template encapsulates everything UCOS needs to know about the device, the user needs to do nothing more than give it a unique name. The new device then contains all the tag definitions, logic, etc. of the device template. In the spirit of object-orientation, any configuration information in the new device can be modified, if needed.

Adherence to Object-Orientedness

The UCOS development environment adheres to the classical, object-oriented paradigms in the following ways:

Encapsulation: For all discrete devices inserted into a device diagram, UCOS hides the inner-workings and configuration data of the device.

However, the configuration engineer may choose to modify that hidden information in user-definable discrete devices.

Inheritance: All discrete devices inserted into a device diagram inherit the logic, tag definitions, symbols, run-time graphical behavior, and other configuration information of the template (object class) on which that discrete device is based. In addition, new discrete device templates based on existing templates inherit all of the existing template's characteristics.

Whether the user is creating a new template (object class) or merely inserting an instance of a class into a device diagram, any changes made to the new template or the new instance have no affect on the original template nor on any other instance based on that template.

Polymorphism: Internally, the object model for UCOS devices in conjunction with the object-oriented software development tools allows the objects to achieve polymorphic behavior.

The result of encapsulation, inheritance, and polymorphism is a unification of characteristics that are kept separate in the more typical, traditional model. The primary benefit of this unification is the ability to quickly and easily instantiate new devices without having to "customize" each new device other than giving it a new name. In the traditional model, the control schemes for new pieces of equipment must all be built from scratch or must be heavily "customized" if they are copied from existing tags, logic, and/or graphic symbols.

Object Orientation in UCOS Source Code

Most traditional control system configuration data is stored in separate places, e.g., separate files, tables, or databases. All UCOS configuration data is stored in an object-oriented repository because traditional files, tables, and databases cannot readily support the essential characteristics of object-oriented data, e.g., encapsulation, inheritance, and polymorphism.

In the illustrated embodiment of the invention, the UCOS object-oriented repository is implemented using a commercially-available object-oriented database product called "Object Store." The UCOS development and run-time code is written in Microsoft's Visual C++, one of the industry-standard object-oriented languages. These products support all standards of object-oriented programming (encapsulation, inheritance, and polymorphism).

The UCOS Object-Oriented User Interface

Figure 20:
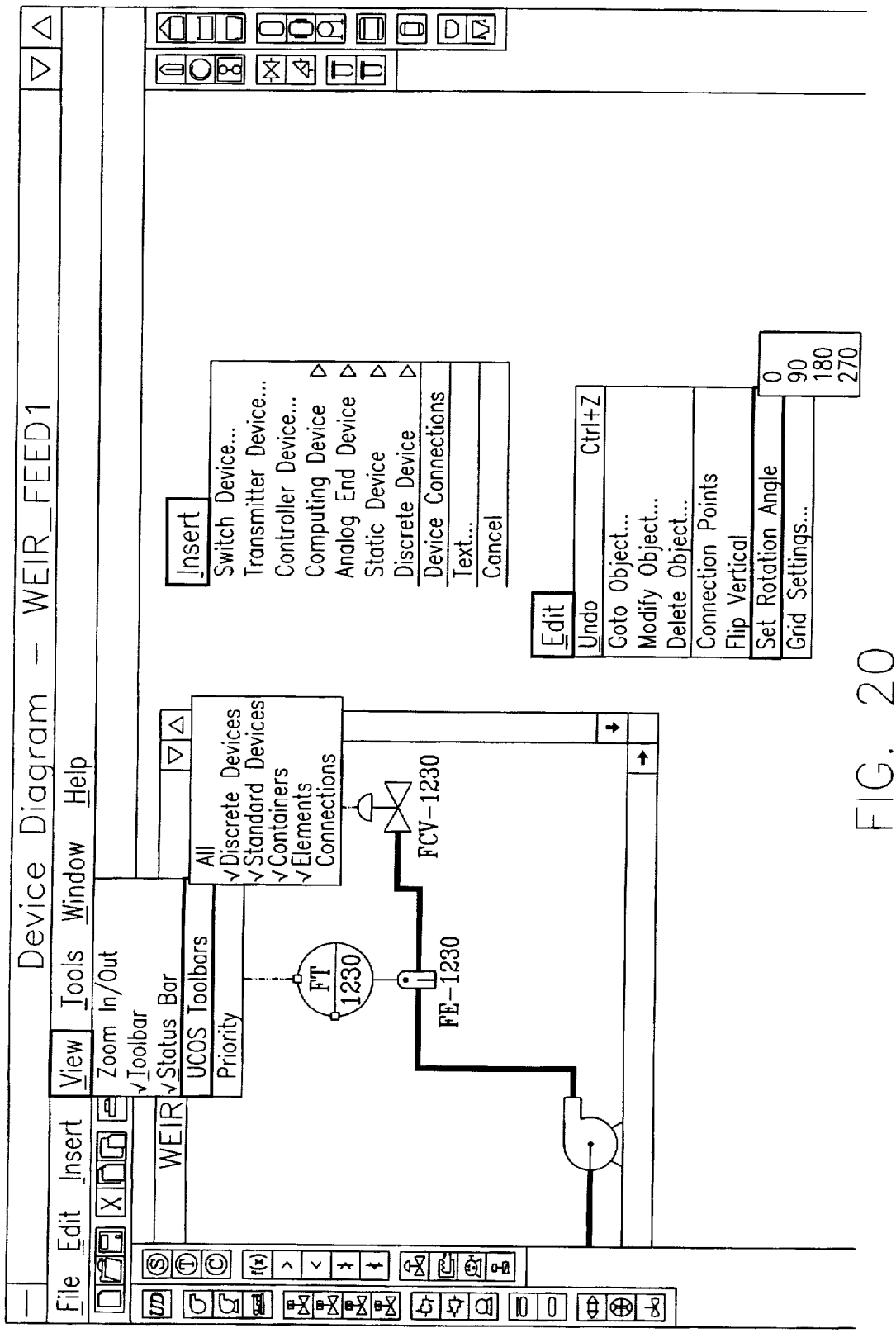
FIG. 20 is a screen capture illustrating the object-oriented user interface according to the present invention.

FIG. 20 provides an example of the object-oriented user interface concepts applied in UCOS. The comments listed below elaborate on the characteristics of the UCOS user interface which exhibit object orientation.

Windows is a graphical, object-based, general purpose user interface. All UCOS configuration is via windows-based editors and dialogs.

Much of the UCOS user interface is based on standard Microsoft user interface objects available in the Visual C++ MFC (Microsoft foundation classes) libraries. The significance of this fact is that the UCOS object-oriented user interface has the same "look and feel" as other Windows MFC-based applications.

The UCOS editor shown in FIG. 20 depends heavily on "graphical objects", toolbar button symbols, bitmap symbols for devices, and pulldown menus organized according to the Windows convention.

Managing Control System Network Architecture

In most traditional control system development, the components of the architecture are managed independently of one another either through operating system utilities or by filling in forms in a built-in editor. There is little or no ability to easily see relationships among development nodes, operator interface nodes, controllers, printers, etc., and little ability to access each component's configuration data at any but the highest level. This often creates a system management burden on the end user.

Figure 21:
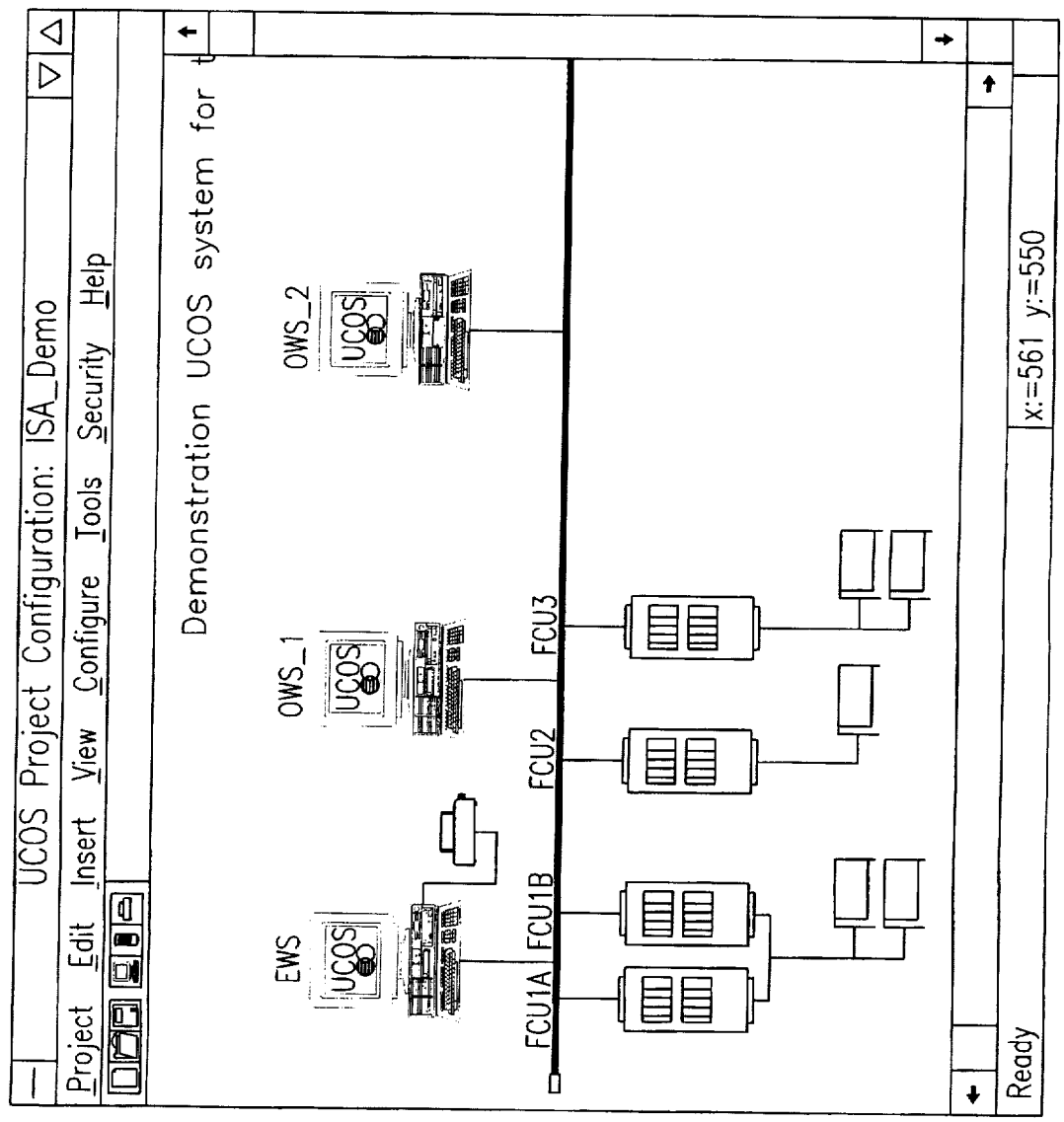
FIG. 21 is a screen capture of the project configuration editor showing major components of a project configured with the User Configurable Open System for Control of the present invention.

In UCOS, as explained further below, the first task a developer performs is to place graphical symbols representing workstations, printers, and controllers onto a network symbol. This graphically displays the highest level components in the system, their network address information, and their physical relationship to one another all on a single screen. It should be noted that the UCOS project configuration editor illustrated in FIG. 21 represents the components of a control system architecture.

To configure a workstation, the developer double-clicks on the symbol of that workstation. To configure the I/O associated with a particular controller (FCU), the developer double-clicks on that controller. The ability to access objects and follow the configuration trail down several levels is another hallmark of object orientedness which UCOS employs.

Emulating Design Drawings UCOS is designed to emulate the drawings used to design many types of facilities. This is done to provide a heightened sense of familiarity with the physical facility for the engineer as he/she builds the control scheme required. The Device Diagramming tool allows the engineer to build control programs that mimic drawings which were previously developed by the designers of the facility. The Device Logic editors express control logic in a format similar to the logic design drawings which engineers sometimes develop.

Typical/Traditional Control System Project Configuration

In a typical control system project, these steps and tools are usually used in the planning stages, i.e., before a control system product is used:

1. Using CAD software, draw or insert a picture of each piece of equipment and draw lines between those pieces of equipment indicating the flow of the interrelations among the equipment. Such drawings are dependent on the type of facility. For example, a chemical process would likely have an associated Piping and Instrumentation Drawing (P&ID). However, a coal handling conveyor system might have a mechanical flow sheet drawing. A control system for electrical power generation might include electrical one-line drawings. Print this drawing so it can be used in subsequent steps.

2. Using a word processor/typewriter/etc., write a sequence of operations that details exactly how the facility is to be controlled. And/or using flow charting software, draw logic schematics that details exactly how the process works.

In a typical control system project, the following steps and tools are usually used to implement the above steps:

3. Using one or more specialized control programming languages, draw or write code that defines exactly how the logic works for each process. If similar logic is used in multiple processes within a project, copy existing code and manually make all necessary changes. If a tag used in the original code and the pasted code are not the same physical tag, then that tag name must be changed. In most cases, all pasted tag names need to be changed.

4. Using drawing software, draw any graphic screens required at the operator interface. Build or insert from a library a symbol for each piece of equipment to be represented on these graphic screens, and define the on-screen behavior of each piece of equipment. (This step is required only if the project will have graphic screens.)

The final optional step is to change and reprint the various drawings used to document the project, if desired.

UCOS Project Configuration

In keeping with the present invention, UCOS is capable of replacing steps three and four above with one step, and some users may depend on UCOS-generated documentation to replace the drawings in steps one through three:

I.a. Using the UCOS Template Logic editor, create or modify discrete device templates (this step is only required if the control functionality of the UCOS supplied templates is not sufficient to control the project's equipment). The discrete device template Logic diagrams emulate the logic schematic drawings that are sometimes produced in the design phase.

I.b. Using the UCOS Device Diagram editor, insert a symbol of each device in each process and draw lines between those devices indicating their interconnection. All characteristics of each device are pre-defined, although many of them may be modified. Print the diagram and supporting documentation. The Device Diagram editor includes the capability for user-created device symbols. Both the device symbol and its "connectable" points can be specified, resulting in a wide range of flexibility for representing devices and their connections. With this capability, the user can make the device diagram resemble practically any type of drawing that represents the physical facility. Therefore, the diagram would emulate either a P&ID, mechanical flow sheet, electrical one-line, etc.

I.c. Using the UCOS Discrete Device Definition editor, modify the characteristics of any discrete devices on the diagram. Like the template editor, the discrete device logic diagrams emulate the logic schematic drawings that are sometimes produced in the design phase.

II. Using the UCOS Screen Configuration editor, draw the graphic screens. Insert a symbol for each device to be represented in the graphic screens. The on-screen behavior of each device is pre-defined, although it may be modified. (This sub-step is required only if the project will have graphic screens.)

Many projects can be entirely configured using device characteristics that are pre-defined in UCOS. Many projects will require additional preparation. However, once that preparation is performed, the remaining steps are fewer than in a typical/ traditional control system.

Note that in a traditional control system, the engineer may develop several paper prototypes, write code to implement those prototypes, and then re-draw the prototypes to reflect any changes made during the configuration process. With UCOS, prototyping, logic code programming, and finished documentation are all accomplished at the same time and without the use of a programming language. Some control system products might allow one to import a P&ID, mechanical flow sheet, electrical one-line, etc. for use in creating graphic screens for the operator interface. However, in comparison to UCOS of the present invention, no additional leveraging of these drawings is possible. The UCOS leverage is the increased familiarity the control engineer experiences because the UCOS Development Tool emulates design drawings. This familiarity translates into labor savings and reduced cost over the life cycle of the control system installation.

UCOS Technical Disclosure

This section provides technical information describing how UCOS implements and performs its features and capabilities that are pertinent to the inventive aspects of UCOS. This technical disclosure describes UCOS implementation in general but also specifically focuses on how the development environment is implemented.

Major Subsystem Explanation

The EWS subsystem functions as the provider of Run-Time instructions to the OWS and FCU. Because of this relationship, the following explanation will focus on the EWS. However, it should be understood that for every feature that can be used or configured in the EWS, an "engine" must be available on either the FCU or OWS (or both) to execute this feature when real-time data is flowing through the system.

EWS Subsystem

In the present invention, the use of the object-oriented model in which EWS configuration data is manipulated, processed, and stored is of primary importance. As explained in detail, UCOS maintains the logical, physical, and graphical component of a device together because they are stored together in a unified object-oriented repository which contains the model.

The fundamental idea of the UCOS development tool is based on object-oriented principles. However, the capabilities of the UCOS development tool can be implemented in a variety of methods, including some that would not depend on specific object-oriented systems, e.g., Windows NT, etc.

Figure 22:
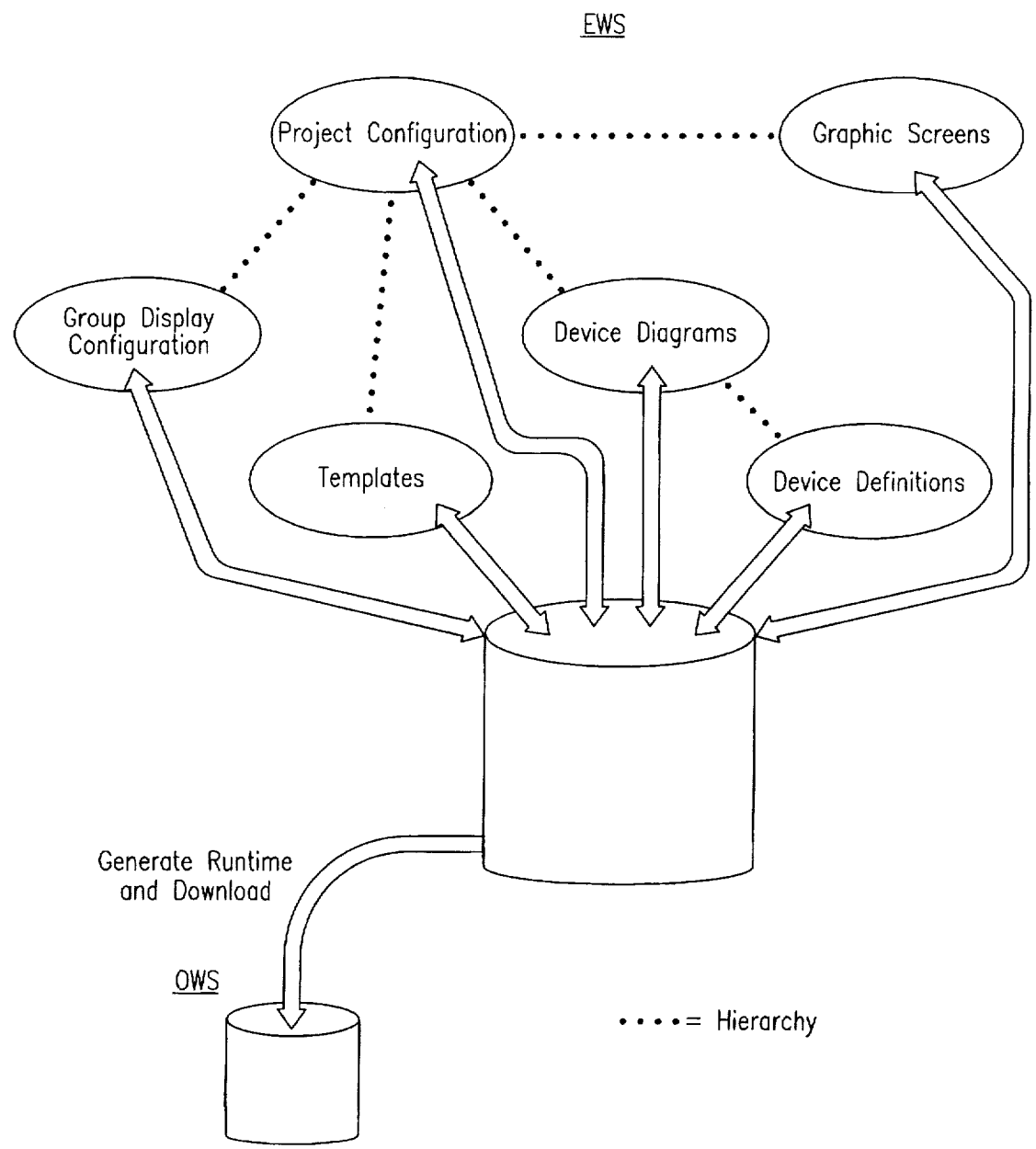
FIG. 22 is a schematic diagram illustrating the object-oriented model for the User Configurable Open System for Control of the present invention.

FIG. 22 depicts the manner in which UCOS EWS makes use of the object-oriented repository. An important part of understanding the implementation of the present invention lies in increasing an understanding of how the components of a UCOS Device Diagram are created, used, manipulated, and stored. The following explanation provides this understanding.

OWS Subsystem

Most of the UCOS OWS subsystem components require the Run-Time copy of the UCOS object-oriented repository to gain information necessary for run-time operation. Accordingly, the "Download" step in FIG. 22 results in a copy of the unified object-oriented repository placed within the OWS subsystem.

FCU Subsystem

Downloading to an FCU results in an operation similar to that described for the OWS. However, only a subset of the information in that project's object model is sent to the FCU. This information allows for a unified stream of logic execution for both analog and discrete devices placed on UCOS device diagrams. The ultimate result in the FCU is execution of both analog/regulatory and discrete/sequential/interlocking control for a single piece of equipment or facility.

Distribution of the Object-Oriented Repository

Figure 23:
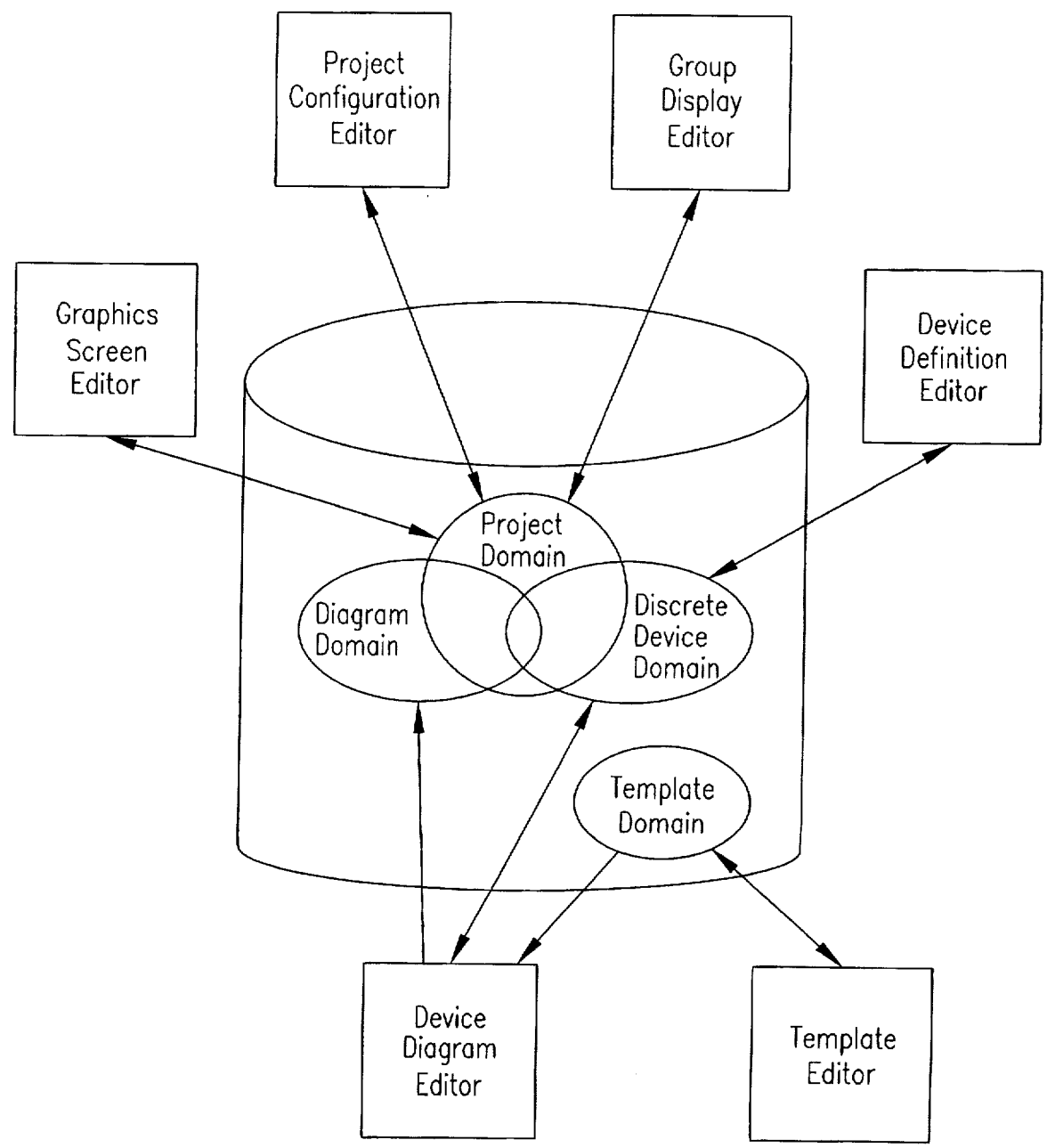
FIG. 23 is a diagram illustrating entry points into the object-oriented repository for the User Configurable Open System for Control of the present invention.

Each subsystem requires information from the object-oriented repository that is populated with "instructions" and configuration information from the EWS subsystem. It will be recalled that FIG. 1 illustrates each major subsystem, while FIG. 23 shows how the EWS subsystem interacts with the object-oriented model. UCOS requires, however, that the OWS and FCU subsystems also have the ability to "see" this information.

To meet this requirement the OWS subsystem actually receives a direct copy of the object-oriented repository. This allows the OWS subsystem full access to the entire object model for UCOS, including the objects which support device diagramming and device logic.

The FCU subsystem receives a subset of the information in the object-oriented repository. The objects critical to device diagramming and discrete device logic are part of the subset the FCU receives. However, in the illustrated embodiment, at the FCU level, the UCOS object model is maintained by the organization and content of the information.

It must also be noted that the word "database" is used in association with the commercially-available product employed by UCOS to implement its object-oriented repository. Sometimes the word database implies a relational data modeling approach. It is true that the software industry has spawned a class of products called "object-oriented databases." However, these "databases" are significantly different from their relational cousins. To illustrate this point, the term "object-oriented repository" will be used to refer to this aspect of UCOS.

UCOS Device Diagram Object Model

The entire implementation methodology used to develop UCOS is based on object-oriented programming concepts and employs an object model of a control system. UCOS presents its capabilities to the EWS or OWS "user" via a window-based, object-oriented interface. Essentially, all the elements of a control system, large or small, are implemented as objects in the programming environment used to build UCOS. Recall that programming objects contain both data and "methods," or functions that operate on the data in the object. This is in stark contrast to procedural programming environments which separate the data and the functions.

The following will present a detailed technical disclosure of the major UCOS objects associated with Device Diagramming. This technical information will include code fragments from C++ header files which define key UCOS classes for device diagramming and the logic associated with devices on a diagram.

Much of the meaning and data abstraction is lost when attempting to commit an object-oriented data model to two-dimensional drawings. However, FIG. 23 is designed to communicate several concepts important to understanding the overall UCOS object model.

- Several editors operate on the object model in an interlocking, interrelated fashion. Control system engineers use these editors to configure a control project. As the engineer performs activity with the editors, information is being read/written/updated in potentially many areas in the object-oriented model.

- The editors also have a "local, memory-based" copy of the objects which corresponds to the object's definition in the object-oriented repository.

- The editors correspond roughly to the development process listed below. However, the two logic definition editors are grouped together for this discussion because of their tremendous similarity in UCOS. The template definition editor allows for creation/modification of "template" devices from which discrete devices are instantiated (created). The device definition editor allows instantiated discrete devices to be modified and customized.

- The Project domain is the main repository for instantiated devices organized by FCU. The Diagram domain is the repository for device symbols, connections between devices, and a logical organization between devices. The Discrete Device domain contains the data and methods for instantiated discrete devices. The Template domain contains class definitions for discrete devices.

- The TemplateDiagrams and DiscreteDiagrams base classes are related in a fairly direct manner. DiscreteDiagrams objects hold instantiated objects from TemplateDiagrams objects. Discrete Device Templates are a basic capability of the core UCOS product, while instantiated devices are associated with a specific named project.

- The Diagram List, Project, and DiscreteDiagrams classes have objects which are all related to each other. As an application is configured with the EWS editors, objects are instantiated from these classes. The classes themselves have areas of overlap and dependence.

Figure 24A:
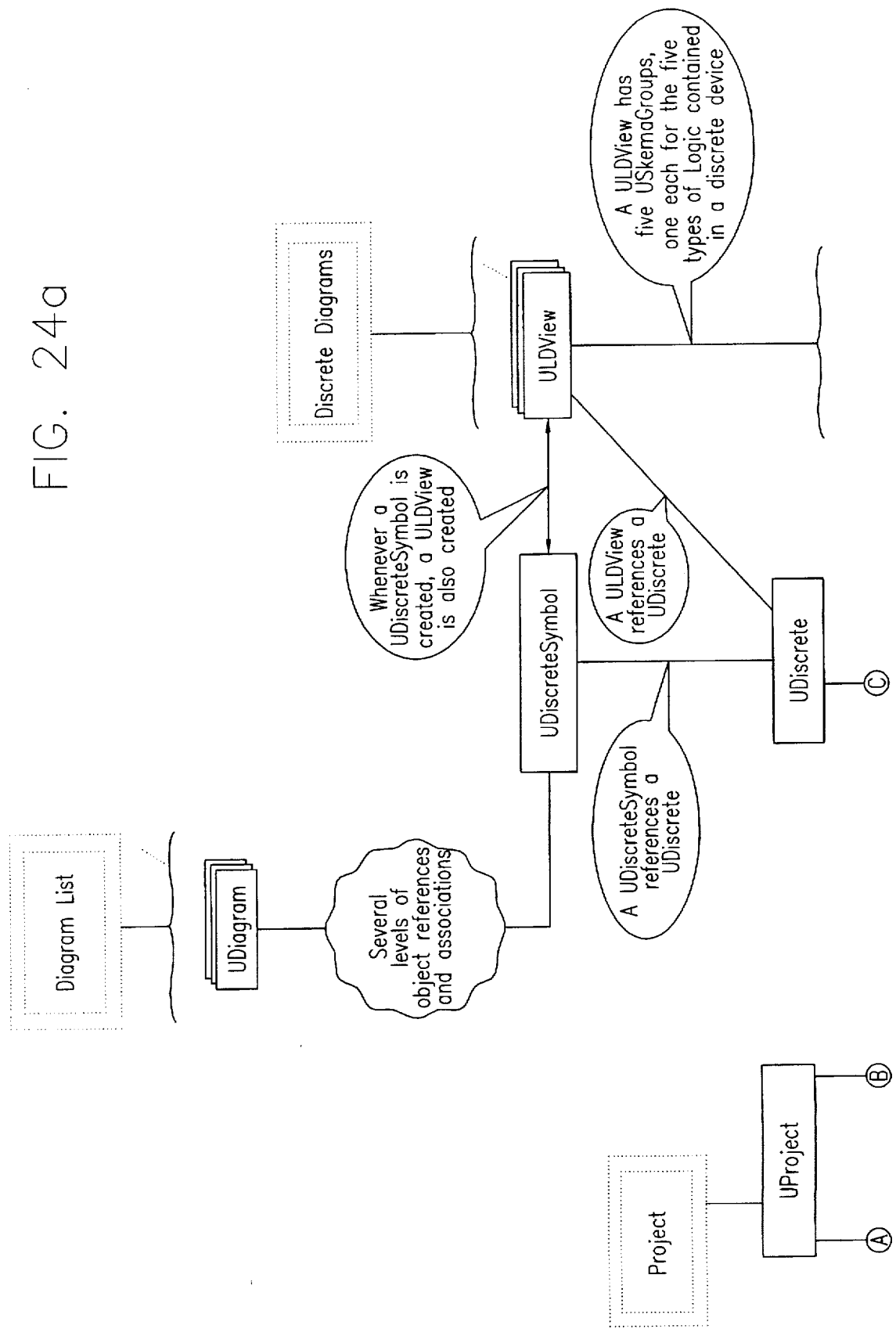
FIG. 24 is a diagram illustrating the relationship between device diagrams and device logic classes in accordance with the User Configurable Open System for Control of the present invention.
Figure 24B:
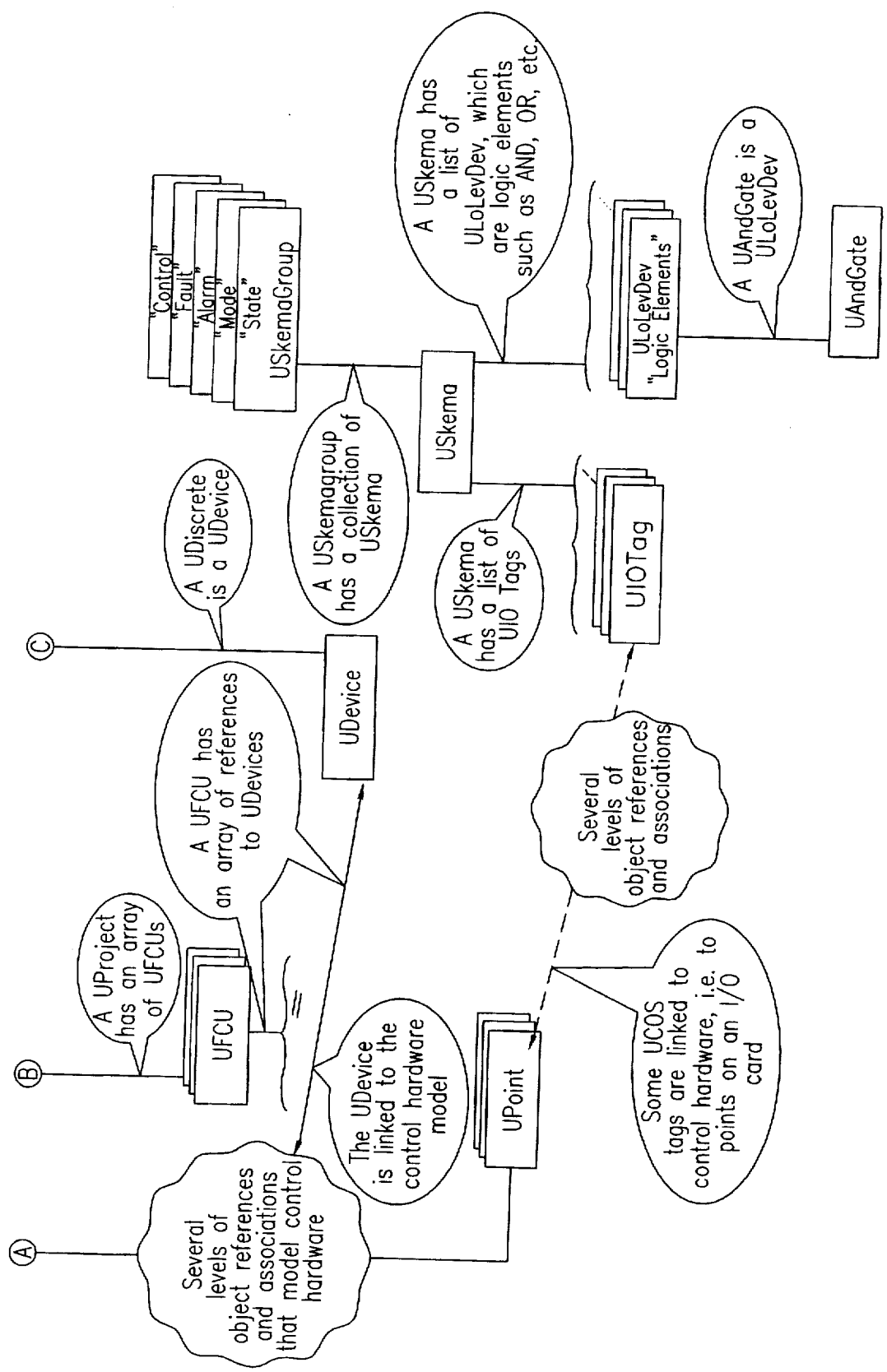

To further expand on the ideas from FIG. 23, a slightly more detailed example from the object model will be presented. FIG. 24 provides several additional concepts important to further understanding of the UCOS object model, but is not a "top down" or all-inclusive presentation of all elements of the objects shown.

Recalling FIG. 14, this figure provides a conceptual-only perspective of a UCOS device. Another way to describe this figure is "what the user sees" with respect to a device in UCOS. The underlying implementation, its objects and their hierarchy, is not nearly as simple as this figure. However, each component of this "user view" of the device is identifiable within the UCOS object model.

FIG. 24 illustrates a consolidation of the UCOS class definitions presented below in the section entitled "UCOS Source Code Class Definitions." This consolidation pictorially relates the object model hierarchy implied by the class definitions and by the comments inserted among the class definitions.

Several points are important to consider when interpreting FIG. 24:

Three of the four domains in the UCOS object-oriented repository are depicted: Project, Diagram, and Discrete Device domain. Template domain is not depicted because the logic for objects in the Discrete Device domain is instantiated from objects in the Template domain.

Certain levels of detail are omitted in some areas of the object class hierarchy to simplify the figure so it can display correspondence with the primary inventive aspects of UCOS.

The UDiscreteSymbol object corresponds with the Diagram Symbol. USkema objects are grouped and store the logic associated with the discrete device. Tag definitions may be tied to UPoint objects. Graphic screen symbol references can also be included with the associated discrete devices.

The Device Diagram (UDiagram) and Device Logic (ULDView) both reference the device object, while the device object references only other objects within the Project domain.

UCOS Source Code Class Definitions

The previous discussions have focused on the overall UCOS object repository. It has been noted that the editors are used to create/modify/update information in the object repository. The C++ source code for these editors includes object class definitions. These class definitions are extremely useful because in an object-oriented system they provide both the data and the methods which can operate on this data.

The following sections do not provide source code class definitions for all UCOS objects but instead focus on class definitions for the key objects with respect to the present invention.

Pertinent Device Diagram Class Definitions

Part of the class definitions below correspond to the pictorial representation of these objects shown in FIG. 24. These class definitions have been slightly modified from their actual appearance in UCOS source code for the EWS subsystem. The modifications have been made to annotate certain points so that a clear understanding of an object is provided.

Various type styles have been used in the presentation of these definitions:

These class definitions are extremely useful because in an object-oriented system they provide both the data and the methods which can operate on this data.

The following sections do not provide source code class definitions for all UCOS objects but instead focus on class definitions for the key objects with respect to the present invention.

Pertinent Device Diagram Class Definitions

Part of the class definitions below correspond to the pictorial representation of these objects shown in FIG. 24. These class definitions have been slightly modified from their actual appearance in UCOS source code for the EWS subsystem. The modifications have been made to annotate certain points so that a clear understanding of an object is provided.

Various type styles have been used in the presentation of these definitions:

Type of this size/style represents conceptual comments or explanation.

Type of this size/style denotes the start of a new class definition.

Type of this size/style is used for the body of the class definition.

class UDiagram { data:

```
char m_name[UDIAGRAM_NAMELEN+1];
List<UDrawable*> m_osScreen;
List<UPolyLine*> m_osConnections;

UDrawable* m_pSelected;
UPolyLine* m_pSelectedLine;
UConnectable* m_pSelectedTerminal;
CSize m_szOffset;
BOOL m_bIsNextBranchInverted;
UConnectDirection m_eStartDirection;
```

```
        UConnectDirection m_eStopDirection;

methods:

const char* GetName() const {return m_name;}
            BOOL AddDevice(UDatabase *, CDC *, DEVICE_ID);
                (DEVICE_ID can be CONTROLLER, TRANSMITTER, MOTOR, etc.)
            HITRESULT HitTest(const CPoint &, const CPoint &);
            BOOL HitControl(const CPoint &);
            void SetControl(const CPoint &);
            BOOL HitStartTerminal(const CPoint &);
            BOOL HitStopTerminal(const CPoint &);
            void HiliteStartTerminal(const CPoint &);
            void HiliteStopTerminal(const CPoint &);
            void MoveControl(const CPoint &);
            void LineMove(const CPoint &, CDC *);
            void AddToLine(const CPoint &);
            void AttachLineToTerminal(UINT);
            void AttachBranchToLine(const CPoint &);
            void MoveSelectedObject(CPoint &);
            UDrawable* GetSelectedObject();
            UPolyLine* GetSelectedLine();
            BOOL ObjectSelected();
            BOOL ConnectionSelected();
            void DeleteSelectedObject();
            void DeleteSelectedConnection();
            void DeselectObject();
            void EditSelectedObject(UDatabase *, CDC *);
            void ChangeObjectRotation(URotationAngle);
            void FlipObject();
            void DrawAll(CDC*);
            void DeselectCurrentConnection();
            void SelectCurrentConnection();
            void DeselectCurrentObject();
            void SelectCurrentObject();
            void RelinkConnections();

}

A UDiagram could have a UBlowerSymbol in its m_osScreen
    (list of UDrawables):

class UBlowerSymbol : is a UDiscreteSymbol, which is a UBitmap,
    which is a UDrawable { data:

static CBitmap* pBlowerBitmap;
            os_Array<UConnectable *> m_Connectables;
            UTextSymbol* m_ptextDeviceText;

methods:
```

- 70 -

```
        UDrawable* Copy(os_segment* s);
        void Draw(CDC*);
        void Move(const CPoint &);
        void Select();
        void Deselect();
        void SetRotation( URotationAngle ra);
        void Flip();
        BOOL IsConnected();
        UDrawable* HitStartConnectable(const CPoint &);
        UDrawable* HitStopConnectable(const CPoint &);
        void HiliteStartConnectable(const CPoint &);
        void HiliteStopConnectable(UConnectable *, const CPoint &);
} class UDiscreteSymbol: is a UBitmap, which is a UDrawable { data:

os_Reference<UDiscrete> m_refDiscrete;
        static UProcess* pDeviceApp;

methods:

void Edit(UDatabase*, CDC*);
        static void KillDeviceApp();
}

A UDiscreteSymbol references a UDiscrete:

class UDiscrete : is a UDevice { data:

UDisplayPoint* m_display_point[UDISCRETE_NUM_DISPLAYPOINT];
        UState* m_default_state;
        UMode* m_default_mode[UDISCRETE_NUM_DEFAULT_MODE];

methods:

void AddDisplayPoint( UDisplayPoint* display_point, int position );
        UDisplayPoint* RemoveDisplayPoint( int position );
        void SetDefaultState( UState* tag );
        void SetDefaultMode( int ModeGroup, UMode* tag );
        UDisplayPoint * GetDisplayPoint( const char* extension ) const;
        BOOL GetDisplayPoint( UDisplayPoint** display_point, int index ) const;
        UState* GetDefaultState() const;
        UMode* GetDefaultMode(int ModeGroup);
        Type GetType() const;
```

```
        void Initialize();
        int GetBase( UTag::Type tag_type ) const;
        int GetHowMany( UTag::Type tag_type ) const;
        UTag::Type GetType( int offset ) const;

} class UDevice { data:

BOOL m_is_template;
        BOOL m_is_read_only;
        UTagArray m_tags;
        UDeviceName m_name;
        os_Reference<UFCU> m_fcu;
        int m_priority;
        char m_description[UDEVICE_DESCRIPTIONLEN+1];
        USymbol m_Symbol;
        int m_nDeviceNumber;

methods:

const char* GetName() const;
        const char* GetName( char* buffer ) const;
        UDeviceName& GetDeviceName();
        const os_Reference<UFCU> & GetFCU() const;
        int GetPriority() const;
        int GetDeviceID() const;
        int GetDeviceNumber();
        const char* GetDescription() const;
        USymbol & GetSymbol();
        BOOL IsTemplate() const;
        BOOL IsReadOnly() const;
        void SetFCU( UFCU* const fcu );
        void SetName( const UDeviceName & dn );
        void SetName( const char *dn );
        void SetPriority( int priority );
        void SetSymbol( const USymbol &s );
        void SetDescription( const char* description );
        void SetDeviceNumber(int n);
        void ExternalToInternal( const char* external_name, char* internal_name )
        const;
        void InternalToExternal( const char* internal_name, char* external_name )
        const;
        BOOL GetCommand( UCommand** tag, int index ) const;
        BOOL GetState( UState** tag, int index ) const;
        BOOL GetMode( UMode** tag, int index ) const;
        BOOL GetFault( UFault** tag, int index ) const;
        BOOL GetAlarm( UAlarm** tag, int index ) const;
        BOOL GetControlAnalog( UControlAnalog** tag, int index ) const;
        BOOL GetControlDigital( UControlDigital** tag, int index ) const;
        BOOL GetSetpoint( USetpoint** tag, int index ) const;
        BOOL GetText( UText** tag, int index ) const;
        virtual UMode* GetDefaultMode(int ModeGroup);
        virtual Type GetType() const = 0;
```

```
                (Type can be Compute, Switch, Transmitter, etc.)
        UDevice::Result AddTag( UTag* tag, int position );
        UDevice::Result AddTag( UTag* tag, int* position );
        UDevice::Result AddTag( UTag* tag );
 5      UDevice::Result RemoveTag( UTag* tag );
        UDevice::Result RemoveTag( const char* name, UTag::Type type );
        UTag* GetTag( const char* name ) const;
        BOOL GetTag( UTag** tag, int index, UTag::Type type ) const;
        virtual BOOL GetInternalID(UInternalDeviceID &);
10      UTag* GetTag( int index ) const { return m_tags.GetTag( index ); }
        void Initialize();
        void CopyTags(const UDevice &);
        virtual int GetBase( UTag::Type tag_type ) const = 0;
        virtual int GetHowMany( UTag::Type tag_type ) const = 0;
15      virtual UTag::Type GetType( int offset ) const = 0;

}
```

The UDevice could have a UAlarm in its TagArray:

class UAlarm : is a UTag { data:

```
20      char m_position;
        char m_description[UALARM_DESCRIPTIONLEN+1];
        char m_window_label[UALARM_LABELLEN+1];
        UColor m_color;
        os_Reference<UAlarmDef> m_rAlarmDef;

25  methods:

UTag * Copy( os_segment* segment );
        void SetPosition( char position );
        void SetDescription( const char* description );
        void SetWindowLabel( const char* window_label );
30      void SetColor( const UColor& color );
        void SetAlarmDef( UAlarmDef* alarm_def );
        char GetPosition() const;
        const char* GetDescription() const;
        const char* GetWindowLabel() const;
35      const UColor& GetColor() const;
        os_Reference<UAlarmDef> & GetAlarmDef();

}
``` class UTag { data:

```
40      char m_name[UNAMED_NAMELEN+1];
        Type m_eType;
```

- 73 -

```
                (Type can be Alarm, Command, ControlAnalog, etc.)
        UDevice* m_pOwner;
        int m_nOffset;

methods:

virtual UTag * Copy( os_segment* segment ) = 0;
        void SetExtension( const char* extension );
        const Type GetType() const;
        const char* GetName() const;
        const char* GetExtension() const;
        const char* GetFullName( char* buffer ) const;
        UDevice* GetOwner() const;
        virtual BOOL GetInternalID(UInternalTagID &);
        void SetOffset(int i);
        const int GetOffset() const;
        void SetOwner( UDevice* device );
}
```

Pertinent Discrete Device Logic Class Definitions

Part of the class definitions below correspond to the pictorial representation of these objects shown in FIG. 24. These class definitions also have been slightly modified from their actual appearance in UCOS source code for the EWS subsystem for the same reasons as above.

Whenever a UDiscreteSymbol is created, a ULDView is also created.

```
class ULDView { data:

os_Reference<UDiscrete> m_refDevice;
        USkemaGroup* m_Groups[NumGroups];
            (there are 5 groups: Mode, State, Alarm, Fault, Control)

methods:

void SetDeviceRef(UDiscrete *d, BOOL ReConfigureTags = FALSE);
        const os_Reference<UDiscrete> & GetDeviceRef();
        USkemaGroup* GetSkemaGroup(int);
} class  USkemaGroup {
```

Pertinent Discrete Device Logic Class Definitions

Part of the class definitions below correspond to the pictorial representation of these objects shown in FIG. 24.

These class definitions also have been slightly modified from their actual appearance in UCOS source code for the EWS subsystem for the same reasons as above.

```
                (Type can be Alarm, Command, ControlAnalog, etc.)
        UDevice* m_pOwner;
        int m_nOffset;

methods:

5       virtual UTag * Copy( os_segment* segment ) = 0;
        void SetExtension( const char* extension );
        const Type GetType() const;
        const char* GetName() const;
        const char* GetExtension() const;
10      const char* GetFullName( char* buffer ) const;
        UDevice* GetOwner() const;
        virtual BOOL GetInternalID(UInternalTagID &);
        void SetOffset(int i);
        const int GetOffset() const;
15      void SetOwner( UDevice* device );

}

Pertinent Discrete Device Logic Class Definitions
        Part of the class definitions below correspond to the
    pictorial representation of these objects shown in FIG. 24. These
20  class definitions also have been slightly modified from their
    actual appearance in UCOS source code for the EWS subsystem for the
    same reasons as above.

Whenever a UDiscreteSymbol is created, a ULDView is also
    created.

25  class ULDView { data:

os_Reference<UDiscrete> m_refDevice;
        USkemaGroup* m_Groups[NumGroups];
            (there are 5 groups: Mode, State, Alarm, Fault, Control)

30  methods:

void SetDeviceRef(UDiscrete *d, BOOL ReConfigureTags = FALSE);
        const os_Reference<UDiscrete> & GetDeviceRef();
        USkemaGroup* GetSkemaGroup(int);
    }

35  class  USkemaGroup {
```

```
data:

USkema *m_Skemas[40];
        int m_nIndex;
        int m_nMaxSkemas;

methods:

int GetIndex();
        ~USkemaGroup();
        USkema *GetSkema(int n);
        USkema *GetSkema();
        USkema *GetFirst();
        USkema *GetLast();
        USkema *GetNext();
        USkema *GetPrevious();
        void ReConfigureTags(UDiscrete *);
        int GetMaxSkemas();
} class USkema { data:

os_List<ULoLevDev*> m_LogicElements;
        os_List<UIOTag*> m_IOTags;
        os_List<UPolyLine*> m_Connections;
        ULoLevDev* m_pSelElem;
        UIOTag* m_pSelTag;
        UPolyLine* m_pSelLine;
        CSize m_HitOffset;

methods:

void AddLogicElement(const USkema::LogicElement);
        void AddIOTag(const USkema::LogicElement, UTag *);
        void EditSelectedObject();
        ULoLevDev* GetSelectedLogicElement(void);
        UIOTag* GetSelectedIOTag(void);

enum HitResult HitTest(CPoint &, UGrid &);
        BOOL HitControl(const CPoint&);
        UConnectable* HitInputConnectable(const CPoint&);
        UConnectable* HitOutputConnectable(const CPoint&);

void SetControl(const CPoint&);
        void MoveControl(const CPoint&);
        void MoveSelectedObject( const CPoint& );
        void LineMove( const CPoint&, CDC * );

void AddLine(UConnectable &);
        void AddToLine( const CPoint& );
```

```
        void AttachBranchToLine(const CPoint &);
        void FinishLine(UConnectable & );
        void ToggleLinePolarity();

void DeleteSelectedObject();
        void DeselectLogicElement();
        void DeselectLine();
        void DrawAll( CDC* );
        int NumElem();
        void SetViewPriority(BOOL);
        BOOL GetViewPriority();
        int ElementCount();
        void ReConfigureTags(UDiscrete *);
        void RecalcPriority(int);
        int GetNextPriority();
        BOOL m_bEnablePriority;
        void RemovePriority(int);
        void RelinkConnections();

}
```

A USkema could have a UAndGate in its m_LogicElements list of low level devices.

class UAndGate : is a ULogicGate, which is a ULoLevDev { data:

```
        static CBitmap* pStaticBmp;
``` methods:

```
        UDrawable* Copy( os_segment* segment );
        void Init( );
}
```

ULogicGate : is a ULoLevDev { data:

```
        os_List<UInputConnectable *> m_ConnectableInputs;
        UOutputConnectable m_ConnectableOutput;
        BOOL m_bDispExec;
        int m_nExecutionOrder;
``` methods:

- 76 -

```
        virtual UDrawable* HitInputConnectable(const CPoint&);
        virtual UDrawable* HitOutputConnectable(const CPoint&);
        virtual void Draw( CDC* );
        virtual void Move( const CPoint & );
        virtual void Edit( UDatabase* pDB = NULL, CDC* pDC = NULL);
        void Select();
        void Deselect();
        int GetPriority();
        void DisplayPriority(BOOL b);
        void SetPriority(int e);
        void DisplayExecOrder(BOOL display);
        UDrawable* Copy( os_segment* segment );
        os_List<UInputConnectable *> & GetConnectableInputs();
        UOutputConnectable & GetConnectableOutput();
        void CalcInputYs(int *);
        void OffsetConnectables( const CSize &);
} class ULoLevDev : is a UBitmap { data:

int m_nLoLevelType;
        int m_nDeviceNum;

methods:

virtual int GetPriority();
        int GetLoLevelType();
        int GetDeviceNum();
        void SetDeviceNum(int n);
}
```

A USkema could have a UInternalOutput in its m_IOTags list of input/output tags.

```
class UInternalOutput : is a UOutputTag, which is a UIOTag, which
is a ULoLevDev data:

static CBitmap* pStaticBmp;

methods:
```

```
        UDrawable* Copy( os_segment* segment );
        void Init( );
} class UOutputTag : is a UIOTag, which is a ULoLevDev { data:

UInputConnectable m_Input;

methods:

UDrawable* HitInputConnectable(const CPoint&);
        void Draw( CDC* pDC);
        void Move( const CPoint & pt);
        void Select();
        void Deselect();
        UDrawable* Copy( os_segment* segment );
        void InitLLDevType(UTag *);
} class UIOTag : is a ULoLevDev { data:

os_Reference<UTag> m_rTag;

methods:

BOOL SetTag( UDiscrete * );
        BOOL SetTag( UTag * );
        virtual UDrawable* HitInputConnectable(const CPoint&);
        virtual UDrawable* HitOutputConnectable(const CPoint&);
        virtual void Draw( CDC* pDC);
        virtual void Move(const CPoint & pt);
        virtual void Select();
        virtual void Deselect();
        UDrawable* Copy( os_segment* segment );
        os_Reference<UTag> & GetTag();
}
```

UCOS Object Model Operation During Development

The previous section presented key object class definitions, including their data and methods. To understand how

UCOS Object Model Operation During Development

The previous section presented key object class definitions, including their data and methods. To understand how various objects interact and are used together, it is necessary to explain what occurs as a device diagram is built. Explaining these operations will primarily involve discussing what objects are created, destroyed, referenced, linked, etc.

Essentially, the implementation of the present invention can be understood by discerning the class definitions and their relationships as expressed in FIG. 24. The inventive aspects of UCOS revolve around Device Diagrams and the structure of Discrete Device Logic, both of which should be considered in relation to the concept of UCOS device templates. With an object-oriented approach both internally and at the user interface, UCOS applies a unified model for storing configuration information in a single repository. Several of the UCOS Development editors emulate control engineering design drawings, and the Device Diagram editor specifically allows one to convey both the physical facility and the logical definition of the control scheme which operates the interconnected equipment in the facility.

Augmenting the device diagram, UCOS templates allow the user to take advantage of the object-oriented nature of UCOS. The templating facility is a unique, "built-in" feature for building a library of device objects. The unique structure of discrete device logic, accessible by double clicking on the device symbol in a device diagram, provides an approach to organizing the control scheme for a piece of equipment that is applicable to any device and significantly enhances the clarity and re-usability of the control scheme. Discrete Device Logic—organized into categories of Alarm, Mode, Fault, State, and Control—represents a substantial improvement over traditional logic programming tools.

The critical implementation features of each of these inventive aspects are to be found within the UCOS object model. The previously presented class definitions disclose the UCOS object model. However, certain key objects will benefit from further elaboration concerning how the object's capabilities fit into the bigger picture shown in FIG. 24 and concerning how the objects support these inventive aspects.

The UProject Class

The initial configuration activity for any UCOS project is to define the hardware that comprises the project. This activity is performed with the Project Configuration editor, which is shown in FIG. 23. The detailed class definitions for UProject are not described because they are not critical to the inventive aspects of UCOS. However, the UProject object will be briefly discussed for background information purposes.

A UProject object will be the first object created when the user begins a new project. Essentially, the UProject object models the control hardware used in the project. This includes an extensive model of the input/output electronics hardware which is connected to a UCOS FCU. Several links are depicted in FIG. 24 between portions of the UProject object and the UDevice object. The figure shows how the project knows about its FCUs, and how each FCU knows about the UCOS devices which it will execute. These associations are important because they demonstrate how the other devices in a project will link to portions of the UProject object so they can be associated with a particular piece of control hardware. Note that a similar linkage occurs to tie a point on an I/O card to a UCOS tag used as part of a discrete device object.

The UDiagram Class

Once a project is started and the UProject object exists, the user might perform one of two steps: Device Template Definition or Device Diagram Definition. If the user performs template definition, typically it is in preparation for the Device Diagramming step. The relationship of template device objects will be discussed later in this section. If the user begins to create a Device Diagram, then he/she will use the Device Diagram editor to instantiate devices from existing templates.

By creating and naming a Device Diagram, the user causes the Device Diagram editor to create a UDiagram object. As the user places devices on the diagram, this object will maintain a list of the device symbols placed on the diagram. By examining the UDiagram class definition one can see the definition of this list, which is repeated below:

UDiagram class definition one can see the definition of this list, which is repeated below:

List<UDrawable*> m_osScreen;

This list of UDrawables associates with a list of UDevice objects. FIG. 24 shows this association indirectly; however, the association is in the class definitions as follows:

A UDiagram could have a UBlowerSymbol in its m_osScreen (list of UDrawables):

class UBlowerSymbol : is a UDiscreteSymbol, which is a UBitmap, which is a UDrawable {

A UDiscreteSymbol references a UDiscrete:

class UDiscrete : is a UDevice {

Each time a discrete device object is instantiated in a UDiagram these objects are created and linked.

The key to the Device Diagram's ability to show multiple types of device objects starts with the UDrawable object. This object can "be a" specific device symbol (such as a UBlowerSymbol in our example class definitions) which "leads it" to a specific functionality and structure. FIG. 24 shows the structure that exists under a UDiscreteSymbol. This is the object model for a UCOS Discrete Device because the UDiscreteSymbol is created in association with a ULDView. The "LD" in this name stands for "Logic Diagram." Both the UDiscreteSymbol and the ULDView reference the UDiscrete. The ULDView class segments the logic for controlling a discrete device into five categories: Alarm, Mode, Fault, State, and Control.

This list of UDrawables associates with a list of UDevice objects. FIG. 24 shows this association indirectly; however, the association is in the class definitions as follows:

UDiagram class definition one can see the definition of this list, which is repeated below:

List<UDrawable*> m_osScreen;

This list of UDrawables associates with a list of UDevice objects. FIG. 24 shows this association indirectly; however, the association is in the class definitions as follows:

A UDiagram could have a UBlowerSymbol in its m_osScreen (list of UDrawables):

class UBlowerSymbol : is a UDiscreteSymbol, which is a UBitmap, which is a UDrawable {

A UDiscreteSymbol references a UDiscrete:

class UDiscrete : is a UDevice {

Each time a discrete device object is instantiated in a UDiagram these objects are created and linked.

The key to the Device Diagram's ability to show multiple types of device objects starts with the UDrawable object. This object can "be a" specific device symbol (such as a UBlowerSymbol in our example class definitions) which "leads it" to a specific functionality and structure. FIG. 24 shows the structure that exists under a UDiscreteSymbol. This is the object model for a UCOS Discrete Device because the UDiscreteSymbol is created in association with a ULDView. The "LD" in this name stands for "Logic Diagram." Both the UDiscreteSymbol and the ULDView reference the UDiscrete. The ULDView class segments the logic for controlling a discrete device into five categories: Alarm, Mode, Fault, State, and Control.

Each time a discrete device object is instantiated in a UDiagram these objects are created and linked.

The key to the Device Diagram's ability to show multiple types of device objects starts with the UDrawable object, This object can "be a" specific device symbol (such as a UBlowerSymbol in our example class definitions) which "leads it" to a specific functionality and structure. FIG. 24 shows the structure that exists under a UDiscreteSymbol. This is the object model for a UCOS Discrete Device because the UDiscreteSymbol is created in association with a ULDView. The "LD" in this name stands for "Logic Diagram." Both the UDiscreteSymbol and the ULDView reference the UDiscrete. The ULDView class segments the logic for controlling a discrete device into five categories: Alarm, Mode, Fault, State, and Control.

When the user instantiates devices in a diagram, the UCOS Device Diagram editor is actually invoking the AddDevice method of the UDiagram object. This method is defined in the UDiagram class definition.

When the user instantiates devices in a diagram, the UCOS Device Diagram editor is actually invoking the AddDevice method of the UDiagram object. This method is defined in the UDiagram class definition.

BOOL AddDevice(UDatabase *, CDC *, DEVICE_ID);

(DEVICE_ID can be CONTROLLER, TRANSMITTER, MOTOR, etc.)

Many other methods are defined as part of the UDiagram class. However, the AddDevice method is one of the most important with respect to user activity while building a device diagram. Some of the UDiagram methods relate to user activity in connection mode, for example HitTest, HitControl, HitStartTerminal, etc. Other methods support the object for selection activity, as shown below.

UDrawable* GetSelectedObject();
            UPolyLine* GetSelectedLine();
            BOOL ObjectSelected();
            BOOL ConnectionSelected();

Still other methods allow for deleting objects, rotating them, flipping them, etc. The purpose of reviewing these methods is to illustrate how user activity when building or modifying a device diagram corresponds to the underlying class definitions.

Other Types of Devices

The objects shown in FIG. 24 specifically refer to a discrete device example. This is because the UDrawable referred to a UBlowerSymbol, which "is a" UDiscreteSymbol. If the user had selected and placed a static device on the diagram then the ULDView class would not have been created and would not be referencing the UDevice because there would be no UDiscrete to associate with. This means that FIG. 24 would appear simpler for the static device.

Many other methods are defined as part of the UDiagram class. However, the AddDevice method is one of the most important with respect to user activity while building a device diagram. Some of the UDiagram methods relate to user activity in connection mode, for example HitTest, HitControl, HitStartTerminal, etc. Other methods support the object for selection activity, as shown below.

When the user instantiates devices in a diagram, the UCOS Device Diagram editor is actually invoking the AddDevice method of the UDiagram object. This method is defined in the UDiagram class definition.

```
BOOL AddDevice(UDatabase *, CDC *, DEVICE_ID);
```

(DEVICE_ID can be CONTROLLER, TRANSMITTER, MOTOR, etc.)

Many other methods are defined as part of the UDiagram class. However, the AddDevice method is one of the most important with respect to user activity while building a device diagram. Some of the UDiagram methods relate to user activity in connection mode, for example HitTest, HitControl, HitStartTerminal, etc. Other methods support the object for selection activity, as shown below.

```
UDrawable* GetSelectedObject();
UPolyLine* GetSelectedLine();
BOOL ObjectSelected();
BOOL ConnectionSelected();
```

Still other methods allow for deleting objects, rotating them, flipping them, etc. The purpose of reviewing these methods is to illustrate how user activity when building or modifying a device diagram corresponds to the underlying class definitions.

Other Types of Devices

The objects shown in FIG. 24 specifically refer to a discrete device example. This is because the UDrawable referred to a UBlowerSymbol, which "is a" UDiscreteSymbol. If the user had selected and placed a static device on the diagram then the ULDView class would not have been created and would not be referencing the UDevice because there would be no UDiscrete to associate with. This means that FIG. 24 would appear simpler for the static device.

Still other methods allow for deleting objects, rotating them, flipping them, etc. The purpose of reviewing these methods is to illustrate how user activity when building or modifying a device diagram corresponds to the underlying class definitions.

Other Types of Devices

The objects shown in FIG. 24 specifically refer to a discrete device example. This is because the UDrawable referred to a UBlowerSymbol, which "is a" UDiscreteSymbol. If the user had selected and placed a static device on the diagram then the ULDView class would not have been created and would not be referencing the UDevice because there would be no UDiscrete to associate with. This means that FIG. 24 would appear simpler for the static device.

Static devices comprise the simplest case. Static device objects do not even contain associations to any particular FCU.

The ULDView Class

The ULDView class contains the UCOS Structure for Device Logic which segments the logic for a discrete device into Alarm, Mode, Fault, State, and Control categories. This definition is observable by examination of the class definitions.

Each of these logic categories corresponds to a particular USkemaGroup. Traversing the ULDView class further, one can trace the relationships for a particular USkema under a USkemaGroup. The USkema class shows items identifiable from the UCOS Device Definition editor: UIOTag class definitions for the input/output tags which the user places on the logic, and ULoLevDev "Logic Element" class definitions for the logical elements that comprise the network of logic.

Static devices comprise the simplest case. Static device objects do not even contain associations to any particular FCU.

The ULDView Class

The ULDView class contains the UCOS Structure for Device Logic which segments the logic for a discrete device into Alarm, Mode, Fault, State, and Control categories. This definition is observable by examination of the class definitions.

Each of these logic categories corresponds to a particular USkemaGroup. Traversing the ULDView class further, one can trace the relationships for a particular USkema under a USkemaGroup. The USkema class shows items identifiable from the UCOS Device Definition editor: UIOTag class definitions for the input/output tags which the user places on the logic, and ULoLevDev "Logic Element" class definitions for the logical elements that comprise the network of logic.

These definitions are also found in the class definitions:

```
class USkemaGroup { data:
        USkema *m_Skemas[40];

class USkema { data:

os_List<ULoLevDev*> m_LogicElements;
        os_List<UIOTag*> m_IOTags;
        os_List<UPolyLine*> m_Connections;
        ULoLevDev* m_pSelElem;
        UIOTag* m_pSelTag;
```

```
UPolyLine* m_pSelLine;
```

A USkema could have a UAndGate in its m_LogicElements list of low level devices.

```
class UAndGate : is a ULogicGate, which is a ULoLevDev {
```

These definitions further expose the object model for the UCOS discrete device logic structure.

The Template Domain

The Template domain holds UCOS discrete device templates. UCOS discrete devices are instantiated from these templates. The conceptual underpinnings of FIG. 24 describing the discrete device domain will be similar in the Template domain where the discrete device templates are held. Templates will not, however, have any references to control hardware through UIOTags linked to points because the template is not part of a UCOS project.

The Process View of Each Subsystem

Figure 25A:
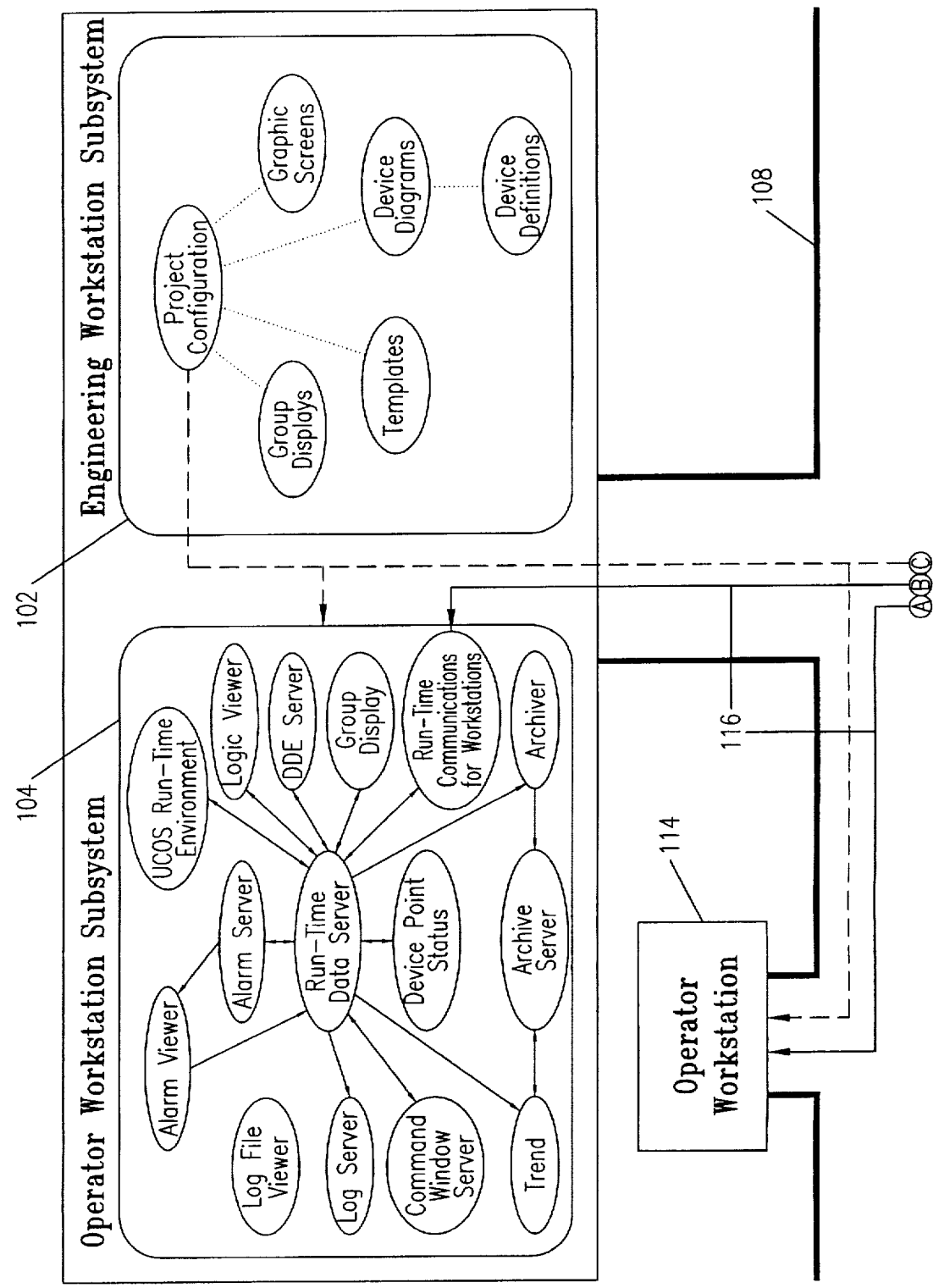
FIG. 25 is a view similar to FIG. 1 but showing the process view of each subsystem of the User Configurable Open System for Control of the present invention.
Figure 25B:
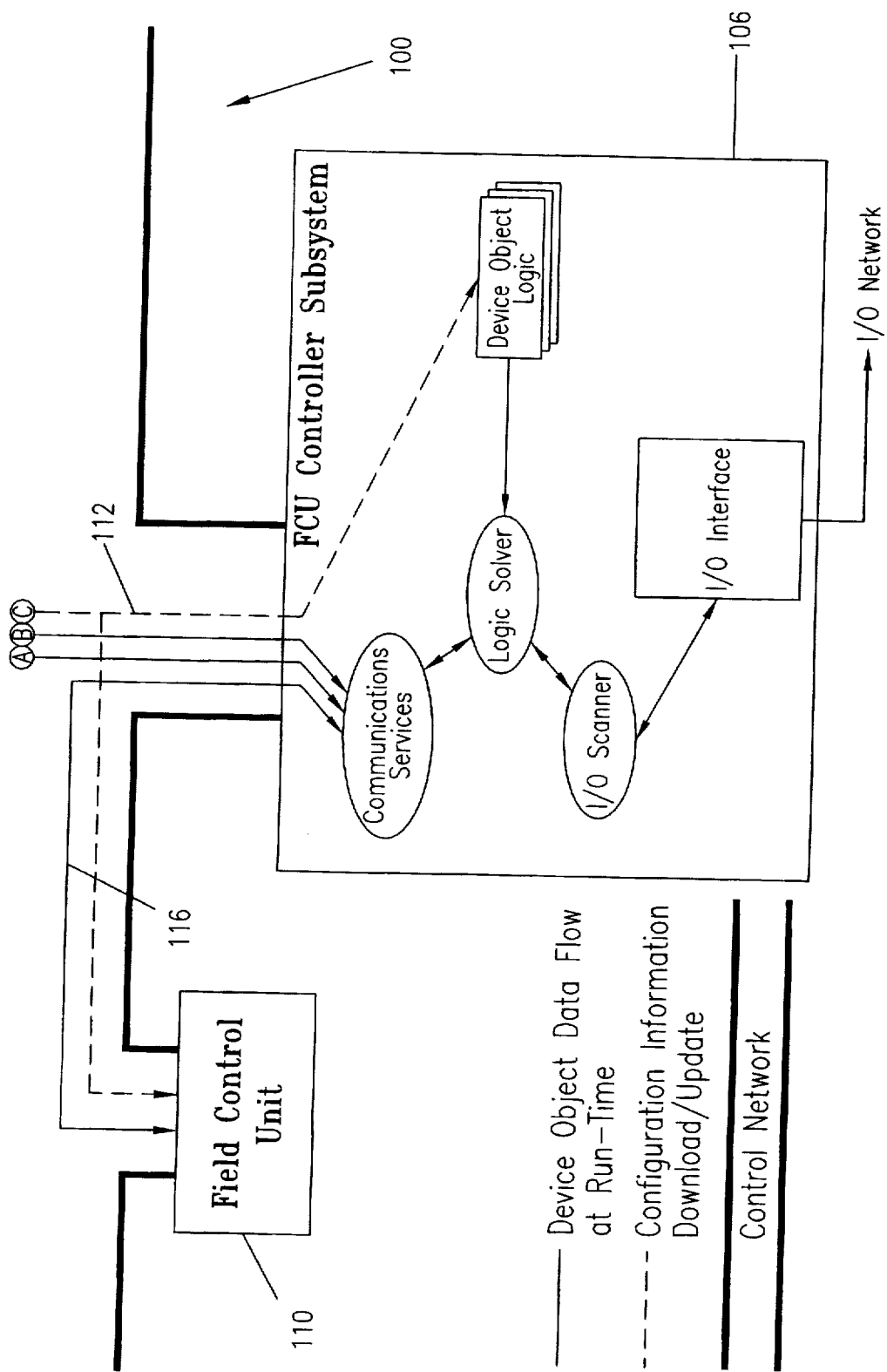

Several processes run under each of the major subsystems of UCOS. These processes are illustrated in FIG. 25 and are described in the following sections.

Development (Engineering Workstation)

UCOS project development or configuration takes place on a computer designated as the engineering workstation. After the project is configured, it is downloaded to one or more other computers designated as operator workstations. Project configuration is accomplished via the following general steps using the following tools built into the UCOS development software of the present invention:

These definitions further expose the object model for the UCOS discrete device logic structure.

The Template Domain

The Template domain holds UCOS discrete device templates. UCOS discrete devices are instantiated from these templates. The conceptual underpinnings of FIG. 24 describing the discrete device domain will be similar in the Template domain where the discrete device templates are held. Templates will not, however, have any references to control hardware through U/O Tags linked to points because the template is not part of a UCOS project.

The Process View of Each Subsystem

Several processes run under each of the major subsystems of UCOS. These processes are illustrated in FIG. 25 and are described in the following sections.

Development (Engineering Workstation)

UCOS project development or configuration takes place on a computer designated as the engineering workstation. After the project is configured, it is downloaded to one or more other computers designated as operator workstations. Project configuration is accomplished via the following general steps using the following tools built into the UCOS development software of the present invention:

Start the UCOS Project Configuration window. The remaining network configuration steps are performed in the UCOS Project Configuration window.

Name a new project and specify the type of network on which the project will be run (Required).

Configure the engineering workstation object on which the project will be built by specifying such object attributes as the network node name and address.

Insert and configure operator workstation objects on which the project will be run specifying such object attributes as node name and address, the project screen to display initially (if any), and the workstation profile.

Insert and configure field control unit objects and associated I/O hardware specifying such object attributes as the make and model of the communications hardware in each controller and other necessary communications parameters.

Configure device templates.

Configure device diagrams.

In addition, the developer may configure logging and alarms, configure security, and download the project as described in the following sections.

Configure Logging and Alarms

Among the attributes of a device are the logging of:

Alarms

Commands

Setpoint changes

State changes

Fault changes

Mode changes

During device template creation and/or device object insertion, the developer optionally associates individual tags and/or devices with previously-named logging groups and alarm groups. This association encapsulates the destination of logging messages for a given tag or device object. The possible destinations for logging messages are defined through editors available in the UCOS Project Configuration window. Destinations can include printers and/or disk files.

In many cases throughout UCOS, object attributes can have attributes themselves. One example is alarming. Each tag defined for logging as an alarm is assigned a priority attribute which defines the alarm message's behavior. The developer may define alarm priorities with each priority specifying the color of an alarm message before and after acknowledgment, whether or not an into alarm condition is audible, whether or not an alarm requires acknowledgment and the hierarchical priority of an alarm. These priorities can then be assigned to multiple alarms each of which inherits the characteristics of the defined priority.

Configure Security

In several types of device objects, certain tags specify the destination of an operator-initiated command made via command windows. One attribute of these tags is security. In order to send a command to one of these tags, the logged-in run-time operator must have "permission" to send that command. As such, security becomes another public attribute of a device object.

In addition to some operator-initiated commands, a number of other UCOS functions are considered secure, e.g., starting and stopping run-time, configuring Group Displays, etc. In other words, the logged-in developer or operator must have "permission" to use that function. Security may also be implemented for project graphic screens and Group Displays. A given operator's ability to view and send commands from any given project graphic screen or Group Display can vary from screen-to-screen, from Group Display-to-Group Display, and from workstation-to-workstation.

Screen and Group Display security is implemented via a workstation profile, another public attribute of each workstation. A named workstation profile is optionally assigned to a workstation. As such, the workstation inherits the security definitions associated with the workstation profile.

Download Project

Downloading sends the completed project to the appropriate workstations and field control units for testing and/or use. In many cases, the workstation used to develop the project can also be used to test it.

Engineering Workstation Subsystem

The following sections describe the processes of the EWS subsystems illustrated in FIG. 25.

Project Configuration

Single-document interface (SDI) window with menus and dialogs.

Manages which project is being configured (one at a time).

Graphically displays placement of workstation, printer, field control unit (controller), and I/O interface objects on a network object.

Dialogs configure the attributes of each object plus logging, alarms, and security objects. You can set the archive attribute of one or more workstation objects which means that that workstation will run the processes necessary for archiving. Saves configuration information in the object-oriented repository on exit from each dialog.

Provides menu-based access to the following configuration editors: Templates, Device Diagrams, Graphic Screens, and Group Display.

Generates run-time. This step prepares the device objects for the download step.

Downloads run-time to operator workstations and field control units. This step transfers the modified device objects to the target operator workstations and field control units.

Group Displays

SDI window with menus and dialogs.

Manages which Group Display is being configured (one at a time).

Adds and removes command windows each of which may have a one-to-one correlation with a UCOS device.

Saves configuration information in the object-oriented repository.

Templates

Multiple-document interface (MDI) window with menus and dialogs

Manages which device template is being configured (one at a time).

Allows configuration of tag definitions for all tags associated with the template (i.e., with the device object). Definitions include object attributes for alarms, logging, and command windows.

Supports a full complement of logic elements including logic gates, timers, counters, and tags.

Uses graphical drag-and-drop drawing techniques to place, arrange, and connect logic elements in multiple child windows.

Provides menu-based access to the screen configuration editor which supports drawing and modification of the template's run-time symbol and configuration of its on-screen behavior. This is the same editor used to configure screens.

Saves configuration information in the object-oriented repository.

Device Diagrams

MDI window with menus and dialogs

Manages which device diagram is being configured (one or more at a time).

Uses graphical drag-and-drop drawing techniques to place, arrange, and connect supported device objects.

Displays dialogs to allow instance naming of each inserted device object and to allow modifications to defaults.

Saves configuration information in the object-oriented repository.

Device Definition

MDI window with menus and dialogs

Accessible only through the device diagram editor.

The device object selected for editing in the device diagram editor is automatically loaded into the device definition editor.

Provides functionality similar to the device template editor.

Saves configuration information in the object-oriented repository.

Graphic Screens

SDI window with menus and dialogs

Allows creation and editing of the run-time graphic attribute of a device template or a single instance of a device diagram object. This specifies the run-time appearance of the symbol and its behavior, i.e., its response to incoming data. Saves configuration information in the object-oriented repository.

Allows creation and modification of graphical project screens to be displayed on the operator workstation. Saves information in a vector file.

Supports CAD-like drawing capabilities including a full complement of drawing objects and tools, plus functions that support the attributes of UCOS device objects.

Only one device graphic or project screen may be edited at a time.

Run-Time Operator Workstation

UCOS project development or configuration takes place on the engineering workstation. After the project is configured, it is downloaded to one or more operator workstations where it is executed by the UCOS Run-Time software. The logic is also downloaded to the UCOS controllers or field control units where it is used by the UCOS logic solver software. Note that an engineering workstation also includes UCOS Run-Time software that allows it to act like an operator workstation.

The UCOS Run-Time software allows the operator to see and perform the following operations.

UCOS Run-Time Environment

This window allows the operator to:

Open and close any UCOS project that has been downloaded to that operator workstation.

Start and stop an open UCOS project. This operation loads project screens into memory, establishes communication with the controller, starts several background processes, etc.

Display zero or more graphic screens containing graphical representations of devices and other objects. The objects on these screens may change colors, shape, and/or position in response to data received from the physical equipment they represent. The screen objects may also display numeric and text information that allows an operator to monitor the status, performance, and variables associated with each defined aspect of a process. These dynamics are among the attributes inherited by a device via its template. The developer has the option to modify those attributes.

Displays command windows corresponding to UCOS devices. A command window allows the operator to monitor all data associated with a particular device object in more detail than is usually represented on a graphic screen. In addition, the command window is used by the operator to send commands to that device.

View groups of command windows (Group Display) view and acknowledge alarms (Alarm Viewer), view log files (Log File Viewer), view and change tag values (Device Point Status), and view trends (Trend Viewer).

Change the security status of the UCOS Run-Time environment on an operator workstation.

Graphic Screens

The number of graphic screens as well as their behavior, appearance, and organization are specified entirely by the project developer during project configuration. For example, the developer can configure screens with paging objects which, when clicked at run-time, act as a navigation tool. However, the run-time operator can override the developer's planned navigational behavior for project screens by electing to display multiple graphic screens concurrently and by specifying which graphic screens to display.

The only restriction on the run-time operator's ability to display graphic screens is security. The logged-in security user determines which graphic screens can be displayed or acted upon on a given operator workstation. This is also defined by the project developer during project configuration.

Command Windows

When an operator double-clicks the graphical representation of a UCOS device, a command window or Group Display appears. A command window contains detailed information associated with the device. As such, the command window is the run-time expression of many device object attributes. Each command window displays data associated with the device and allows the operator to send commands to the device, assuming the logged-in security user has permission to do so.

The type of information that is monitored and the type of commands that may be sent vary from device type-to-device type. In addition, devices may each be configured to send different types of commands.

Many of these variations are due to developer choices for a particular project as well as variations in the requirements of the control scheme for individual devices. They are also due to the device object model which allows each device (object) to retain its own behavior/appearance (methods).

Group Displays

The Group Display contains the contents and functionality of one or more command windows. A Group Display can be called by name. The developer may have defined some devices to display a Group Display instead of a command window when double-clicked.

Alarm Viewer

UCOS Alarm Viewer allows the operator to monitor and acknowledge alarms. The operator can display multiple, concurrent alarm views and customize the appearance and content of each one.

UCOS Alarm Viewer can display only alarm messages associated with alarm groups that are designated for display on the current operator workstation. The run-time operator can choose to add or remove alarm groups which, in effect, adds or removes alarm messages associated with those alarms groups.

Log File Viewer

UCOS Log File Viewer allows the operator to concurrently view one or more log files produced by the UCOS log server, which logs entries from sources such as the alarm server as well as operator actions.

Trend Viewer

UCOS Trend Viewer interprets raw data as marks and lines on a chart. By comparing marks and lines among samples and among tags, the operator is able to view and analyze general tendencies for a set of values.

As new data is received, the marks and lines scroll within a plot area with new marks and lines replacing old ones. The operator can suspend automatic scrolling and use manual scrolling to view recent data that has scrolled off the plot area.

UCOS Trend Viewer allows the operator to choose multiple tags to trend and allows the operator to customize the appearance of the trend plot area, samples, and updating characteristics. Either real-time or archived values may be displayed. In order to display archive values, the archive attribute of at least one node in the project must have been set during configuration. Multiple, concurrent views may be displayed.

Device Point Status

UCOS allows the developer to interpret data and display that data in a meaningful, graphical form at the operator workstation. Device Point Status allows the operator to monitor and control individual tags without graphical interpretation.

The operator specifies the FCU and device. Then the program displays the tag names associated with that device and the current tag values for each tag name. The operator may take any tag off scan, manually enter a new value, and put the tag on scan which inserts the manually entered value into the data stream.

Operator Workstation Subsystem

The following sections describe the processes of the OWS subsystem illustrated in FIG. 25. In the following sections, references are made to a "device object message." This is an encapsulated description of the particular tags associated with a device object update along with change of state information that supports the exception processing communication technique employed in UCOS.

Run-Time Data Server

Background process

Keeps a list of device objects and tags for which updates have been requested and the processes that requested those updates. An interested process can register to receive updates for specific tags or updates for the entire device object message. Subsequent references in this section refer to this activity generally as registering for and receiving run-time information updates.

When Run-Time Data Server detects that a tag value has changed in a device object message, it converts the device object update message into a tag update and sends the update to all processes that requested an update for that tag. When requested, it can also forward the entire device object message to interested processes.

Sends operator-initiated commands and tag value changes to the Run-Time Communications Workstation process.

Run-Time Communications Workstation

Background process

Device-aware network communication process used to exchange device object messages with the Communications Services process on multiple FCUs. Various types of messages are possible, including: connect request, connect cancel, data request, data cancel, FCU shutdown, command message, etc.

Supports various message types when in communication with the FCU.

Background Session Manager

Background process

Master process in charge of starting and stopping run-time background processes and monitoring their health.

Updates operating system registry with process information.

Passes proper parameters to run-time tasks.

UCOS Run-Time Environment

MDI window with menus and dialogs.

An interprocess channel is used to register and deregister requests for run-time information updates with Run-Time Data Server.

Receives updates and animates graphic screens based on that data.

Provides menu-based access to Group Display, Alarm Viewer, Log File Viewer, Trend, and Device Point Status.

Displays, pages, and updates graphic screens.

When devices on graphic screens are selected by double-clicking them, UCOS Run-Time Environment sends a message via an interprocess communication mechanism to the command window server process. This message contains, among other items, identifying device information so the Command Window Server process can display the command window for the device.

Archiver

Background process

An interprocess channel is used to register and deregister requests for run-time information updates with Run-Time Data Server.

Accepts run-time updates from Run-Time Data Server for all device objects and saves only archivable data.

Archiver runs only on workstations whose archive attribute is set during configuration.

Archive Server

Background process

Receives requests for tag-specific archived data from Trend, retrieves that data from the archive storage, and sends that data to Trend for display.

Archive Server runs only on workstations whose archive attribute is set during configuration.

Trend

MDI window with menus and dialogs

Allows the operator to select which tags to trend as well as the appearance of the tag data on screen.

Multiple trends may be displayed concurrently.

Permits trending of run-time tag data or archived data (if the archive attribute of at least one workstation was set during project configuration).

Tag data is trended via a standard line graph. Actual samples are indicated with a user-selectable, optional marker and are connected with an optional line. Samples are plotted from left to right while the plot area scrolls right to left. As such, the latest samples are always visible unless the operator has suspended updating in order to scroll through recent data.

An interprocess channel is used to register and deregister requests for run-time information updates with Run-Time Data Server.

Accepts run-time updates from Run-Time Data Server for requested information.

Requests historical data from Archiver process (which gets the data from the archive storage) and receives data based on those requests.

Saves operator preferences in a file.

Log Server

Background process

An interprocess channel is used to register and deregister requests for run-time information updates with Run-Time Data Server.

Accepts run-time updates from Run-Time Data Server for registered information. Receives those updates and sends them to one or more printers or disk files, depending on the logging attributes of a given tag or command.

Log File Viewer

MDI window with menus and dialogs.

Displays the contents of operator-selected log files on screen. The log files are created by LogServer.

Multiple log files may be displayed concurrently.

Command Window Server

SDI window that looks and acts like a dialog.

Displays one command window when the operator double-clicks on a controller, transmitter, or discrete device graphic screen symbol that is not configured to display a Group Display.

An interprocess channel is used to register and deregister requests for run-time information updates with Run-Time Data Server.

Accepts run-time updates from Run-Time Data Server. Receives those updates and displays them in the command window.

Sends operator-initiated commands to Run-Time Data Server.

Alarm Server

Background process

Receives alarm information for devices from RunTime Data Server.

Accepts run-time updates from Run-Time Data Server. Receives those updates and sends them to Alarm Viewer.

Alarm Viewer

MDI window with menus and dialogs.

Displays alarm messages received from the alarm server.

Receives acknowledgment commands from the operator and sends them to Run-Time Data Server.

Dialogs allow the operator to customize the appearance of the Alarm Viewer and select alarm groups to view.

Multiple alarm views may be displayed concurrently.

Saves operator preferences in a file.

DDE Server

Background process.

Makes the current value of user-requested tags available at run-time to other applications via Microsoft's Dynamic Data Exchange (DDE).

Device Point Status

SDI window.

An interprocess channel is used to register and deregister requests with Run-Time Data Server for updates of all tags for a user-selected device within a user-selected FCU.

Accepts run-time updates from Run-Time Data Server and displays that data in the Device Point Status window.

At the request of the operator, suspends the controller's processing of tag values for one or more selected tags.

At the request of the operator, inserts an operator-specified value into the data stream for a selected tag.

At the request of the operator, resumes the controller's processing of tag values for one or more selected tags.

Logic Viewer

MDI window with menus and dialogs.

An interprocess channel is used to register and deregister requests with Run-Time Data Server for updates of information for a user-selected device.

Accepts run-time updates from Run-Time Data Server for the device and displays that data on screen.

Displays the logic for a selected device and animates that logic by changing the color of each logic element's output to reflect its current value.

At the request of the operator, suspends the controller's processing of tag values for one or more selected tags.

At the request of the operator, inserts an operator-specified value into the data stream for a selected tag.

At the request of the operator, resumes the controller's processing of tag values for one or more selected tags.

Controller (Field Control Unit)

The controller in UCOS is called a field control unit. It is a computer executing a real-time operating system specifically designed to handle multiple events within fixed time constraints, as in the exchange of data with field sensors and control devices.

The UCOS controller includes software that:

Receives commands and data from one or more operator workstations executing a UCOS run-time project and/or one or more input/output interfaces which communicate with field devices (e.g. pumps, valves, etc.)

Processes each command or data transition. For example, the project developer might have specified that the controller logically AND two values during the processing of logic for a particular device. The controller software does that.

Communicates the results to the operator workstation and/or input/output interfaces.

The input/output interfaces are hardware units fitted inside the controller computer. I/O racks are directly connected to that interface hardware, and field sensors and control devices are directly connected to I/O racks. The UCOS controller also has a number of debugging tools.

While the UCOS project configuration and run-time software runs under Windows NT which is well suited to a graphical user interface and security, in the illustrated embodiment, the UCOS controller software runs under the QNX operating system which is well suited to run-time processing of data.

Communications Services

Background process

The controller's (FCU's) communications subsystem handles transfer of data between operator workstations and the logic solver in the FCU and between FCUs.

Logic Solver and Device Object Logic

During the development phase of a UCOS project, the project developer specifies device diagrams which include:

The devices associated with a specific FCU.

The logical relationship among the devices, e.g. how the output of one device affects the operation of another device.

This not only defines much of the user interface for the operator, it also defines the device object attributes used by the FCU to solve the logic for devices solved in that FCU. This includes the pertinent attributes for the device object, based on its type.

Every non-static device configured in a device diagram during project configuration is represented in the object-oriented configuration repository. A representation of its contents are downloaded as logic into the FCU's memory. When an event occurs at run-time, the UCOS logic solver process uses the downloaded object model to determine what action (if any) to execute. That action might in turn trigger another event which might cause the UCOS logic solver process to execute another action.

For example, assume that a release valve, VALVE_A, is configured to open when the level in TANK_A reaches six feet. In addition, the six foot level must also cause PUMP_A to start. When PUMP_A reaches its On state, VALVE_B must open in order to allow the pumped overflow to be diverted.

The logical relationship which defines this control scheme could be configured within one or more devices, depending on a variety of factors. Logic diagrams, which are part of discrete devices, could be used, in part, to implement this control scheme. The control system engineer would have previously built logic that was translated, downloaded, and now resides in the FCU Logic solver in the form of event tables. The event tables support the event-based logic solving capability of the UCOS FCU. There are varying levels of detail to the event tables, however, their action can be examined conceptually through the simplified example below.

| When this event occurs | Trigger this action |
|---|---|
| The level in TANK_A reaches six feet | Open VALVE_A and Start PUMP_A |
| PUMP_A is On | Open VALVE_B |

The I/O interface receives measurable signals from the field, i.e. from I/O points, and makes this information available to the I/O scanner process. The I/O scanner process generates an event which is sent to the logic solver process. Then the logic solver process performs the action associated with that event. In the above example, the first event triggers two actions (Open VALVE_A and Start PUMP_A), one of which may also trigger a third event (Open VALVE_B).

If the FCU was defined as redundant during project configuration, then the same events occur in both FCUs.

I/O Scanner

The I/O scanner process receives measurable signals from the field by virtue of its control over the I/O interface hardware. The I/O scanner process produces events from this I/O information. The I/O scanner process passes messages to and from the logic solver process and to and from the I/O interface hardware. These messages are sensed values (from the I/O interface) or control output values (from the logic solver).

UCOS Project Example

In the following example, the basic capabilities of UCOS will be illustrated by showing the step-by-step flow of building a control application. A user will take advantage of the UCOS object-oriented configuration techniques to perform the following tasks:

Configure the hardware components for the project.

Build a graphical device diagram which will include several types of UCOS device objects.

Define a group display to allow the operator to control and monitor several devices at once through command windows.

Configure a graphic screen using animated graphics symbols.

Modify the logic for a discrete device using the device definition editor.

Modify the logic for a discrete device template.

Finally, generate several run-time systems to show the results of the configuration activities at the project's operator interface.

To get started, the user goes to the standard Windows Program Manager. The UCOS Program Group is one of many that appear on the user's PC. It allows a user to startup the UCOS Project Configuration environment on an engineering workstation or a run-time system on an operator workstation. Note that there is nothing that keeps the user from running other desktop programs along with the UCOS control system, or sharing the data from a UCOS run-time system with another application via standard Windows Dynamic Data Exchange (DDE).

Since the example will begin by developing a new project, the user's first step is to double-click the Project Configuration icon. A UCOS Project Configuration window will then appear. To create a new project, the user selects "New" from the Project menu. In the dialog that appears, the user indicates a directory in which to store the UCOS Project Configuration information. UCOS automatically stores the data in a variety of subdirectories under the directory name. For this example, the user names the project WEIR1. The project will consist of a simple system for controlling the amount of a very dilute liquid glue that is flooded into a weir.

Once the project is named, a dialog lets the user enter a description for the project, designate an initial screen, and select a network type. For this project, the user chooses the default UCOS copyright screen as the initial project screen and selects a single Ethernet network.

Another dialog appears to let the user define the workstation attributes. Because the user is creating a new project, the workstation dialog shows the default attributes of an engineering workstation. The user gives the workstation the name which will appear in the Project Configuration window, a node address, and a description.

After filling in the workstation dialog and clicking OK, the user returns to the UCOS Project Configuration window. The engineering workstation the user has just defined is shown in the window. The full array of pull-down menus for the Project Configuration environment become available.

For this example project, the Insert and Configure menu options will primarily be used. These let a user designate the project's hardware components and configure the control logic and project screens. Security, Help and View menus are also available, but are not essential to configuring a simple control system project example. Note that to provide security for the system, an authorized user can create security groups, each of which lists secure functions. Users can then be assigned to security groups and given a username and password. Security can also be made workstation-specific, as mentioned earlier, or even tied to individual screens on a workstation.

The next step is to configure a field control unit, or FCU. This is the real-time controller that will execute the logic configured for the project. The user selects Field Control Unit from the Insert menu. In the dialog that appears, the user names the FCU "SIMULATOR" and enters a network node address. The user can also define locations for the FCU(s) and associated I/O rack(s) that will be required for the project.

For this example, the user names the first I/O location Plant1. The user then enters a second I/O location name in the dialog, Plant2. All location names defined will be available via the pull-down arrow to the right of the location name field in any dialog that lets the user select I/O locations.

The user now selects the I/O Interface for configuration. The interface represents the communications card that will support the I/O network. From the I/O Interface dialog, the user selects the card that will be used in the FCU to allow it to communicate with racks on the I/O network. Note that an FCU can be configured with multiple interface cards to provide redundancy. A single, PC-based FCU can support multiple vendor's I/O networks.

To edit the first rack associated with the Interface, the user clicks on the Edit Rack button. The Rack Definitions dialog appears. First, the user selects a location for the rack. Two locations are available. The user chooses Plant2 to show that the rack is in a different location than the FCU and will communicate remotely with the rack over the I/O network.

The user selects the rack type and then the scanner type. The scanner allows the rack to communicate with the UCOS FCU. For this example, the user selects rack type 1771-A4B with scanner 1771-ASB/D.

The user then clicks on the Edit Slots button. The Slot Point Definition dialog appears, letting the user select modules to assign to the rack slots. Note that besides entering modules for the slots, the user could add UCOS device tags in the point definitions area. At some point during project configuration, device tags will be assigned to the appropriate modules of the rack. The user may make the assignments, or let UCOS do it automatically.

By performing these steps, the user is building up the configuration model of the project's control hardware within the UCOS object model. The model of the project's hardware layout is stored in the object-oriented repository using software objects. This is a vendor-independent model that allows the user to incorporate I/O from various vendors' I/O subsystems for a project. As noted earlier, even a single FCU can support multiple I/O subsystems.

The user completes the definition of an FCU named "SIMULATOR" for this project example. The Project Configuration window will show the defined FCU and its single rack, corresponding to the definitions entered in the dialogs.

It should be noted that a user normally will configure several additional items that will be used during device diagramming, namely, logging and alarming. These options are available from the Configure menu, and enable operators to easily monitor and respond to relevant alarms and events at run-time. For this explanation, these options will not be described.

The user has now completed the first major phase of UCOS application configuration activity, called Project Configuration. It included defining the hardware components for the Weir control system—in this case an engineering workstation and an FCU with a single rack. The user gave them names and defined their attributes. Importantly, no programming was required to set up the project's communication networks.

The next major phase of project configuration involves developing the control program for the Weir flood process area. This is accomplished by drawing a UCOS device diagram.

Through device diagramming, the user builds the actual control strategy. However, this strategy will not at all resemble a program written in a procedural programming language. Nor will it resemble traditional control programming methods such as rung ladder logic or function blocks. The device diagram the user is about to build resembles typical control system physical definition drawings, e.g., piping and instrumentation drawings, commonly known to engineers as a P&ID.

It should be noted that in some cases a user might first want to add or modify device templates. Later in this project example, device templating and its role in application configuration will be explained.

For ease of explanation in this initial device diagram, only the pre-defined UCOS device templates will be used. UCOS contains templates that define the control logic for many types of devices, from PID controllers and transmitters to discrete devices like pumps.

During the device diagramming phase, the Device Definition editor will be examined. In the later examination of device templating, it will be seen that the Device Definition editor and the Device Template editor are very similar. Both of these editors provide graphical tools for defining the control logic for discrete devices and editors for defining the device's tags.

It should be understood, however, that while the Template editor allows the user to modify or define the basic device templates, the Device Definition editor is used only to modify instantiated devices. These are individualized discrete devices which have been placed on a device diagram and, therefore, made part of a control strategy for a specific application. Device definition affects only a single, individualized project device, while device templating changes the basic template from which all of a certain type of device are created.

Figure 26:
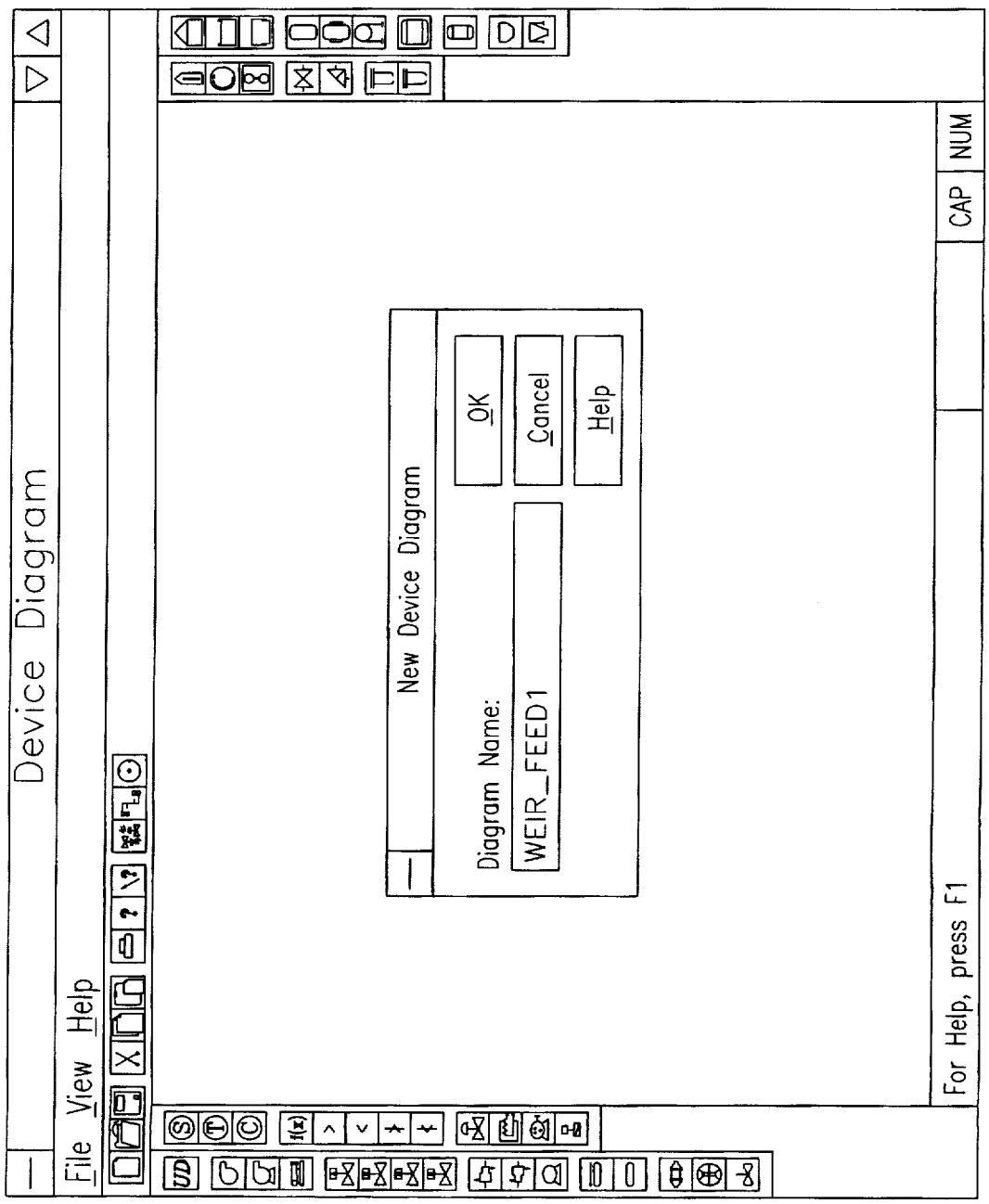

To create a new diagram, the user selects File New. The New Device Diagram dialog appears as shown in FIG. 26.

The user enters a name for this device diagram. Here the user has entered the name WEIR_FEED1. When the user selects OK, the device diagram changes its appearance and the rest of its menus become available for selection.

Figure 27:
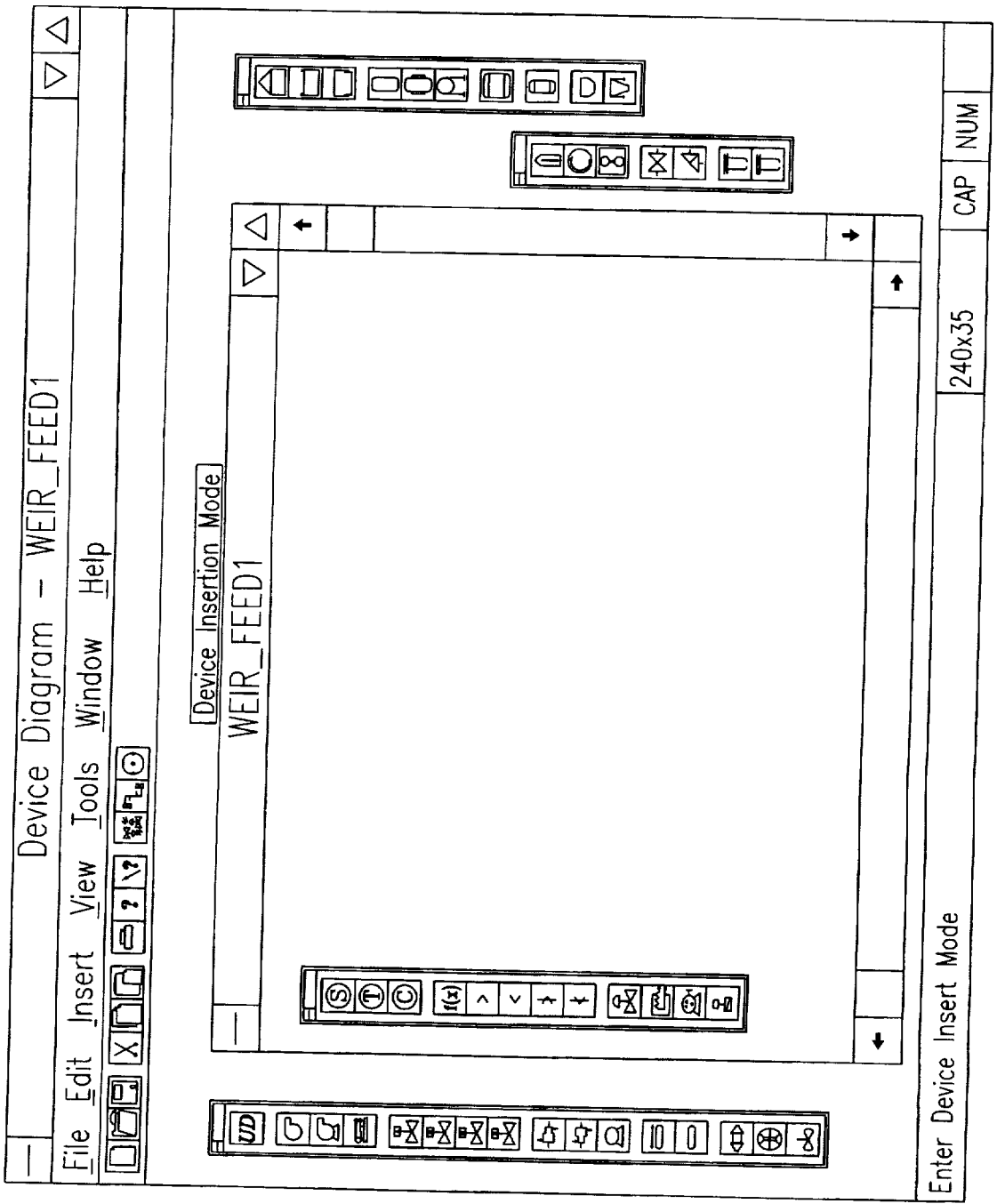

Note that there is now a window titled WEIR_FEED1 within the device diagram window as shown in FIG. 27. This window will contain the device diagram for the Weir system. The Device Diagram editor could show multiple device diagrams open in their own separate windows.

In FIG. 27, the user has undocked the toolbars by selecting them and pulling them away from the side of the window. The pictures on each of the toolbars have become activated, turning from gray to black. This indicates that the Device Diagram window is active and that the device insertion mode is selected.

As explained below, UCOS allows the user to draw different types of connections between devices on a device diagram. These connections can indicate either logical or physical relationships, and the type of connection is reflected by its visual representation.

Figure 28:
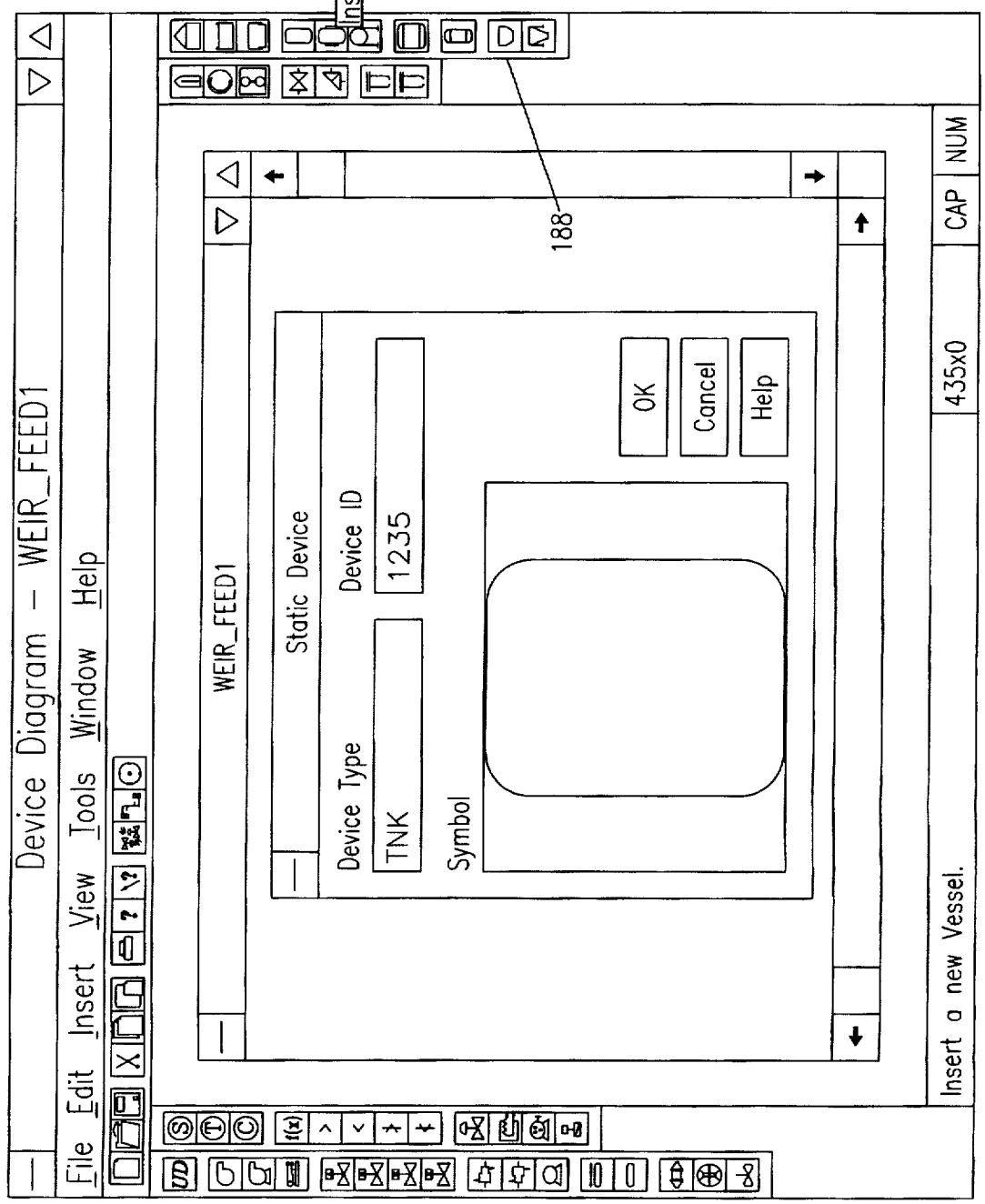

For the first step of device diagramming, the user inserts a static container device into the diagram as shown in FIG. 28. The static devices are organized together on a single toolbar 188. Here, the user selects a tank device by clicking on the tank symbol. A Static Device dialog appears. In the dialog, the user enters the device type TNK and the Device ID 1235. Note that the Static Device dialog also displays the symbol for the selected device. When the user clicks OK and moves the mouse into the drawing area of the device diagram, the symbol is attached to the cursor. To place the symbol on the diagram, the user clicks the mouse at the desired location as illustrated in FIG. 29.

As explained previously, there are two primary device categories within UCOS, discrete devices and analog devices. These analog devices include transmitters and controllers, analogous to "function blocks" in a traditional DCS function block environment. Dialogs allow the user to define parameters for these devices. UCOS devices also include static devices which do not have any monitoring or control functionality.

Figure 29:
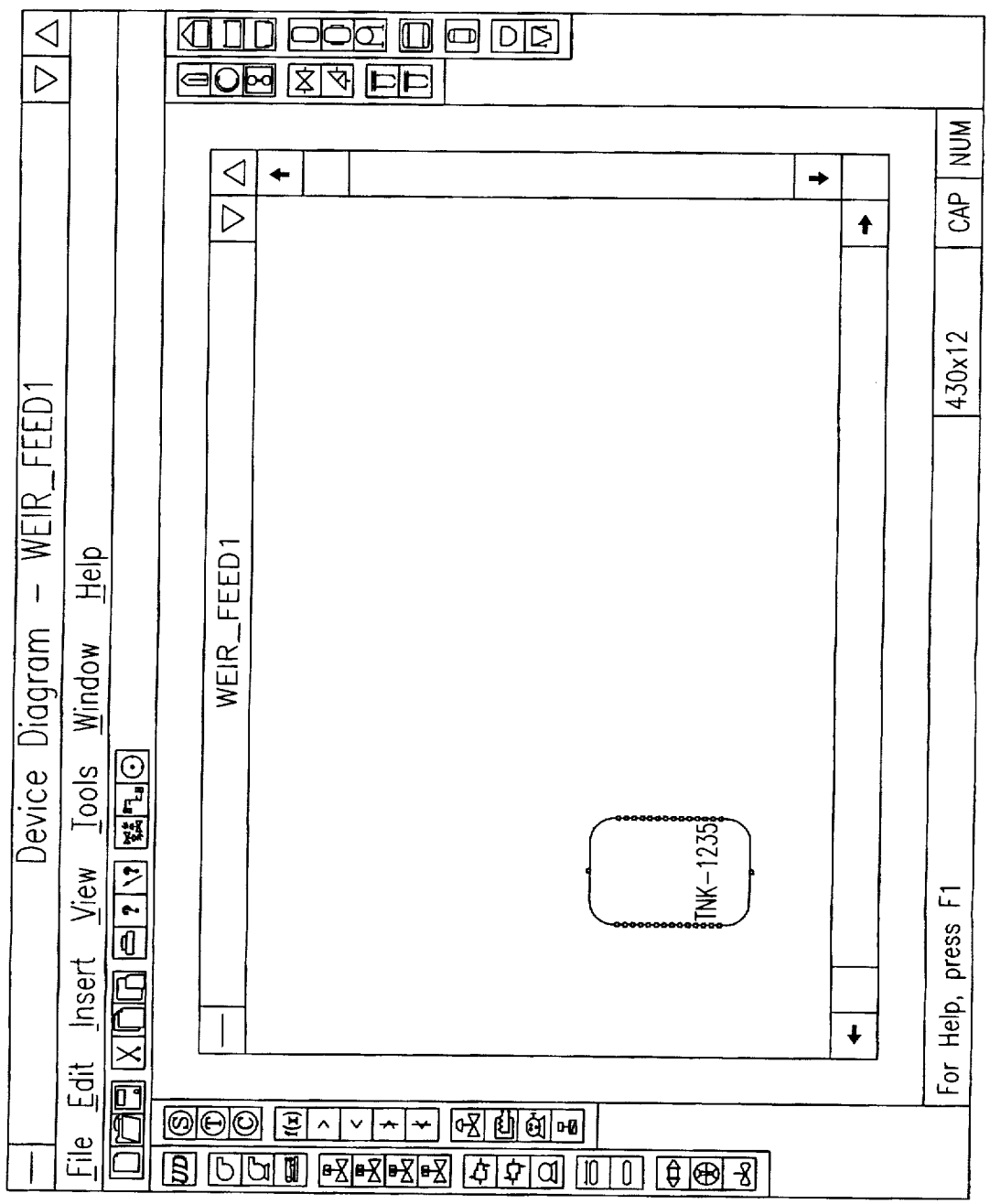

The device diagram shown in FIG. 29 now has a single static device. The static device required minimal definition since it is not directly responsible for any monitoring or control functions. Its purpose is simply to help illustrate the physical definition of the facility within the diagram.

Figure 30:
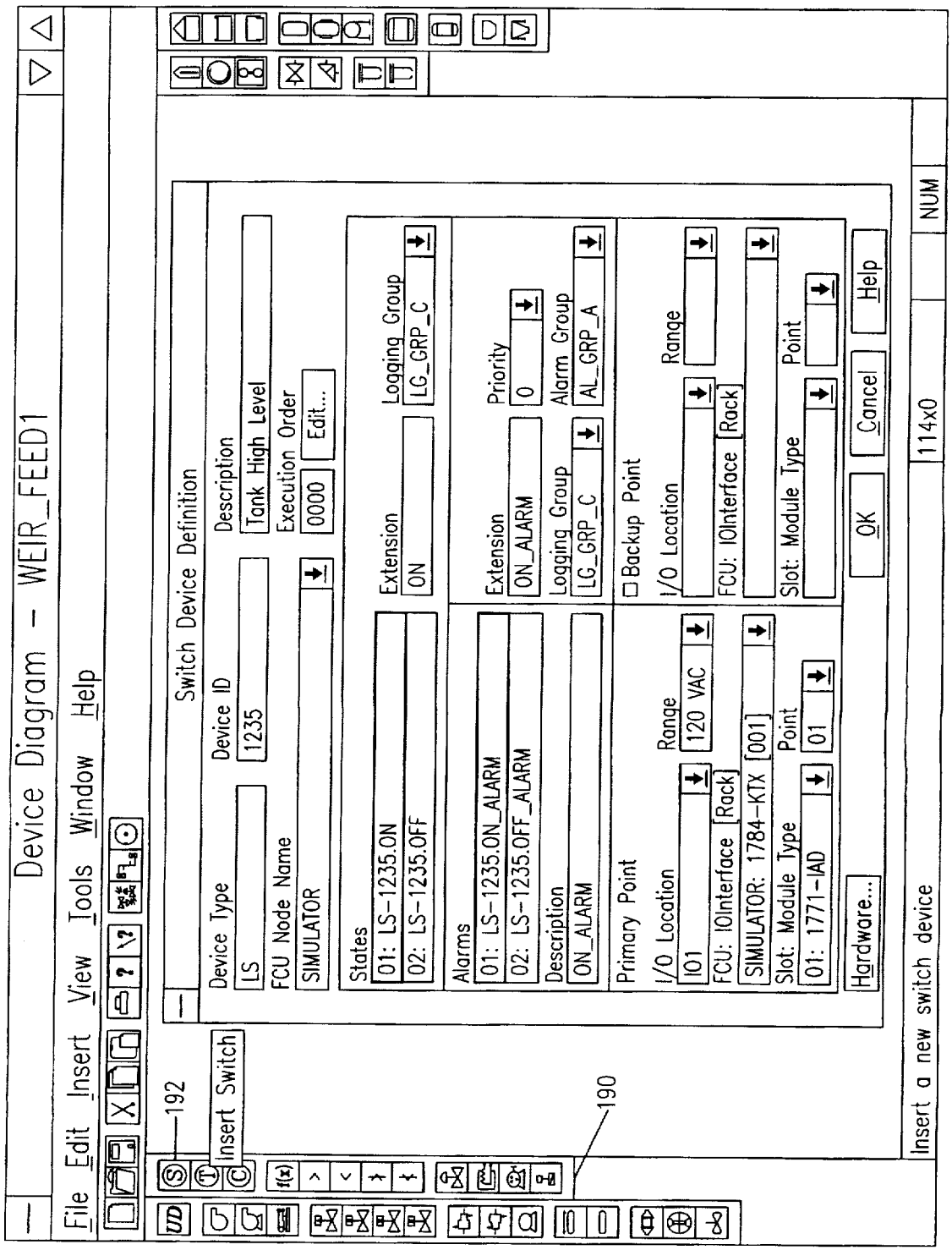

Next, a switch device is added to the device diagram. The switch is a device whose logic will execute in a UCOS FCU. Referring to FIG. 30, the user selects the switch device from the toolbar 190. It is represented by a button 192 labeled with an S in a circle. The Switch Device Definition dialog appears. The user enters a Device Type, Device ID, and Description, and then selects the FCU in which the device logic will be executed. The dialog also allows the user to designate other, individualized parameters for this switch device as follows:

| Item | Information |
| --- | --- |
| Device Type | LS |
| Device ID | 1235 |
| Description | Tank High Level |
| FCU Name | The user selects the Simulator FCU from the pull-down list. |
| States | For the first state tag the user designates a logging group from the pull-down list. |
| Alarms | Using the pull-down list, the. user |

-continued

| Item | Information |
| --- | --- |
| Primary Point | designates an alarm group and a logging group. The user can also enter a description for the alarm and indicate its priority.<br>The user selects a range of 120 Volts AC. When this is done, UCOS offer the user a particular slot, module type, and point. Here, UCOS offers Point 1 on the I/O module in the first slot of the rack that was defined for the Simulator FCU. |

After the user enters this information in the dialog and clicks OK, the dialog disappears and the switch device symbol is connected to the cursor. The user places the device in the diagram by clicking the left mouse button.

Figure 31:
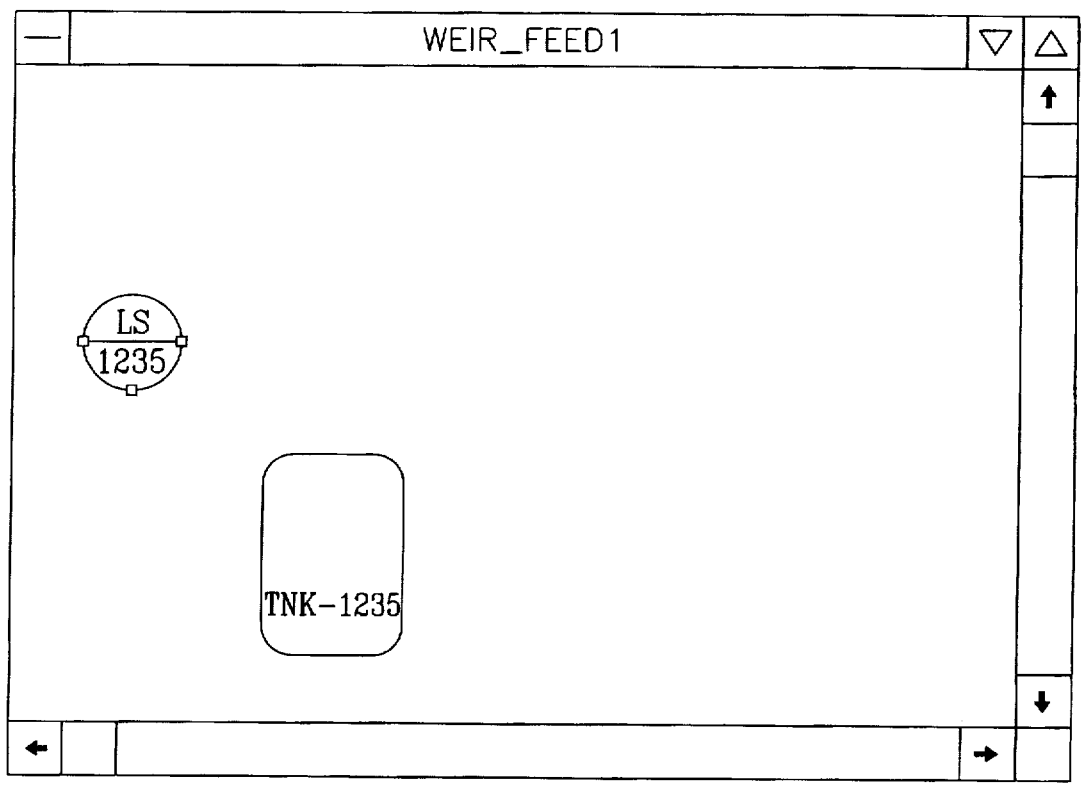

By placing the switch on the diagram shown in FIG. 31, the user has shown that the tank is equipped with a level switch device. In a real-world application, this level switch might be a float switch mounted into the side of the tank. When the tank level reaches a certain height the float switch is turned on. The switch was associated with the tank level when the user selected the primary module point for the switch in the switch definition dialog.

Figure 32:
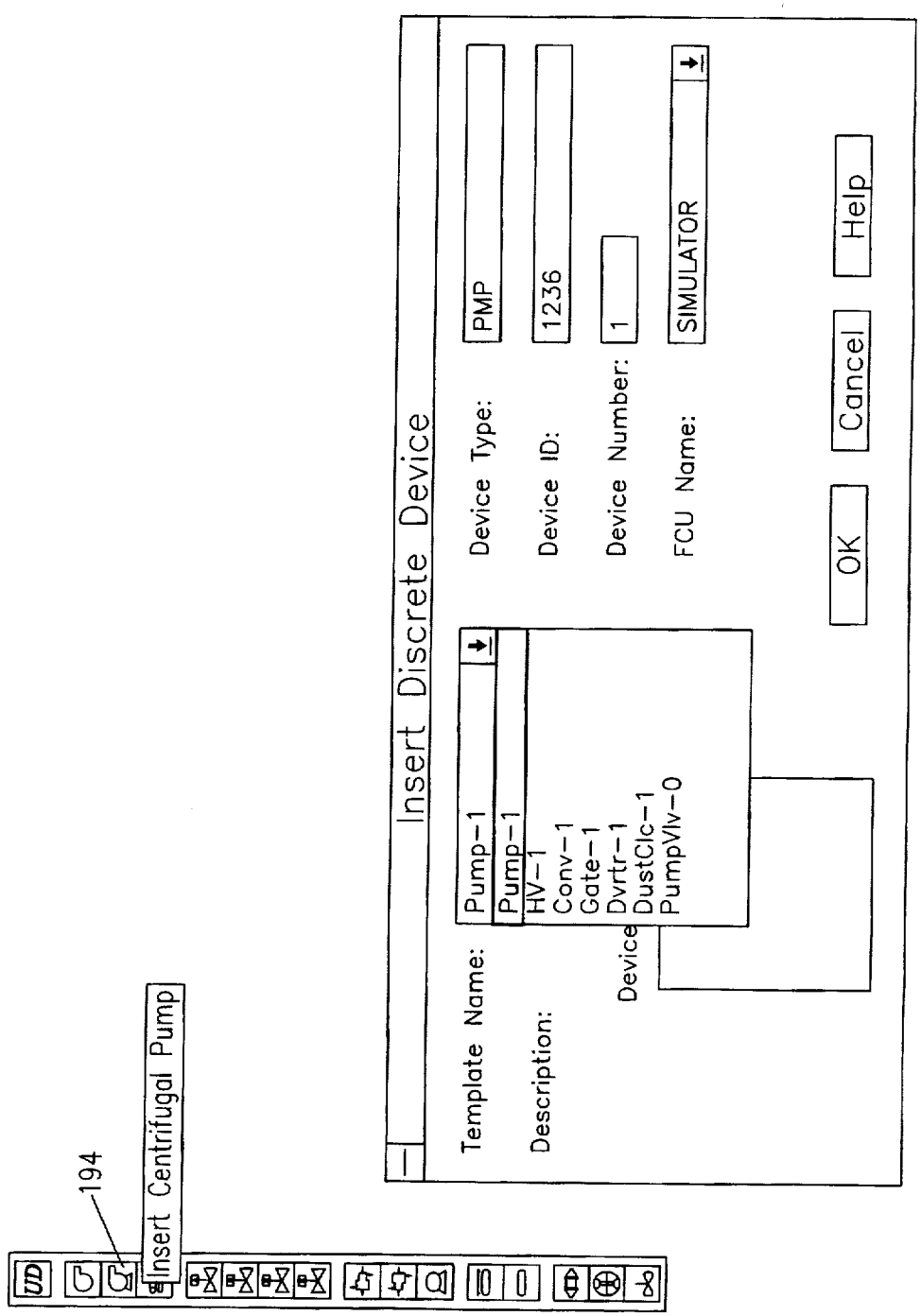

The device diagram of FIG. 31 now includes a single static device, the tank, and a single switch device, Level Switch 1235. Next, the user inserts a pump discrete device into the device diagram. The pump device is instantiated from a template. The user selects the pump symbol from the toolbar 194 as shown in FIG. 32. The Insert Discrete Device dialog appears. The user enters the definitions for this project device, including Device Type and Device ID. The user also selects the FCU in which this pump's device logic will execute.

The left side of the dialog shows a list of templates the user could have selected for this discrete device instead of the pump template. Here, the user selects the pump template, enters the Device Type PMP, and enters the Device ID 1236 to form a unique device name, PMP-1236.

On the surface, this is a rather simple-looking dialog. In fact, the insert discrete device dialog is performing a tremendous amount of work in the background when the user clicks OK and places the pump symbol onto the device diagram. When the user clicks OK, all the logic from the template is instantiated for this individual instance of the pump. Additionally, the tag names in the template logic are changed to specific tag names using the Device Type and Device ID the user entered in the dialog.

Figure 33:
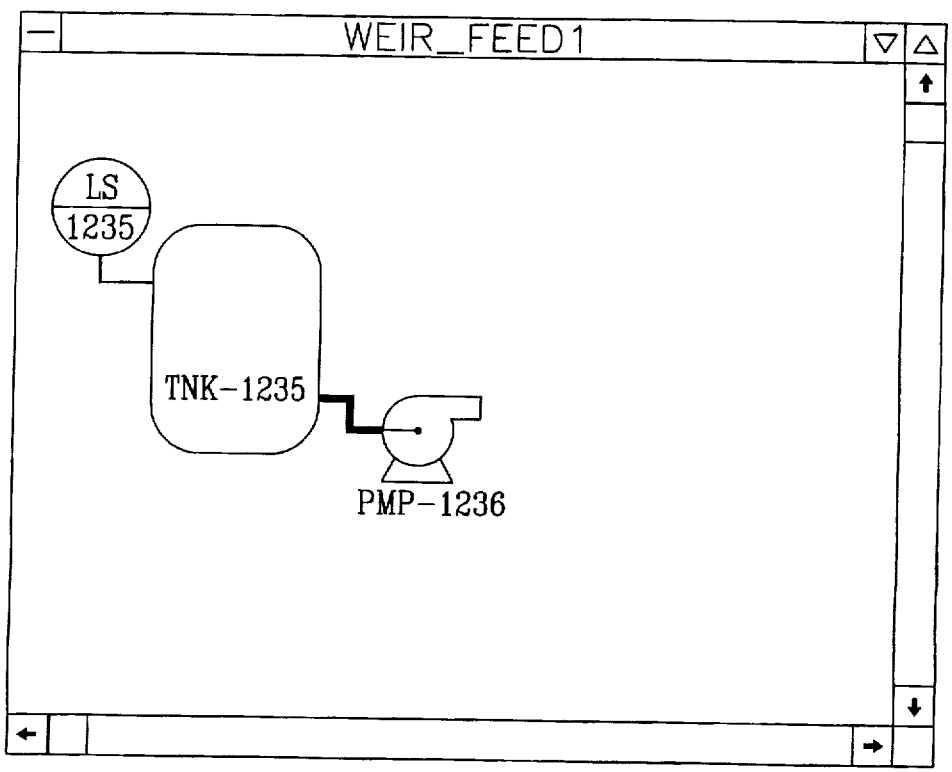

In FIG. 33, it can be seen that the pump device symbol and its name now appear on the device diagram. Next, the user draws a connection between the tank and the pump. To draw this connection, the user places the cursor on the edges of the tank. This causes the available connection points on the tank device symbol to appear. When the user clicks on the connection point and holds down, the connection drawing is started. The user can create an angle in the connection by clicking the button again as the connection is drawn. As the cursor drawing the connection reaches the pump, the pump's connection points appear. Clicking on one of the connection points completes the connection from the tank to the pump. In a similar manner, a connection is also drawn from the switch to the tank.

Because of the nature of these devices, the connection is a mechanical one. This shows that the two devices are physically connected pieces of equipment through which the material flows. The mechanical connection is represented by a thick line.

The UCOS device diagram permits the user to connect devices in different ways, depending on the device type. Discrete devices normally have only mechanical connection points. Their logical connections to other devices are drawn in the Device Definition editor, which will be discussed below along with different types of logical and physical connections between devices.

Figure 34:
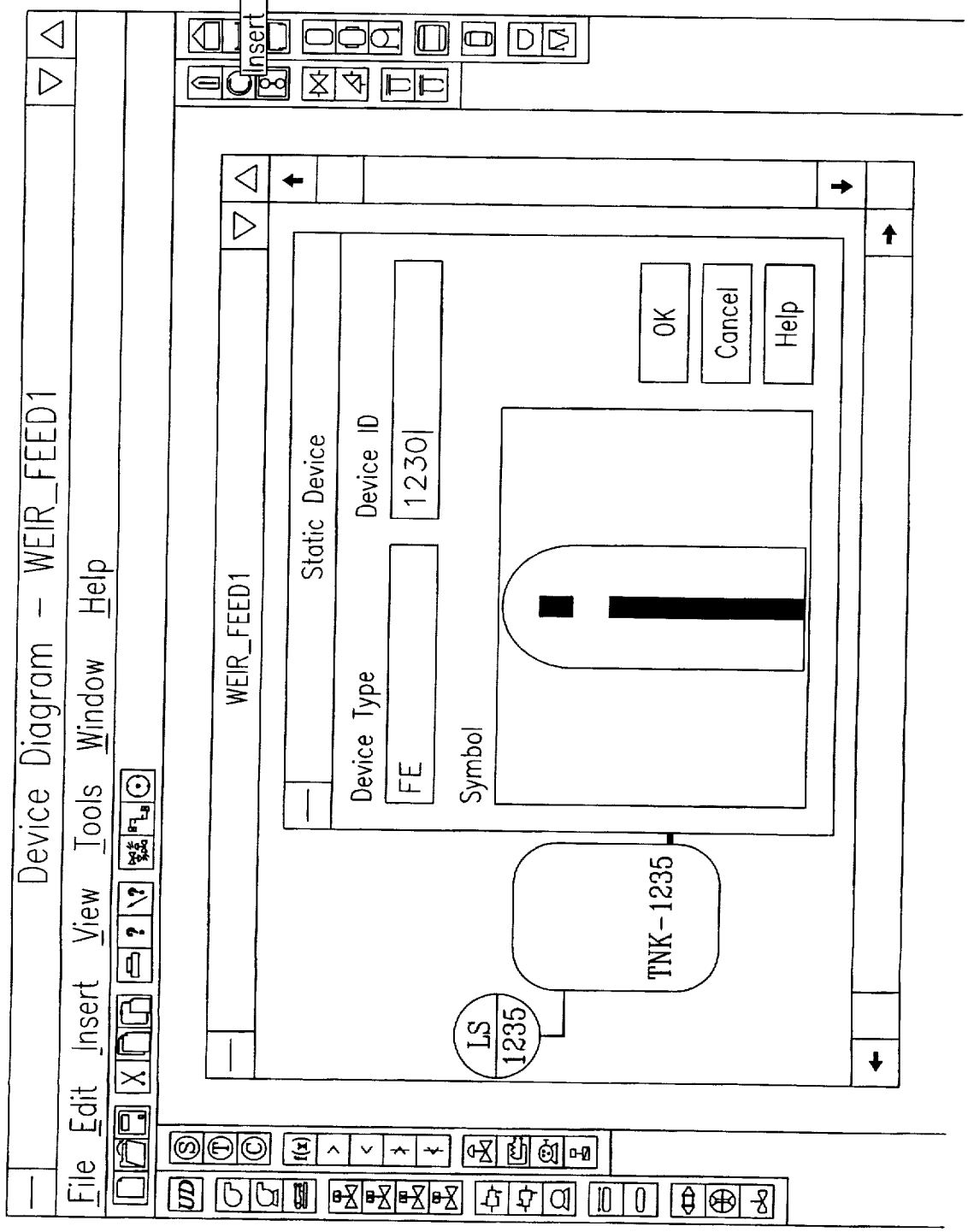

Next, in FIG. 34 the user places another static device in the device diagram. Since a fluid is being pumped out of a tank, the user wants to place an orifice plate in the flow. This will allow the flow to be measured as a function of the differential pressure across the orifice plate. The user selects an orifice plate static device from the toolbar and enters information in the dialog that appears.

Figure 35:
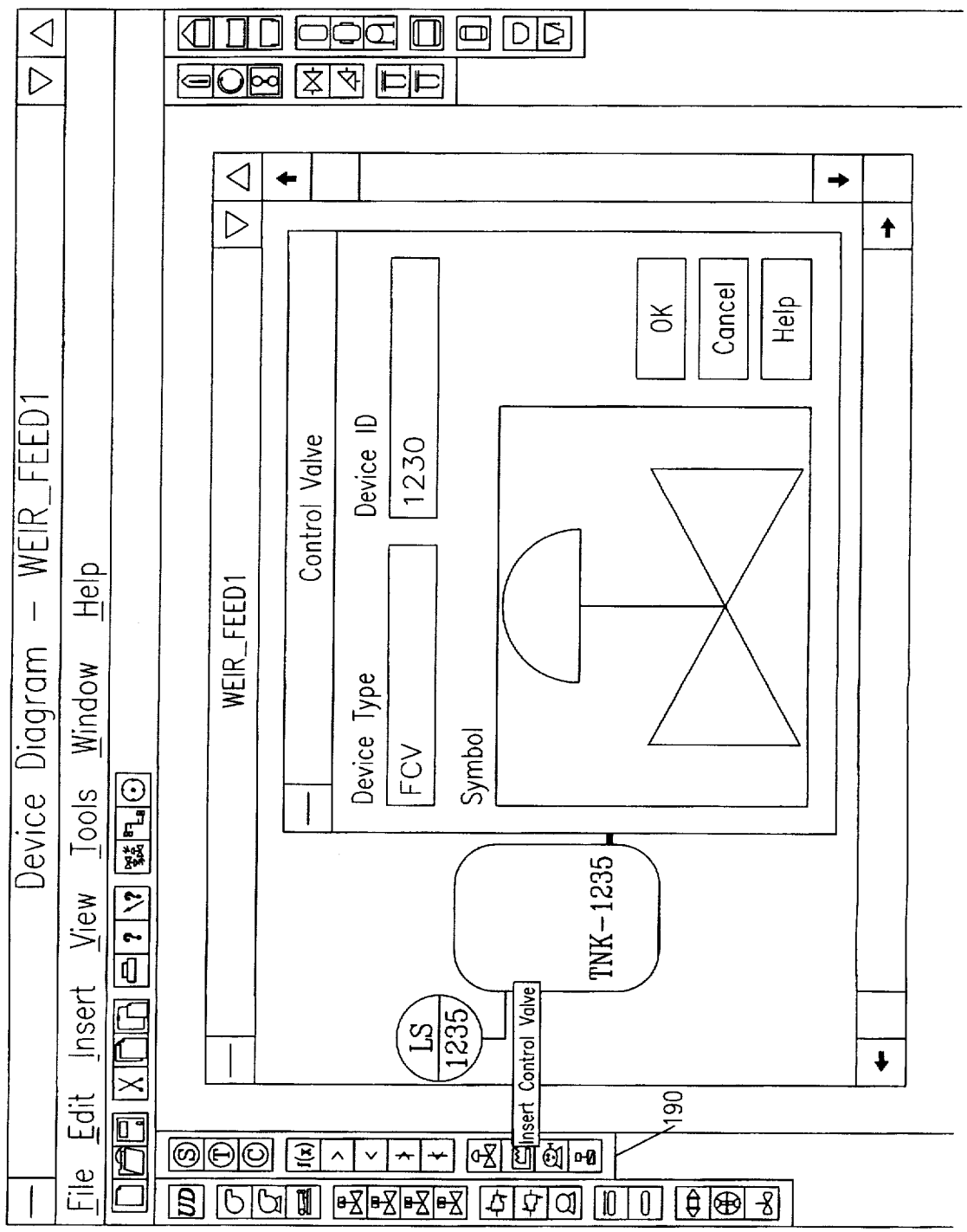
Figure 36:
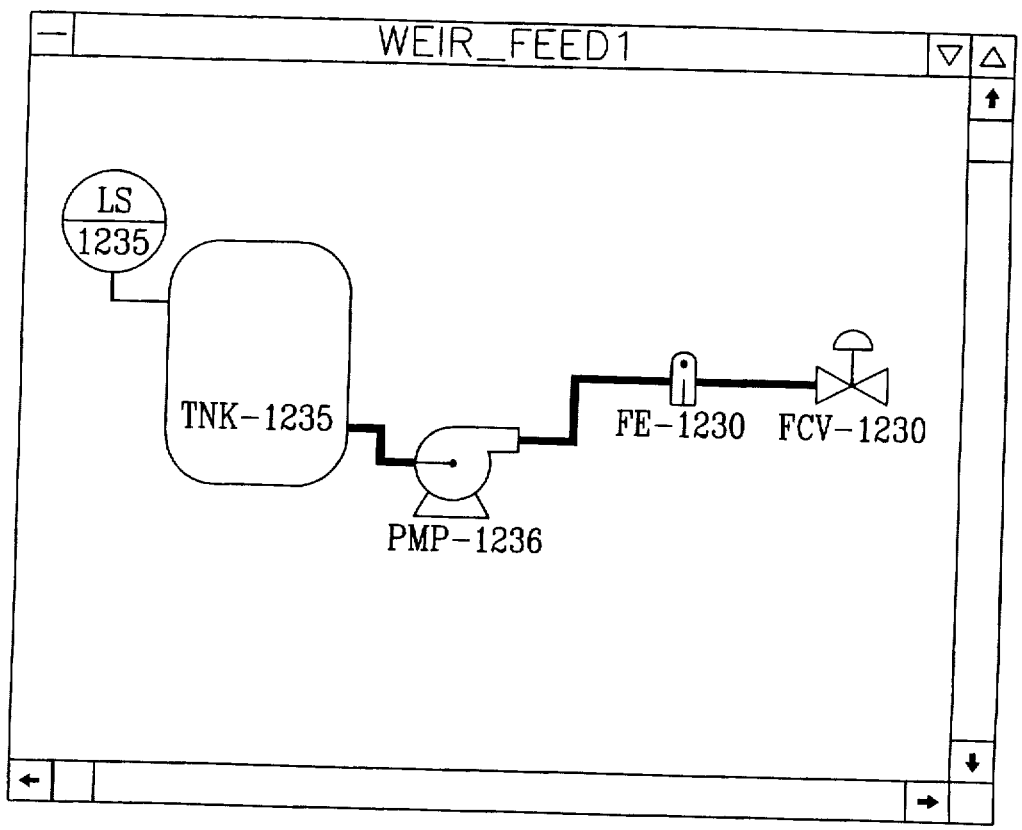

In FIG. 35, the user inserts the control device that will actually regulate the flow, in this case, a control valve. The user selects a control valve from the toolbar 190, fills in the dialog, and places the control valve on the diagram. The user then draws the mechanical connections between the pump, orifice plate and control valve as shown in FIG. 36.

Figure 37:
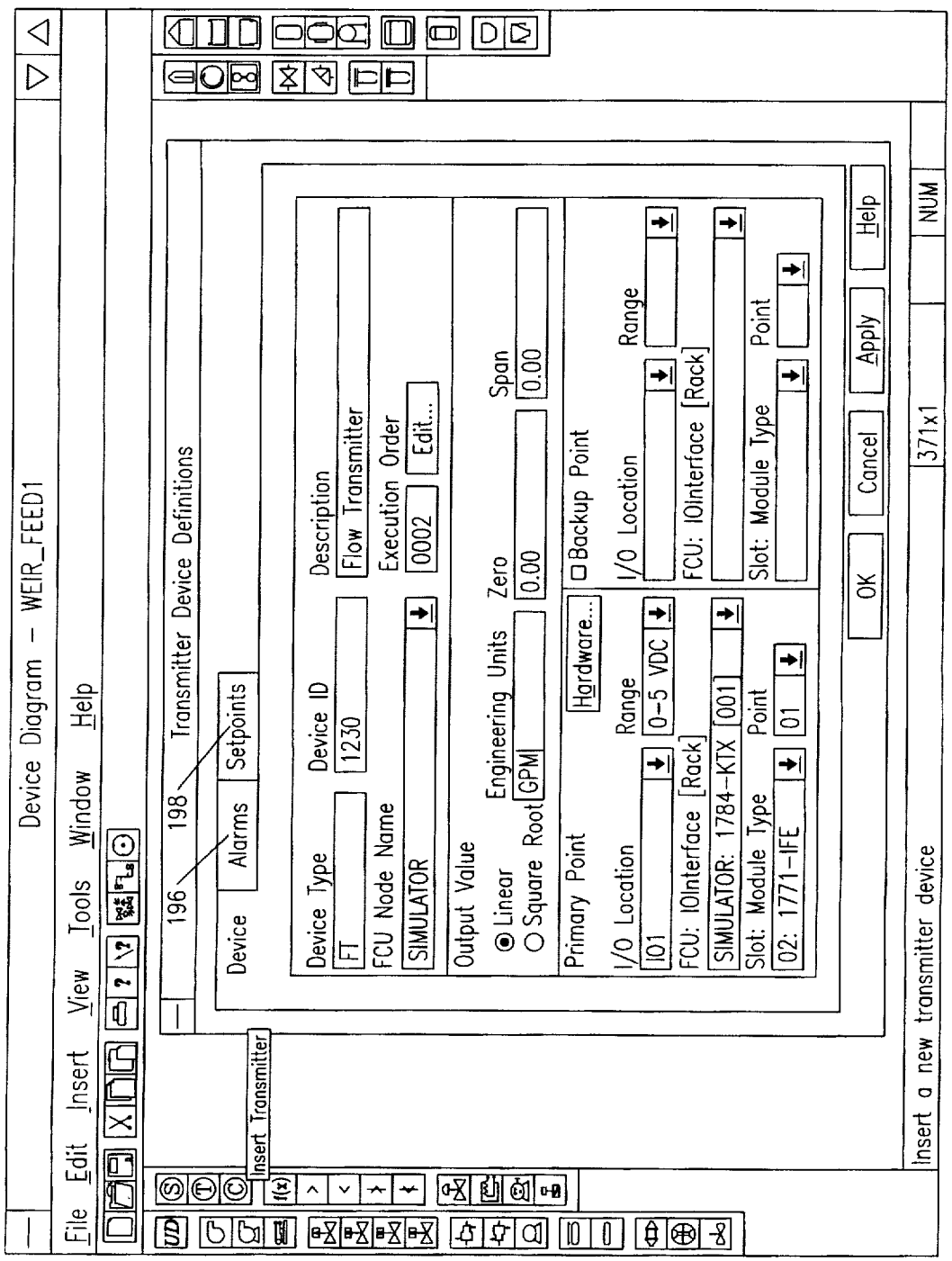
Figure 1:
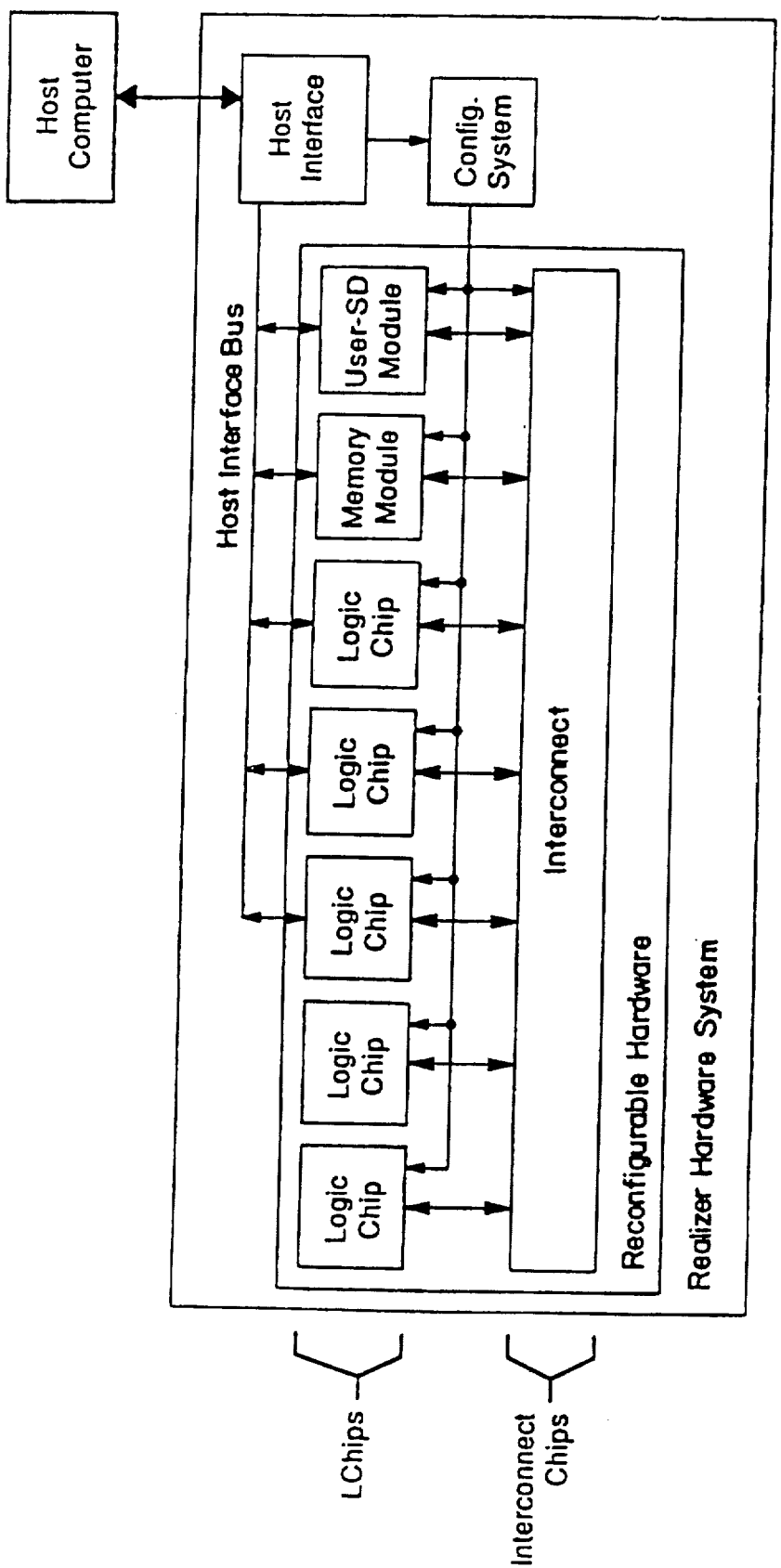

The next device the user places on the device diagram is a transmitter. The transmitter button on the toolbar 190 shows a T in a circle. In FIG. 37, the Transmitter device definition dialog that appears is open to the device folder. Note that the dialog includes separate folders 196 and 198 for alarms and setpoints, respectively.

The device folder lets the user define the following information for the transmitter:

| Item | Description |
| --- | --- |
| Device Type | FT |
| Device ID | 1230 |
| Description | Flow Transtnitter |
| FCU Node Name | The user selects the Simulator FCU from the pull-down list. |
| Engineering Units | The user enters GPM for gallons per minute. |
| Primary Point | UCOS provides a default primary point on the analog input module that was defined for the FCU's rack. |

In FIG. 38, the user now configures alarm parameters for the transmitter by opening the alarms folder 196 for the device. This folder shows a list of alarm tags 200 associated with this device. Note that all the tags have as a part of their tag name the device type and device ID which the user entered. The user selects the high alarm tag and configures it with a description, a logging group, an alarm group, and a selected alarm priority.

Figure 39:
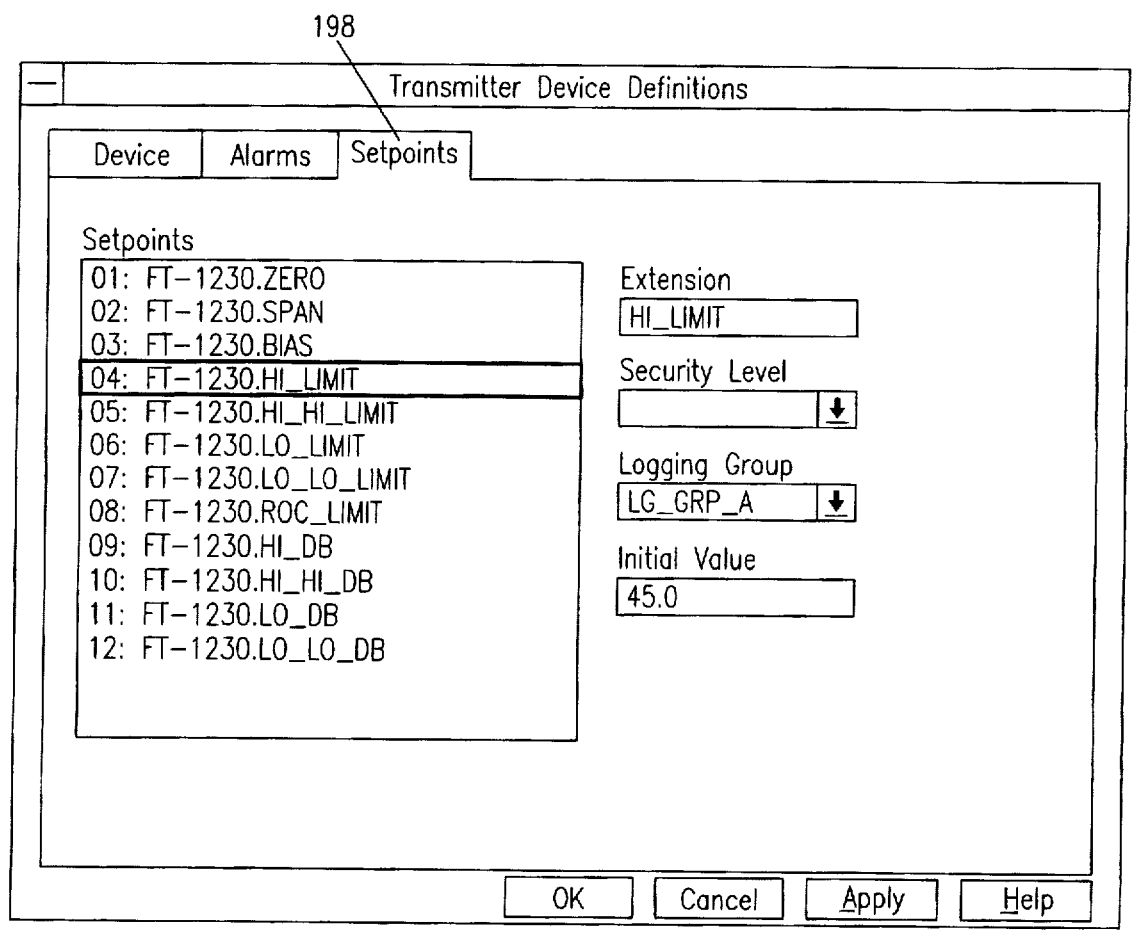

The user configures setpoints for the transmitter using the setpoint file folder 198 as shown in FIG. 39. This folder shows the setpoint tags for the device and allows the user to define an extension, logging group, initial value, and security level for each setpoint tag. For the high limit tag, the user designates a logging group and initial value. This high limit setpoint will determine when the high limit alarm will be triggered, that is, whenever the flow is greater than the high limit setpoint value. In this definition, if the flow reaches a value greater than 45, then the alarm tag will be set and an alarm will be generated within UCOS.

Figure 40:
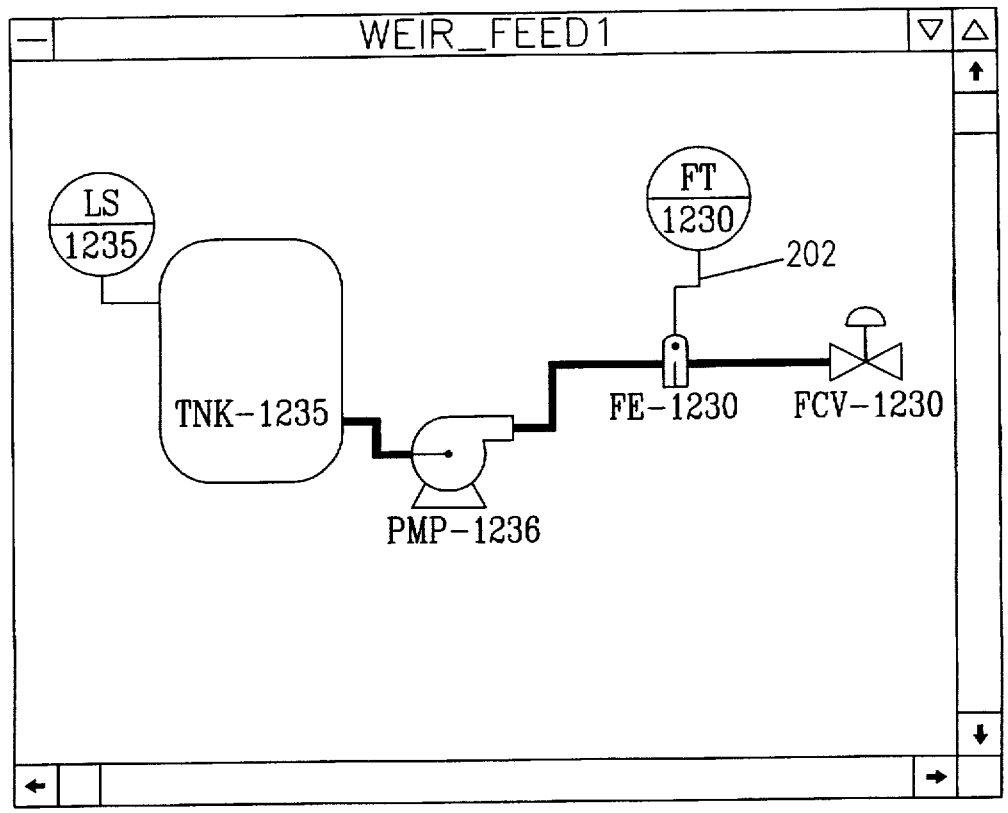

After clicking OK in the transmitter device definitions dialog, the user places the transmitter in the device diagram. The user then connects the transmitter to the orifice plate device as can be seen in FIG. 40. This connection is shown as a medium width gray line 202 indicating an instrument connection between the two devices. This is different than the mechanical connection drawn earlier between the pump and the tank.

Figure 41:
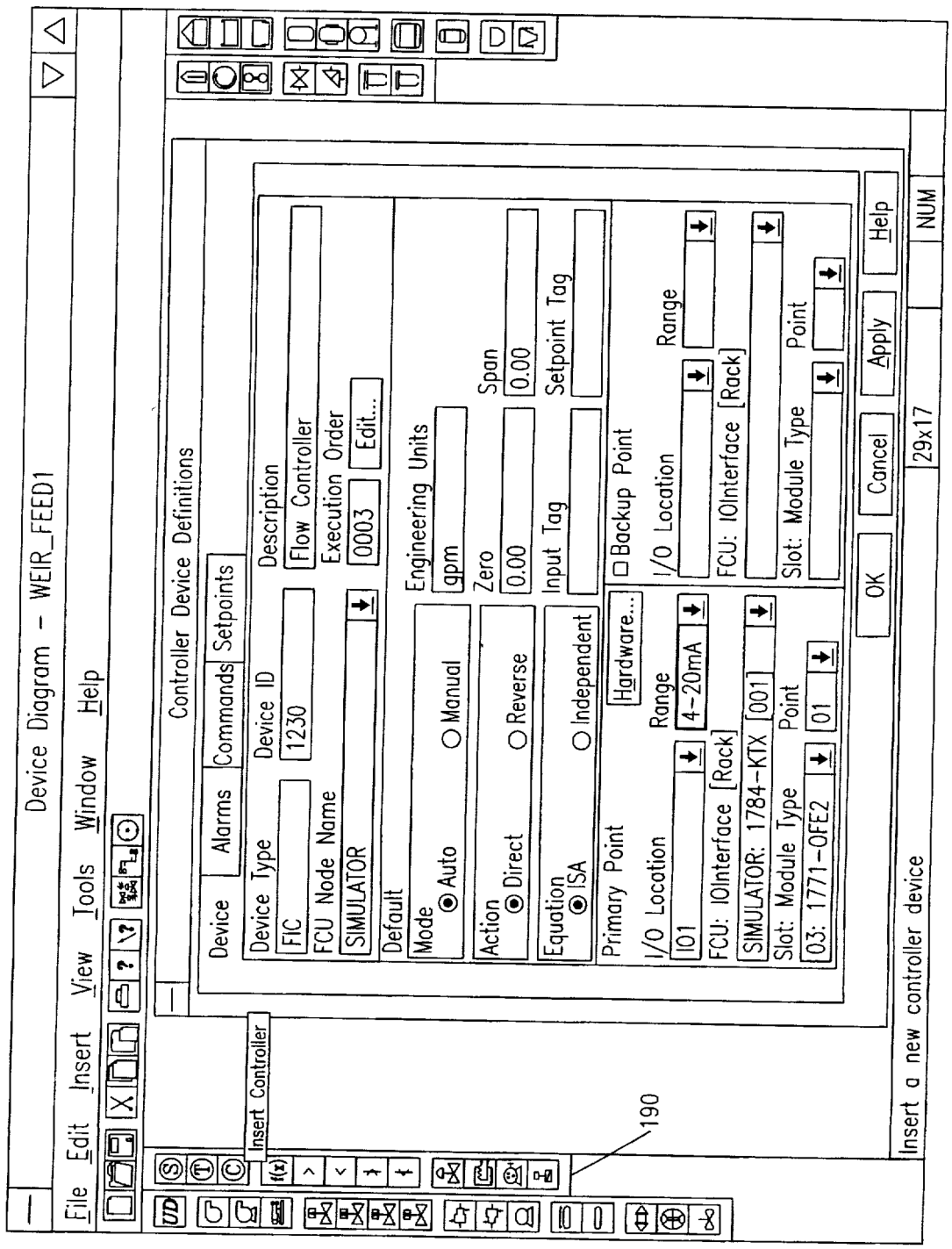

Next, in FIG. 41, the user inserts a controller device into the device diagram by selecting a controller from the toolbar 190 and filling in the dialog that appears:

| Item | Description |
| --- | --- |
| Device Type | FIC for flow controller |
| Device ID | 1230 |
| Description | The user enters Flow Controller. |
| FCU Node Name | The user selects the Simulator FCU from the pull-down iist. |
| Engineering Units | The user enters GPM for gallons per minute. |
| Primary Point | The user clicks on the range pull-down list and selects 4–20 mA. This causes UCOS to offer the first point in the OFE2 module that has been configured for the FCU's rack. |

Figure 42:
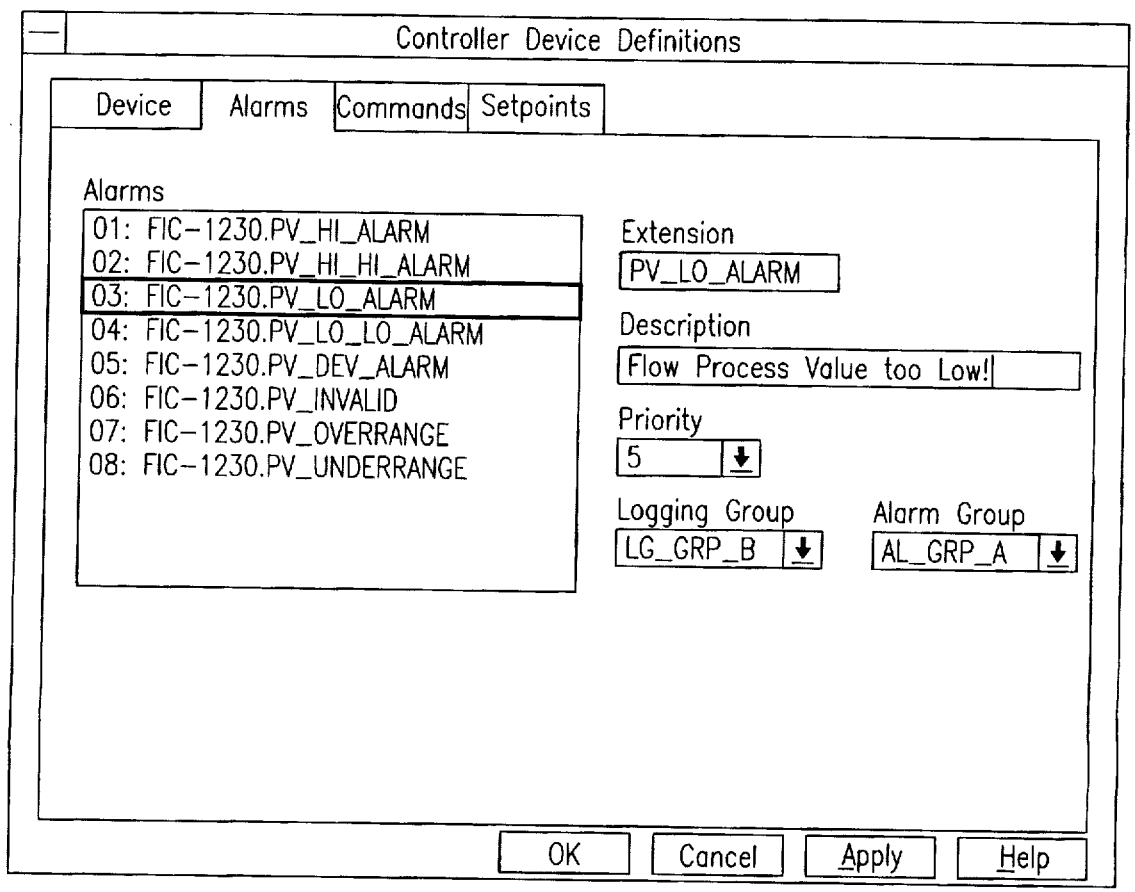

The controller is a device which executes a PID algorithm. Like the transmitter, the controller device definitions dialog contains several folders. The user selects the alarm folder as shown in FIG. 42, and then selects the low alarm tag from the list. The user then gives this alarm a description, priority, logging group, and alarm group.

Figure 43:
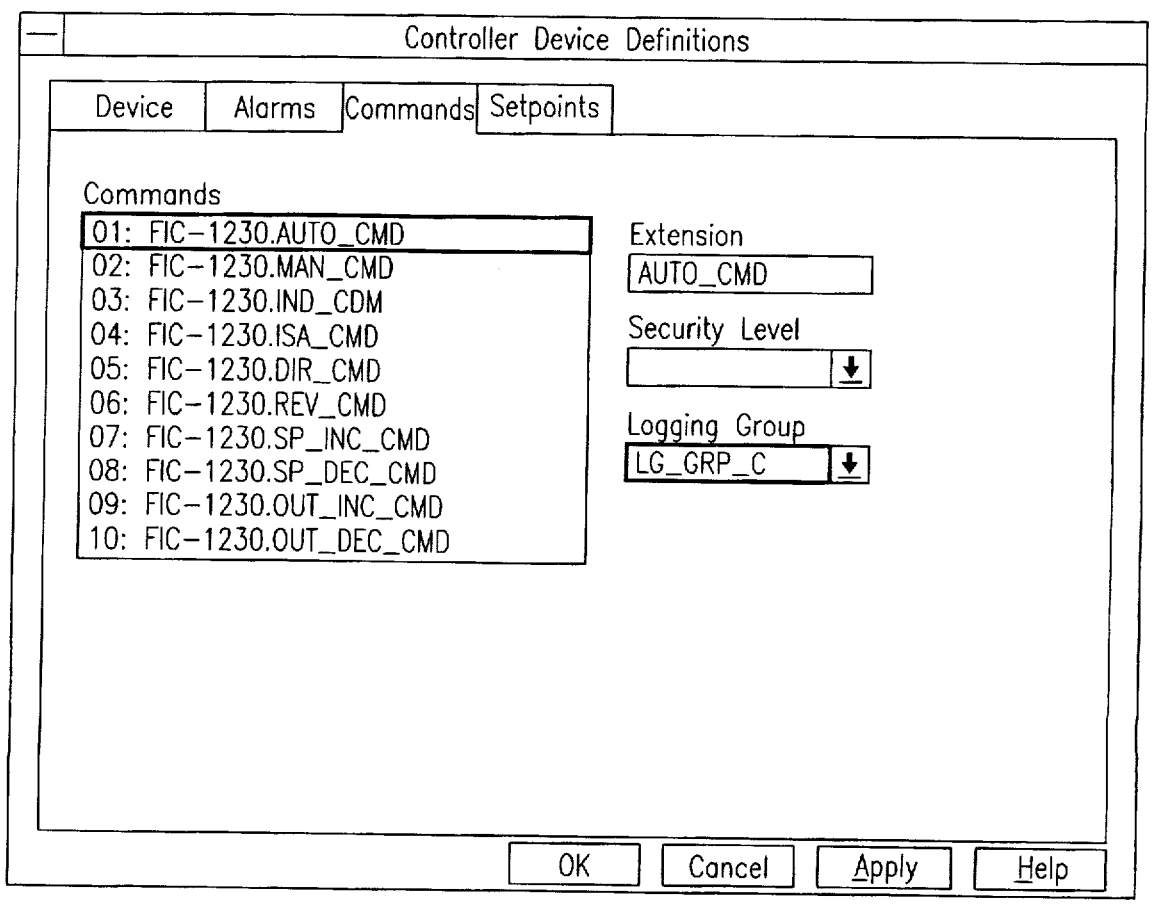

The user next selects the commands folder for the controller device. (FIG. 43). The tags listed in the commands folder are somewhat different than those for alarms and setpoints. Tags in the command folder act as one-shot messages from a UCOS operator workstation to the UCOS FCU. Commands cause the device to go into different states or perform different operations when an operator input is received by the FCU in which the logic for the device is executed. Here, the user indicates that whenever an operator clicks to put the controller into auto mode that the event will be logged to a particular logging group. The user could also configure security for the command or change the extension of the tag, effectively changing the tag's name within the system.

Figure 44:
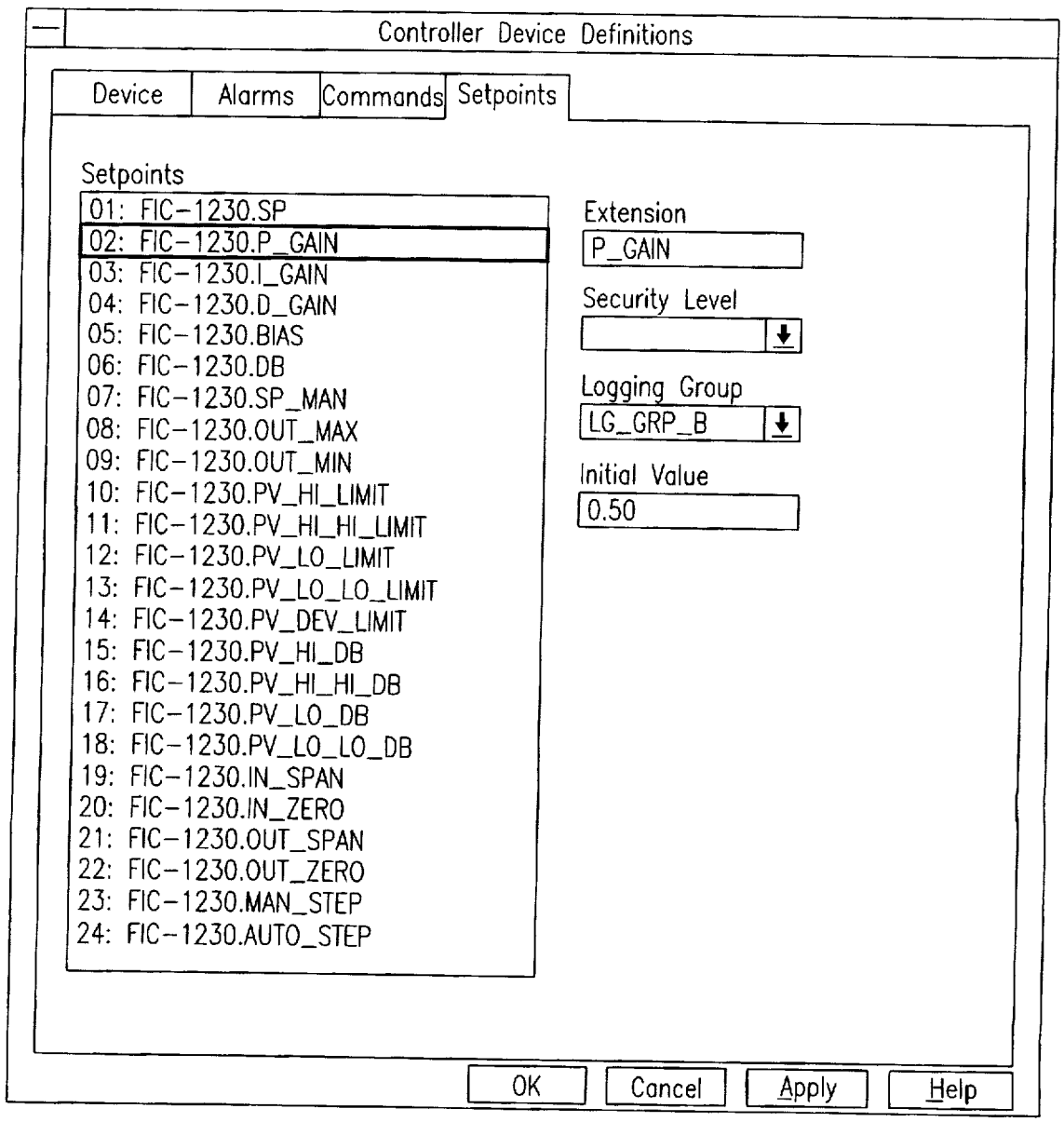

The final folder for definition of the controller is the setpoints folder shown in FIG. 44. The user defines the controller setpoints in the same way the setpoints for the transmitter were defined: Click on a setpoint tag and indicate its extension, security level, logging group, and initial value. Here, the user selects the P_GAIN tag, selects a logging group from the pull-down list, and enters an initial value of 0.5.

Figure 45:
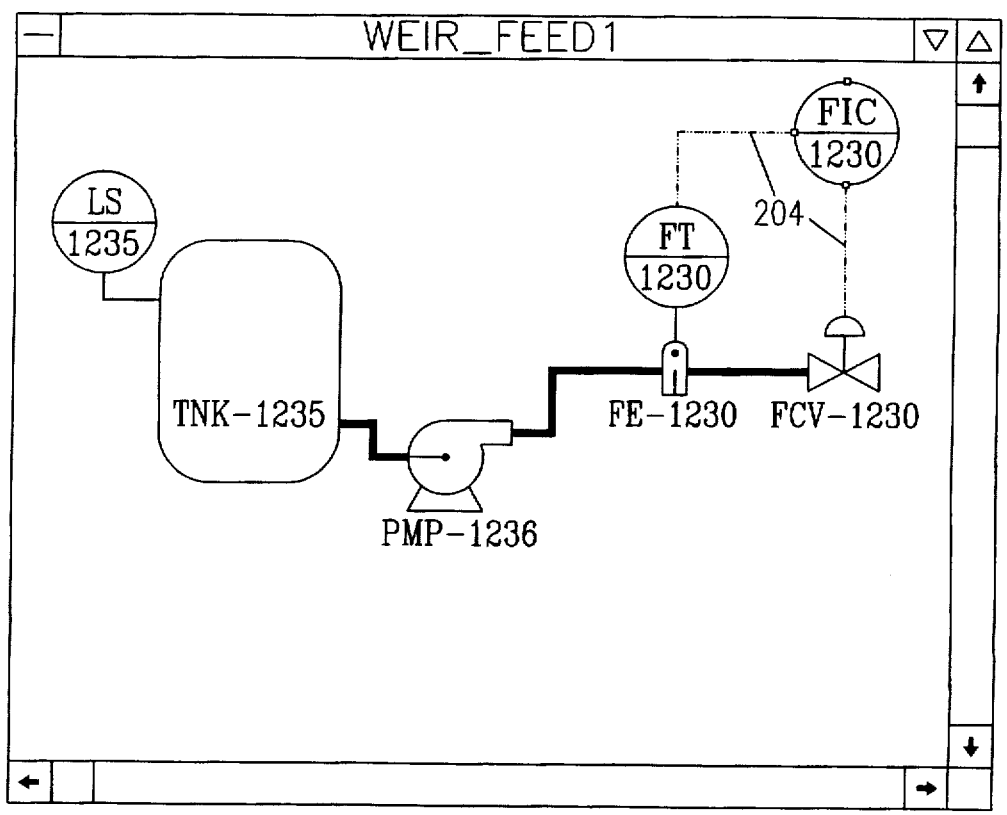

This completes the user's definition of the controller. The user clicks OK and places the controller in the device diagram. The user then connects the controller to the transmitter and the control valve as seen in FIG. 45.

Note that these connections 204 are dotted/dashed lines to indicate that they are internal, logical UCOS connections. In other words, the connection between the transmitter and the controller, for example, is via a UCOS tag rather than via an actual electrical signal through an input/output module point.

Figure 46:
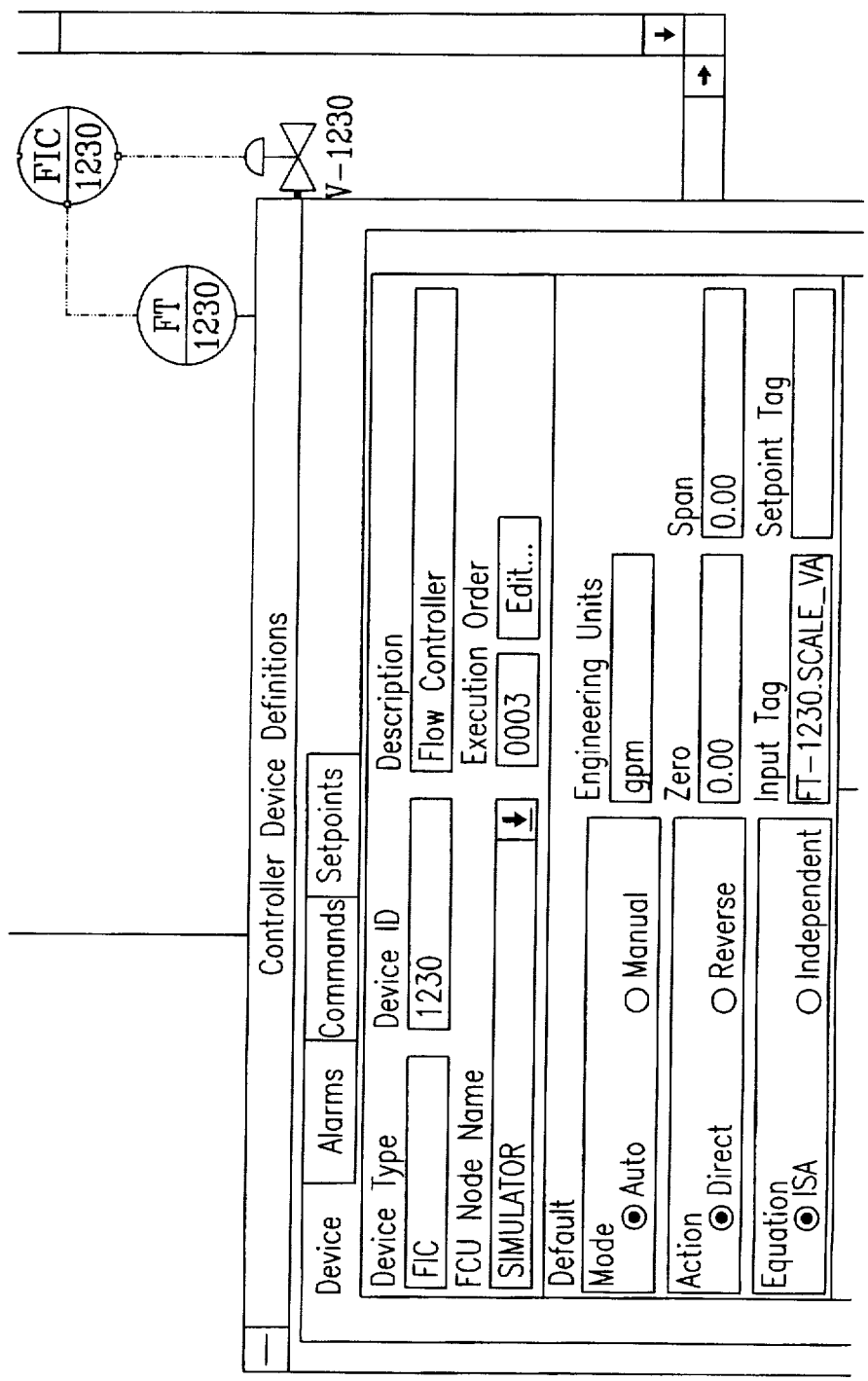

The UCOS internal connections shown as dotted/dashed lines indicate that data values will be passed from device tag to device tag. UCOS configures this logic automatically when the user draws the connection between the two devices. In FIG. 46, the user has retrieved the flow controller device definitions by double clicking the controller symbol. Note that the input tag is now specified. When the user initially inserted the flow controller, it was not specified. UCOS supplied the input tag field on the flow controller when the user made the connection between the flow transmitter and the flow controller.

The user has now completed the initial definition of the device diagram for the WEIR_FEED control system. This device diagram has a single control loop, i.e., a sensed flow value that is passed to a flow controller, which then controls the output of the valve which regulates the flow. This device diagram also includes a discrete device—the pump—which has logic in its definition. This is the logic that will control the pump at run-time.

In creating this device diagram, note that the user has not modified or even examined the discrete logic for the pump, but simply inserted the pump with its pre-defined template logic into the diagram. Double-clicking on the pump symbol reveals the logic schemes that have been copied from the template. As explained below in connection with device definition and device templating, the user can easily customize the logic that controls the operation of a pump or other discrete device.

The user has now configured the initial control program with its various types of devices. For each device that can be monitored and controlled, UCOS has automatically created a device display symbol that can be placed on a project screen. UCOS has also generated a device command window that will pop up when the device symbol is selected from a project screen. The command window can be grouped with others into a group display and accessed from a menu at run-time.

Next, the underlying concepts that govern the device logic included with discrete device templates will be discussed. The user returns to the device diagram created for the project. During the initial device diagramming, the user placed four devices that were assigned to the FCU on the diagram. The user placed other devices that were not assigned to any FCUs. These were the static devices that were incorporated into the device diagram for purposes of illustrating the physical definition. When the download operation was performed, logic for the dynamic devices was placed in the FCU where it will execute.

To closely examine the device diagram for the WEIR_FEED1 system, the user can double click on any of the devices placed on the diagram. If the user double-clicks on the level switch, the same dialog the user used to define and place the level switch in the device diagram would appear. Similarly, double clicking on the transmitter or the flow controller shows the original dialogs used to define and place the devices on the diagram.

When the user double clicks on the pump device, a different dialog will appear. Recall that the initial dialog used to define and place the pump was fairly simple. The user simply picked the template desired for the pump and provided the new pump its individualized type and ID. Once the pump logic has been instantiated for the new, individual pump and the pump is placed on the screen, its device definition editor becomes available.

Figure 47:
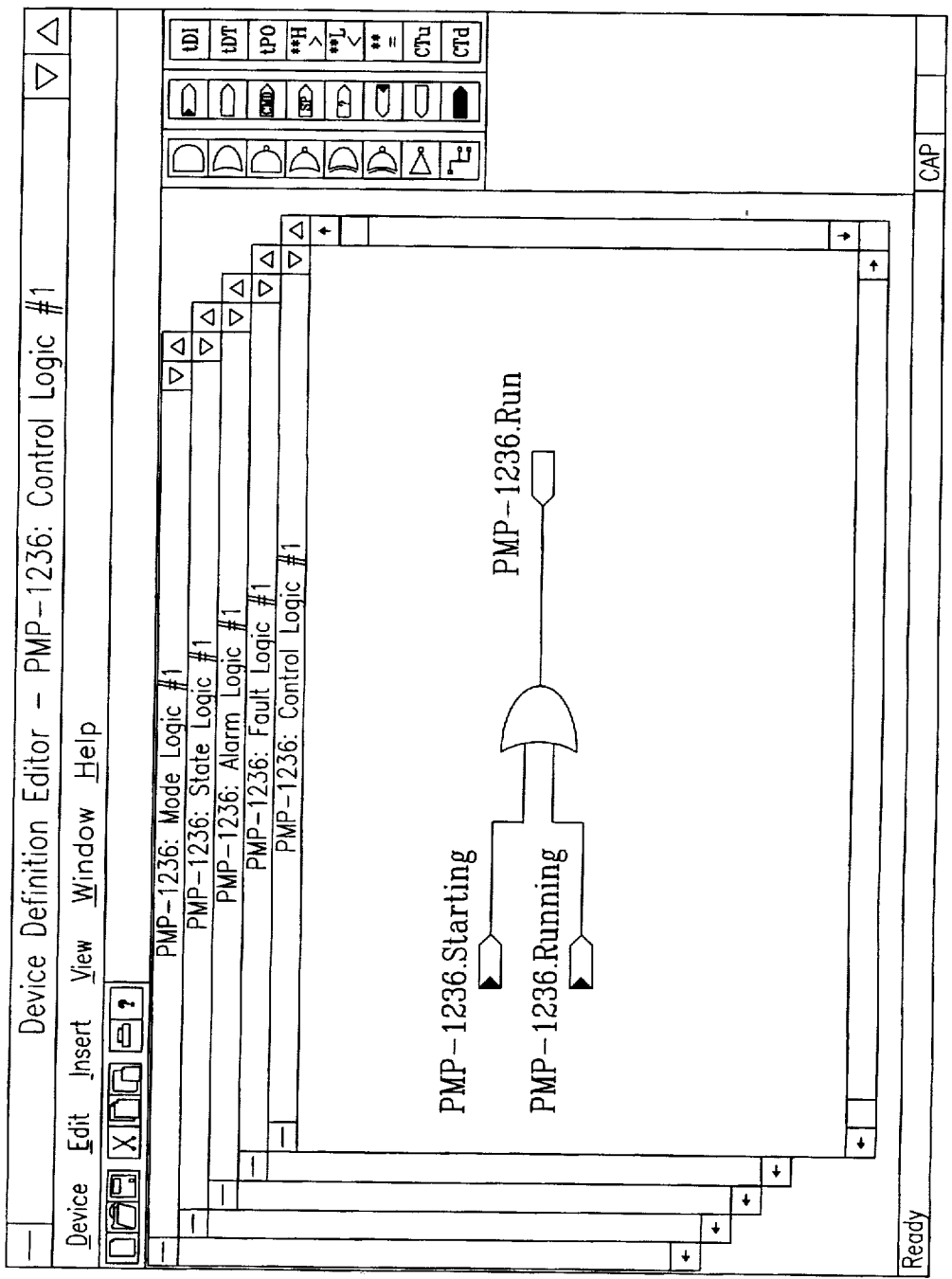
FIGS. 47–57 are a series of screen captures illustrating the step-by-step process of modifying discrete device logic of the example project illustrated in FIGS. 26–46 using the device definition editor of the present invention.

When the user double clicks on the instantiated pump, the pump's device definition editor appears as shown in FIG. 47. This editor allows the user to view, modify, or change the logic for the instantiated discrete device.

Figure 48:
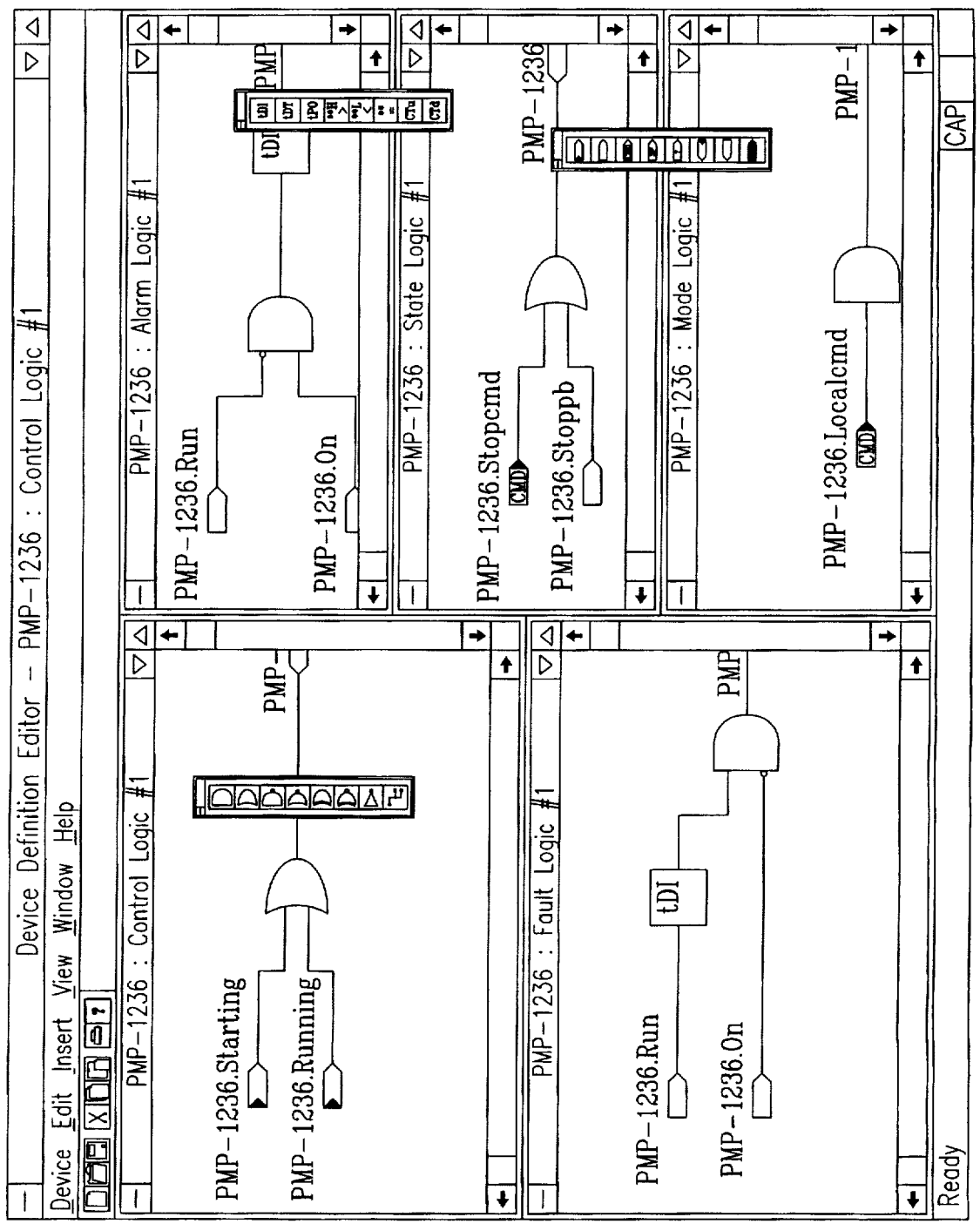

Like the device diagram editor, the device definition editor can be customized. In FIG. 48, the user has selected and undocked the toolbars. Then, the user horizontally tiles the five windows of logic using the Window menu. This arrangement more clearly shows the five categories of logic available to the user for the pump device. For a UCOS discrete device—and for a UCOS discrete device template—the user can define multiple pages of control logic, alarm logic, state logic, mode logic, and fault logic as shown in the windows of FIG. 48.

The logic page shown in the control logic window is titled "Control Logic #1". This is because the page is the first of the 32 pages of control logic which may be defined for this pump discrete device. The other types of logic—fault, alarm, state, and mode—can each have up to 16 pages of logic defined.

Note in FIG. 48 that the device definition editor is specifically titled for Pump-1236 and that each of the logic windows is titled Pump-1236. As the user examines the logic contained in each of the windows, the pre-defined UCOS tags appear as a part of the logic. For example, the fault logic window contains the tag "PMP-1236.Run." This is a complete UCOS tag name consisting of three segments: PMP is the Device Type, 1236 is the Device ID, and Run is the Extension. This shows how tag names can be unique throughout the entire system, yet also can be easily copied from a discrete device template to an instantiated discrete device on a device diagram. UCOS replaces the first two parts of the tag name with an individualized name when the device is instantiated.

All the tags that appear in the editor have been renamed from Pump-1.extension to PMP-1236.extension. The extensions remained the same during the instantiation that placed the pump device in the device diagram and renamed the first two parts of the tag. However, now the user can change or modify any of these tag names. These changes will apply only to the instantiated pump device, PMP-1236.

Figure 49:
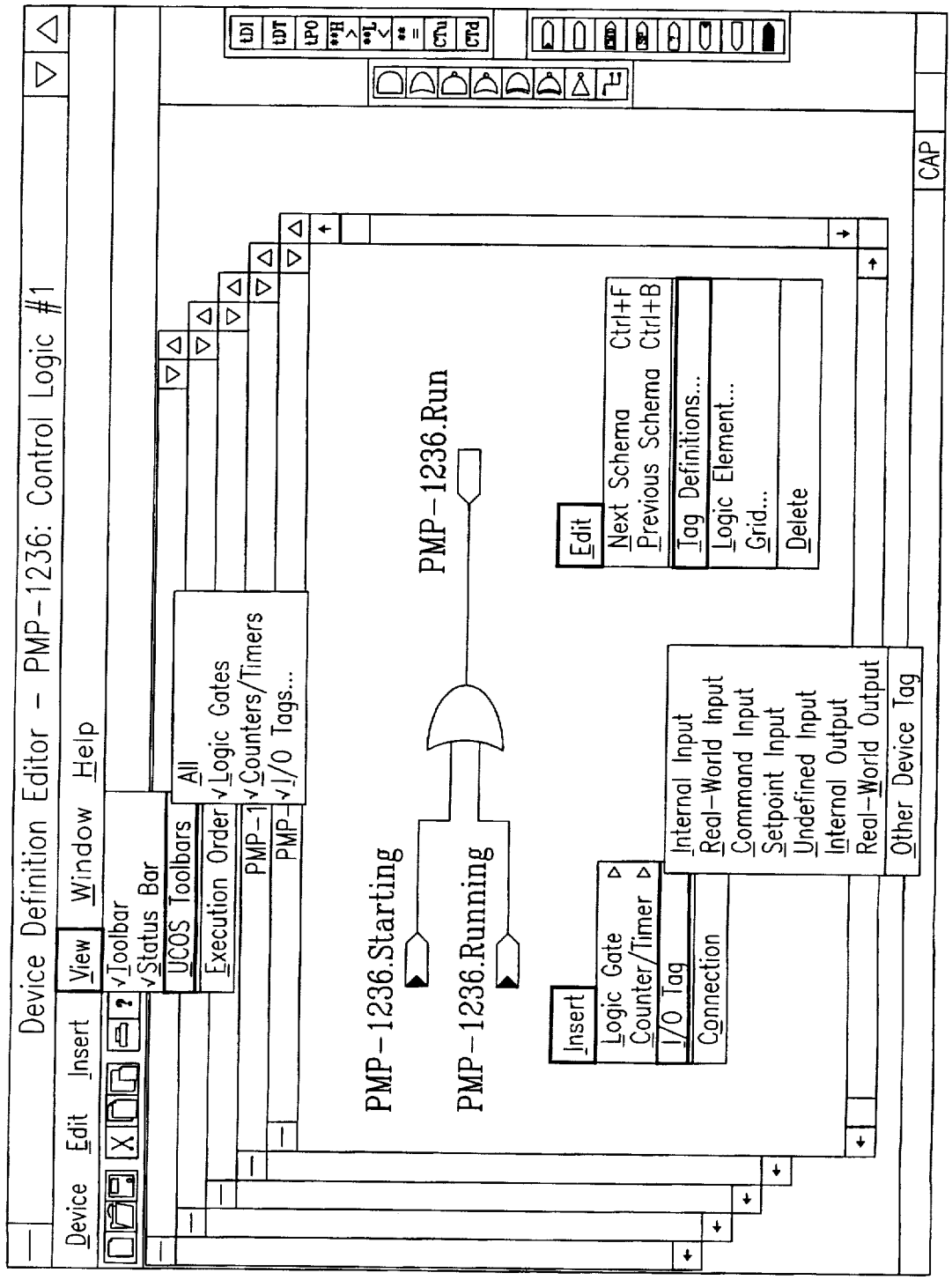

FIG. 49 shows the key pull-down menus available from the editor. Note that the three toolbars in the editor correspond to the three submenus on the Insert menu. For example, the tag toolbar displays tag symbols which appear as labels with arrow shapes at the ends to indicate the direction of logic flow. When the user places the cursor on the bottom most tag symbol, its "Help" definition appears. This symbol corresponds to the menu selection Insert I/O Tag "Other Device Tag". Note that the "Other Device Tag" symbol allows the user to incorporate tags from other device's into this device's logic schemes. This allows the user to configure control interlocking.

Figure 50:
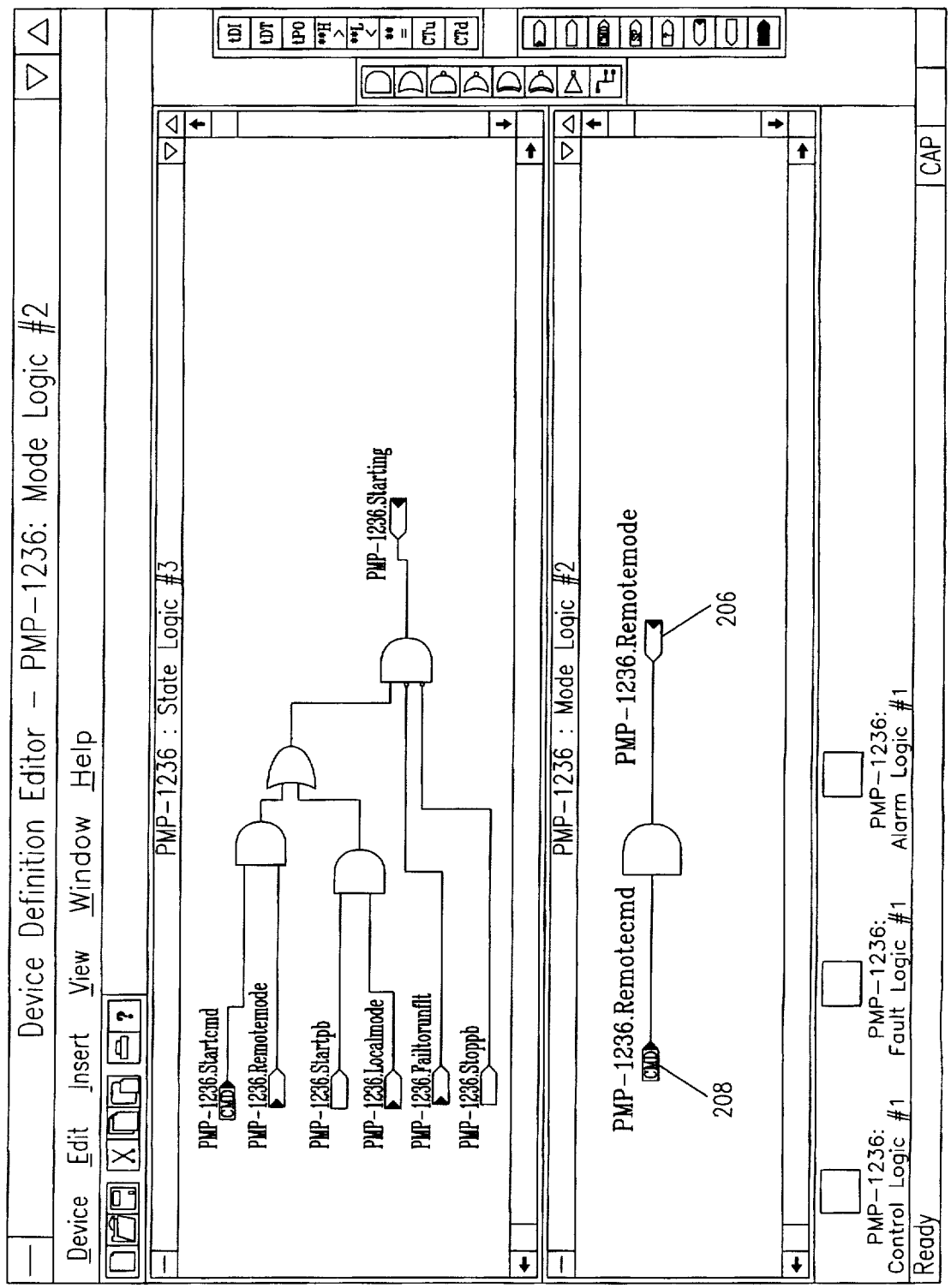

FIG. 50 shows some logic for the instantiated pump device, PMP-1236. The logic will be modified using the device definition editor. The user's modification of the pump device will be very simple: adding a third page of mode logic. The new mode logic will closely resemble the logic shown on the 2nd page. As the user returns to the 2nd page of mode logic, it can be seen that only two types of UCOS tag symbols and a single "And" gate are used. The "And" gate is placed between the two tags simply to provide potential linkage points for expanded logic. Here, the logic is simply passing the remote command to the remote mode tag.

The remote mode tag 206 is an "internal out" tag. This is reflected in the appearance of its tag symbol, with the solid arrow-shape on the right end of the tag symbol. The remote command tag 208 on the left side of the page is a "one-shot" tag. This logic simply puts the device into remote mode by reacting to the remote command which an operator sends from the run-time system.

Figure 51:
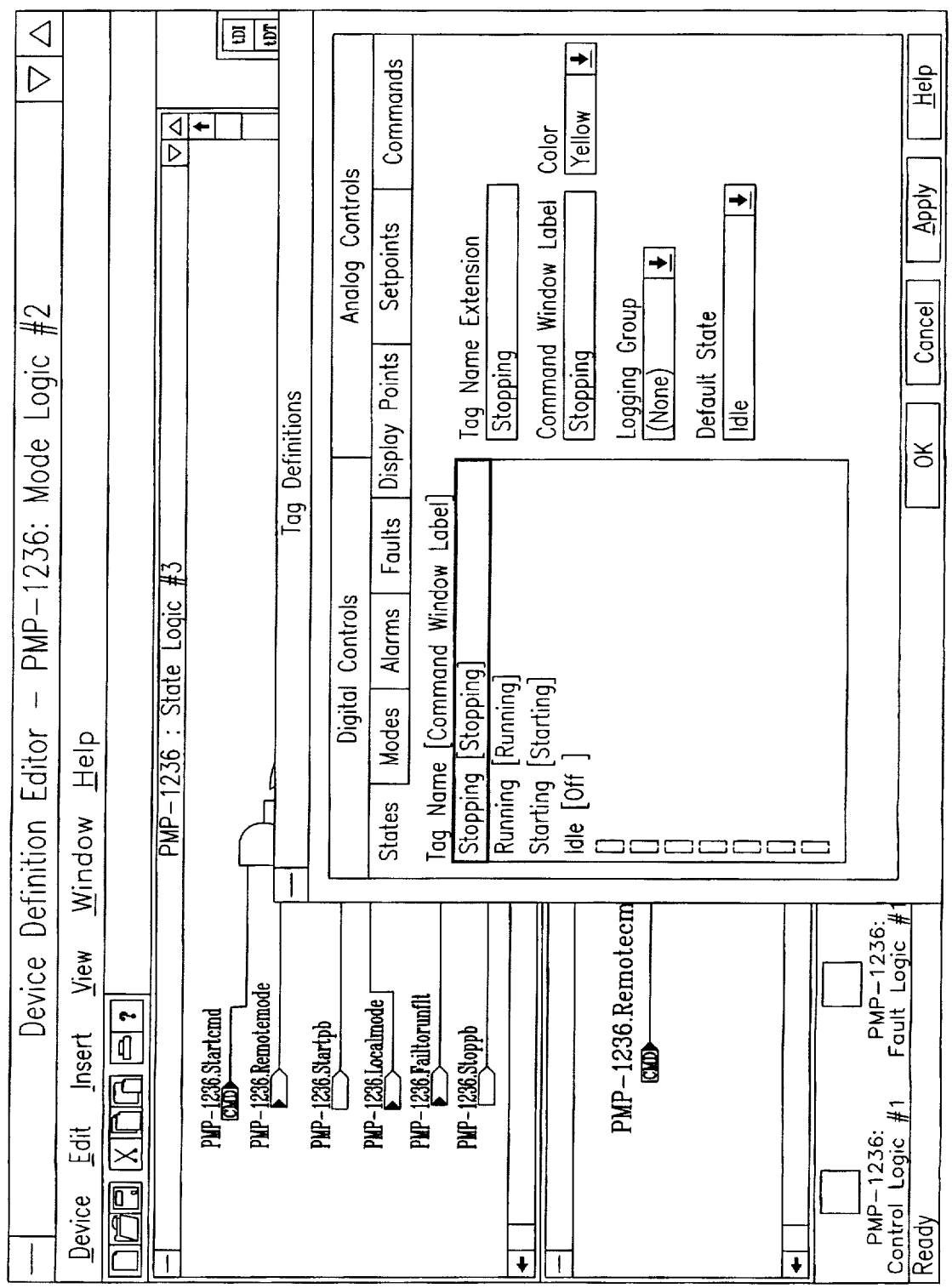

The user clicks the Edit pull-down menu and selects tag definitions which displays the tag definitions window illustrated in FIG. 51. The tag definitions window has nine folders, each of which provides a list of tags for the device. The lists are organized to correspond to the five types of logic: states, modes, alarms, faults, and controls. These tags are associated with the operation of the discrete device. There are, however, additional folders for defining command tags, setpoint tags, and display points. These tags also affect the run-time appearance and behavior of the command window associated with the discrete device.

Now, the user selects one of the mode tags from the list in the folder. In the dialog, the user can enter or change logging definitions for the tag. The user can also enter a definition in the command window label field. This field allows the user to define the text that will appear on a button in the device's command window.

Figure 52:
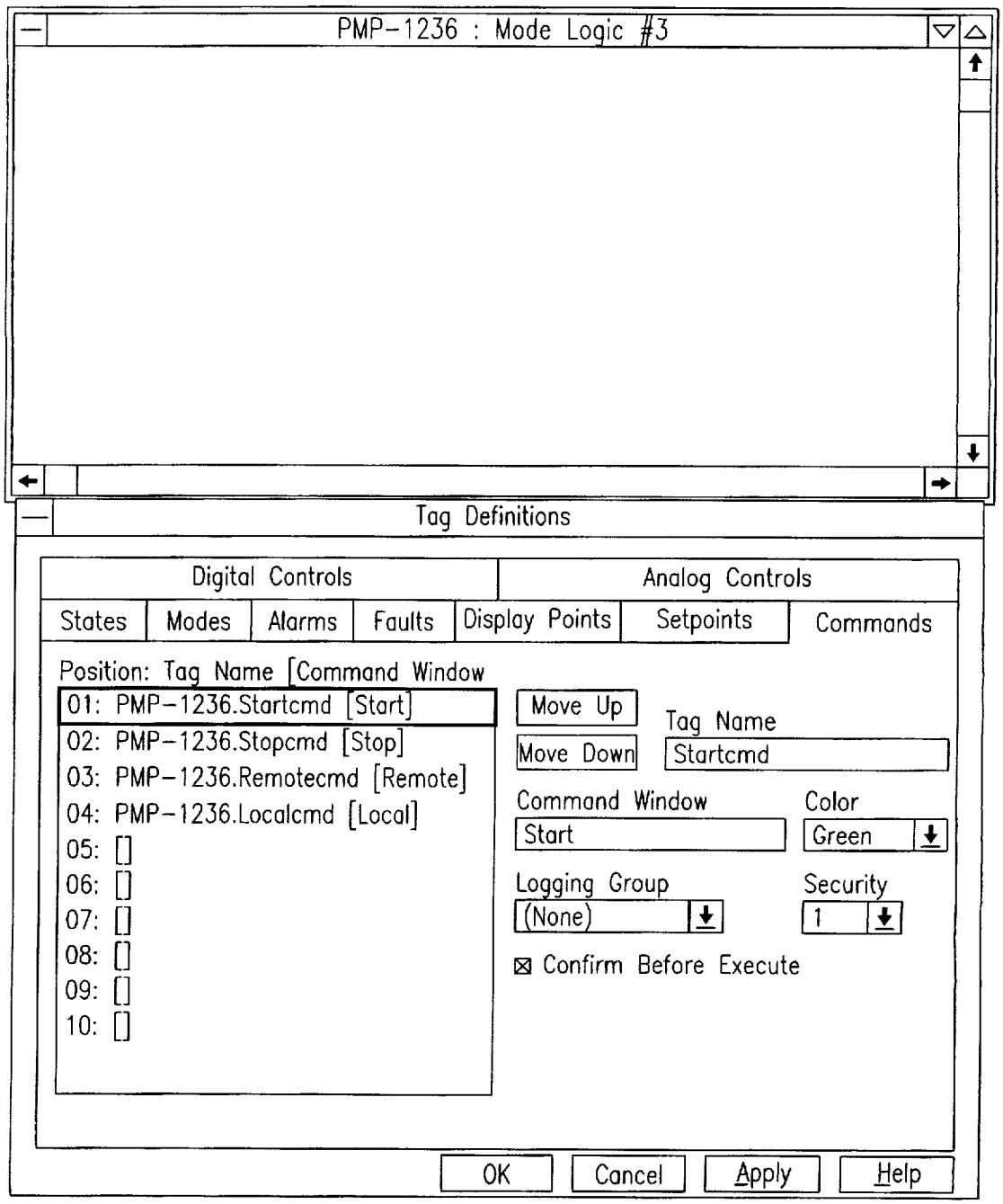

As shown in FIG. 52, the third page of mode logic is empty. The user selects the commands folder. There are currently four commands defined for this device. The user highlights the first tag, the start command. The corresponding command window field displays Start, and Start is shown in brackets to the right of the start command tag name in the list. The four command buttons shown in the pump's command window at run-time are labeled Stop, Start, Remote, and Local. These labels are generated from the definitions entered in the commands folder and correspond to the command window field whose entries are displayed in brackets to the right of each tag name.

As the user defines the third page of mode logic for this pump device, it will be seen that adding a command tag to the device will change the appearance of the pump's command window at run-time. The user closes the folder and begins to insert the new mode logic. The user clicks on the command tag symbol on the command toolbar. This retrieves the tag definitions window with the commands folder automatically selected as shown in FIG. 52.

Figure 53:
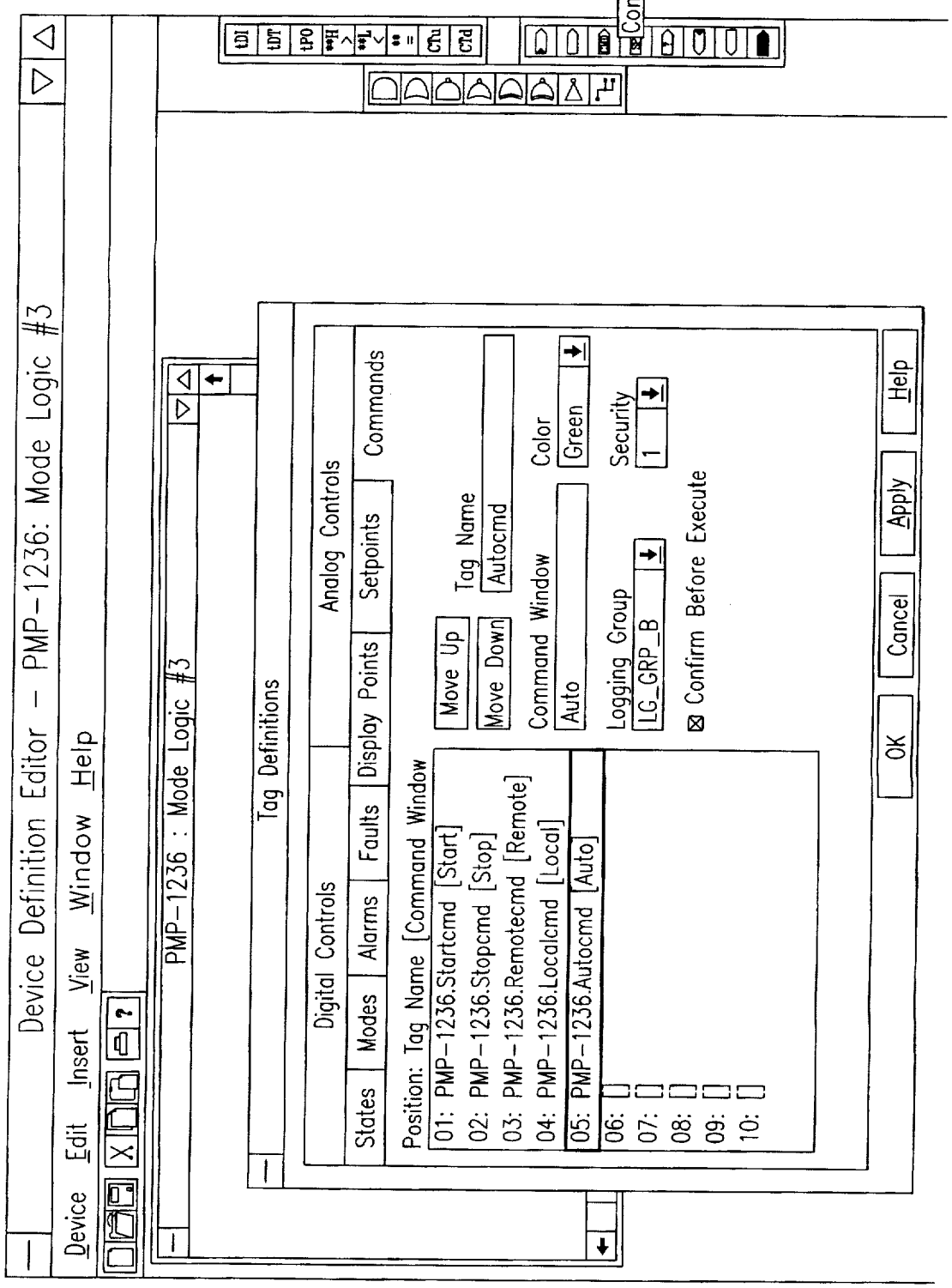
Figure 54:
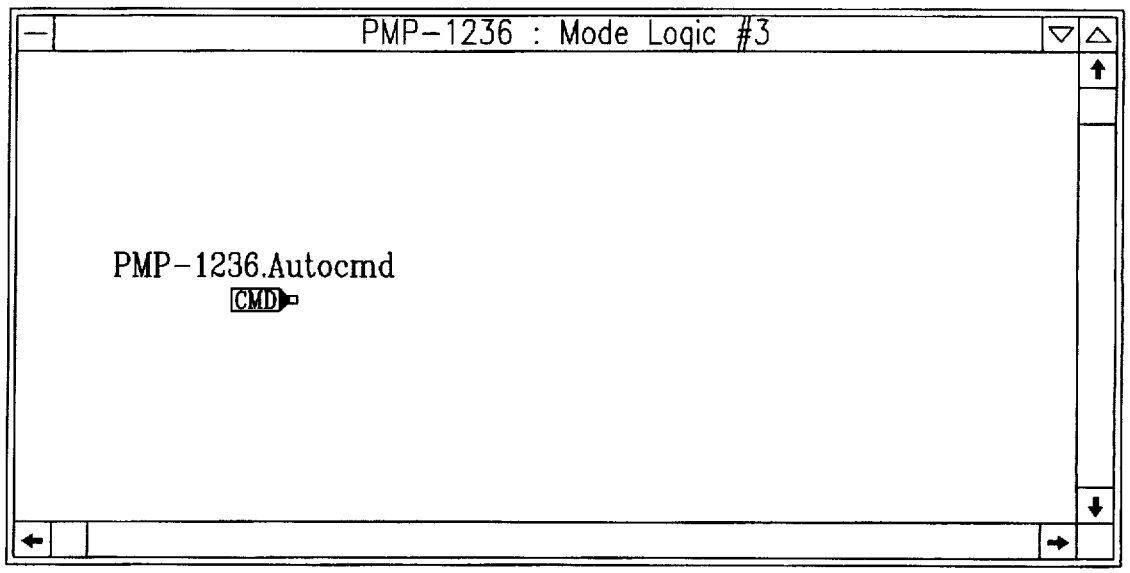

The user enters a new command tag and names it "Autocmd". The user also provides the command a label of "Auto" which appears in brackets to the right of the tag name as shown in FIG. 53. When the user clicks OK in the tag definitions folder, the tag symbol is attached to the cursor and the user clicks to place it in the drawing area for the page as shown in FIG. 54.

Figure 55:
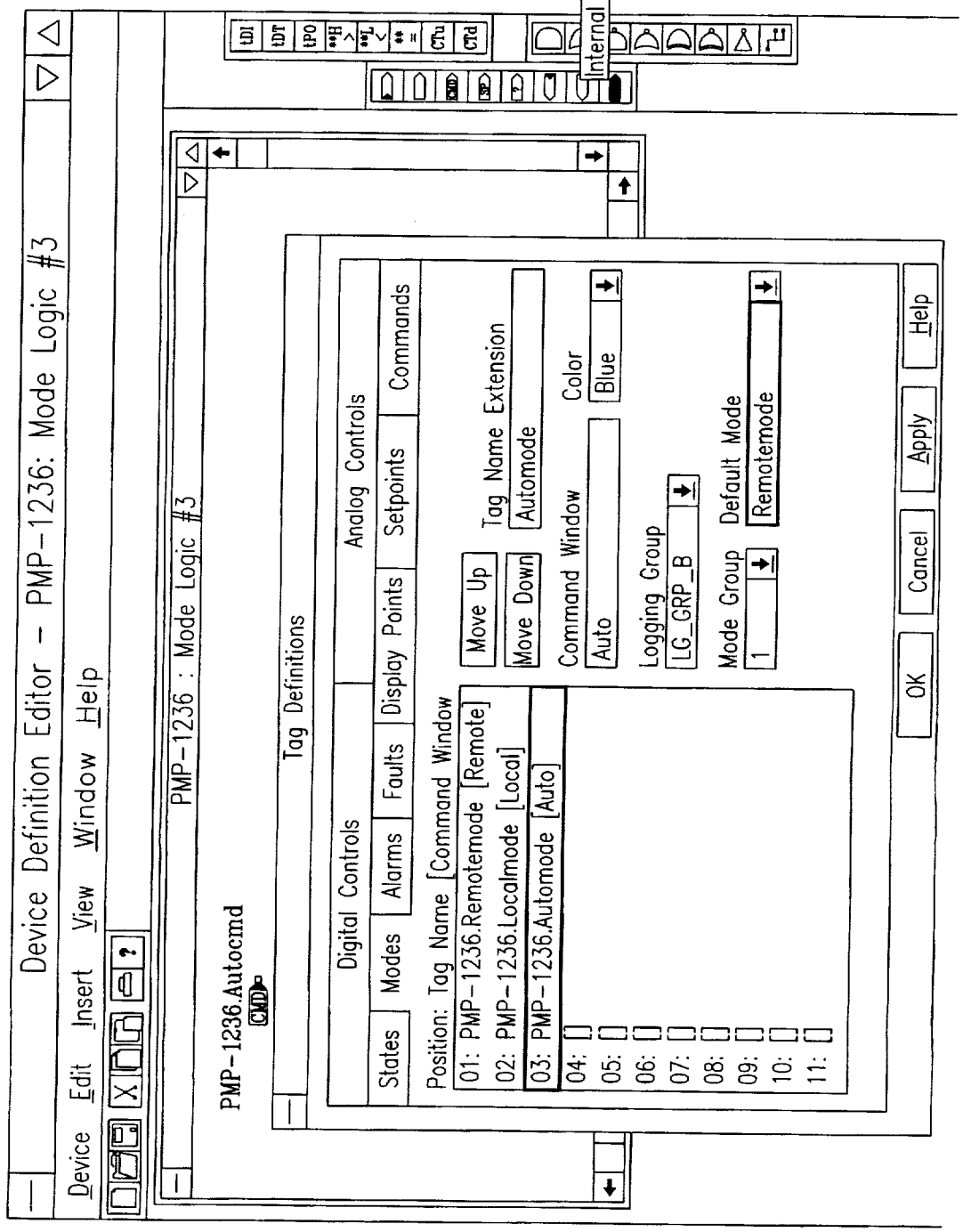
Figure 56:
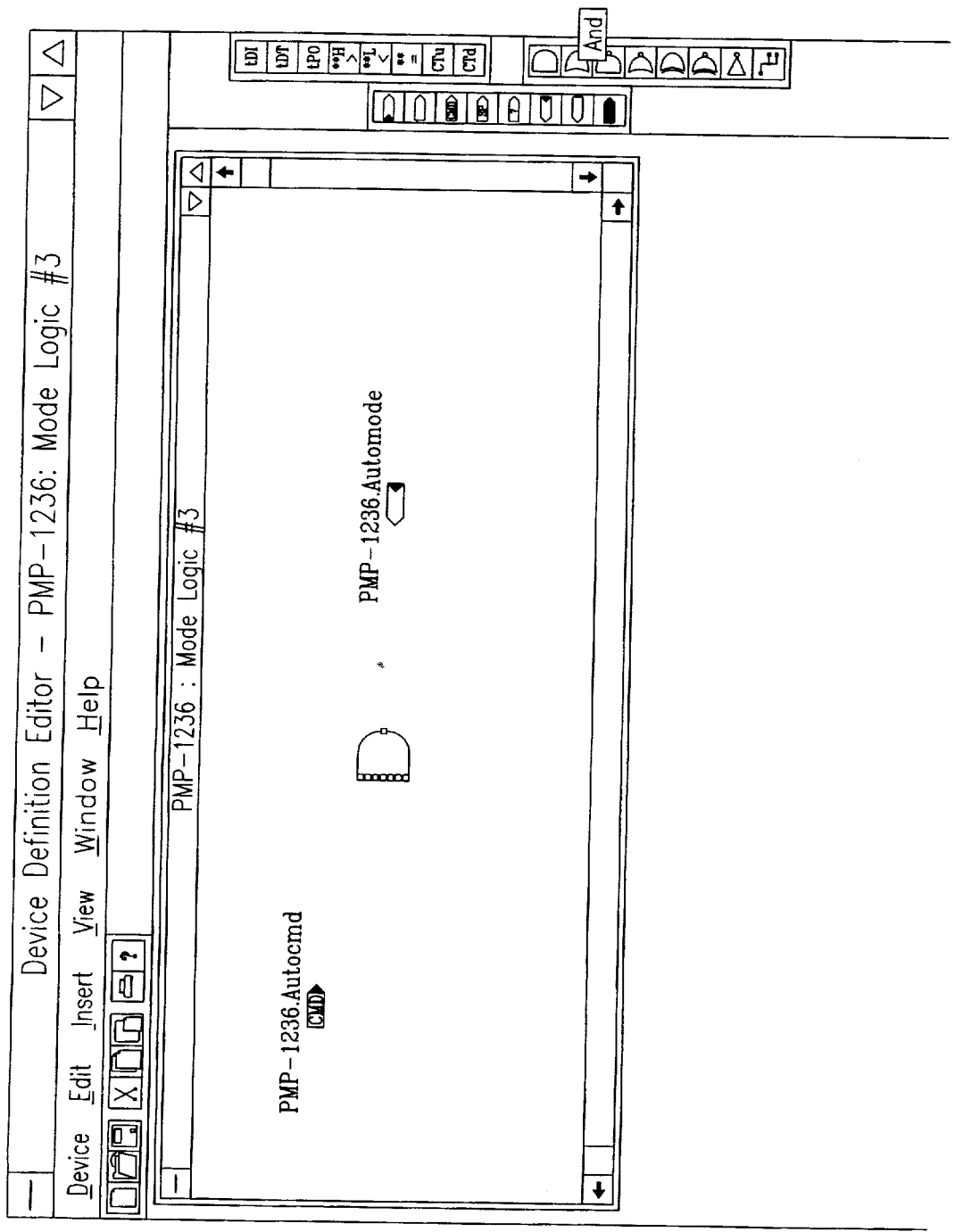

Next, in FIG. 55, the user performs a similar operation to placing the mode output tag in the logic page. The user clicks on the internal out tag symbol. The tag definition dialog appears with the modes folder selected because the user is currently working on a page of mode logic. The user clicks on the third, empty row in the tag list and enters the information necessary to add a tag to this device. The tag the user adds is "PMP-1236.Automode" with the label of "Auto." The user clicks OK and places the tag in the diagram. After placing the tag onto the diagram, the user selects an "And" gate and places it in the diagram as depicted in FIG. 56.

Figure 57:
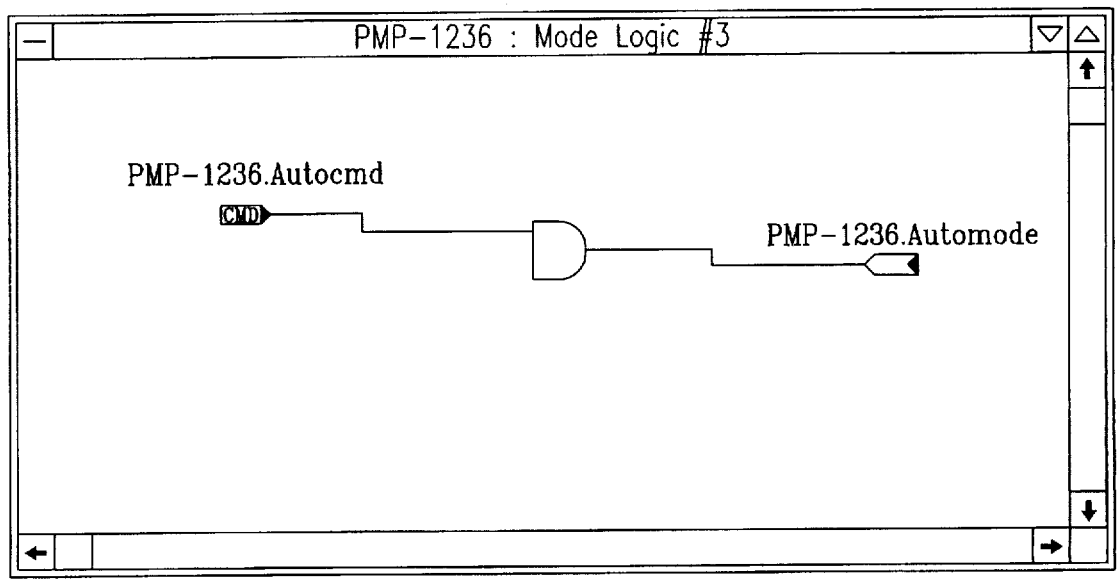

Finally, in FIG. 57, the user connects the logic elements. The device definitions editor provides two modes similar to the two modes in the device diagram editor, the insert mode and the connection mode. The user has selected the connection mode and uses the cursor to draw lines between the connectable points on the tags and on the logic gate. The user then saves the modified logic and exits the device definition editor.

This completes the user's modification of the pump discrete device. The user now goes through the steps of generating and downloading the modified run-time system. The user's modification of the device logic to incorporate a new mode was not complete. For example, this device's mode logic is designed to affect its state logic. A new device Auto Mode should also be reflected in corresponding state logic definitions. For this example, the user made only the most obvious of the necessary modifications, which can be observed in the run-time system.

For the next configuration activity, the user creates a group display of command windows. Then, the user generates the run-time system that has just been created in order to view the display.

To configure a group display, the user selects group displays from the pull-down Configure menu on the main UCOS Project Configuration window. The configuration dialog appears. The user clicks on the New button, and then uses the edit pull-down menu to add devices to the group display.

The "Add Device" dialog appears listing three devices that were placed on the device diagram for this project. These are the devices whose logic will execute in the FCU at run-time and which are associated with a command window for use by an operator.

It should be noted that the static devices the user placed on the diagram are not listed. They have no associated logic which executes in the FCU. However, the operation of transmitters, controllers, and discrete devices can be monitored and adjusted by operators from command windows during run-time. The three devices of these types the user configured for this project appear in the list.

Figure 58:
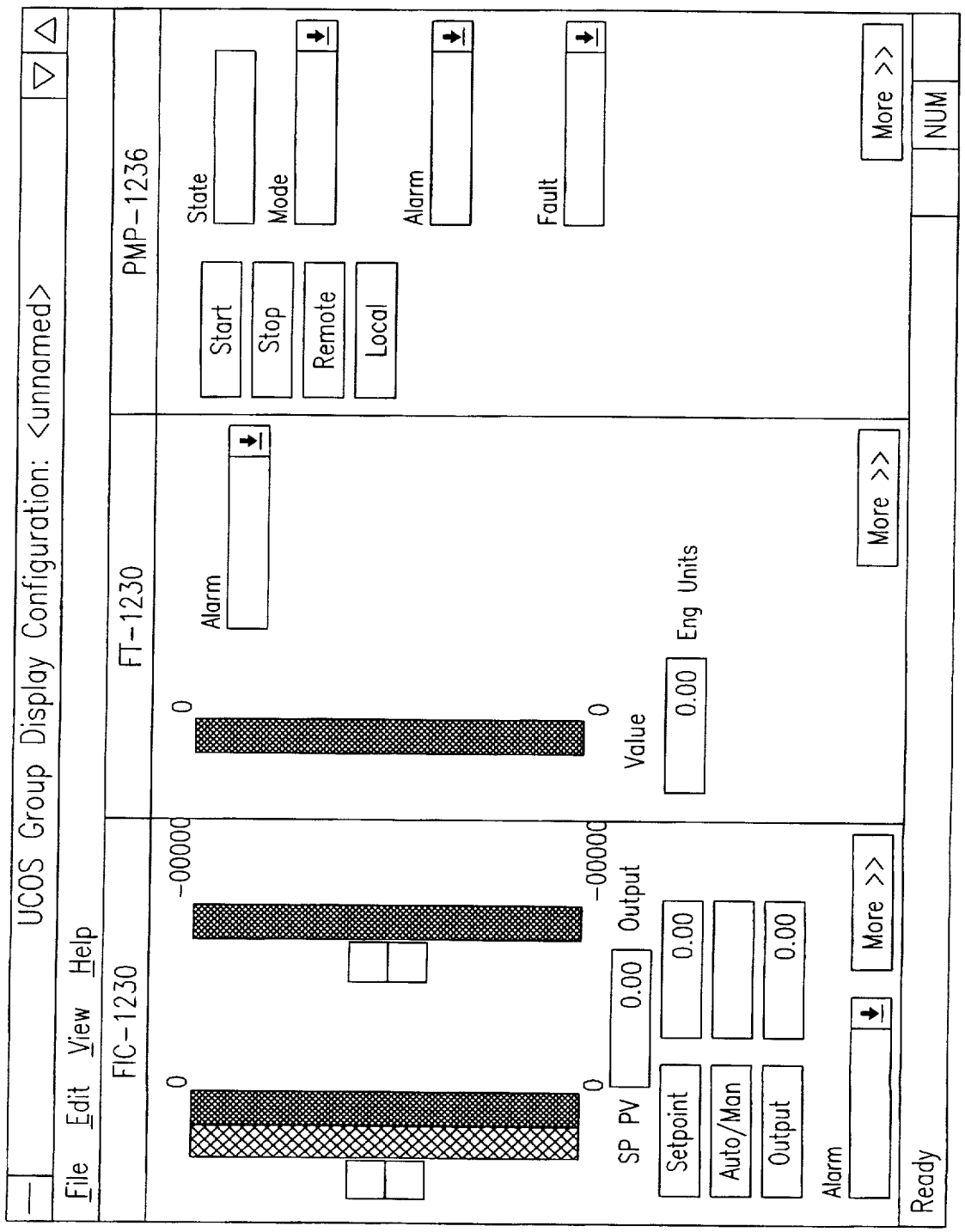
FIG. 58 is a screen capture showing the group display configuration for the example control application shown in FIGS. 26–46.

When the user double clicks on the controller device name FIC-1230, the group display configuration window places the command window for the controller into the group display. Next, the user selects the transmitter and the pump device to be included in the group display shown in FIG. 58. The user can then name the group. This completes the group display definition and the user exits the dialog.

The user is now ready to generate the configured run-time system and download it to the engineering workstation node. The generate run-time step is performed from the Configure menu. When the run-time system has been generated, the user downloads it to the engineering workstation node. This is the only workstation that has been configured for this example project. If operator workstations had been configured, the user could also download the system to one or more of those nodes.

To download the application the user double clicks on the Engineering Workstation symbol in the UCOS Project Configuration window. The workstation dialog appears and the user selects the Download button. Note that in creating a real project, the user would also have to download the configured system to the FCU which executes the control logic at run-time. For this example project, an actual FCU is not used.

When the system has been generated and downloaded, the user is ready to execute the run-time application. To do this, the user goes to the Main UCOS Program Group and double clicks on the Run-Time Environment icon. A dialog appears. In this dialog the user loads the new project WEIR1.

The run-time window shows that it is running the WEIR1 project in its title bar. The run-time menus appear across the top of the screen. Note that since the user has not yet configured a display screen for the project, the only means of monitoring and controlling the project devices is through the group display that was just configured.

To access the group display, the user selects Group Display from the Tools menu. A dialog appears from which the user selects the previously configured group display shown in FIG. 58. From this display, an operator can monitor and control all the devices in that group.

Next, returning to the EWS configuration environment, a graphic screen for the project is configured. The graphic screen will show the devices the user has placed on the device diagram for the project. The devices that can be shown are those that have a graphic component associated with their device object. This graphic becomes available for placement on a project screen once an individual device created from the template has been inserted in a device diagram.

Figure 59:
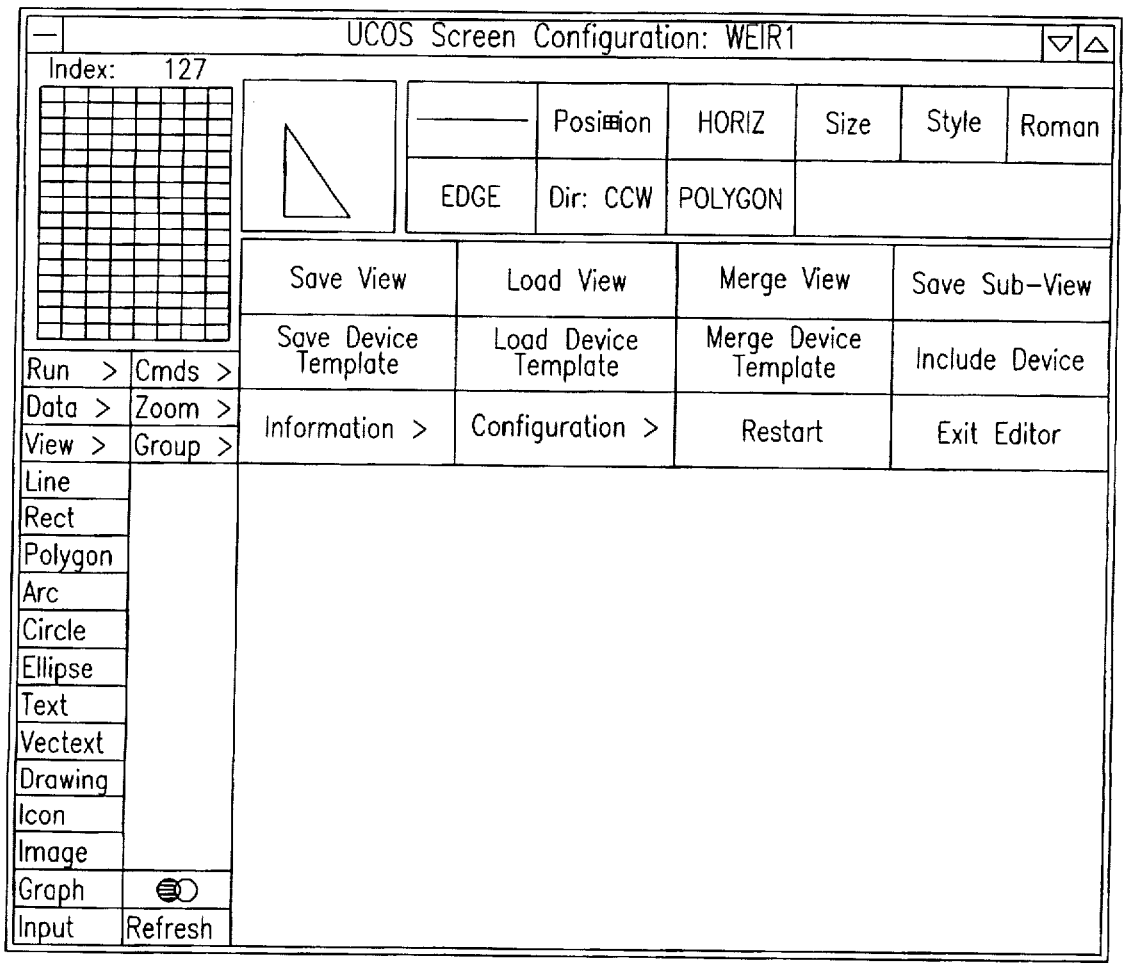
FIGS. 59–62 are screen captures of the graphic screen configuration for the example control application shown in FIGS. 26–46.
Figure 60:
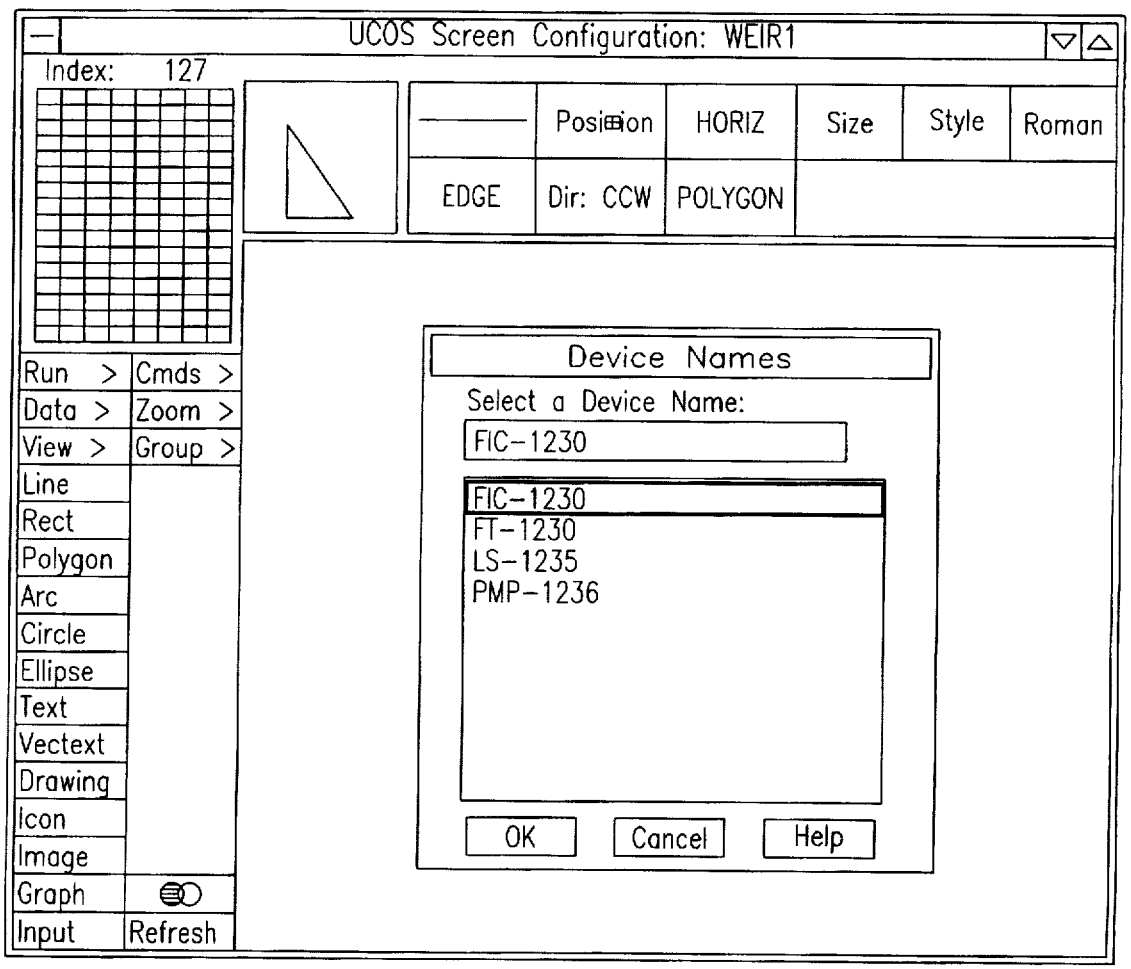

The user starts the screen configuration editor by clicking on Configure Screen from the Project Configuration Window. In the screen configuration window shown in FIG. 59, the user clicks on the Commands ("Cmds") button. The user then clicks on the "Include Device" button, and the device names dialog appears. As shown in FIG. 60, this dialog shows the four dynamic devices the user previously placed on the project's device diagram. The user selects a controller device for placement onto the graphics screen by highlighting it and clicking OK.

The graphical representation of the controller device will appear on the screen. This representation looks significantly different than the command window representation of the controller device. The graphical screen representation of a controller device provides only several key pieces of information. However, the user could customize this graphical representation. Both the instantiated device graphics symbol and the device symbol associated with the original device template can be customized by the user.

The CAD-like graphics editor provided by UCOS allows the graphical symbol of a device to look like just about anything the user desires. This is in contrast to the bitmap symbols for these devices which are used on device diagrams. These bitmap symbols are meant only to provide a non-dynamic representation of the device.

Figure 61:
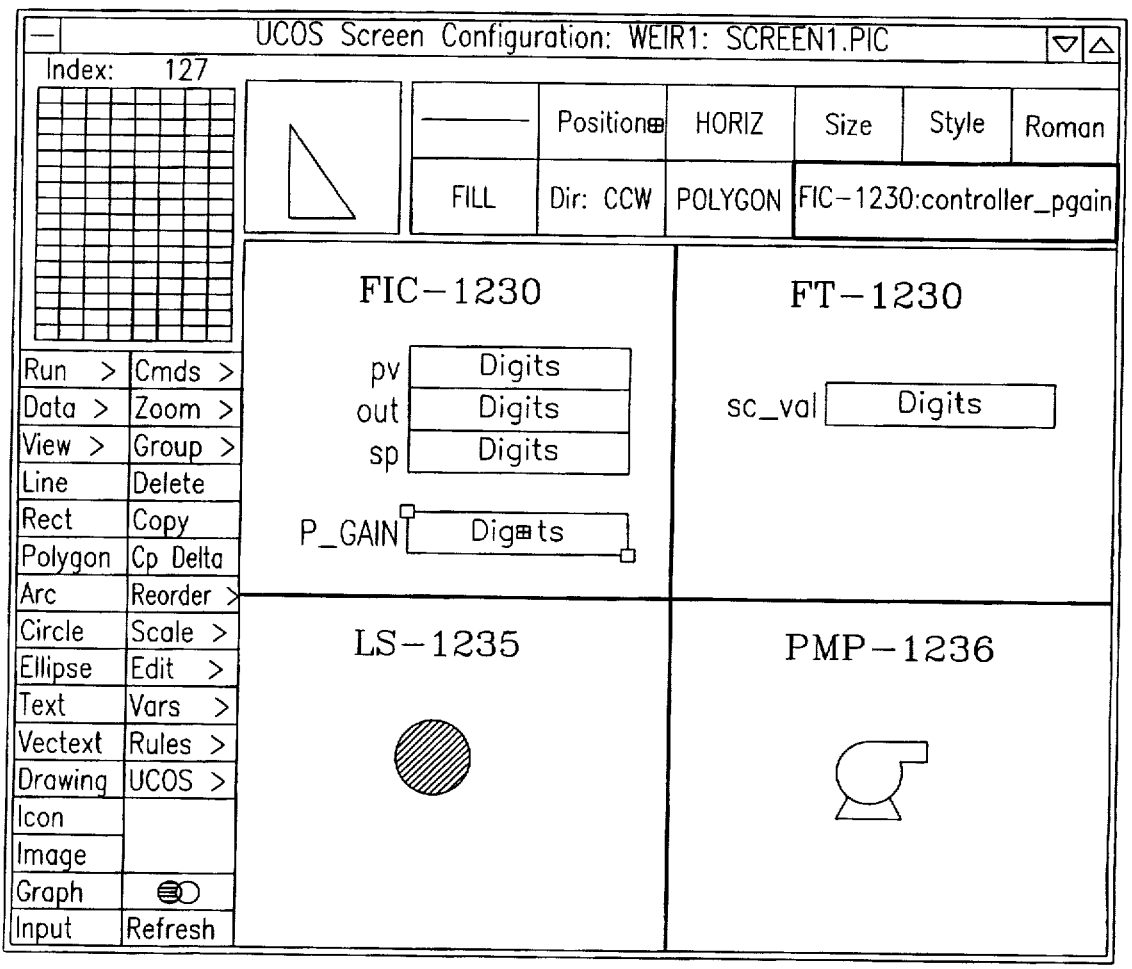

The user includes all the available project devices on the screen as shown in FIG. 61. The user also adds text labels to the devices. The editor includes standard CAD-type drawing shapes and functions. It also includes many types of real-time graphs that can help the operator interpret the data changes that are received from the FCU. Finally, it should be noted that the editor includes a variety of pre-drawn symbols and drawings that can enhance the user interface. The user can add custom symbols and drawings to the various library directories. The user can even incorporate bitmap files, such as an actual photographic image of a piece of equipment.

It should also be noted that including the UCOS devices on the screen has made all of their device tags or parameters available for use on the graphic screen even if the device graphic uses only a subset of the device's tags. The user can access these tags and tie them to real-time graphs or any object for which dynamics can be defined. These objects may then change color or shape or appear to move when the underlying data values change at run-time.

For each of the pre-defined UCOS device graphics, various color dynamics and color changes based on the state of the device have already been incorporated using the tags tied to the devices. This graphic screen behavior is instantiated from the symbol associated with the device template into the instantiated device for placement and use on the graphic screens.

Figure 62:
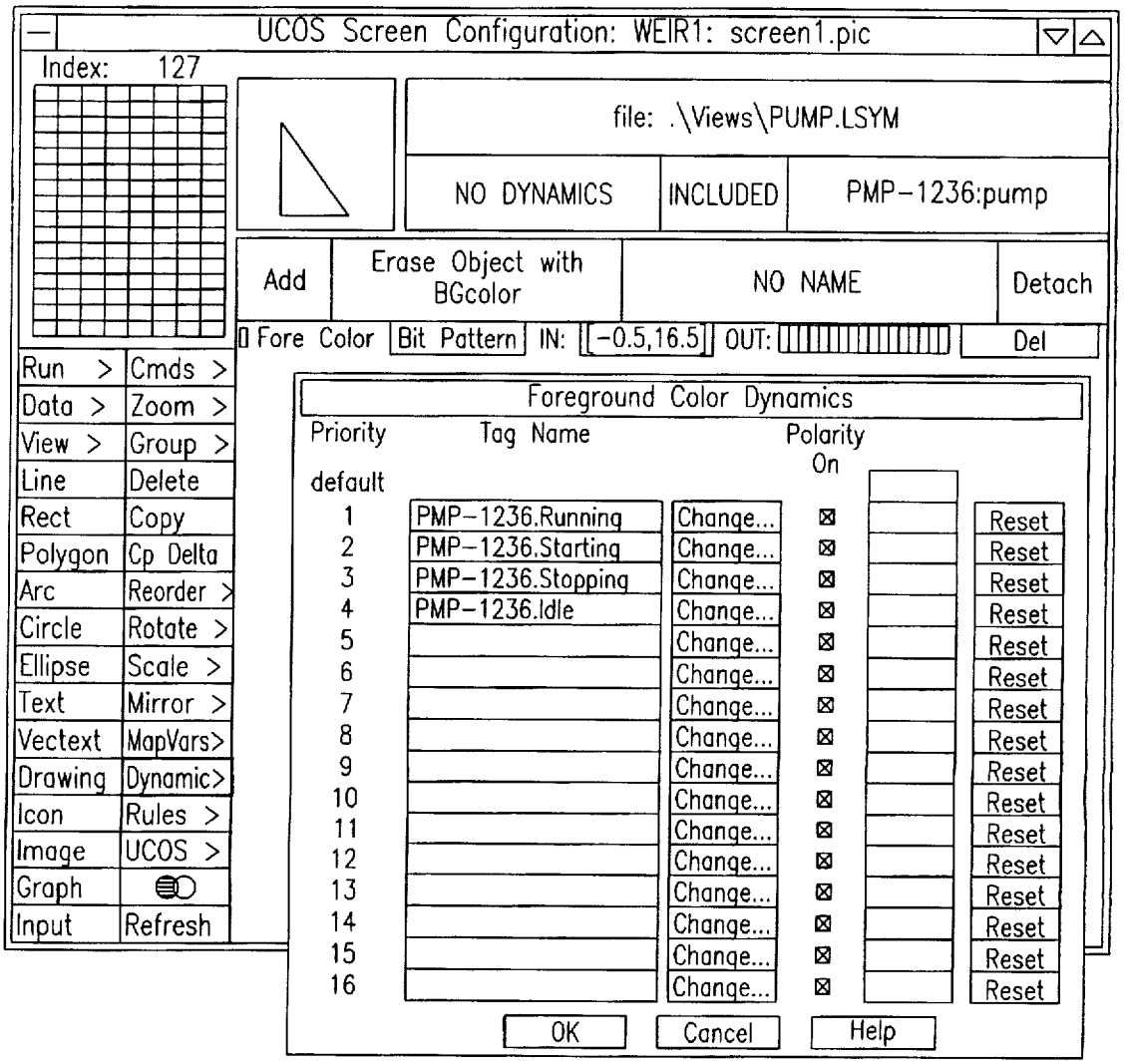

To illustrate how the dynamic behavior of a graphic is tied to a device, the user now selects the pump device and then selects the Dynamics button. Selecting the Dynamics button brings up a menu at the top of the drawing area as shown in FIG. 62. Clicking on the OUT: field that shows an array of colors brings up the foreground color dynamics dialog. As can be seen, some device tags have already been associated with foreground color changes. The foreground color dynamics determine the color of the pump symbol's white outline. The color will change when the device's point values change at run-time, for example from green to indicate "running" to red to indicate "stopped." The on/off state of the tag determines the color of the pump device. By clicking on a Change button next to an empty tag position, the user could add more tags that would determine additional, different color changes of the pump at run-time.

All the available device tags are listed in the dialog that appears when the user clicks a Change button.

Figure 63:
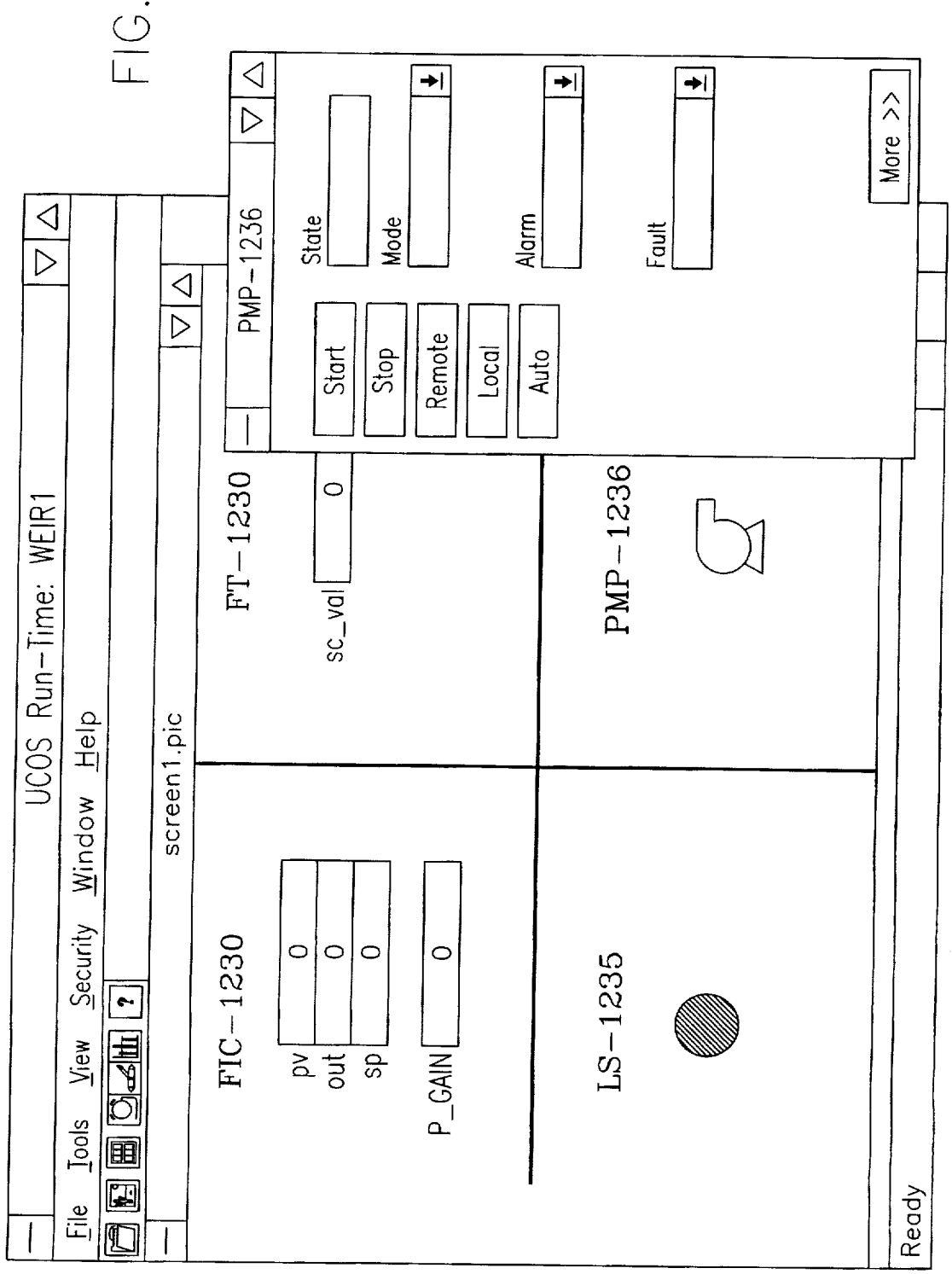
FIG. 63 is a run-time screen showing four devices placed on a graphic screen and showing a command window.

FIG. 63 also shows the modifications to the pump symbol made in the device definition editor. As can be seen, the Auto command button is now available.

Now the user has completed an initial version of the project device diagram, configured a group display, and created a graphic screen. The result is a run-time system that lets the operator monitor and control the devices that were placed first on the device diagram, and then on the graphic screen.

The last major component of the UCOS configuration subsystem to be examined is the template definition editor. This is the editor that allows users to make changes to existing UCOS device templates, or create completely new ones.

Figure 64:
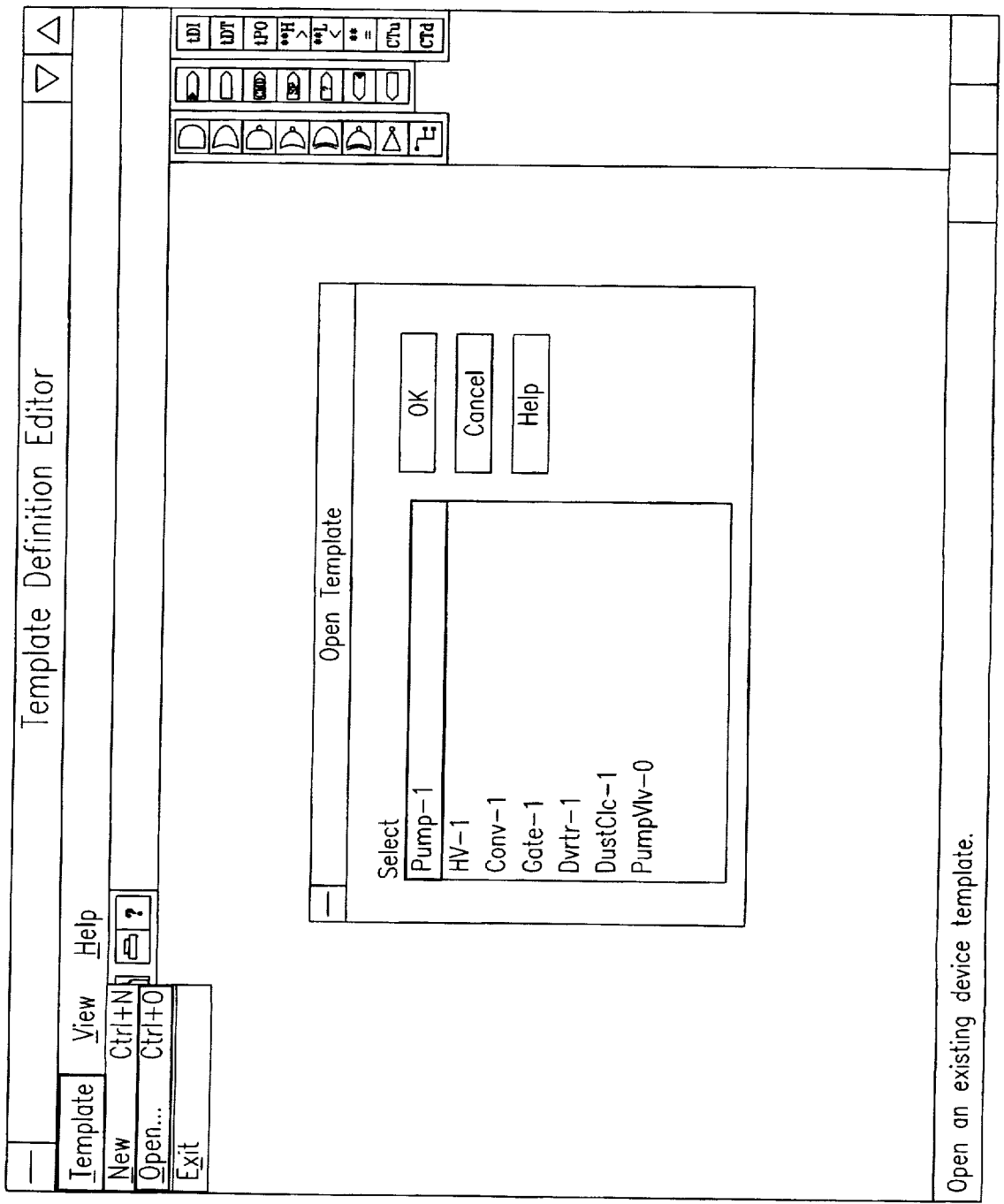
FIGS. 64–68 illustrate use of the device template definition editor of the present invention to modify a discrete device template used in connection with the example control application shown in FIGS. 26–46.

The user accesses the template definition editor by selecting it from the Configure menu on the Project Configuration main window. The user then opens the template for Pump-1 as shown in FIG. 64. This is the template from which the user created the instantiated pump device for our example WEIR1 project.

The template definition editor provides essentially equivalent functionality to the device definition editor with a few small differences. For example, in FIG. 65, notice that the tag toolbar does not have the darkened tag symbol at the bottom to access tags from other devices. This capability is not required in the template definition editor, which pertains to generic devices not yet associated with any project-specific devices. Fundamentally, the template definition editor and the device definition editor are designed to work together and augment each other. Note that the template definition editor provides the same types of logic as the device definition editor.

Figure 65:
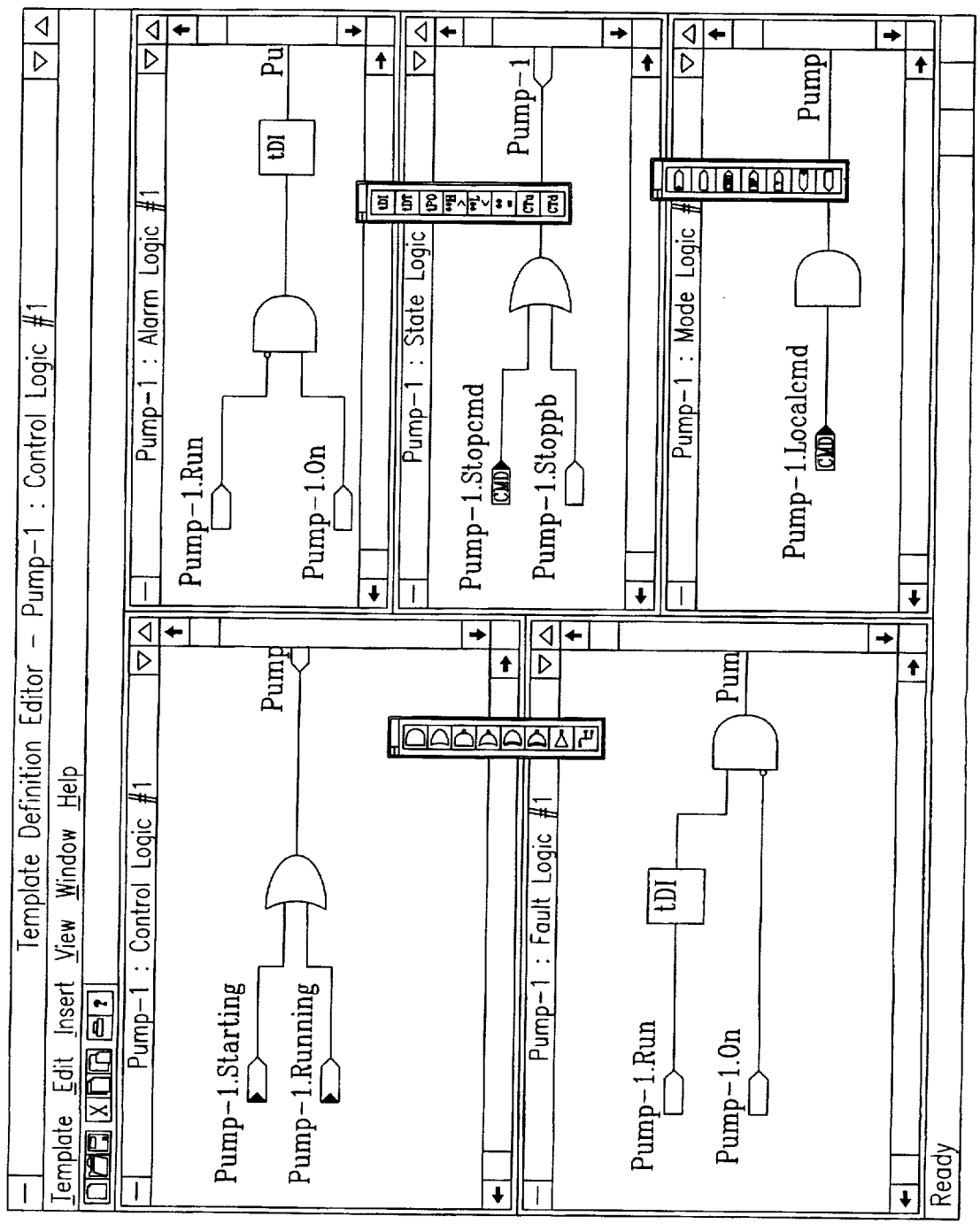

Perhaps the most significant difference is that all of the tags in the template editor shown in FIG. 65 are identified with a template Device Type and ID. However, the tag name extensions are transferred from the template to the specific project device and this can be seen when a device is inserted in a device diagram.

Figure 66:
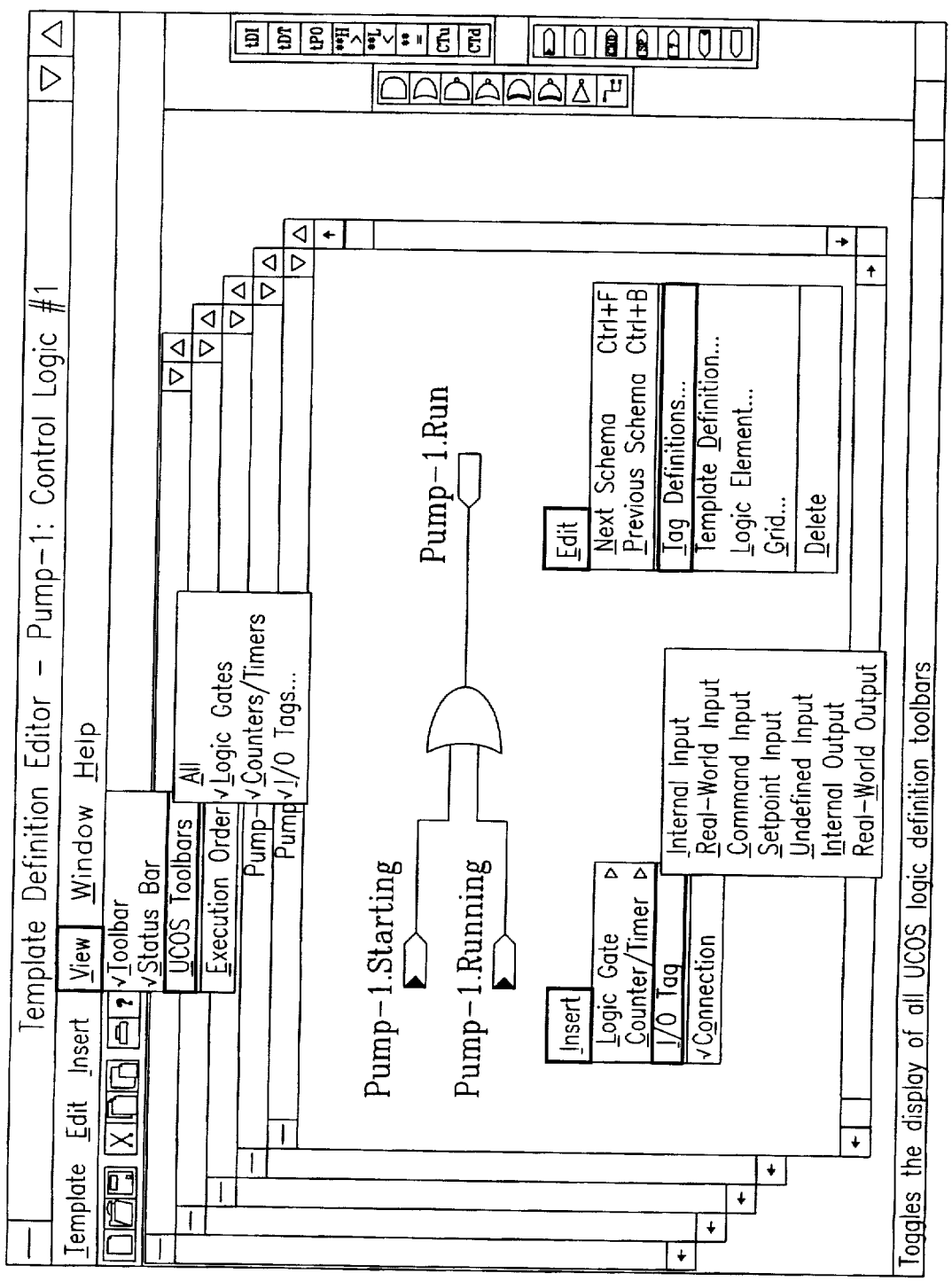

In FIG. 66, the key menus are pulled down to show that they resemble the menus in the device definition editor.

To illustrate how templates work, the Pump-1 template will be modified. The modification will be similar to the earlier modification of the instantiated pump device PMP-1236 using the Device definition editor.

In the case of the device PMP-1236, the user added an auto mode. For this template, a manual mode will be added. For all future pump devices instantiated from this template, a command will place the device in manual mode and some mode logic will reflect this condition.

Figure 67:
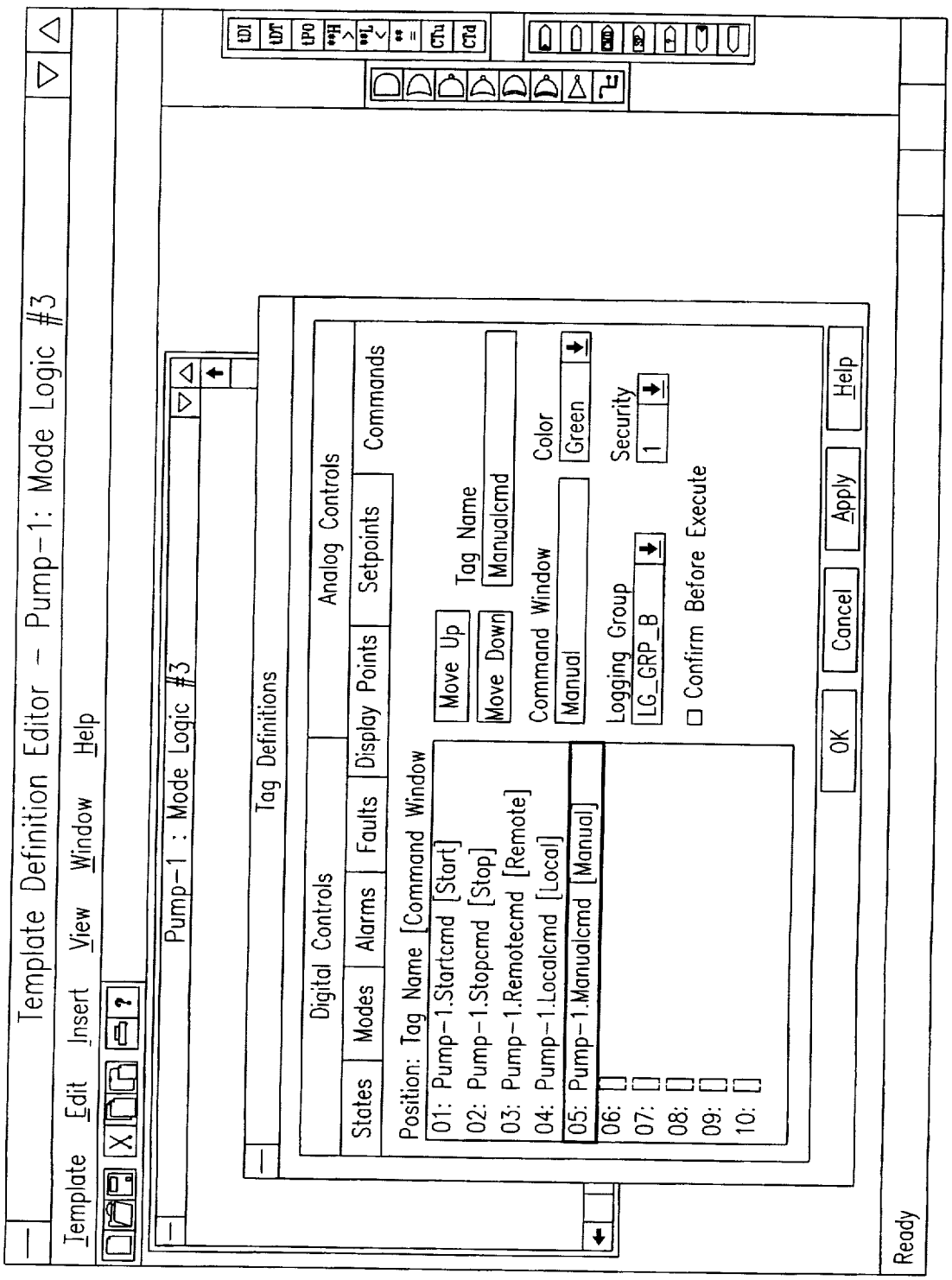
Figure 68:
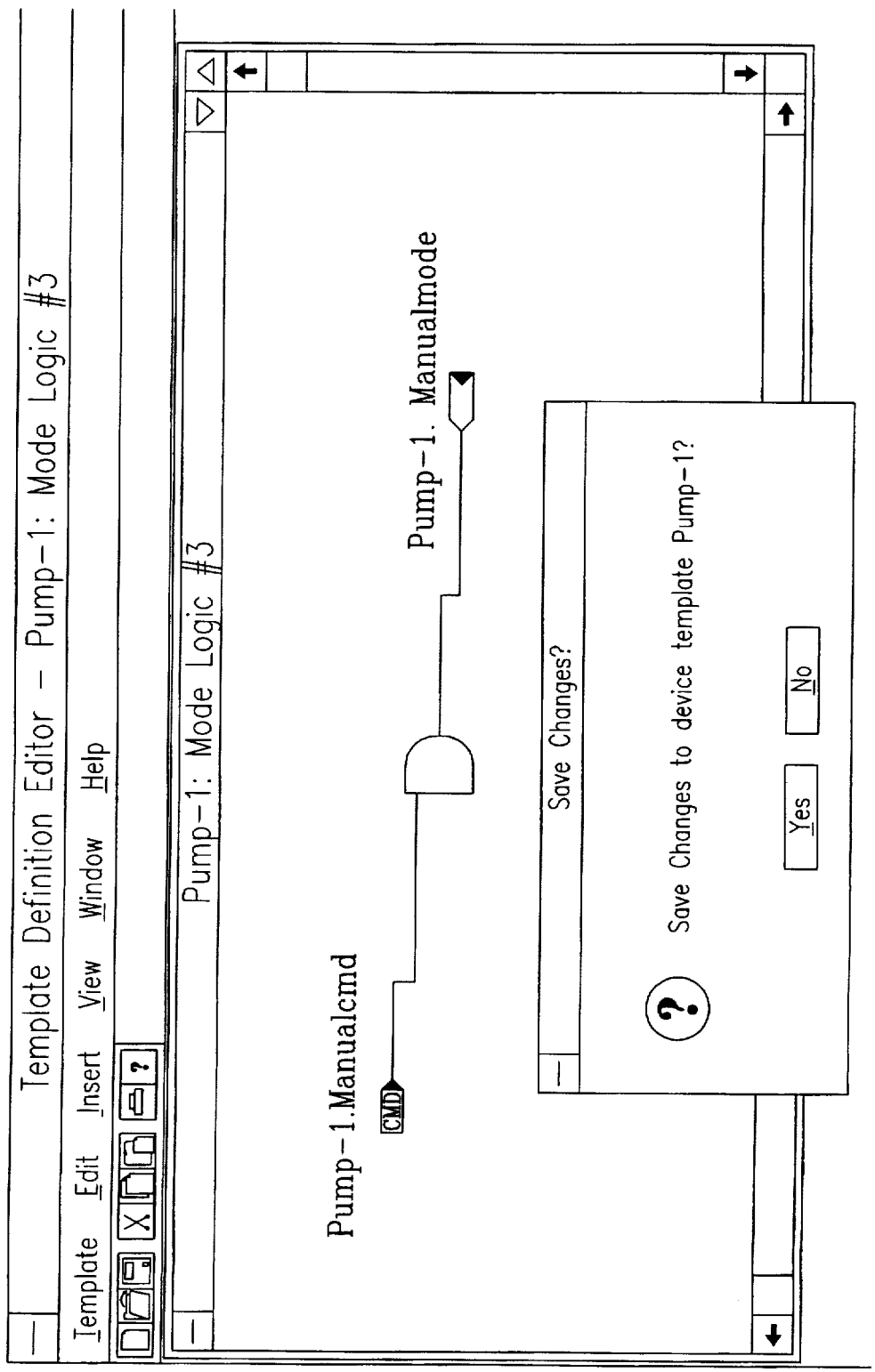

To implement this change, the user first defines a manual mode command for the pump as shown in FIG. 67. After defining the manual command tag and placing it in the diagram, the user proceeds to define and place the manual mode output tag. The user then inserts an "And" gate and makes the connections between the logic elements as depicted in FIG. 68. Normally, the new mode "Manual" would be used to feed subsequent logic, e.g., state logic, in conformance with the UCOS structured approach to programming a device. However, for expediency with this example project, the user will not implement these additional logic changes which would normally be performed to actually control the device.

Now, the Pump-1 template is modified and any devices instantiated from it in the future will reflect the change. Note that these changes do not affect in any way the device PMP-1236 which the user instantiated from the unmodified template.

Figure 69:
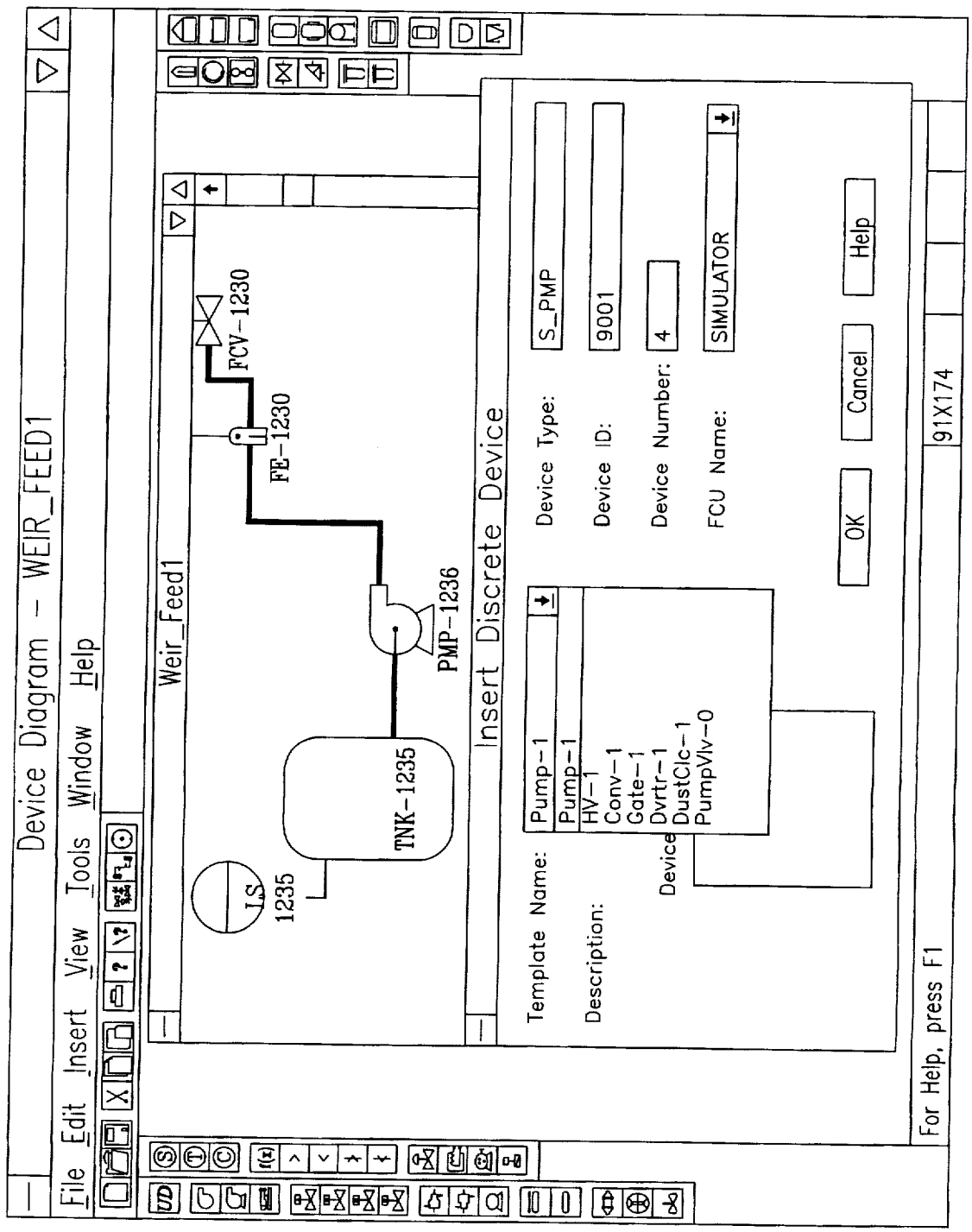
FIG. 69 shows the insertion of a new discrete device following modification of the corresponding device template as illustrated in FIGS. 64–68.

To show the effect of changing the Pump-1 template, the user goes back to the device diagram for the WEIR control system and inserts a new discrete device as seen in FIG. 69. The user places a secondary pump in parallel with the original pump. The user gives the new discrete device a Device Type of S_PMP and a Device ID of 9001, and selects the FCU Simulator in which to execute its logic. After clicking on OK, the user places the pump onto the picture and makes the mechanical connection. The modified device diagram is shown in FIG. 3.

The modified device diagram shows discrete device PMP-1236 which was instantiated from the original version of the template. The user then modified the device PMP-1236 to give it an auto mode. The second discrete device, S_PMP-9001 was instantiated from the new version of the Pump-1 template. The new discrete device, the secondary pump, therefore contains the manual mode that was added to the template.

To illustrate the differences between these devices at run-time the user will create a second graphic screen for the project. This screen will be used to display the second project pump. To do this, the user returns to the Screen Configuration window and clicks the Commands button. From the menu, the user simply clicks the Include Device button and selects the secondary pump by name from the dialog that appears. Note that each new dynamic device that is inserted in a project device diagram automatically becomes available for placement on a project screen. Once it is included on a project screen, all of its points are available for association with dynamic screen objects including real-time graphs.

The user saves the new screen, referred to as a View, with the name SCREEN2.PIC. The user then generates and downloads the new run-time system following the steps explained above. The user starts up the new run-time system and selects View Change screen. Two screens will be available for display. The user selects both screens for display simultaneously by opening up a second window from the Windows menu.

Figure 70:
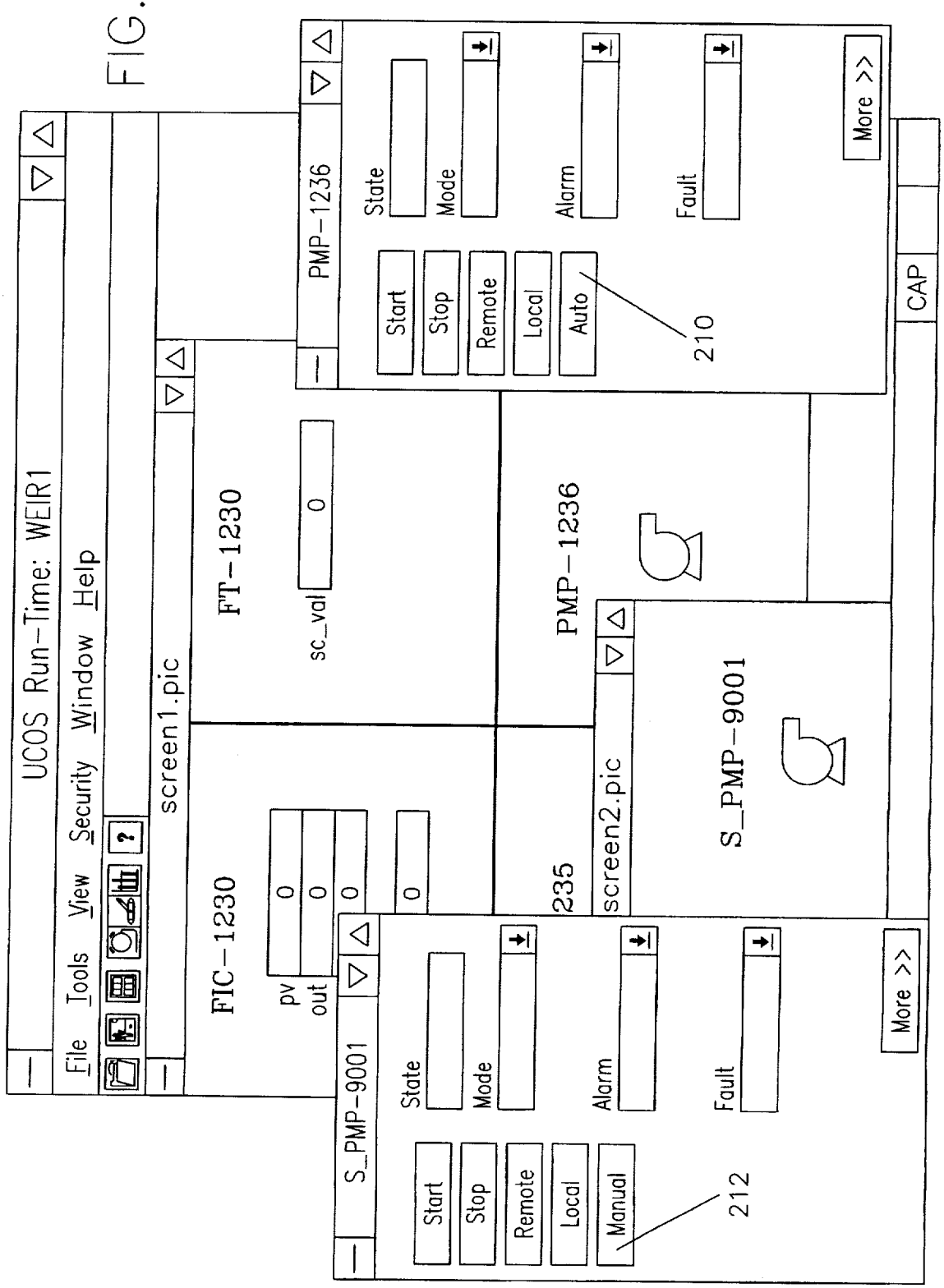
FIG. 70 shows the graphic screen at run-time after the modified discrete device has been inserted into the device diagram in the example control application of FIGS. 26–46.

As shown in FIG. 70, the user double clicks on the graphic symbol for PMP-1236 on the first screen to display its command window. The user also double clicks on the graphic symbol for S_PMP-9001 on the second window to show its command window.

The difference between the two windows can be seen by examining the command buttons on the left hand side of each window. The PMP-1236 command window contains the Auto mode command button 210 which the user added in the device definition editor. The S_PMP-9001 command window contains the Manual command button 212 which the user added to the pump template and then instantiated as the secondary pump device.

This concludes the example of the creation of a relatively simple UCOS process control application according to the present invention. This example has illustrated all the major application configuration phases for the project.

Configuring the hardware components of the project.

Building a device diagram with several types of UCOS devices.

Defining a group display to allow the operator to control and monitor several devices at once through standard command windows.

Configuring a graphic screen with animated graphics of the devices.

Modifying the logic for a discrete device using the device definitions editor.

Modifying the template logic for a discrete device.

As is evident from the foregoing description, the present invention provides a development system for control systems that allows users to define, in an intuitive fashion, the control scheme for a facility by combining the definition of the physical facility with the definition of the logical instructions which comprise the control scheme. Additionally, the present invention integrates the capabilities of analog/regulatory and discrete/sequential/interlocking control programming languages into a single tool. The present invention also provides a structured approach to programming logic instructions for controlling a piece of equipment that fits any controllable piece of equipment and that increases reusability and consistency thus providing a consistent model for building a set of logic instructions to control equipment.

Having described the invention, we claim:

1. An object-oriented development system for developing control schemes for facilities, the development system utilizing a graphical user interface environment, the system comprising:

device diagramming means for describing a physical description of a facility and a logical definition of a control scheme for the facility, the device diagramming means including, means for selecting device symbols representative of equipment or control functions used in facilities, the device symbols being selected from an object-oriented repository containing a plurality of device symbols and device objects, and wherein certain types of device symbols relate to device objects containing logical instructions and configuration information relating to the represented equipment or control functions, and means for interrelating in a graphical manner the selected device symbols and their corresponding device objects into one or more device diagrams, each of the device diagrams representing both the physical description of the facility or a portion of the facility and the logical definition of the control scheme for the facility or the portion of the facility; and device logic developing means for defining the logical instructions of the device objects relating to the equipment or control functions;

wherein the development system integrates in a graphical format the physical description of the facility with the logical instructions which define the control scheme for the facility, and wherein the logical instructions unify configuration of analog/regulatory control with configuration of discrete/sequential/interlocking control.

2. The development system as defined in claim 1 wherein the device symbols comprise configurable device symbols relating to device objects containing user modifiable logical instructions and configuration information.

3. The development system as defined in claim 2 wherein the device symbols further comprise static device symbols which illustrate physical aspects of the facility.

4. The development system as defined in claim 2 wherein the device logic developing means includes device definition editing means for creating and modifying the logical instructions and configuration information of the selected configurable device objects, and device template editing means for creating and defining device template objects for configurable device objects.

5. The development system as defined in claim 2 wherein the logical instructions for configurable discrete device objects are organized in a plurality of structured logic categories, with each logic category exhibiting distinct functional characteristics.

6. The development system as defined in claim 5 wherein the structured logic categories include control logic, state logic, mode logic, alarm logic, and fault logic.

7. The development system as defined in claim 5 wherein the device objects comprise new instances of existing device template objects and inherit all of the logical instructions and configuration information of the corresponding device template objects upon instantiation and interrelation into the device diagram.

8. The development system as defined in claim 1 wherein the device diagramming means further comprises means for creating and modifying device symbols to allow the illustration of any desired physical or logical aspect of a facility.

9. The development system as defined in claim 1 wherein the system merges the capabilities of the traditional programming tools of rung ladder logic programming and function block programming in order to unify the configuration of analog/regulatory control with the configuration of discrete/sequential/interlocking control.

10. Method for developing an object-oriented user-configurable control scheme for facilities in a graphical user interface environment, the method comprising:

selecting device symbols from an object-oriented repository containing a plurality of device symbols and device objects which represent equipment or control functions used in facilities, wherein certain types of device symbols relate to device objects containing logical instructions and configuration information relating to the represented equipment or control functions, and interrelating in a graphical manner the selected device symbols and their corresponding device objects into one or more device diagrams, each of the device diagrams representing both a physical description of the facility or a portion of the facility and a logical definition of the control scheme for the facility or the portion of the facility, wherein the physical description of the facility is integrated in a single control system with the definition of the logical instructions which comprise the control scheme in a graphical format, the logical instructions unifying configuration of analog/regulatory control with configuration of discrete/sequential/interlocking control.

11. The method as defined in claim 10 wherein the step of interrelating includes:

inserting in a graphical manner the selected device symbols into the device diagram; and connecting the selected device symbols inserted into the device diagram in a manner to represent the physical nature of the facility and the logical definition of the control scheme.

12. The method as defined in claim 10 wherein the device symbols comprise configurable device symbols relating to device objects containing user modifiable logical instructions and configuration information.

13. The method as defined in claim 12 further comprising the step of defining the logical instructions of the configurable devices in the device diagram.

14. An object-oriented development system for developing control schemes for facilities, the system comprising;

diagramming means for graphically producing one or more device diagrams, each of the device diagrams interrelating a plurality of device objects to provide in a graphical format a physical description of a facility or a portion of the facility integrated with a logical definition of a control scheme for the facility or the portion of the facility, the device objects relating to equipment or control functions used in facilities and including control information relating to control of the equipment or control functions, and means for defining, creating, and modifying the control information of the device objects;

wherein the logical definition of the control scheme unifies configuration of analog/regulatory control with configuration of discrete/sequential/interlocking control.

15. The development system as defined in claim 14 wherein each of the device objects respectively comprise a physical representation of the corresponding equipment or control functions, a graphical representation of the equipment or control functions, and the control information including logical instructions and configuration information relating to control of the equipment or control functions, the device objects organizing said representations, instructions and information in a consolidated manner to provide unification of the information which defines control and monitoring behavior for the equipment or control functions.

16. The development system as defined in claim 14 wherein the device objects comprise configurable device objects containing user modifiable logical instructions and configuration information.

17. The development system as defined in claim 16 wherein the means for defining includes device definition editing means for creating and modifying the logical instructions and configuration information of the configurable device objects, and device template editing means for creating and defining device template objects for configurable device objects.

18. The development system as defined in claim 16 wherein the logical instructions for configurable discrete device objects are organized in a plurality of structured logic categories, with each logic category exhibiting distinct functional characteristics.

19. The development system as defined in claim 18 wherein the structured logic categories include control logic, state logic, mode logic, alarm logic, and fault logic.

20. The development system as defined in claim 14 wherein the diagramming means further comprises means for creating and modifying device objects to allow the illustration of any desired physical or logical aspect of a facility.

21. In a development system for developing control schemes for facilities, the development system operating in a graphical user interface environment, an object-oriented development tool comprising:

a plurality of device objects relating to equipment or control functions used in facilities, the device objects including physical representations of the equipment or control functions and logical instructions and configuration information relating to the equipment or control functions, the device objects organizing said representations, instructions and information in a consolidated manner to provide unification of the information which defines control for the equipment or control functions; and diagramming means for graphically producing one or more device diagrams, each of the device diagrams interrelating a plurality of the device objects to provide in a graphical format a physical description of a facility or a portion of the facility integrated with a logical definition of a control scheme for the facility or the portion of the facility, wherein the logical definition of the control scheme unifies configuration of analog/regulatory control with configuration of discrete/sequential/interlocking control.

22. The development tool as defined in claim 21 wherein the device objects further include graphical representations of the equipment or control functions, said graphical representations being included with the unified information to further define monitoring and control behavior for the equipment or control functions during operation of the control scheme.

23. The development tool as defined in claim 21 wherein the diagramming means further comprises means for creating and modifying the device objects to allow the illustration of any desired physical or logical aspect of a facility.

24. The development tool as defined in claim 21 wherein the logical instructions for configurable discrete device objects are organized in a plurality of structured logic categories, with each logic category exhibiting distinct functional characteristics.

25. The development system as defined in claim 24 wherein the structured logic categories include control logic, state logic, mode logic, alarm logic, and fault logic.

26. An object-oriented computer program stored on a computer-readable memory device for directing operation of a computer for developing graphical user interface control schemes for a facility, the computer program comprising:

device diagram creating means for creating one or more device diagrams, each of the device diagrams representing both a physical description of the facility or a portion of the facility and a logical control scheme for the facility or the portion of the facility, the device diagram creating means including means for selecting a plurality of device symbols each representative of a piece of equipment or a control function used in the facility from an object-oriented repository containing a plurality of device symbols that relate to device objects containing logical instructions and configuration information for the represented equipment or control functions, and means for graphically interrelating the selected device symbols and their corresponding device objects on each of the device diagrams; and device logic developing means for defining the logical instructions of the device objects for the device symbols for integrating in each of the device diagrams both the physical description of the facility or the portion of the facility and the logical control scheme for the facility or the portion of the facility.

27. The computer program as set forth in claim 26, wherein the device symbols comprise configurable device symbols relating to device objects containing user modifiable logical instructions and configuration information.

28. The computer program as set forth in claim 26, wherein the device symbols further comprise static device symbols that illustrate physical aspects of the facility.

29. The computer program as set forth in claim 26, wherein the device logic developing means includes device definition editing means for creating and modifying the logical instructions and configuration information of the selected configurable device objects, and device template editing means for creating and defining device template objects for configurable device objects.

30. The computer program as set forth in claim 26, wherein the device diagramming means further comprises means for creating and modifying device symbols to allow the illustration of any desired physical or logical aspect of a facility.

31. The computer program as set forth in claim 26, wherein the logical instructions for configurable discrete device objects are organized in a plurality of structured logic categories, with each logic category exhibiting distinct functional characteristics.

32. The computer program as set forth in claim 26, wherein the structured logic categories include control logic, state logic, mode logic, alarm logic, and fault logic.

* * * * *

UNITED STATES PATENT AND TRADEMARK OFFICE
CERTIFICATE OF CORRECTION

PATENT NO. : 5,812,394

DATED : September 22, 1998

INVENTOR(S) : Lewis, Robert w.; Walker, Timothy K.; and Tanner, Matthew A.

It is certified that error appears in the above-identified patent and that said Letters Patent is hereby corrected as shown below:

In the drawings, sheet 45, Fig. 1, the drawing should be Fig. 38 and should appear as follows: (see attahcment).

Signed and Sealed this

Twenty-ninth Day of June, 1999

Attest:

Q. TODD DICKINSON

*Attesting Officer*        Acting Commissioner of Patents and Trademarks

UNITED STATES PATENT AND TRADEMARK OFFICE
CERTIFICATE OF CORRECTION

PATENT NO. : 5,812,394           Page 2 of 2
DATED      : September 22, 1998
INVENTOR(S) : Lewis, Robert W.; Walker, Timothy K.; and Tanner, Matthew A.

It is certified that error appears in the above-identified patent and that said Letters Patent is hereby corrected as shown below:

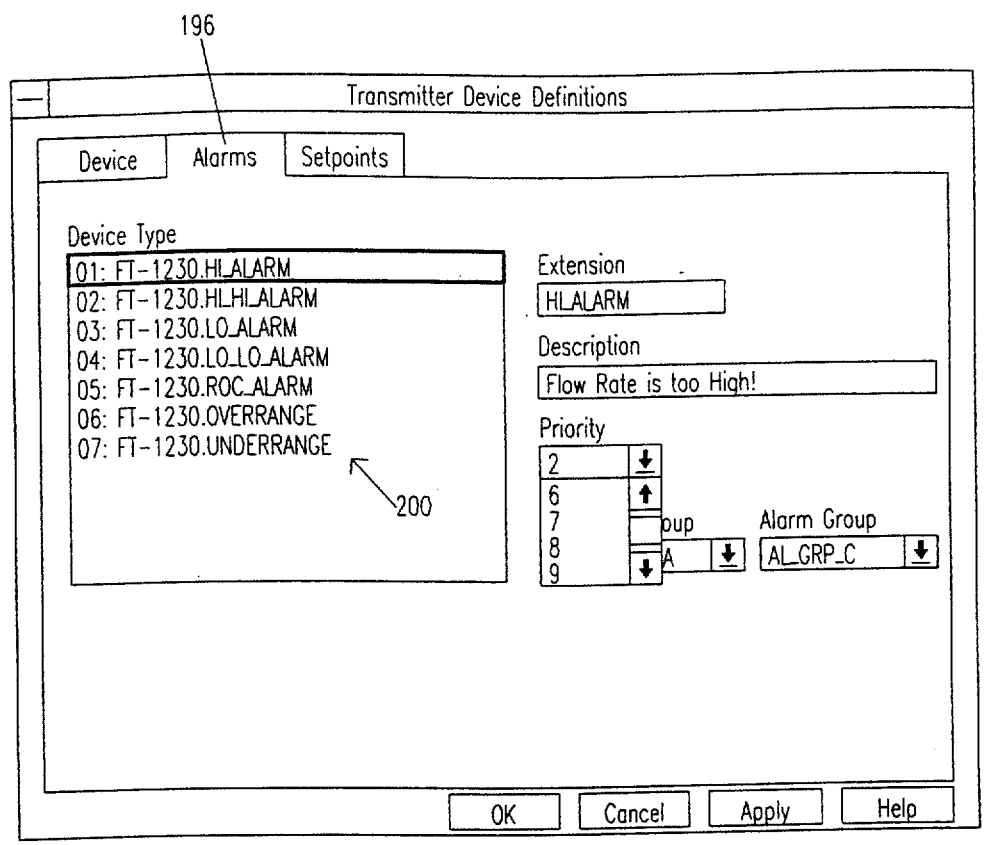

FIG. 38